United States Patent
Babaei

(10) Patent No.: US 11,832,306 B2
(45) Date of Patent: *Nov. 28, 2023

(54) WIRELESS DEVICE PROCESSES FOR A CELL WITH CONSISTENT LBT FAILURE

(71) Applicant: PanPsy Technologies, LLC, Fairfax, VA (US)

(72) Inventor: Alireza Babaei, Fairfax, VA (US)

(73) Assignee: PanPsy Technologies, LLC, Fairfax, VA (US)

( * ) Notice: Subject to any disclaimer, the term of this patent is extended or adjusted under 35 U.S.C. 154(b) by 84 days.

This patent is subject to a terminal disclaimer.

(21) Appl. No.: 17/384,886

(22) Filed: Jul. 26, 2021

(65) Prior Publication Data

US 2021/0352727 A1  Nov. 11, 2021

Related U.S. Application Data

(63) Continuation of application No. 17/201,003, filed on Mar. 15, 2021, now Pat. No. 11,109,413, which is a
(Continued)

(51) Int. Cl.
*H04W 4/00* (2018.01)
*H04W 74/08* (2009.01)
(Continued)

(52) U.S. Cl.
CPC ....... *H04W 74/0816* (2013.01); *H04L 1/1819* (2013.01); *H04W 16/14* (2013.01);
(Continued)

(58) Field of Classification Search
CPC . H04W 74/0816; H04W 16/14; H04W 28/04; H04W 72/1263; H04W 72/23; H04W 80/02; H04W 76/19; H04W 74/0808; H04L 1/1819; H04L 1/08; H04L 1/1835; H04L 1/1841
(Continued)

(56) References Cited

U.S. PATENT DOCUMENTS 10,979,128 B1   4/2021   Babaei
10,980,059 B1   4/2021   Babaei
(Continued)

OTHER PUBLICATIONS

3GPP TS 38.211 V15.7.0 (Sep. 2019); Technical Specification; 3rd Generation Partnership Project; Technical Specification Group Radio Access Network; NR; Physical channels and modulation; (Release 15).
(Continued)

*Primary Examiner* — Chuong T Ho
(74) *Attorney, Agent, or Firm* — Alireza Babaei

(57) ABSTRACT

A wireless device may receive first configuration parameters for uplink LBT failure recovery. The wireless device may create a transport block, comprising an LBT failure MAC CE, scheduled for transmission via a first cell at a first timing. The wireless device may trigger consistent LBT failure for the first cell based on the first configuration parameters and before the first timing. In response to the triggering, the wireless device may drop or transmit the transport block based on one or more conditions.

18 Claims, 48 Drawing Sheets

Related U.S. Application Data continuation of application No. 17/124,326, filed on Dec. 16, 2020, now Pat. No. 10,980,062.

(60) Provisional application No. 62/948,785, filed on Dec. 16, 2019.

(51) Int. Cl.

| | | |
|---|---|---|
| *H04W 80/02* | (2009.01) | |
| *H04W 72/1263* | (2023.01) | |
| *H04W 28/04* | (2009.01) | |
| *H04L 1/1812* | (2023.01) | |
| *H04W 16/14* | (2009.01) | |
| *H04W 72/23* | (2023.01) | |

(52) U.S. Cl.
CPC ....... *H04W 28/04* (2013.01); *H04W 72/1263* (2013.01); *H04W 72/23* (2023.01); *H04W 80/02* (2013.01)

(58) Field of Classification Search
USPC .................................................. 370/329, 330
See application file for complete search history.

(56) References Cited

U.S. PATENT DOCUMENTS

| | | | |
|---|---|---|---|
| 2018/0279340 A1 | 9/2018 | Skordeman et al. | |
| 2020/0107335 A1 | 4/2020 | Xue et al. | |
| 2020/0221495 A1 | 7/2020 | Chen et al. | |
| 2020/0275485 A1 | 8/2020 | Babaei et al. | |
| 2020/0314889 A1* | 10/2020 | Cirik ................ | H04W 74/0808 |
| 2021/0007146 A1 | 1/2021 | Agiwal et al. | |
| 2021/0029768 A1 | 1/2021 | Shih et al. | |
| 2021/0100031 A1* | 4/2021 | Cirik .................... | H04W 76/19 |
| 2021/0144760 A1* | 5/2021 | Ozturk ............. | H04W 72/0453 |
| 2021/0144762 A1* | 5/2021 | Tsai .................. | H04W 74/0833 |
| 2023/0164843 A1* | 5/2023 | Wang ............... | H04W 74/0816 370/329 |

OTHER PUBLICATIONS

3GPP TS 38.212 V15.7.0 (Sep. 2019); Technical Specification; 3rd Generation Partnership Project; Technical Specification Group Radio Access Network; NR; Multiplexing and channel coding; (Release 15).
3GPP TS 38.213 V15.7.0 (Sep. 2019); Technical Specification; 3rd Generation Partnership Project; Technical Specification Group Radio Access Network; NR; Physical layer procedures for control; (Release 15).
3GPP TS 38.214 V15.7.0 (Sep. 2019); Technical Specification; 3rd Generation Partnership Project; Technical Specification Group Radio Access Network; NR; Physical layer procedures for data; (Release 15).
3GPP TS 38.300 V15.7.0 (Sep. 2019); Technical Specification; 3rd Generation Partnership Project; Technical Specification Group Radio Access Network; NR; NR and NG-RAN Overall Description; Stage 2; (Release 15).
3GPP TS 38.321 V15.7.0 (Sep. 2019); Technical Specification; 3rd Generation Partnership Project; Technical Specification Group Radio Access Network; NR; Medium Access Control (MAC) protocol specification; (Release 15).
3GPP TS 38.331 V15.7.0 (Sep. 2019); Technical Specification; 3rd Generation Partnership Project; Technical Specification Group Radio Access Network; NR; Radio Resource Control (RRC); Protocol specification; (Release 15 ).
3GPP RAN WG2 Meeting #107; R2-1909604; Prague, Czech Republic, Aug. 26-30, 2019; Revision of R2-1906403; Agenda Item: 11.2.1.2; Source: InterDigital; Title: Handling UL LBT Failures in MAC; Document for: Discussion, Decision.
3GPP TSG-RAN WG2 Meeting #107bis; R2-1912095; Chongqing, China, Oct. 14-Oct. 18, 2019; Agenda Item: 6.2.2.2; Source: OPPO; Title: Remaining issues of detecting uplink LBT failure in NR-U; Document for: Discussion, Decision.
3GPP TSG-RAN WG2 Meeting #107bis; R2-1912096; Chongqing, China, Oct. 14-Oct. 18, 2019; Agenda Item: 6.2.2.2; Source: OPPO; Title: Uplink LBT failure recovery for NR-U; Document for: Discussion, Decision.
3GPP TSG-RAN WG2 Meeting #107bis; R2-1912177; Chongqing, China, Oct. 14-18, 2019; Source: vivo; Title: Remaining issues of uplink LBT failure; Agenda Item: 6.2.1.2; Document for: Discussion and Decision.
3GPP TSG-RAN2#107bis; R2-1912304; Chongqing, China, Oct. 14-18, 2019; Agenda item: 6.2.1.4; Source: Qualcomm Incorporated; Title: Details of the Uplink LBT failure mechanism; Document for: Discussion/Decision.
3GPP TSG-RAN WG2 107bis; R2-1912625; Chongqing, China, Oct. 14-18, 2019; Agenda Item: 6.2.1.2; Source: Intel Corporation; Title: Detecting and Handling of UL LBT failures; Document for: Discussion and Decision.
3GPP TSG-RAN WG2 Meeting #107bis; R2-1912684; Chongqing, China, Oct. 14-18, 2019; resubmission of R2-1910099; Agenda item: 6.2.2.2; Source: Lenovo, Motorola Mobility; Title: Impact of systematic LBT failure on UL transmission procedure; Document for: Discussion and Decision.
3GPP RAN WG2 Meeting #107bis; R2-1912889; Chongqing, China, Oct. 14-18, 2019; Revision of R2-1909604; Agenda Item: 6.2.2.2; Source: InterDigital; Title: Handling UL LBT Failures in MAC; Document for: Discussion, Decision.
3GPP TSG-RAN WG2 Meeting 107bis; R2-1913029; Chongqing, China, Oct. 14-18, 2019; Agenda Item: 6.2.2.2; Source: Huawei, HiSilicon; Title: UL LBT failure; Document for: Discussion, Decision.
3GPP TSG-RAN WG2 Meeting #107bis; R2-1913287; Chongqing, China, Oct. 14-18, 2019; Agenda item: 6.2.2.2; Source: Nokia, Nokia Shanghai Bell; Title: Remaining issues on UL LBT; WID/SID: NR_unlic-Core—Release 16; Document for: Discussion and Decision.
3GPP TSG-RAN WG2 Meeting #107bis; R2-1913294; Chongqing, China, Oct. 14-18, 2019; Agenda Item: 6.2.2.2; Source: Fujitsu; Title: UE behaviour upon consistent UL LBT failures; Document for: Discussion & Decision.
3GPP TSG-RAN WG2 v107bis; Tdoc R2-1913504; Chongqing, China, Oct. 14-18, 2019; (Revision of R2-1910779); Agenda Item: 6.2.2.2; Source: Ericsson; Title: Handling LBT failures; Document for: Discussion, Decision.
3GPP TSG-RAN WG2 Meeting #107bis; R2-1913649; Chongqing, China, Oct. 14-18, 2019; Agenda item: 6.2.2.2; Source: Charter Communications; Title: Remaining Issues on Consistent LBT Failure Detection in NRU; WID/SID: NR-U WID—Release 16; Document for: Discussion and Decision.
3GPP TSG-RAN WG2 Meeting #107-Bis; R2-1913913; Chongqing, China, Oct. 14-18, 2019; Agenda Item: 6.2.2.2; Source: ETRI; Title: Further considerations on handling UL LBT failures; Document for: Discussion and Decision.
3GPP TSG-RAN WG2 Meeting #108; R2-1914367; Reno, USA, Nov. 18-22, 2019; Source: vivo; Title: Remaining issues on uplink LBT failure; Agenda Item: 6.2.2.2; Document for: Discussion and Decision.
3GPP TSG RAN WG2 NR #108 Meeting; R2-1914791; Reno, USA, Nov. 18-22, 2019; Agenda Item: 6.2.2.2; Source: ZTE Corporation, Sanechips; Title: LBT failure report on SCell; Document for: Discussion and Decision.
3GPP RAN WG2 Meeting #108; R2-191xxxx; Reno, U.S.A, Nov. 18-22, 2019; Agenda Item: 6.2.2.2; Source: InterDigital; Title: Handling UL LBT Failures in MAC; Document for: Discussion, Decision.
3GPP TSG-RAN WG2 Meeting #108; R2-1915015; Reno, USA, Nov. 18-22, 2019; Revision of R2-1912243; Agenda item: 6.2.2.2; Source: Spreadtrum Communications, Huawei, HiSilicon; Title: LBT Failures Handling in Non-Connected State; Document for: Discussion and Decision.
3GPP TSG-RAN WG2 Meeting #108; R2-1915105; Reno, USA, Nov. 18-22, 2019; Agenda item: 6.2.2.2; Source: Lenovo, Motorola

(56) References Cited

OTHER PUBLICATIONS

Mobility; Title: UE behavior upon consistent LBT failure; Document for: Discussion and Decision.

3GPP TSG-RAN WG2 Meeting 108; R2-1915141; Reno, USA, Nov. 18-22, 2019; Agenda Item: 6.2.2.2; Source: Huawei, HiSilicon; Title: Handling of UL LBT failure; Document for: Discussion, Decision.

3GPP TSG-RAN WG2 Meeting #108; R2-1915177; Reno, USA, Nov. 18-Nov. 22, 2019; Source: Panasonic; Title: Remaining issue on detecting UL LBT Failures; Agenda Item: 6.2.2.2; Document for: Discussion and Decision.

3GPP TSG-RAN WG2 Meeting #108; R2-1915544; Reno, USA, Nov. 18-22, 2019; Revision of R2-1913260; Agenda Item: 6.2.2.2; Souce: MediaTek Inc.; Title: Remaining issues on consistent LBT failures; Document for: Discussion and decision.

3GPP TSG-RAN WG2 Meeting #108; R2-1915765; Reno, NV, USA Nov. 18-22, 2019; Agenda item: 6.2.2.4; Source: Qualcomm Incorporated; Title: Remaining details of UL LBT failure mechanism; Document for: Discussion and Decision.

3GPP TSG-RAN WG2 Meeting#108; R2-1915802; Reno, USA, Nov. 18-22, 2019; Agenda Item: 6.2.2.2; Source: Google; Title: Adapting the BFD mechanism for consistent LBT failure detection; Document for: Discussion and decision.

3GPP TSG-RAN WG2 Meeting #108; Tdoc R2-1915870; Reno, U.S., Nov. 18-22, 2019; Agenda Item: 6.2.2.2; Source: Ericsson; Title: Handling consistent UL LBT failures; Document for: Discussion, Decision.

3GPP TSG-RAN WG2 Meeting #108; R2-1915886; Reno, USA, Nov. 18-22, 2019; Agenda item: 6.2.2.2; Source: Nokia, Nokia Shanghai Bell; Title: UL LBT failure report; WID/SID: LTE_NR_DC_CA_enh-Core—Release 16; Document for: Discussion and Decision.

* cited by examiner

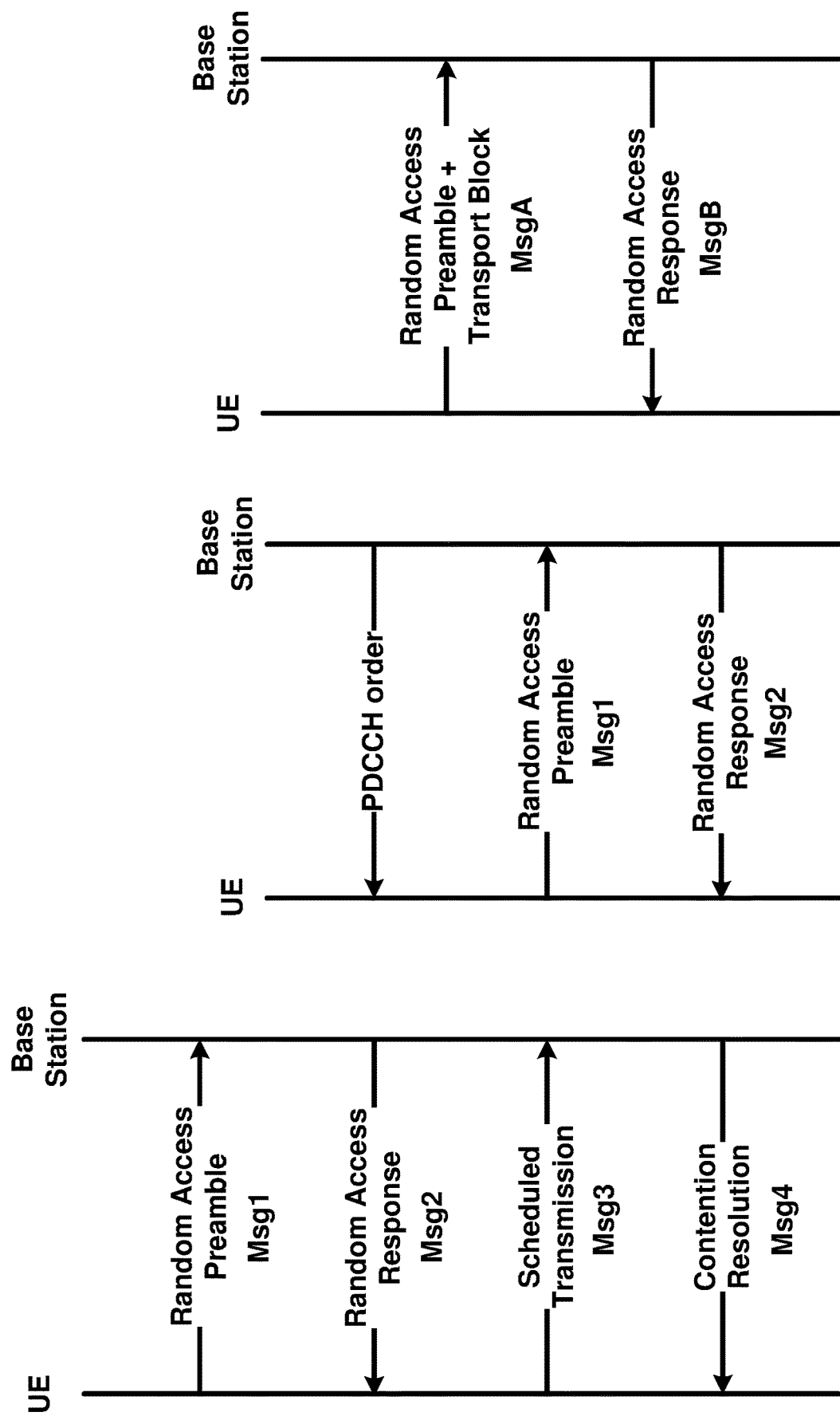

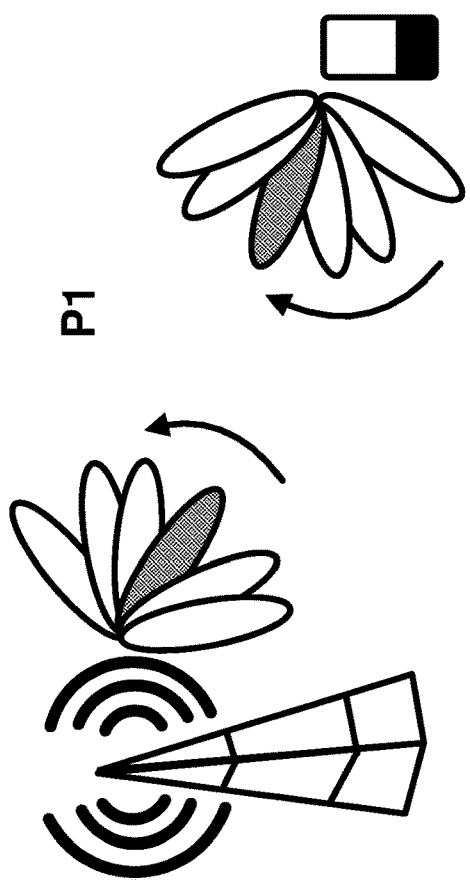
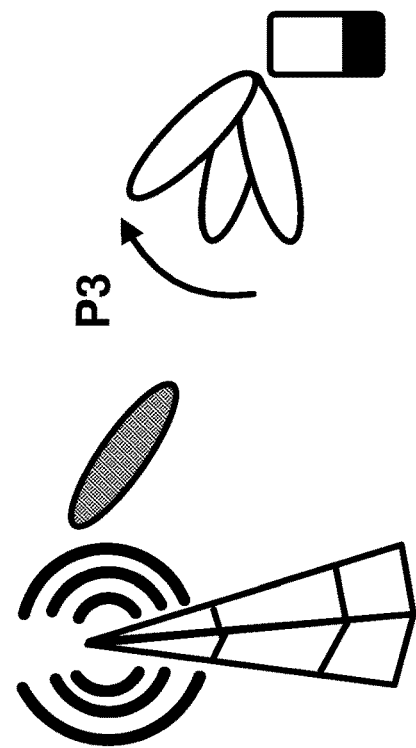
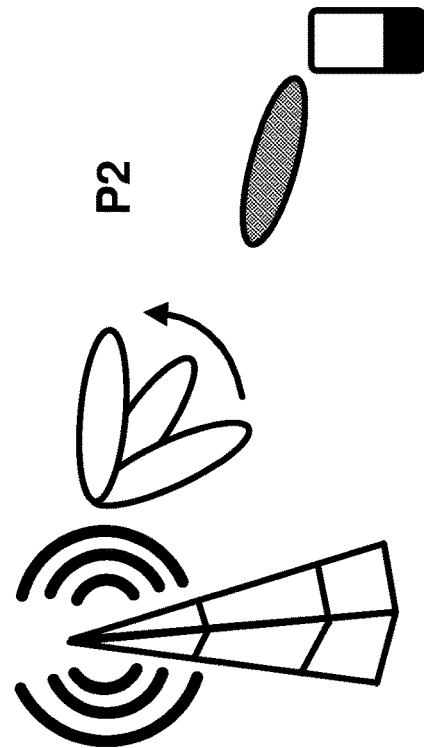
FIG. 14A
FIG. 14B
FIG. 14C

| Channel Access Priority Class ($p$) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3,7} |
| 2 | 2 | 7 | 15 | 4 ms | {7,15} |
| 3 | 3 | 15 | 1023 | 6ms or 10 ms | {15,31,63,127,255,511,1023} |
| 4 | 7 | 15 | 1023 | 6ms or 10 ms | {15,31,63,127,255,511,1023} |

For $p = 3, 4$, $T_{ulmcot,p}$ =10ms if the higher layer parameter absenceOfAnyOtherTechnology-r14 or absenceOfAnyOtherTechnology-r16 may be provided, otherwise, $T_{ulmcot,p}$ =6ms.

When $T_{ulmcot,p}$=6ms it may be increased to 8 ms by inserting one or more gaps. The minimum duration of a gap may be 100 μs. The maximum duration before including any such gap may be 6 ms.

FIG. 16

Receive configuration parameters for uplink LBT failure recovery
4110

- Transmit a 1st SRS via a 1st cell based on consistent LBT failures not being triggered for the 1st cell

- Triggering the consistent LBT failures for the 1st cell is based on the configuration parameters
4120

WIRELESS DEVICE PROCESSES FOR A CELL WITH CONSISTENT LBT FAILURE

CROSS-REFERENCE TO RELATED APPLICATIONS

This application is a continuation of U.S. application Ser. No. 17/201,003, filed Mar. 15, 2021, which is a continuation of U.S. patent application Ser. No. 17/124,326, filed Dec. 16, 2020, which claims the benefit of U.S. Provisional Application No. 62/948,785, filed Dec. 16, 2019, which is hereby incorporated by reference in its entirety.

BRIEF DESCRIPTION OF THE DRAWINGS

FIG. 12A, FIG. 12B and FIG. 12C show example random access processes in accordance with several of various embodiments of the present disclosure.

FIG. 14A, FIG. 14B and FIG. 14C show example beam management processes in accordance with several of various embodiments of the present disclosure.

FIG. 16 shows example channel access parameters for listen before talk in accordance with several of various embodiments of the present disclosure.

DETAILED DESCRIPTION

The exemplary embodiments of the disclosed technology enable operation of a wireless device and/or one or more base stations that employ unlicensed or shared spectrum. The exemplary disclosed embodiments may be implemented in the technical field of wireless communication systems. More particularly, the embodiment of the disclosed technology may relate to various wireless device and base station processes in response to consistent listen-before-talk (LBT) failures.

The devices and/or nodes of the mobile communications system disclosed herein may be implemented based on various technologies and/or various releases/versions/amendments of a technology. The various technologies include various releases of long-term evolution (LTE) technologies, various releases of 5G new radio (NR) technologies, various wireless local area networks technologies and/or a combination thereof and/or alike. For example, a base station may support a given technology and may communicate with wireless devices with different characteristics. The wireless devices may have different categories that define their capabilities in terms of supporting various features. The wireless device with the same category may have different capabilities. The wireless devices may support various technologies such as various releases of LTE technologies, various releases of 5G NR technologies and/or a combination thereof and/or alike. At least some of the wireless devices in the mobile communications system of the present disclosure may be stationary or almost stationary. In this disclosure, the terms "mobile communications system" and "wireless communications system" may be used interchangeably.

Figure 1A:
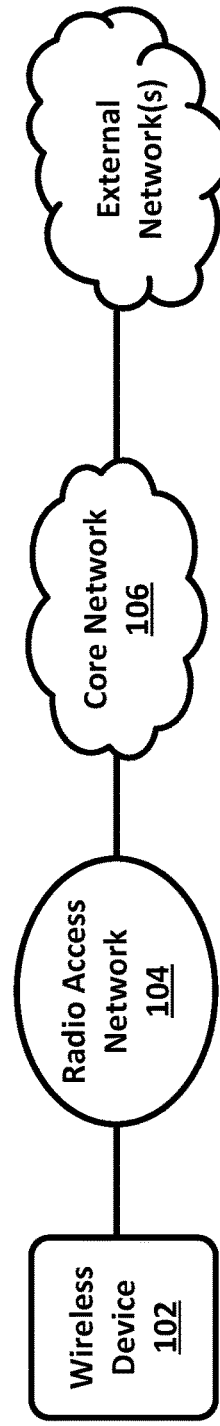
FIG. 1A and FIG. 1B show examples of mobile communications systems in accordance with several of various embodiments of the present disclosure.

FIG. 1A shows an example of a mobile communications system 100 in accordance with several of various embodiments of the present disclosure. The mobile communications system 100 may be, for example, run by a mobile network operator (MNO) or a mobile virtual network operator (MVNO). The mobile communications system 100 may be a public land mobile network (PLMN) run by a network operator providing a variety of service including voice, data, short messaging service (SMS), multimedia messaging service (MMS), emergency calls, etc. The mobile communications system 100 includes a core network (CN) 106, a radio access network (RAN) 104 and at least one wireless device 102.

The CN 106 connects the RAN 104 to one or more external networks (e.g., one or more data networks such as the Internet) and is responsible for functions such as authentication, charging and end-to-end connection establishment. Several radio access technologies (RATs) may be served by the same CN 106.

The RAN 104 may implement a RAT and may operate between the at least one wireless device 102 and the CN 106. The RAN 104 may handle radio related functionalities such as scheduling, radio resource control, modulation and coding, multi-antenna transmissions and retransmission protocols. The wireless device and the RAN may share a portion of the radio spectrum by separating transmissions from the wireless device to the RAN and the transmissions from the RAN to the wireless device. The direction of the transmissions from the wireless device to the RAN is known as the uplink and the direction of the transmissions from the RAN to the wireless device is known as the downlink. The separation of uplink and downlink transmissions may be achieved by employing a duplexing technique. Example duplexing techniques include frequency division duplexing (FDD), time division duplexing (TDD) or a combination of FDD and TDD.

In this disclosure, the term wireless device may refer to a device that communicates with a network entity or another device using wireless communication techniques. The wireless device may be a mobile device or a non-mobile (e.g., fixed) device. Examples of the wireless device include cellular phone, smart phone, tablet, laptop computer, wearable device (e.g., smart watch, smart shoe, fitness trackers, smart clothing, etc.), wireless sensor, wireless meter, extended reality (XR) devices including augmented reality (AR) and virtual reality (VR) devices, Internet of Things (IoT) device, vehicle to vehicle communications device, road-side units (RSU), automobile, relay node or any combination thereof. In some examples, the wireless device (e.g., a smart phone, tablet, etc.) may have an interface (e.g., a graphical user interface (GUI)) for configuration by an end user. In some examples, the wireless device (e.g., a wireless sensor device, etc.) may not have an interface for configuration by an end user. The wireless device may be referred to as a user equipment (UE), a mobile station (MS), a subscriber unit, a handset, an access terminal, a user terminal, a wireless transmit and receive unit (WTRU) and/or other terminology.

The at least one wireless device may communicate with at least one base station in the RAN 104. In this disclosure, the term base station may encompass terminologies associated with various RATs. For example, a base station may be referred to as a Node B in a 3G cellular system such as Universal Mobile Telecommunication Systems (UMTS), an evolved Node B (eNB) in a 4G cellular system such as evolved universal terrestrial radio access (E-UTRA), a next generation eNB (ng-eNB), a Next Generation Node B (gNB) in NR and/or a 5G system, an access point (AP) in Wi-Fi and/or other wireless local area networks. A base station may be referred to as a remote radio head (RRH), a baseband unit (BBU) in connection with one or more RRHs, a repeater or relay for coverage extension and/or any combination thereof. In some examples, all protocol layers of a base station may be implemented in one unit. In some example, some of the protocol layers (e.g., upper layers) of the base station may be implemented in a first unit (e.g., a central unit (CU)) and some other protocol layer (e.g., lower layers) may be implemented in one or more second units (e.g., distributed units (DUs)).

A base station in the RAN 104 includes one or more antennas to communicate with the at least one wireless device. The base station may communicate with the at least one wireless device using radio frequency (RF) transmissions and receptions via RF transceivers. The base station antennas may control one or more cells (or sectors). The size and/or radio coverage area of a cell may depend on the range that transmissions by a wireless device can be successfully received by the base station when the wireless device transmits using the RF frequency of the cell. The base station may be associated with cells of various sizes. At a given location, the wireless device may be in coverage area of a first cell of the base station and may not be in coverage area of a second cell of the base station depending on the sizes of the first cell and the second cell.

A base station in the RAN 104 may have various implementations. For example, a base station may be implemented by connecting a BBU (or a BBU pool) coupled to one or more RRHs and/or one or more relay nodes to extend the cell coverage. The BBU pool may be located at a centralized site like a cloud or data center. The BBU pool may be connected to a plurality of RRHs that control a plurality of cells. The combination of BBU with the one or more RRHs may be referred to as a centralized or cloud RAN (C-RAN) architecture. In some implementations, the BBU functions may be implemented on virtual machines (VMs) on servers at a centralized location. This architecture may be referred to as virtual RAN (vRAN). All, most or a portion of the protocol layer functions (e.g., all or portions of physical layer, medium access control (MAC) layer and/or higher layers) may be implemented at the BBU pool and the processed data may be transmitted to the RRHs for further processing and/or RF transmission. The links between the BBU pool and the RRHs may be referred to as fronthaul.

In some deployment scenarios, the RAN 104 may include macrocell base stations with high transmission power levels and large coverage areas. In other deployment scenarios, the RAN 104 may include base stations that employ different transmission power levels and/or have cells with different coverage areas. For example, some base station may be macrocell base stations with high transmission powers and/or large coverage areas and other base station may be small cell base stations with comparatively smaller transmission powers and/or coverage areas. In some deployment scenarios, a small cell base station may have coverage that is within or has overlap with coverage area of a macrocell base station. A wireless device may communicate with the macrocell base station while within the coverage area of the macrocell base station. For additional capacity, the wireless device may communicate with both the macrocell base station and the small cell base station while in the overlapped coverage area of the macrocell base station and the small cell base station. Depending on their coverage areas, a small cell base station may be referred to as a microcell base station, a picocell base station, a femtocell base station or a home base station.

Different standard development organizations (SDOs) have specified, or may specify in future, mobile communications systems that have similar characteristics as the mobile communications system 100 of FIG. 1A. For example, the Third-Generation Partnership Project (3GPP) is a group of SDOs that provides specifications that define 3GPP technologies for mobile communications systems that are akin to the mobile communications system 100. The 3GPP has developed specifications for third generation (3G) mobile networks, fourth generation (4G) mobile networks and fifth generation (5G) mobile networks. The 3G, 4G and 5G networks are also known as Universal Mobile Telecommunications System (UMTS), Long Term Evolution (LTE) and 5G system (5GS), respectively. In this disclosure, embodiments are described with respect to the RAN implemented in a 3GPP 5G mobile network that is also referred to as next generation RAN (NG-RAN). The embodiments may also be implemented in other mobile communications systems such as 3G or 4G mobile networks or mobile networks that may be standardized in future such as sixth generation (6G) mobile networks or mobile networks that are implemented by standards bodies other than 3GPP. The NG-RAN may be based on a new RAT known as new radio (NR) and/or other radio access technologies such as LTE and/or non-3GPP RATs.

Figure 1B:
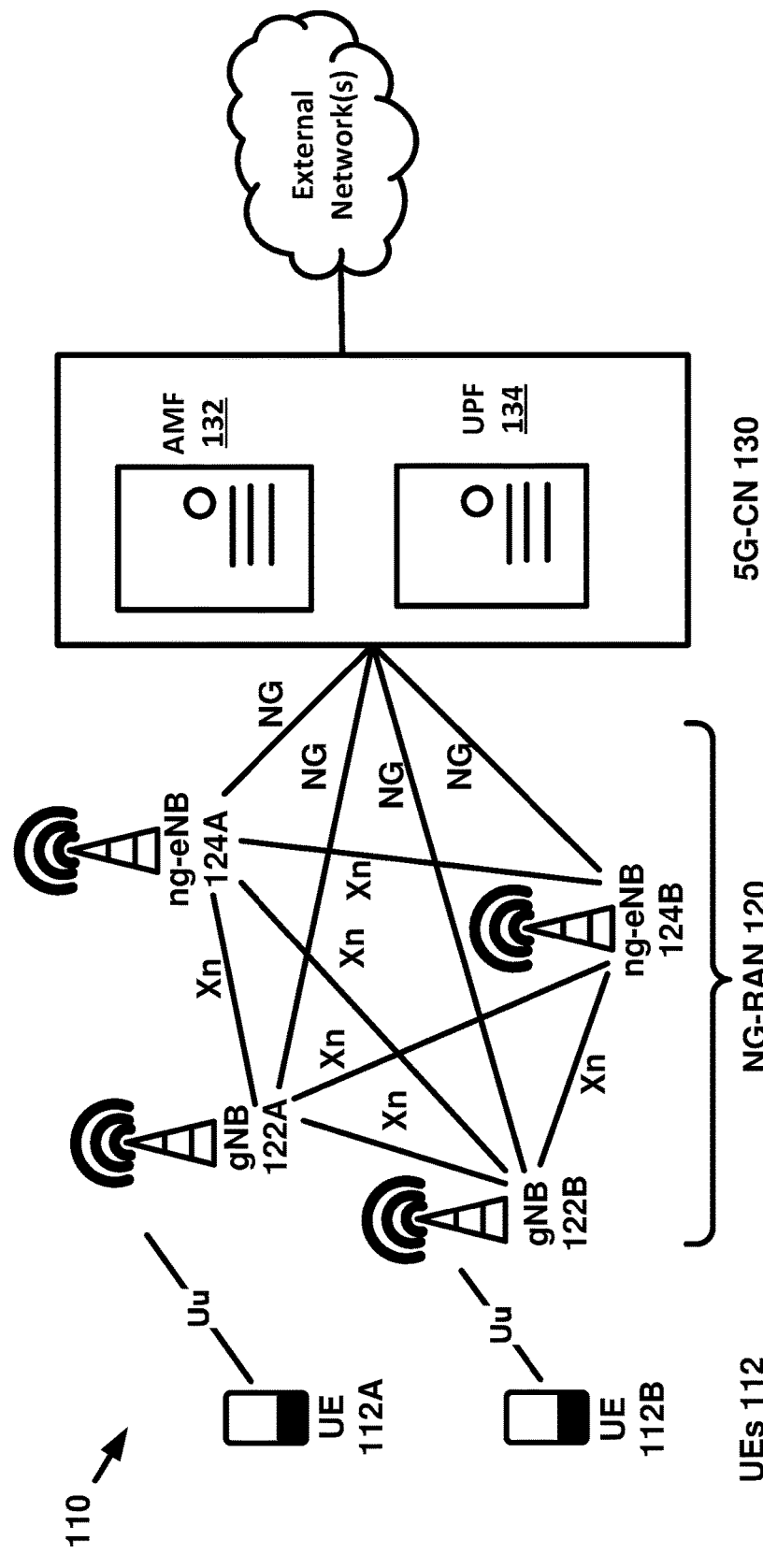

FIG. 1B shows an example of a mobile communications system 110 in accordance with several of various embodiments of the present disclosure. The mobile communications system 110 of FIG. 1B is an example of a 5G mobile network and includes a 5G CN (5G-CN) 130, an NG-RAN 120 and UEs (collectively 112 and individually UE 112A and UE 112B). The 5G-CN 130, the NG-RAN 120 and the UEs 112 of FIG. 1B operate substantially alike the CN 106, the RAN 104 and the at least one wireless device 102, respectively, as described for FIG. 1A.

The 5G-CN 130 of FIG. 1B connects the NG-RAN 120 to one or more external networks (e.g., one or more data networks such as the Internet) and is responsible for functions such as authentication, charging and end-to-end connection establishment. The 5G-CN has new enhancements compared to previous generations of CNs (e.g., evolved packet core (EPC) in the 4G networks) including service-based architecture, support for network slicing and control plane/user plane split. The service-based architecture of the 5G-CN provides a modular framework based on service and functionalities provided by the core network wherein a set of network functions are connected via service-based interfaces. The network slicing enables multiplexing of independent logical networks (e.g., network slices) on the same physical network infrastructure. For example, a network slice may be for mobile broadband applications with full mobility support and a different network slice may be for non-mobile latency-critical applications such as industry automation. The control plane/user plane split enables independent scaling of the control plane and the user plane. For example, the control plane capacity may be increased without affecting the user plane of the network.

The 5G-CN 130 of FIG. 1B includes an access and mobility management function (AMF) 132 and a user plane function (UPF) 134. The AMF 132 may support termination of non-access stratum (NAS) signaling, NAS signaling security such as ciphering and integrity protection, inter-3GPP access network mobility, registration management, connection management, mobility management, access authentication and authorization and security context management. The NAS is a functional layer between a UE and the CN and the access stratum (AS) is a functional layer between the UE and the RAN. The UPF 134 may serve as an interconnect point between the NG-RAN and an external data network. The UPF may support packet routing and forwarding, packet inspection and Quality of Service (QoS)

handling and packet filtering. The UPF may further act as a Protocol Data Unit (PDU) session anchor point for mobility within and between RATs.

The 5G-CN 130 may include additional network functions (not shown in FIG. 1B) such as one or more Session Management Functions (SMFs), a Policy Control Function (PCF), a Network Exposure Function (NEF), a Unified Data Management (UDM), an Application Function (AF), and/or an Authentication Server Function (AUSF). These network functions along with the AMF 132 and UPF 134 enable a service-based architecture for the 5G-CN.

The NG-RAN 120 may operate between the UEs 112 and the 5G-CN 130 and may implement one or more RATs. The NG-RAN 120 may include one or more gNBs (e.g., gNB 122A or gNB 122B or collectively gNBs 122) and/or one or more ng-eNBs (e.g., ng-eNB 124A or ng-eNB 124B or collectively ng-eNB s 124). The general terminology for gNB s 122 and/or an ng-eNBs 124 is a base station and may be used interchangeably in this disclosure. The gNBs 122 and the ng-eNBs 124 may include one or more antennas to communicate with the UEs 112. The one or more antennas of the gNBs 122 or ng-eNBs 124 may control one or more cells (or sectors) that provide radio coverage for the UEs 112.

A gNB and/or an ng-eNB of FIG. 1B may be connected to the 5G-CN 130 using an NG interface. A gNB and/or an ng-eNB may be connected with other gNBs and/or ng-eNBs using an Xn interface. The NG or the Xn interfaces are logical connections that may be established using an underlying transport network. The interface between a UE and a gNB or between a UE and an ng-eNBs may be referred to as the Uu interface. An interface (e.g., Uu, NG or Xn) may be established by using a protocol stack that enables data and control signaling exchange between entities in the mobile communications system of FIG. 1B. When a protocol stack is used for transmission of user data, the protocol stack may be referred to as user plane protocol stack. When a protocol stack is used for transmission of control signaling, the protocol stack may be referred to as control plane protocol stack. Some protocol layer may be used in both of the user plane protocol stack and the control plane protocol stack while other protocol layers may be specific to the user plane or control plane.

The NG interface of FIG. 1B may include an NG-User plane (NG-U) interface between a gNB and the UPF 134 (or an ng-eNB and the UPF 134) and an NG-Control plane (NG-C) interface between a gNB and the AMF 132 (or an ng-eNB and the AMF 132). The NG-U interface may provide non-guaranteed delivery of user plane PDUs between a gNB and the UPF or an ng-eNB and the UPF. The NG-C interface may provide services such as NG interface management, UE context management, UE mobility management, transport of NAS messages, paging, PDU session management, configuration transfer and/or warning message transmission.

The UEs 112 and a gNB may be connected using the Uu interface and using the NR user plane and control plane protocol stack. The UEs 112 and an ng-eNB may be connected using the Uu interface using the LTE user plane and control plane protocol stack.

In the example mobile communications system of FIG. 1B, a 5G-CN is connected to a RAN comprised of 4G LTE and/or 5G NR RATs. In other example mobile communications systems, a RAN based on the 5G NR RAT may be connected to a 4G CN (e.g., EPC). For example, earlier releases of 5G standards may support a non-standalone mode of operation where a NR based RAN is connected to the 4G EPC. In an example non-standalone mode, a UE may be connected to both a 5G NR gNB and a 4G LTE eNB (e.g., a ng-eNB) and the control plane functionalities (such as initial access, paging and mobility) may be provided through the 4G LTE eNB. In a standalone of operation, the 5G NR gNB is connected to a 5G-CN and the user plane and the control plane functionalities are provided by the 5G NR gNB.

Figure 2A:
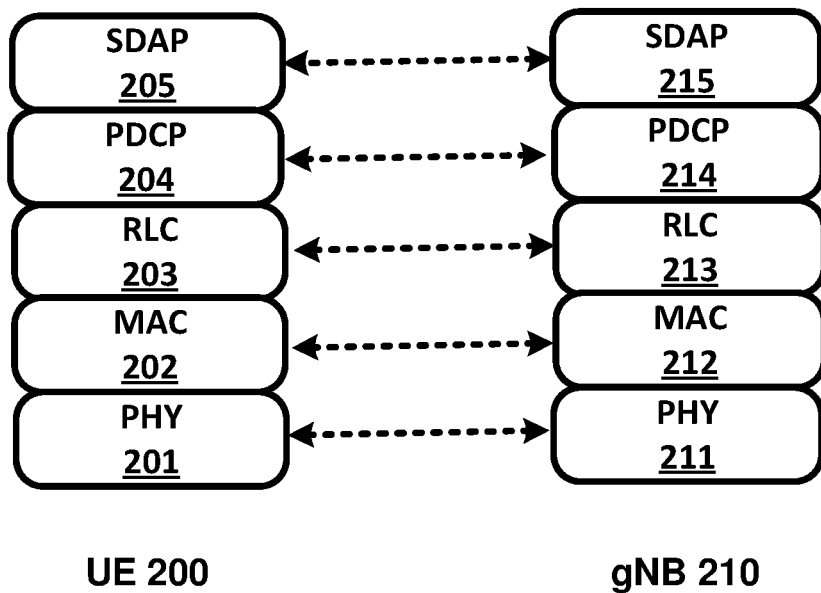
FIG. 2A and FIG. 2B show examples of user plane and control plane protocol layers in accordance with several of various embodiments of the present disclosure.

FIG. 2A shows an example of the protocol stack for the user plan of an NR Uu interface in accordance with several of various embodiments of the present disclosure. The user plane protocol stack comprises five protocol layers that terminate at the UE 200 and the gNB 210. The five protocol layers, as shown in FIG. 2A, include physical (PHY) layer referred to as PHY 201 at the UE 200 and PHY 211 at the gNB 210, medium access control (MAC) layer referred to as MAC 202 at the UE 200 and MAC 212 at the gNB 210, radio link control (RLC) layer referred to as RLC 203 at the UE 200 and RLC 213 at the gNB 210, packet data convergence protocol (PDCP) layer referred to as PDCP 204 at the UE 200 and PDCP 214 at the gNB 210, and service data application protocol (SDAP) layer referred to as SDAP 205 at the UE 200 and SDAP 215 at the gNB 210. The PHY layer, also known as layer 1 (L1), offers transport services to higher layers. The other four layers of the protocol stack (MAC, RLC, PDCP and SDAP) are collectively known as layer 2 (L2).

Figure 2B:
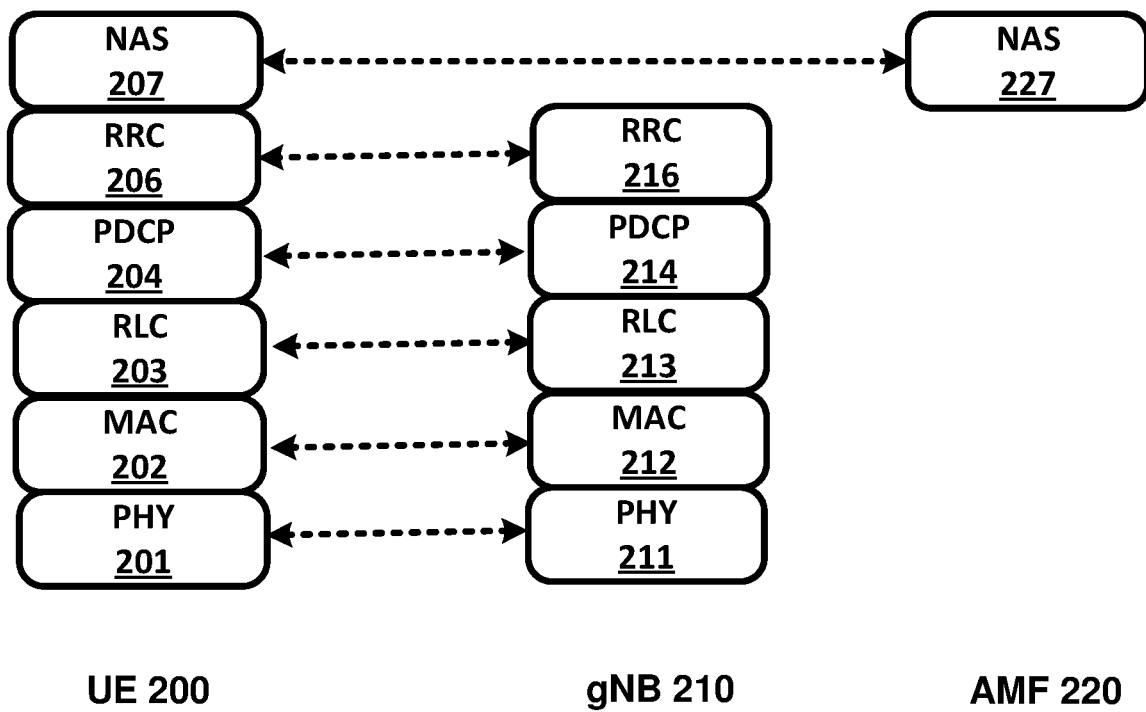

FIG. 2B shows an example of the protocol stack for the control plan of an NR Uu interface in accordance with several of various embodiments of the present disclosure. Some of the protocol layers (PHY, MAC, RLC and PDCP) are common between the user plane protocol stack shown in FIG. 2A and the control plan protocol stack. The control plane protocol stack also includes the RRC layer, referred to RRC 206 at the UE 200 and RRC 216 at the gNB 210, that also terminates at the UE 200 and the gNB 210. In addition, the control plane protocol stack includes the NAS layer that terminates at the UE 200 and the AMF 220. In FIG. 2B, the NAS layer is referred to as NAS 207 at the UE 200 and NAS 227 at the AMF 220.

Figure 3:
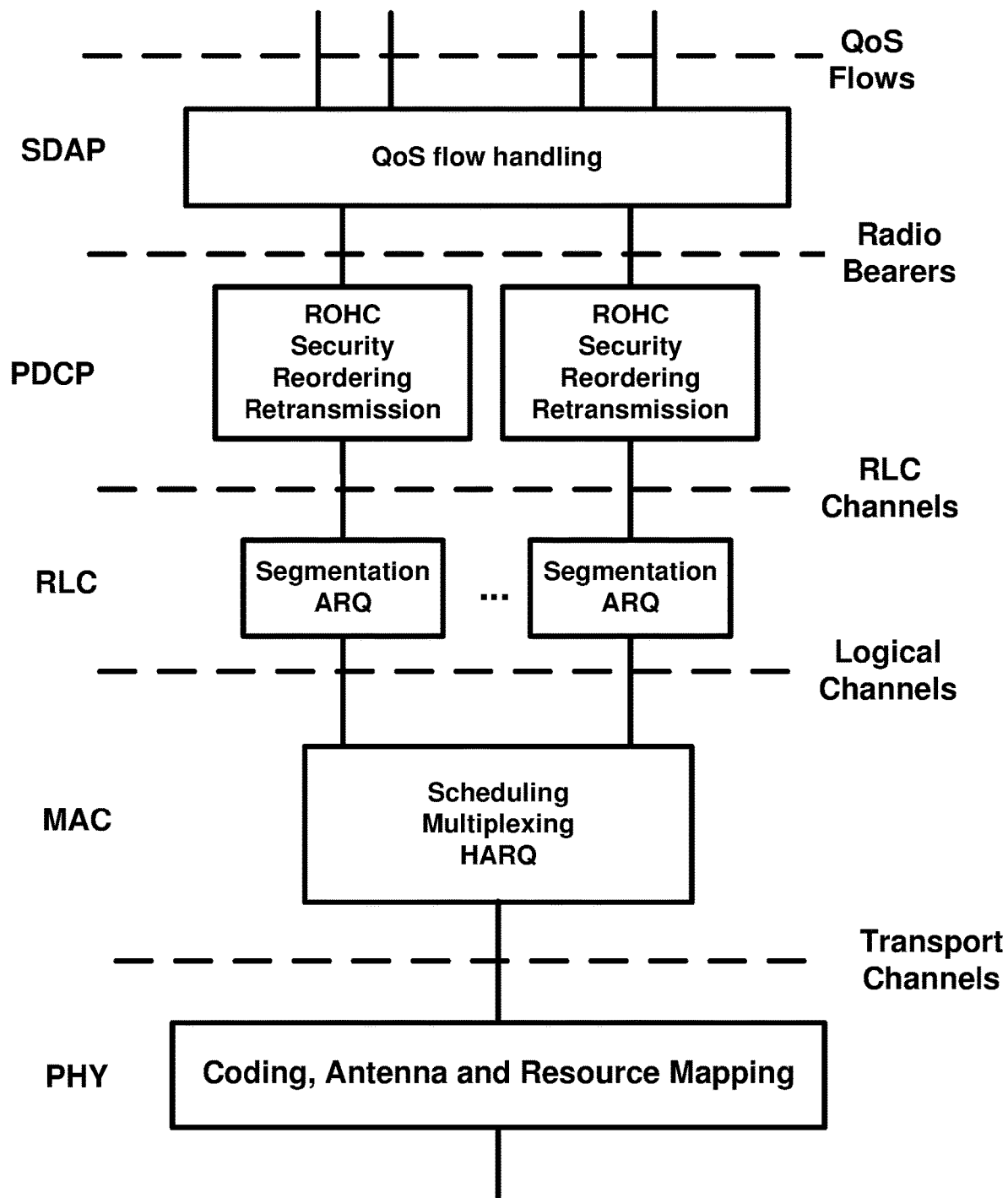
FIG. 3 shows example functions and services offered by protocol layers in a user plane protocol stack in accordance with several of various embodiments of the present disclosure.

FIG. 3 shows example functions and services offered to other layers by a layer in the NR user plane protocol stack of FIG. 2A in accordance with several of various embodiments of the present disclosure. For example, the SDAP layer of FIG. 3 (shown in FIG. 2A as SDAP 205 at the UE side and SDAP 215 at the gNB side) may perform mapping and de-mapping of QoS flows to data radio bearers. The mapping and de-mapping may be based on QoS (e.g., delay, throughput, jitter, error rate, etc.) associated with a QoS flow. A QoS flow may be a QoS differentiation granularity for a PDU session which is a logical connection between a UE 200 and a data network. A PDU session may contain one or more QoS flows. The functions and services of the SDAP layer include mapping and de-mapping between one or more QoS flows and one or more data radio bearers. The SDAP layer may also mark the uplink and/or downlink packets with a QoS flow ID (QFI).

The PDCP layer of FIG. 3 (shown in FIG. 2A as PDCP 204 at the UE side and PDCP 214 at the gNB side) may perform header compression and decompression (e.g., using Robust Header Compression (ROHC) protocol) to reduce the protocol header overhead, ciphering and deciphering and integrity protection and verification to enhance the security over the air interface, reordering and in-order delivery of packets and discarding of duplicate packets. A UE may be configured with one PDCP entity per bearer.

In an example scenario not shown in FIG. 3, a UE may be configured with dual connectivity and may connect to two different cell groups provided by two different base stations. For example, a base station of the two base stations may be referred to as a master base station and a cell group provided by the master base station may be referred to as a master cell group (MCG). The other base station of the two base stations may be referred to as a secondary base station and the cell group provided by the secondary base station may be referred to as a secondary cell group (SCG). A bearer may be configured for the UE as a split bearer that may be handled by the two different cell groups. The PDCP layer may perform routing of packets corresponding to a split bearer to and/or from RLC channels associated with the cell groups.

In an example scenario not shown in FIG. 3, a bearer of the UE may be configured (e.g., with control signaling) with PDCP packet duplication. A bearer configured with PDCP duplication may be mapped to a plurality of RLC channels each corresponding to different one or more cells. The PDCP layer may duplicate packets of the bearer configured with PDCP duplication and the duplicated packets may be mapped to the different RLC channels. With PDCP packet duplication, the likelihood of correct reception of packets increases thereby enabling higher reliability.

The RLC layer of FIG. 3 (shown in FIG. 2A as RLC 203 at the UE side and RLC 213 at the gNB side) provides service to upper layers in the form of RLC channels. The RLC layer may include three transmission modes: transparent mode (TM), Unacknowledged mode (UM) and Acknowledged mode (AM). The RLC layer may perform error correction through automatic repeat request (ARQ) for the AM transmission mode, segmentation of RLC service data units (SDUs) for the AM and UM transmission modes and re-segmentation of RLC SDUs for AM transmission mode, duplicate detection for the AM transmission mode, RLC SDU discard for the AM and UM transmission modes, etc. The UE may be configured with one RLC entity per RLC channel.

The MAC layer of FIG. 3 (shown in FIG. 2A as MAC 202 at the UE side and MAC 212 at the gNB side) provides services to the RLC layer in form of logical channels. The MAC layer may perform mapping between logical channels and transport channels, multiplexing/demultiplexing of MAC SDUs belonging to one or more logical channels into/from transport blocks (TBs) delivered to/from the physical layer on transport channels, reporting of scheduling information, error correction through hybrid automatic repeat request (HARQ), priority handling between UEs by means of dynamic scheduling, priority handling between logical channels of one UE by means of logical channel prioritization and/or padding. In case of carrier aggregation, a MAC entity may comprise one HARQ entity per cell. A MAC entity may support multiple numerologies, transmission timings and cells. The control signaling may configure logical channels with mapping restrictions. The mapping restrictions in logical channel prioritization may control the numerology(ies), cell(s), and/or transmission timing(s)/duration(s) that a logical channel may use.

The PHY layer of FIG. 3 (shown in FIG. 2A as PHY 201 at the UE side and PHY 211 at the gNB side) provides transport services to the MAC layer in form of transport channels. The physical layer may handle coding/decoding, HARQ soft combining, rate matching of a coded transport channel to physical channels, mapping of coded transport channels to physical channels, modulation and demodulation of physical channels, frequency and time synchronization, radio characteristics measurements and indication to higher layers, RF processing, and mapping to antennas and radio resources.

Figure 4:
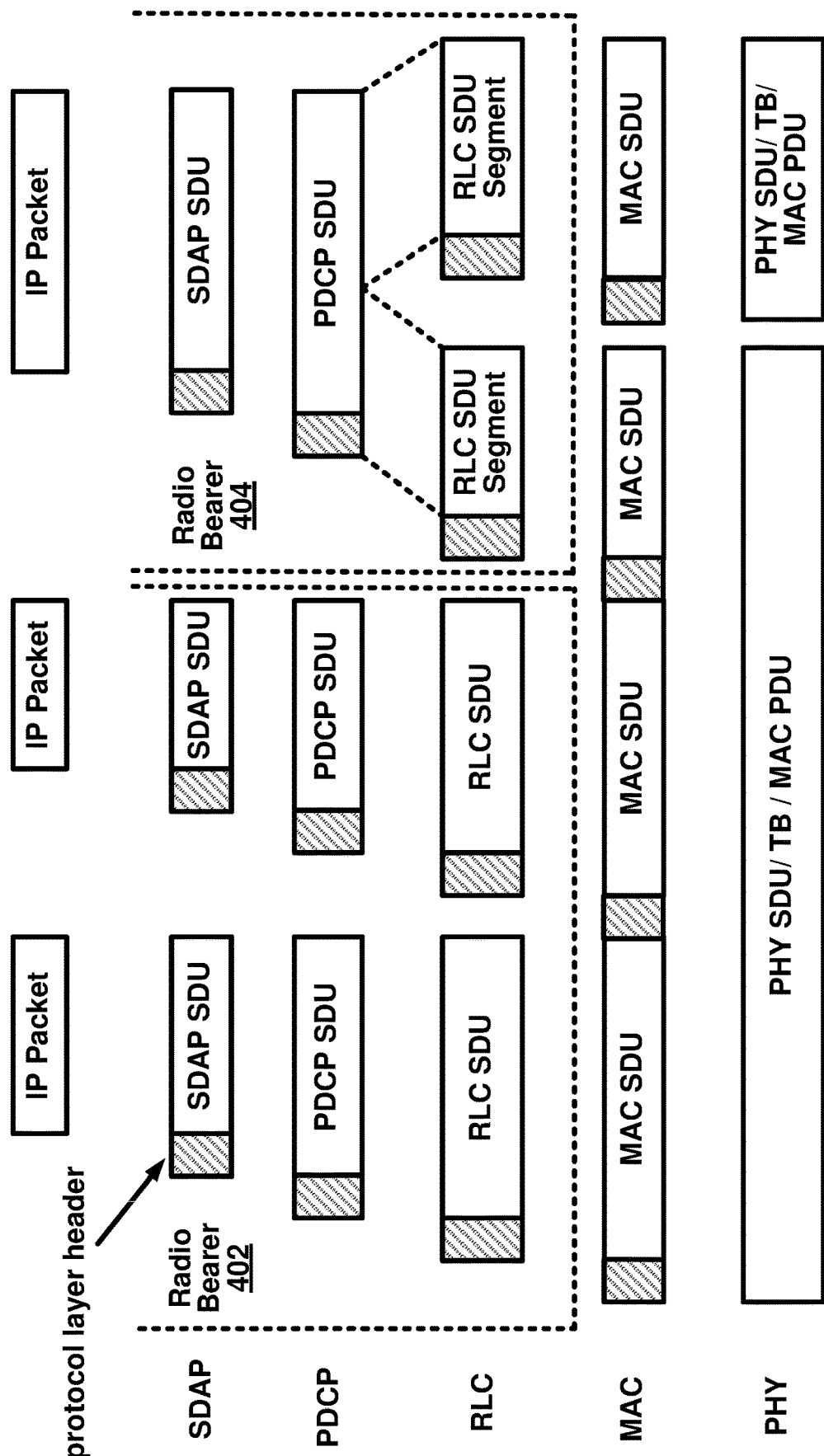
FIG. 4 shows example flow of packets through the protocol layers in accordance with several of various embodiments of the present disclosure.

FIG. 4 shows example processing of packets at different protocol layers in accordance with several of various embodiments of the present disclosure. In this example, three Internet Protocol (IP) packets that are processed by the different layers of the NR protocol stack. The term SDU shown in FIG. 4 is the data unit that is entered from/to a higher layer. In contrast, a protocol data unit (PDU) is the data unit that is entered to/from a lower layer. The flow of packets in FIG. 4 is for downlink. An uplink data flow through layers of the NR protocol stack is similar to FIG. 4. In this example, the two leftmost IP packets are mapped by the SDAP layer (shown as SDAP 205 and SDAP 215 in FIG. 2A) to radio bearer 402 and the rightmost packet is mapped by the SDAP layer to the radio bearer 404. The SDAP layer adds SDAP headers to the IP packets which are entered into the PDCP layer as PDCP SDUs. The PDCP layer is shown as PDCP 204 and PDCP 214 in FIG. 2A. The PDCP layer adds the PDCP headers to the PDCP SDUs which are entered into the RLC layer as RLC SDUs. The RLC layer is shown as RLC 203 and RLC 213 in FIG. 2A. An RLC SDU may be segmented at the RLC layer. The RLC layer adds RLC headers to the RLC SDUs after segmentation (if segmented) which are entered into the MAC layer as MAC SDUs. The MAC layer adds the MAC headers to the MAC SDUs and multiplexes one or more MAC SDUs to form a PHY SDU (also referred to as a transport block (TB) or a MAC PDU).

In FIG. 4, the MAC SDUs are multiplexed to form a transport block. The MAC layer may multiplex one or more MAC control elements (MAC CEs) with zero or more MAC SDUs to form a transport block. The MAC CEs may also be referred to as MAC commands or MAC layer control signaling and may be used for in-band control signaling. The MAC CEs may be transmitted by a base station to a UE (e.g., downlink MAC CEs) or by a UE to a base station (e.g., uplink MAC CEs). The MAC CEs may be used for transmission of information useful by a gNB for scheduling (e.g., buffer status report (BSR) or power headroom report (PHR)), activation/deactivation of one or more cells, activation/deactivation of configured radio resources for or one or more processes, activation/deactivation of one or more processes, indication of parameters used in one or more processes, etc.

Figure 5A:
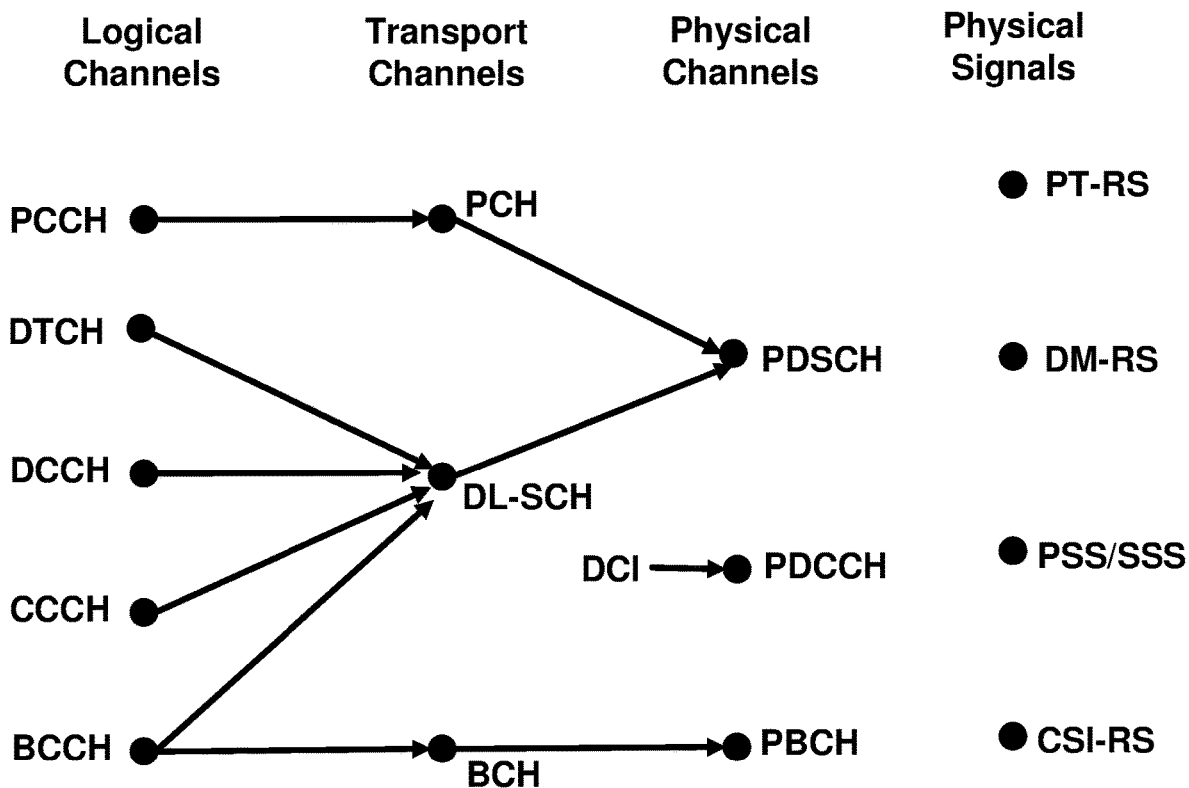
FIG. 5A shows example mapping of channels between layers of the protocol stack and different physical signals in downlink in accordance with several of various embodiments of the present disclosure.
Figure 5B:
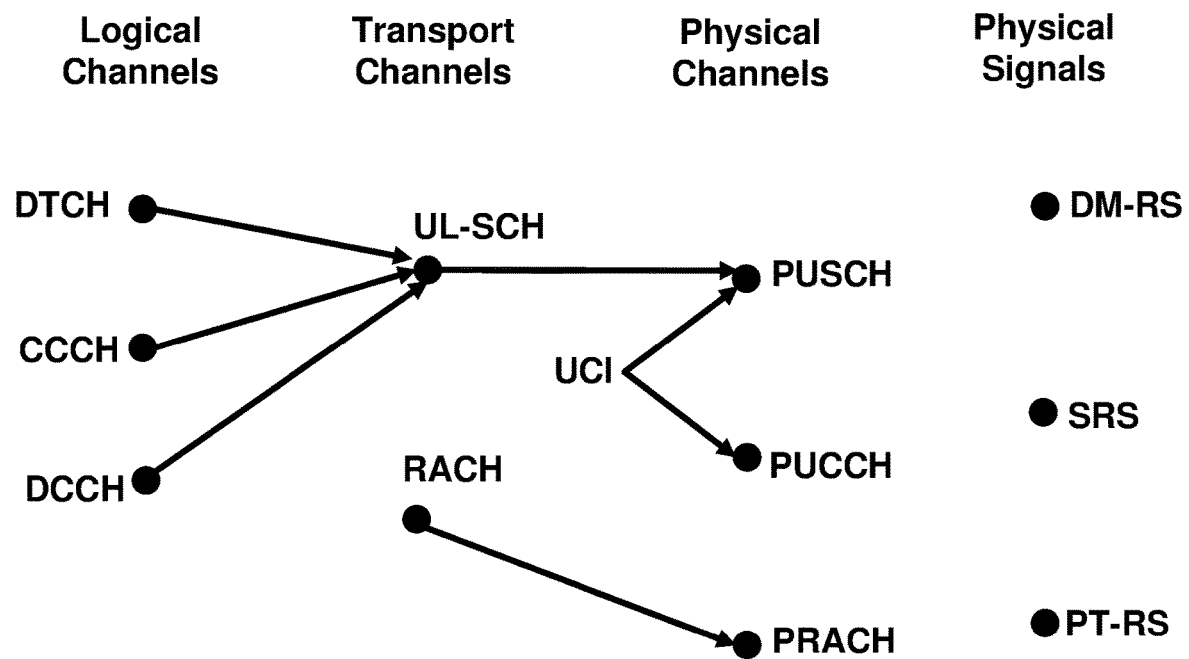
FIG. 5B shows example mapping of channels between layers of the protocol stack and different physical signals in uplink in accordance with several of various embodiments of the present disclosure.

FIG. 5A and FIG. 5B show example mapping between logical channels, transport channels and physical channels for downlink and uplink, respectively in accordance with several of various embodiments of the present disclosure. As discussed before, the MAC layer provides services to higher layer in the form of logical channels. A logical channel may be classified as a control channel, if used for transmission of control and/or configuration information, or a traffic channel if used for transmission of user data. Example logical channels in NR include Broadcast Control Channel (BCCH) used for transmission of broadcast system control information, Paging Control Channel (PCCH) used for carrying paging messages for wireless devices with unknown locations, Common Control Channel (CCCH) used for transmission of control information between UEs and network and for UEs that have no RRC connection with the network, Dedicated Control Channel (DCCH) which is a point-to-point bi-directional channel for transmission of dedicated control information between a UE that has an RRC connection and the network and Dedicated Traffic Channel (DTCH)

which is point-to-point channel, dedicated to one UE, for the transfer of user information and may exist in both uplink and downlink.

As discussed before, the PHY layer provides services to the MAC layer and higher layers in the form of transport channels. Example transport channels in NR include Broadcast Channel (BCH) used for transmission of part of the BCCH referred to as master information block (MIB), Downlink Shared Channel (DL-SCH) used for transmission of data (e.g., from DTCH in downlink) and various control information (e.g., from DCCH and CCCH in downlink and part of the BCCH that is not mapped to the BCH), Uplink Shared Channel (UL-SCH) used for transmission of uplink data (e.g., from DTCH in uplink) and control information (e.g., from CCCH and DCCH in uplink) and Paging Channel (PCH) used for transmission of paging information from the PCCH. In addition, Random Access Channel (RACH) is a transport channel used for transmission of random access preambles. The RACH does not carry a transport block. Data on a transport channel (except RACH) may be organized in transport blocks, wherein One or more transport blocks may be transmitted in a transmission time interval (TTI).

The PHY layer may map the transport channels to physical channels. A physical channel may correspond to time-frequency resources that are used for transmission of information from one or more transport channels. In addition to mapping transport channels to physical channels, the physical layer may generate control information (e.g., downlink control information (DCI) or uplink control information (UCI)) that may be carried by the physical channels. Example DCI include scheduling information (e.g., downlink assignments and uplink grants), request for channel state information report, power control command, etc. Example UCI include HARQ feedback indicating correct or incorrect reception of downlink transport blocks, channel state information report, scheduling request, etc. Example physical channels in NR include a Physical Broadcast Channel (PBCH) for carrying information from the BCH, a Physical Downlink Shared Channel (PDSCH) for carrying information form the PCH and the DL-SCH, a Physical Downlink Control Channel (PDCCH) for carrying DCI, a Physical Uplink Shared Channel (PUSCH) for carrying information from the UL-SCH and/or UCI, a Physical Uplink Control Channel (PUCCH) for carrying UCI and Physical Random Access Channel (PRACH) for transmission of RACH (e.g., random access preamble).

The PHY layer may also generate physical signals that are not originated from higher layers. As shown in FIG. 5A, example downlink physical signals include Demodulation Reference Signal (DM-RS), Phase Tracking Reference Signal (PT-RS), Channel State Information Reference Signal (CSI-RS), Primary Synchronization Signal (PSS) and Secondary Synchronization Signal (SSS). As shown in FIG. 5B, example uplink physical signals include DM-RS, PT-RS and sounding reference signal (SRS).

As indicated earlier, some of the protocol layers (PHY, MAC, RLC and PDCP) of the control plane of an NR Uu interface, are common between the user plane protocol stack (as shown in FIG. 2A) and the control plane protocol stack (as shown in FIG. 2B). In addition to PHY, MAC, RLC and PDCP, the control plane protocol stack includes the RRC protocol layer and the NAS protocol layer.

The NAS layer, as shown in FIG. 2B, terminates at the UE 200 and the AMF 220 entity of the 5G-C 130. The NAS layer is used for core network related functions and signaling including registration, authentication, location update and session management. The NAS layer uses services from the AS of the Uu interface to transmit the NAS messages.

The RRC layer, as shown in FIG. 2B, operates between the UE 200 and the gNB 210 (more generally NG-RAN 120) and may provide services and functions such as broadcast of system information (SI) related to AS and NAS as well as paging initiated by the 5G-C 130 or NG-RAN 120. In addition, the RRC layer is responsible for establishment, maintenance and release of an RRC connection between the UE 200 and the NG-RAN 120, carrier aggregation configuration (e.g., addition, modification and release), dual connectivity configuration (e.g., addition, modification and release), security related functions, radio bearer configuration/maintenance and release, mobility management (e.g., maintenance and context transfer), UE cell selection and reselection, inter-RAT mobility, QoS management functions, UE measurement reporting and control, radio link failure (RLF) detection and NAS message transfer. The RRC layer uses services from PHY, MAC, RLC and PDCP layers to transmit RRC messages using signaling radio bearers (SRBs). The SRBs are mapped to CCCH logical channel during connection establishment and to DCCH logical channel after connection establishment.

Figure 6:
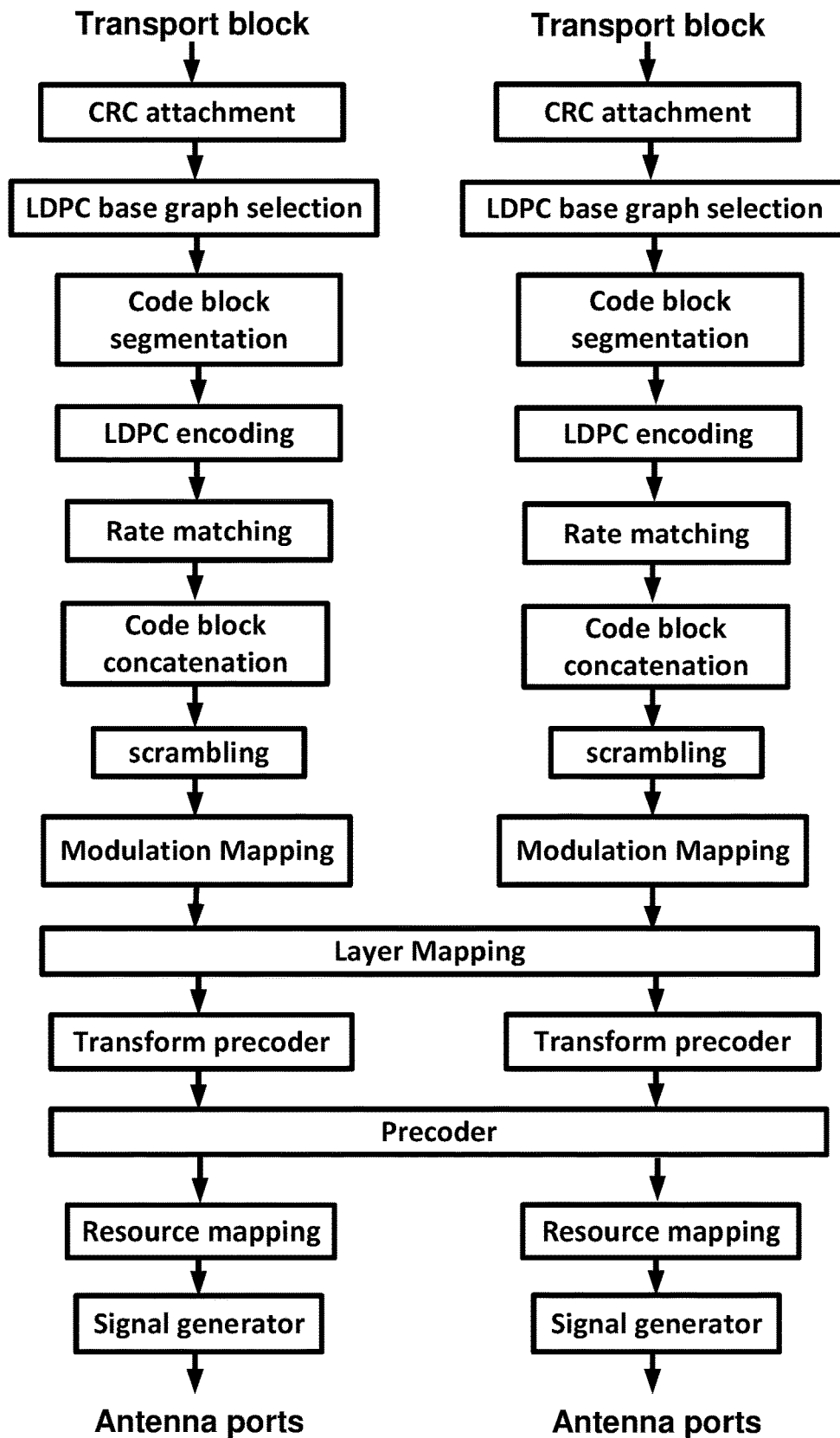
FIG. 6 shows example physical layer processes for signal transmission in accordance with several of various embodiments of the present disclosure.

FIG. 6 shows example physical layer processes for signal transmission in accordance with several of various embodiments of the present disclosure. Data and/or control streams from MAC layer may be encoded/decoded to offer transport and control services over the radio transmission link. For example, one or more (e.g., two as shown in FIG. 6) transport blocks may be received from the MAC layer for transmission via a physical channel (e.g., a physical downlink shared channel or a physical uplink shared channel). A cyclic redundancy check (CRC) may be calculated and attached to a transport block in the physical layer. The CRC calculation may be based on one or more cyclic generator polynomials. The CRC may be used by the receiver for error detection. Following the transport block CRC attachment, a low-density parity check (LDPC) base graph selection may be performed. In example embodiments, two LDPC base graphs may be used wherein a first LDPC base graph may be optimized for small transport blocks and a second LDPC base graph may be optimized for comparatively larger transport blocks.

The transport block may be segmented into code blocks and code block CRC may be calculated and attached to a code block. A code block may be LDPC coded and the LDPC coded blocks may be individually rate matched. The code blocks may be concatenated to create one or more codewords. The contents of a codeword may be scrambled and modulated to generate a block of complex-valued modulation symbols. The modulation symbols may be mapped to a plurality of transmission layers (e.g., multiple-input multiple-output (MIMO) layers) and the transmission layers may be subject to transform precoding and/or precoding. The precoded complex-valued symbols may be mapped to radio resources (e.g., resource elements). The signal generator block may create a baseband signal and up-convert the baseband signal to a carrier frequency for transmission via antenna ports. The signal generator block may employ mixers, filters and/or other radio frequency (RF) components prior to transmission via the antennas. The functions and blocks in FIG. 6 are illustrated as examples and other mechanisms may be implemented in various embodiments.

Figure 7:
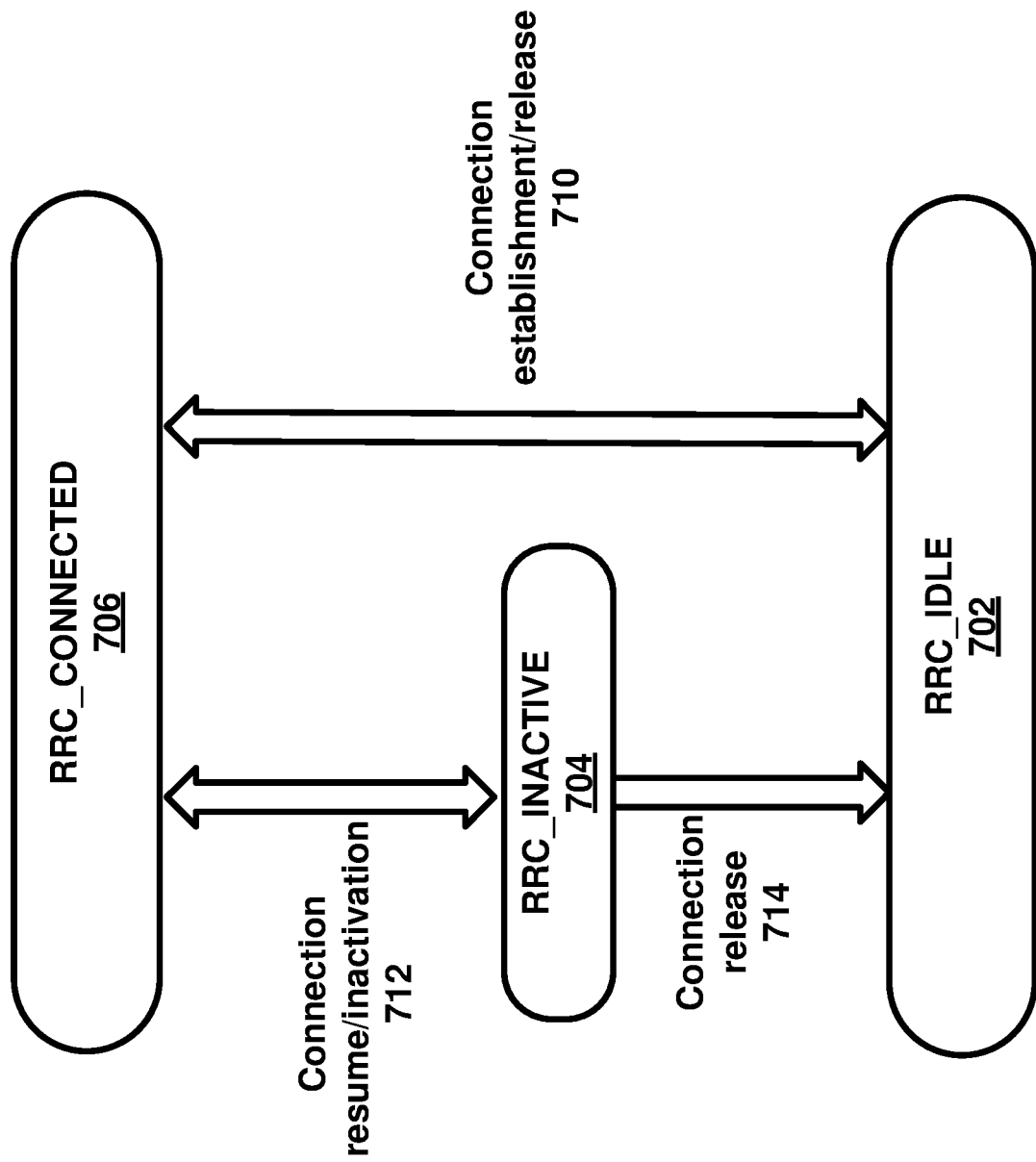
FIG. 7 shows examples of RRC states and RRC state transitions in accordance with several of various embodiments of the present disclosure.

FIG. 7 shows examples of RRC states and RRC state transitions at a UE in accordance with several of various embodiments of the present disclosure. A UE may be in one of three RRC states: RRC_IDLE 702, RRC INACTIVE 704 and RRC_CONNECTED 706. In RRC_IDLE 702 state, no RRC context (e.g., parameters needed for communications between the UE and the network) may be established for the UE in the RAN. In RRC_IDLE 702 state, no data transfer between the UE and the network may take place and uplink synchronization is not maintained. The wireless device may sleep most of the time and may wake up periodically to receive paging messages. The uplink transmission of the UE may be based on a random access process and to enable transition to the RRC_CONNECTED 706 state. The mobility in RRC_IDLE 702 state is through a cell reselection procedure where the UE camps on a cell based on one or more criteria including signal strength that is determined based on the UE measurements.

In RRC_CONNECTED 706 state, the RRC context is established and both the UE and the RAN have necessary parameters to enable communications between the UE and the network. In the RRC_CONNECTED 706 state, the UE is configured with an identity known as a Cell Radio Network Temporary Identifier (C-RNTI) that is used for signaling purposes (e.g., uplink and downlink scheduling, etc.) between the UE and the RAN. The wireless device mobility in the RRC_CONNECTED 706 state is managed by the RAN. The wireless device provides neighboring cells and/or current serving cell measurements to the network and the network may make hand over decisions. Based on the wireless device measurements, the current serving base station may send a handover request message to a neighboring base station and may send a handover command to the wireless device to handover to a cell of the neighboring base station. The transition of the wireless device from the RRC_IDLE 702 state to the RRC_CONNECTED 706 state or from the RRC_CONNECTED 706 state to the RRC_IDLE 702 state may be based on connection establishment and connection release procedures (shown collectively as connection establishment/release 710 in FIG. 7).

To enable a faster transition to the RRC_CONNECTED 706 state (e.g., compared to transition from RRC_IDLE 702 state to RRC_CONNECTED 706 state), an RRC_INACTIVE 704 state is used for an NR UE wherein, the RRC context is kept at the UE and the RAN. The transition from the RRC_INACTIVE 704 state to the RRC_CONNECTED 706 state is handled by RAN without CN signaling. Similar to the RRC_IDLE 702 state, the mobility in RRC_INACTIVE 704 state is based on a cell reselection procedure without involvement from the network. The transition of the wireless device from the RRC_INACTIVE 704 state to the RRC_CONNECTED 706 state or from the RRC_CONNECTED 706 state to the RRC_INACTIVE 704 state may be based on connection resume and connection inactivation procedures (shown collectively as connection resume/inactivation 712 in FIG. 7). The transition of the wireless device from the RRC_INACTIVE 704 state to the RRC_IDLE 702 state may be based on a connection release 714 procedure as shown in FIG. 7.

In NR, Orthogonal Frequency Division Multiplexing (OFDM), also called cyclic prefix OFDM (CP-OFDM), is the baseline transmission scheme in both downlink and uplink of NR and the Discrete Fourier Transform (DFT) spread OFDM (DFT-s-OFDM) is a complementary uplink transmission in addition to the baseline OFDM scheme. OFDM is multi-carrier transmission scheme wherein the transmission bandwidth may be composed of several narrowband sub-carriers. The subcarriers are modulated by the complex valued OFDM modulation symbols resulting in an OFDM signal. The complex valued OFDM modulation symbols are obtained by mapping, by a modulation mapper, the input data (e.g., binary digits) to different points of a modulation constellation diagram. The modulation constellation diagram depends on the modulation scheme. NR may use different types of modulation schemes including Binary Phase Shift Keying (BPSK), π/2-BPSK, Quadrature Phase Shift Keying (QPSK), 16 Quadrature Amplitude Modulation (16QAM), 64QAM and 256QAM. Different and/or higher order modulation schemes (e.g., M-QAM in general) may be used. An OFDM signal with N subcarriers may be generated by processing N subcarriers in parallel for example by using Inverse Fast Fourier Transform (IFFT) processing. The OFDM receiver may use FFT processing to recover the transmitted OFDM modulation symbols. The subcarrier spacing of subcarriers in an OFDM signal is inversely proportional to an OFDM modulation symbol duration. For example, for a 15 KHz subcarrier spacing, duration of an OFDM signal is nearly 66.7 μs. To enhance the robustness of OFDM transmission in time dispersive channels, a cyclic prefix (CP) may be inserted at the beginning of an OFDM symbol. For example, the last part of an OFDM symbol may be copied and inserted at the beginning of an OFDM symbol. The CP insertion enhanced the OFDM transmission scheme by preserving subcarrier orthogonality in time dispersive channels.

In NR, different numerologies may be used for OFDM transmission. A numerology of OFDM transmission may indicate a subcarrier spacing and a CP duration for the OFDM transmission. For example, a subcarrier spacing in NR may generally be a multiple of 15 KHz and expressed as $\Delta f = 2^\mu \cdot 15$ KHz ($\mu = 0, 1, 2, \ldots$). Example subcarrier spacings used in NR include 15 KHz ($\mu=0$), 30 KHz ($\mu=1$), 60 KHz ($\mu=2$), 120 KHz ($\mu=3$) and 240 KHz ($\mu=4$). As discussed before, a duration of OFDM symbol is inversely proportional to the subcarrier spacing and therefor OFDM symbol duration may depend on the numerology (e.g. the μ value).

Figure 8:
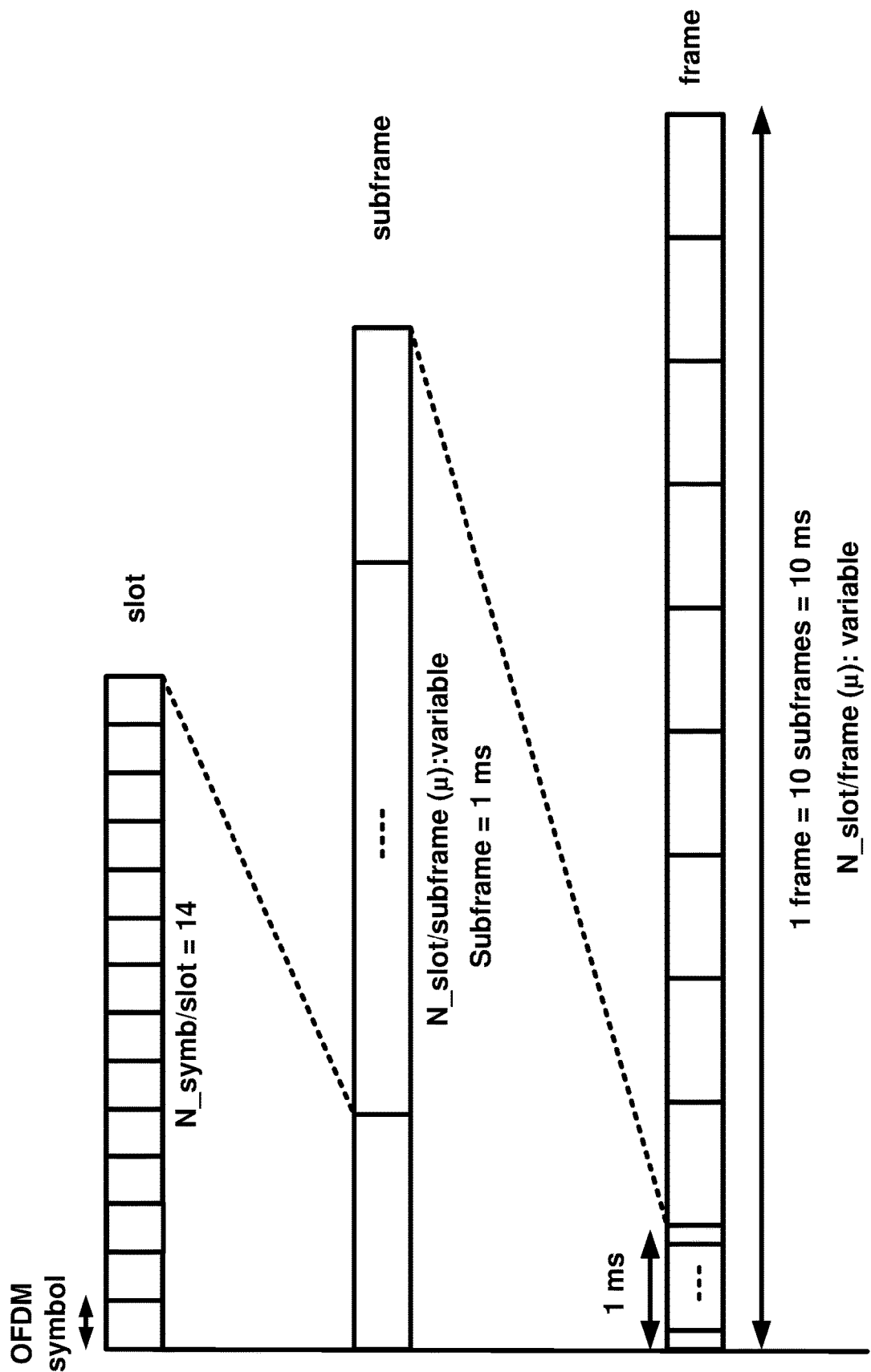
FIG. 8 shows an example time domain transmission structure in NR by grouping OFDM symbols into slots, subframes and frames in accordance with several of various embodiments of the present disclosure.

FIG. 8 shows an example time domain transmission structure in NR wherein OFDM symbols are grouped into slots, subframes and frames in accordance with several of various embodiments of the present disclosure. A slot is a group of $N_{symb}^{slot}$ OFDM symbols, wherein the $N_{symb}^{slot}$ may have a constant value (e.g., 14). Since different numerologies results in different OFDM symbol durations, duration of a slot may also depend on the numerology and may be variable. A subframe may have a duration of 1 ms and may be composed of one or more slots, the number of which may depend on the slot duration. The number of slots per subframe is therefore a function of μ and may generally expressed as $N_{slot}^{subframe,\mu}$ and the number of symbols per subframe may be expressed as $N_{symb}^{subframe,\mu} = N_{symb}^{slot} N_{slot}^{subframe,\mu}$. A frame may have a duration of 10 ms and may consist of 10 subframes. The number of slots per frame may depend on the numerology and therefore may be variable. The number of slots per frame may generally be expressed as $N_{slot}^{frame,\mu}$.

An antenna port may be defined as a logical entity such that channel characteristics over which a symbol on the antenna port is conveyed may be inferred from the channel characteristics over which another symbol on the same antenna port is conveyed. For example, for DM-RS associated with a PDSCH, the channel over which a PDSCH symbol on an antenna port is conveyed may be inferred from the channel over which a DM-RS symbol on the same antenna port is conveyed, for example, if the two symbols are within the same resource as the scheduled PDSCH and/or in the same slot and/or in the same precoding resource block group (PRG). For example, for DM-RS associated with a PDCCH, the channel over which a PDCCH symbol on an antenna port is conveyed may be inferred from the channel over which a DM-RSsymbol on the same antenna port is conveyed if, for example, the two symbols are within resources for which the UE may assume the same precoding being used. For example, for DM-RS associated with a PBCH, the channel over which a PBCH symbol on one antenna port is conveyed may be inferred from the channel over which a DM-RSsymbol on the same antenna port is conveyed if, for example, the two symbols are within a SS/PBCH block transmitted within the same slot, and with the same block index. The antenna port may be different from a physical antenna. An antenna port may be associated with an antenna port number and different physical channels may correspond to different ranges of antenna port numbers.

Figure 9:
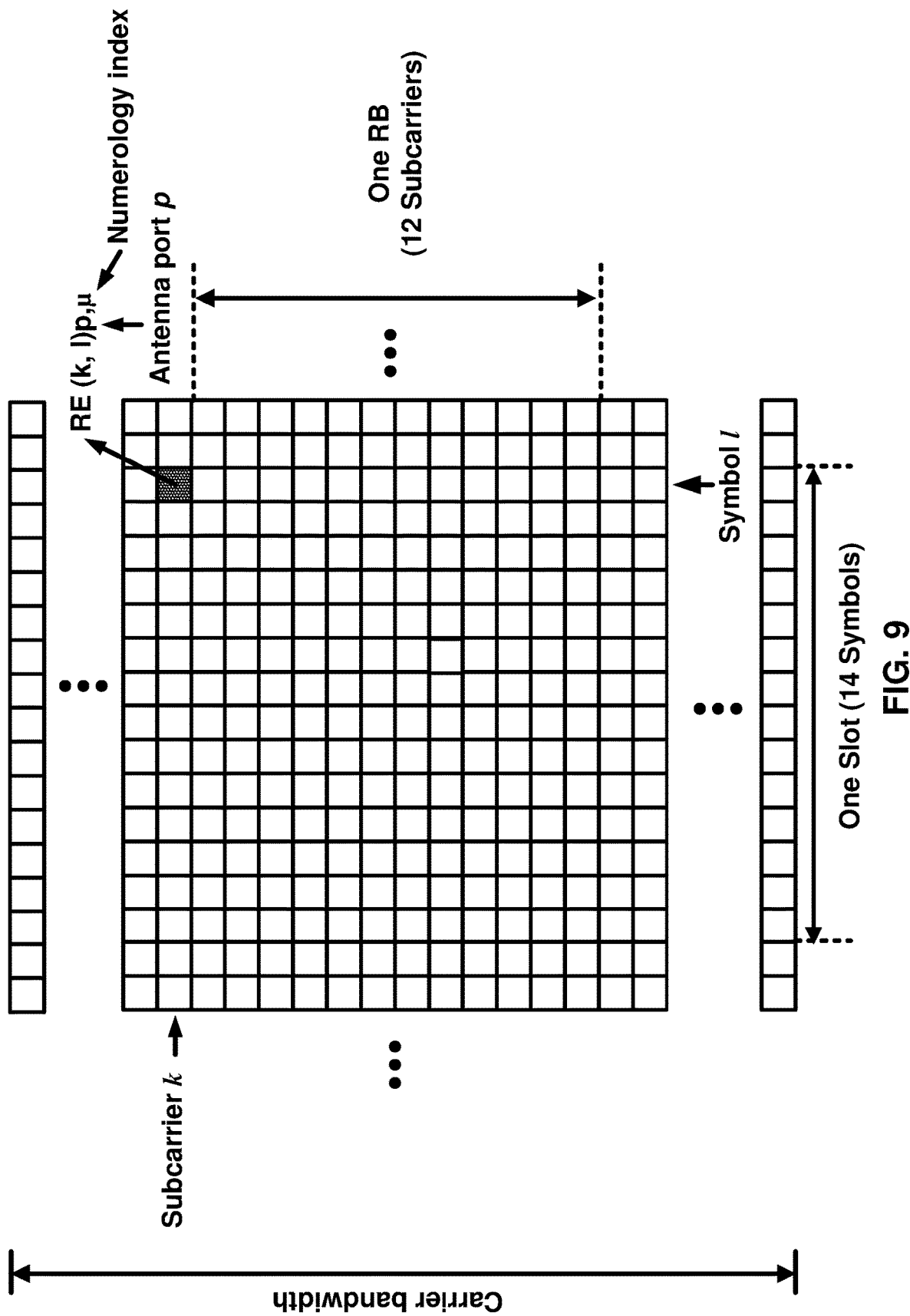
FIG. 9 shows an example of time-frequency resource grid in accordance with several of various embodiments of the present disclosure.

FIG. 9 shows an example of time-frequency resource grid in accordance with several of various embodiments of the present disclosure. The number of subcarriers in a carrier bandwidth may be based on the numerology of OFDM transmissions in the carrier. A resource element, corresponding to one symbol duration and one subcarrier, may be the smallest physical resource in the time-frequency grid. A resource element (RE) for antenna port p and subcarrier spacing configuration μ may be uniquely identified by $(k,l)_{p,\mu}$ where k is the index of a subcarrier in the frequency domain and 1 may refer to the symbol position in the time domain relative to some reference point. A resource block may be defined as $N_{SC}^{RB}=12$ subcarriers. Since subcarrier spacing depends on the numerology of OFDM transmission, the frequency domain span of a resource block may be variable and may depend on the numerology. For example, for a subcarrier spacing of 15 KHz (e.g., μ=0), a resource block may be 180 KHz and for a subcarrier spacing of 30 KHz (e.g., μ=1), a resource block may be 360 KHz.

With large carrier bandwidths defined in NR and due to limited capabilities for some UEs (e.g., due to hardware limitations), a UE may not support an entire carrier bandwidth. Receiving on the full carrier bandwidth may imply high energy consumption. For example, transmitting downlink control channels on the full downlink carrier bandwidth may result in high power consumption for wide carrier bandwidths. NR may use a bandwidth adaptation procedure to dynamically adapt the transmit and receive bandwidths. The transmit and receive bandwidth of a UE on a cell may be smaller than the bandwidth of the cell and may be adjusted. For example, the width of the transmit and/or receive bandwidth may change (e.g. shrink during period of low activity to save power); the location of the transmit and/or receive bandwidth may move in the frequency domain (e.g. to increase scheduling flexibility); and the subcarrier spacing of the transmit or receive bandwidth may change (e.g. to allow different services). A subset of the cell bandwidth may be referred to as a Bandwidth Part (BWP) and bandwidth adaptation may be achieved by configuring the UE with one or more BWPs. The base station may configure a UE with a set of downlink BWPs and a set of uplink BWPs. A BWP may be characterized by a numerology (e.g., subcarrier spacing and cyclic prefix) and a set of consecutive resource blocks in the numerology of the BWP. One or more first BWPs of the one or more BWPs of the cell may be active at a time. An active BWP may be an active downlink BWP or an active uplink BWP.

Figure 10:
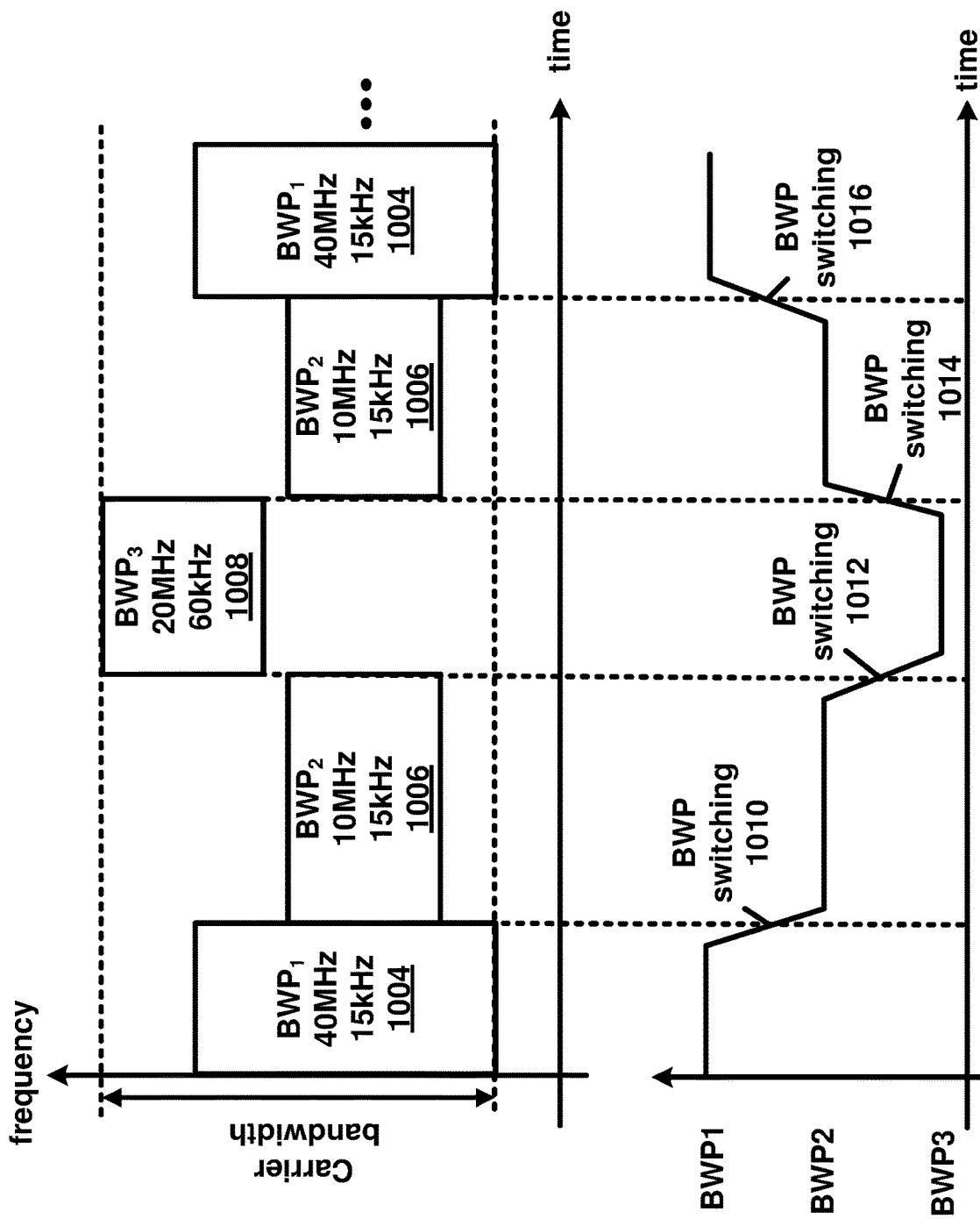
FIG. 10 shows example adaptation and switching of bandwidth parts in accordance with several of various embodiments of the present disclosure.

FIG. 10 shows an example of bandwidth part adaptation and switching. In this example, three BWPs ($BWP_1$ 1004, $BWP_2$ 1006 and $BWP_3$ 1008) are configured for a UE on a carrier bandwidth. The $BWP_1$ is configured with a bandwidth of 40 MHz and a numerology with subcarrier spacing of 15 KHz, the $BWP_2$ is configured with a bandwidth of 10 MHz and a numerology with subcarrier spacing of 15 KHz and the $BWP_3$ is configured with a bandwidth of 20 MHz and a subcarrier spacing of 60 KHz. The wireless device may switch from a first BWP (e.g., $BWP_1$) to a second BWP (e.g., $BWP_2$). An active BWP of the cell may change from the first BWP to the second BWP in response to the BWP switching.

The BWP switching (e.g., BWP switching 1010, BWP switching 1012, BWP switching 1014, or BWP switching 1016 in FIG. 10) may be based on a command from the base station. The command may be a DCI comprising scheduling information for the UE in the second BWP. In case of uplink BWP switching, the first BWP and the second BWP may be uplink BWPs and the scheduling information may be an uplink grant for uplink transmission via the second BWP. In case of downlink BWP switching, the first BWP and the second BWP may be downlink BWPs and the scheduling information may be a downlink assignment for downlink reception via the second BWP.

The BWP switching (e.g., BWP switching 1010, BWP switching 1012, BWP switching 1014, or BWP switching 1016 in FIG. 10) may be based on an expiry of a timer. The base station may configure a wireless device with a BWP inactivity timer and the wireless device may switch to a default BWP (e.g., default downlink BWP) based on the expiry of the BWP inactivity timer. The expiry of the BWP inactivity timer may be an indication of low activity on the current active downlink BWP. The base station may configure the wireless device with the default downlink BWP. If the base station does not configure the wireless device with the default BWP, the default BWP may be an initial downlink BWP. The initial active BWP may be the BWP that the wireless device receives scheduling information for remaining system information upon transition to an RRC_CONNECTED state.

A wireless device may monitor a downlink control channel of a downlink BWP. For example, the UE may monitor a set of PDCCH candidates in configured monitoring occasions in one or more configured COntrol REsource SETs (CORESETs) according to the corresponding search space configurations. A search space configuration may define how/where to search for PDCCH candidates. For example, the search space configuration parameters may comprise a monitoring periodicity and offset parameter indicating the slots for monitoring the PDCCH candidates. The search space configuration parameters may further comprise a parameter indicating a first symbol with a slot within the slots determined for monitoring PDCCH candidates. A search space may be associated with one or more CORESETs and the search space configuration may indicate one or more identifiers of the one or more CORESETs. The search space configuration parameters may further indicate that whether the search space is a common search space or a UE-specific search space. A common search space may be monitored by a plurality of wireless devices and a UE-specific search space may be dedicated to a specific UE.

Figure 11A:
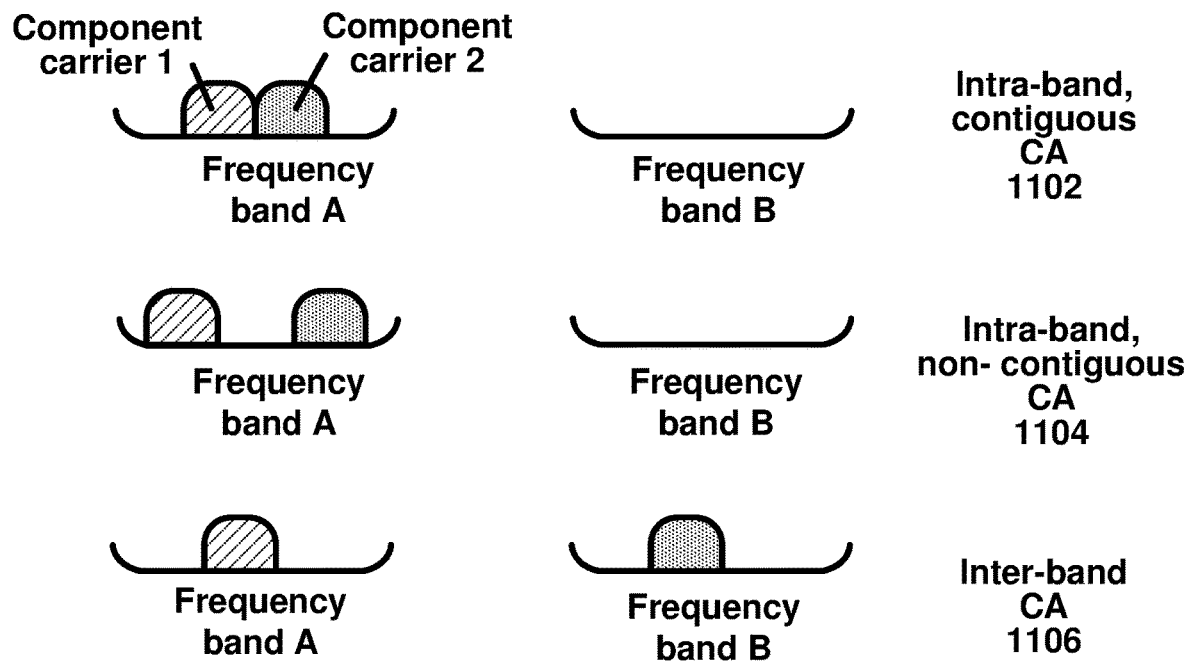
FIG. 11A shows example arrangements of carriers in carrier aggregation in accordance with several of various embodiments of the present disclosure.

FIG. 11A shows example arrangements of carriers in carrier aggregation in accordance with several of various embodiments of the present disclosure. With carrier aggregation, multiple NR component carriers (CCs) may be aggregated. Downlink transmissions to a wireless device may take place simultaneously on the aggregated downlink CCs resulting in higher downlink data rates. Uplink transmissions from a wireless device may take place simultaneously on the aggregated uplink CCs resulting in higher uplink data rates. The component carriers in carrier aggregation may be on the same frequency band (e.g., intra-band carrier aggregation) or on different frequency bands (e.g., inter-band carrier aggregation). The component carriers may also be contiguous or non-contiguous. This results in three possible carrier aggregation scenarios, intra-band contiguous CA 1102, intra-band non-contiguous CA 1104 and inter-band CA 1106 as shown in FIG. 11A. Depending on the UE capability for carrier aggregation, a UE may transmit and/or receive on multiple carriers or for a UE that is not capable of carrier aggregation, the UE may transmit and/or receive on one component carrier at a time. In this disclosure, the carrier aggregation is described using the term cell and a carrier aggregation capable UE may transmit and/or receive via multiple cells.

In carrier aggregation, a UE may be configured with multiple cells. A cell of the multiple cells configured for the UE may be referred to as a Primary Cell (PCell). The PCell may be the first cell that the UE is initially connected to. One or more other cells configured for the UE may be referred to as Secondary Cells (SCells). The base station may configure a UE with multiple SCells. The configured SCells may be deactivated upon configuration and the base station may dynamically activate or deactivate one or more of the configured SCells based on traffic and/or channel conditions. The base station may activate or deactivate configured SCells using a SCell Activation/Deactivation MAC CE. The SCell Activation/Deactivation MAC CE may comprise a bitmap, wherein each bit in the bitmap may correspond to a SCell and the value of the bit indicates an activation status or deactivation status of the SCell.

An SCell may also be deactivated in response to expiry of a SCell deactivation timer of the SCell. The expiry of an SCell deactivation timer of an SCell may be an indication of low activity (e.g., low transmission or reception activity) on the SCell. The base station may configure the SCell with an SCell deactivation timer. The base station may not configure an SCell deactivation timer for an SCell that is configured with PUCCH (also referred to as a PUCCH SCell). The configuration of the SCell deactivation timer may be per configured SCell and different SCells may be configured with different SCell deactivation timer values. The SCell deactivation timer may be restarted based on one or more criteria including reception of downlink control information on the SCell indicating uplink grant or downlink assignment for the SCell or reception of downlink control information on a scheduling cell indicating uplink grant or downlink assignment for the SCell or transmission of a MAC PDU based on a configured uplink grant or reception of a configured downlink assignment.

A PCell for a UE may be an SCell for another UE and a SCell for a UE may be PCell for another UE. The configuration of PCell may be UE-specific. One or more SCells of the multiple SCells configured for a UE may be configured as downlink-only SCells, e.g., may only be used for downlink reception and may not be used for uplink transmission. In case of self-scheduling, the base station may transmit signaling for uplink grants and/or downlink assignments on the same cell that the corresponding uplink or downlink transmission takes place. In case of cross-carrier scheduling, the base station may transmit signaling for uplink grants and/or downlink assignments on a cell different from the cell that the corresponding uplink or downlink transmission takes place.

Figure 11B:
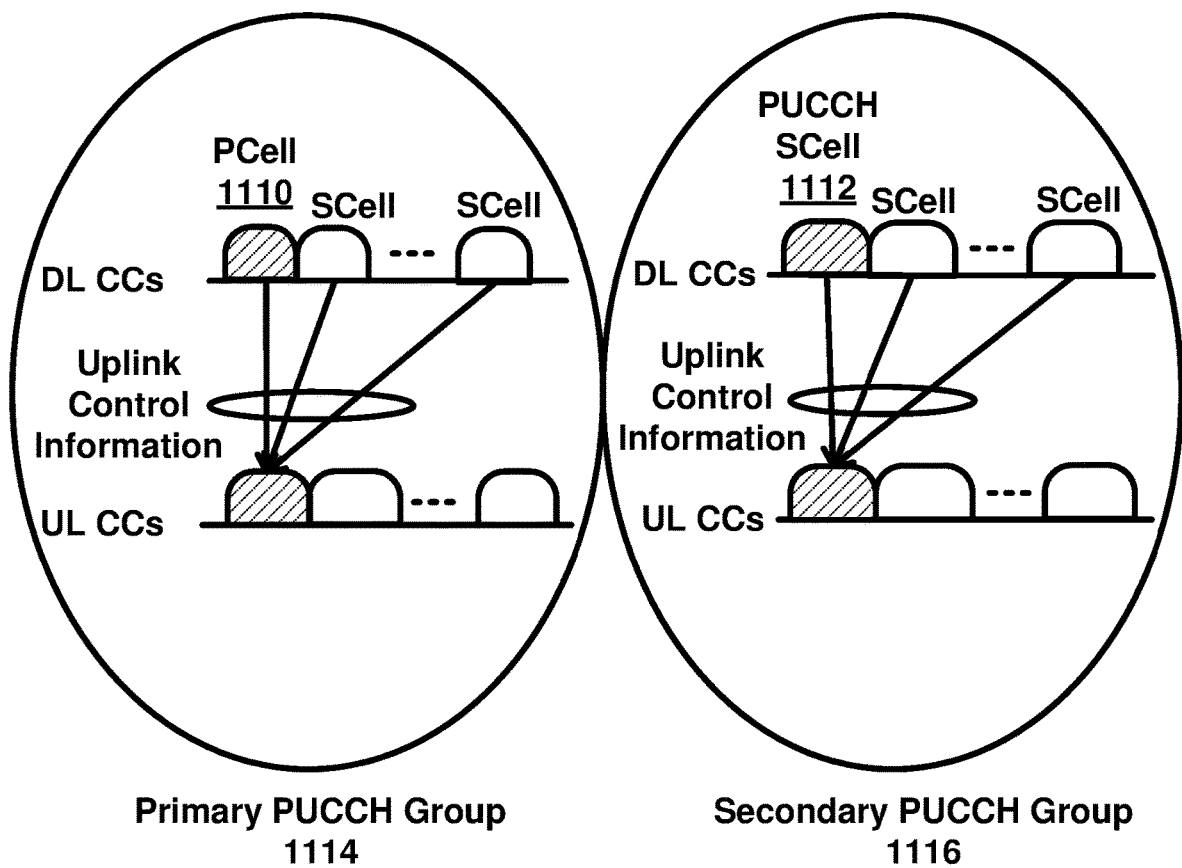
FIG. 11B shows examples of uplink control channel groups in accordance with several of various embodiments of the present disclosure.

FIG. 11B shows examples of uplink control channel groups in accordance with several of various embodiments of the present disclosure. A base station may configure a UE with multiple PUCCH groups wherein a PUCCH group comprises one or more cells. For example, as shown in FIG. 11B, the base station may configure a UE with a primary PUCCH group 1114 and a secondary PUCCH group 1116. The primary PUCCH group may comprise the PCell 1110 and one or more first SCells. First UCI corresponding to the PCell and the one or more first SCells of the primary PUCCH group may be transmitted by the PUCCH of the PCell. The first UCI may be, for example, HARQ feedback for downlink transmissions via downlink CCs of the PCell and the one or more first SCells. The secondary PUCCH group may comprise a PUCCH SCell and one or more second SCells. Second UCI corresponding to the PUCCH SCell and the one or more second SCells of the secondary PUCCH group may be transmitted by the PUCCH of the PUCCH SCell. The second UCI may be, for example, HARQ feedback for downlink transmissions via downlink CCs of the PUCCH SCell and the one or more second SCells.

FIG. 12A, FIG. 12B and FIG. 12C show example random access processes in accordance with several of various embodiments of the present disclosure. FIG. 12A shows an example of four step contention-based random access (CBRA) procedure. The four-step CBRA procedure includes exchanging four messages between a UE and a base station. Msg1 may be for transmission (or retransmission) of a random access preamble by the wireless device to the base station. Msg2 may be the random access response (RAR) by the base station to the wireless device. Msg3 is the scheduled transmission based on an uplink grant indicated in Msg2 and Msg4 may be for contention resolution.

The base station may transmit one or more RRC messages comprising configuration parameters of the random access parameters. The random access parameters may indicate radio resources (e.g., time-frequency resources) for transmission of the random access preamble (e.g., Msg1), configuration index, one or more parameters for determining the power of the random access preamble (e.g., a power ramping parameter, a preamble received target power, etc.), a parameter indicating maximum number of preamble transmission, RAR window for monitoring RAR, cell-specific random access parameters and UE specific random access parameters. The UE-specific random access parameters may indicate one or more PRACH occasions for random access preamble (e.g., Msg1) transmissions. The random access parameters may indicate association between the PRACH occasions and one or more reference signals (e.g., SSB or CSI-RS). The random access parameters may further indicate association between the random access preambles and one or more reference signals (e.g., SBB or CSI-RS). The UE may use one or more reference signals (e.g., SSB(s) or CSI-RS(s)) and may determine a random access preamble to use for Msg1 transmission based on the association between the random access preambles and the one or more reference signals. The UE may use one or more reference signals (e.g., SSB(s) or CSI-RS(s)) and may determine the PRACH occasion to use for Msg1 transmission based on the association between the PRACH occasions and the reference signals. The UE may perform a retransmission of the random access preamble if no response is received with the RAR window following the transmission of the preamble. UE may use a higher transmission power for retransmission of the preamble. UE may determine the higher transmission power of the preamble based on the power ramping parameter.

Msg2 is for transmission of RAR by the base station. Msg2 may comprise a plurality of RARs corresponding to a plurality of random access preambles transmitted by a plurality of UEs. Msg2 may be associated with a random access temporary radio identifier (RA-RNTI) and may be received in a common search space of the UE. The RA-RNTI may be based on the PRACH occasion (e.g., time and frequency resources of a PRACH) in which a random access preamble is transmitted. RAR may comprise a timing advance command for uplink timing adjustment at the UE, an uplink grant for transmission of Msg3 and a temporary C-RNTI. In response to the successful reception of Msg2, the UE may transmit the Msg3. Msg3 and Msg4 may enable contention resolution in case of CBRA. In a CBRA, a plurality of UEs may transmit the same random access preamble and may consider the same RAR as being corresponding to them. UE may include a device identifier in Msg3 (e.g., a C-RNTI, temporary C-RNTI or other UE identity). Base station may transmit the Msg4 with a PDSCH and UE may assume that the contention resolution is successful in response to the PDSCH used for transmission of Msg4 being associated with the UE identifier included in Msg3.

FIG. 12B shows an example of a contention-free random access (CFRA) process. Msg 1 (random access preamble) and Msg 2 (random access response) in FIG. 12B for CFRA may be analogous to Msg 1 and Msg 2 in FIG. 12A for CBRA. In an example, the CFRA procedure may be initiated in response to a PDCCH order from a base station. The PDCCH order for initiating the CFRA procedure by the wireless device may be based on a DCI having a first format (e.g., format 1_0). The DCI for the PDCCH order may comprise a random access preamble index, an UL/SUL indicator indicating an uplink carrier of a cell (e.g., normal uplink carrier or supplementary uplink carrier) for transmission of the random access preamble, a SS/PBCH index indicating the SS/PBCH that may be used to determine a RACH occasion for PRACH transmission, a PRACH mask index indicating the RACH occasion associated with the SS/PBCH indicated by the SS/PBCH index for PRACH transmission, etc. In an example, the CFRA process may be started in response to a beam failure recovery process. The wireless device may start the CFRA for the beam failure recovery without a command (e.g., PDCCH order) from the base station and by using the wireless device dedicated resources.

FIG. 12C shows an example of a two-step random access process comprising two messages exchanged between a wireless device and a base station. Msg A may be transmitted by the wireless device to the base station and may comprise one or more transmissions of a preamble and/or one or more transmissions of a transport block. The transport block in Msg A and Msg 3 in FIG. 12A may have similar and/or equivalent contents. The transport block of Msg A may comprise data and control information (e.g., SR, HARQ feedback, etc.). In response to the transmission of Msg A, the wireless device may receive Msg B from the base station. Msg B in FIG. 12C and Msg 2 (e.g., RAR) illustrated in FIGS. 12A and 12B may have similar and/or equivalent content.

The base station may periodically transmit synchronization signals (SSs), e.g., primary SS (PSS) and secondary SS (SSS) along with PBCH on each NR cell. The PSS/SSS together with PBCH is jointly referred to as a SS/PBCH block. The SS/PBCH block enables a wireless device to find a cell when entering to the mobile communications network or find new cells when moving within the network. The SS/PBCH block spans four OFDM symbols in time domain. The PSS is transmitted in the first symbol and occupies 127 subcarriers in frequency domain. The SSS is transmitted in the third OFDM symbol and occupies the same 127 subcarriers as the PSS. The are eight and nine empty subcarriers on each side of the SSS. The PBCH is transmitted on the second OFDM symbol occupying 240 subcarriers, the third OFDM symbol occupying 48 subcarriers on each side of the SSS, and on the fourth OFDM symbol occupying 240 subcarriers. Some of the PBCH resources indicated above may be used for transmission of the demodulation reference signal (DMRS) for coherent demodulation of the PBCH. The SS/PBCH block is transmitted periodically with a period ranging from 5 ms to 160 ms. For initial cell search or for cell search during inactive/idle state, a wireless device may assume that that the SS/PBCH block is repeated at least every 20 ms.

In NR, transmissions using of antenna arrays, with many antenna elements, and beamforming plays an important role specially in higher frequency bands. Beamforming enables higher capacity by increasing the signal strength (e.g., by focusing the signal energy in a specific direction) and by lowering the amount interference received at the wireless devices. The beamforming techniques may generally be divided to analog beamforming and digital beamforming techniques. With digital beamforming, signal processing for beamforming is carried out in the digital domain before digital-to-analog conversion and detailed control of both amplitude and phase of different antenna elements may be possible. With analog beamforming, the signal processing for beamforming is carried out in the analog domain and after the digital to analog conversion. The beamformed transmissions may be in one direction at a time. For example, the wireless devices that are in different directions relative to the base station may receive their downlink transmissions at different times. For analog receiver-side beamforming, the receiver may focus its receiver beam in one direction at a time.

In NR, the base station may use beam sweeping for transmission of SS/PBCH blocks. The SS/PBCH blocks may be transmitted in different beams using time multiplexing. The set of SS/PBCH blocks that are transmitted in one beam sweep may be referred to as a SS/PBCH block set. The period of PBCH/SSB block transmission may be a time duration between a SS/PBCH block transmission in a beam and the next SS/PBCH block transmission in the same beam. The period of SS/PBCH block is, therefore, also the period of the SS/PBCH block set.

Figure 13A:
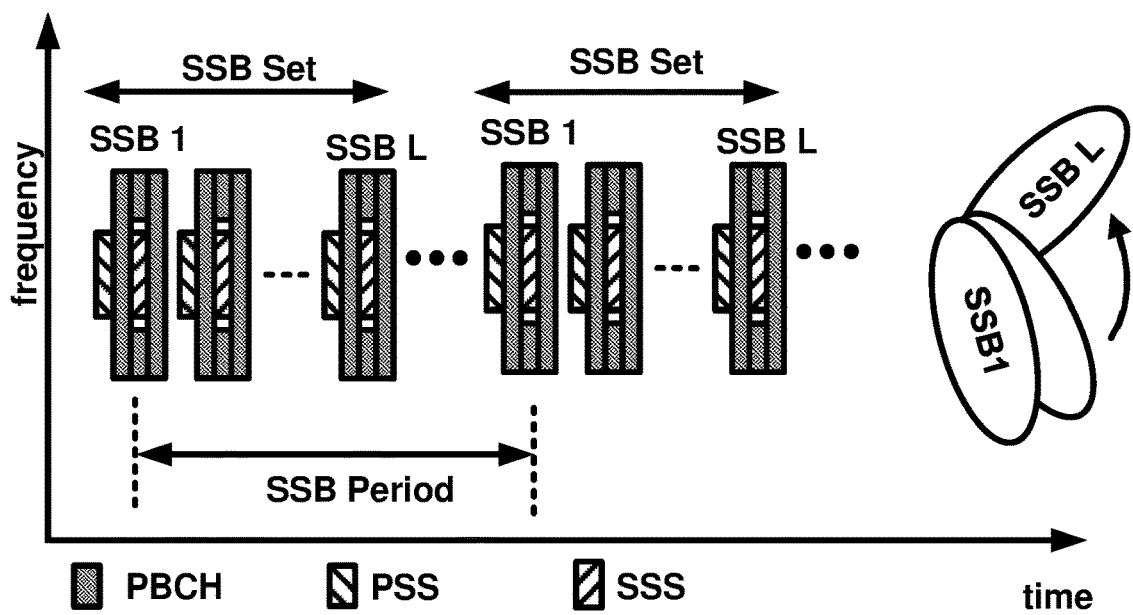
FIG. 13A shows example time and frequency structure of SSBs and their associations with beams in accordance with several of various embodiments of the present disclosure.

FIG. 13A shows example time and frequency structure of SS/PBCH blocks and their associations with beams in accordance with several of various embodiments of the present disclosure. In this example, a SS/PBCH block (also referred to as SSB) set comprise L SSBs wherein an SSB in the SSB set is associated with (e.g., transmitted in) one of L beams of a cell. The transmission of SBBs of an SSB set may be confined within a 5 ms interval, either in a first half-frame or a second half-frame of a 10 ms frame. The number of SSBs in an SSB set may depend on the frequency band of operation. For example, the number of SSBs in a SSB set may be up to four SSBs in frequency bands below 3 GHz enabling beam sweeping of up to four beams, up to eight SSBs in frequency bands between 3 GHz and 6 GHz enabling beam sweeping of up to eight beams, and up to sixty four SSBs in higher frequency bands enabling beam sweeping of up to sixty four beams. The SSs of an SSB may depend on a physical cell identity (PCI) of the cell and may be independent of which beam of the cell is used for transmission of the SSB. The PBCH of an SSB may indicate a time index parameter and the wireless device may determine the relative position of the SSB within the SSB set using the time index parameter. The wireless device may use the relative position of the SSB within an SSB set for determining the frame timing and/or determining RACH occasions for a random access process.

A wireless device entering the mobile communications network may first search for the PSS. After detecting the PSS, the wireless device may determine the synchronization up to the periodicity of the PSS. By detecting the PSS, the wireless device may determine the transmission timing of the SSS. The wireless device may determine the PCI of the cell after detecting the SSS. The PBCH of a SS/PBCH block is a downlink physical channel that carries the MIB. The MIB may be used by the wireless device to obtain remaining system information (RMSI) that is broadcast by the network. The RMSI may include System Information Block 1 (SIB1) that contains information required for the wireless device to access the cell.

As discussed earlier, the wireless device may determine a time index parameter from the SSB. The PBCH comprises a half-frame parameter indicating whether the SSB is in the first 5 ms half or the second 5 ms half of a 10 ms frame. The wireless device may determine the frame boundary using the time index parameter and the half-frame parameter. In addition, the PBCH may comprise a parameter indicating the system frame number (SFN) of the cell.

The base station may transmit CSI-RS and a UE may measure the CSI-RS to obtain channel state information (CSI). The base station may configure the CSI-RS in a UE-specific manner. In some scenarios, same set of CSI-RS resources may be configured for multiple UEs and one or more resource elements of a CSI-RS resource may be shared among multiple UEs. A CSI-RS resource may be configured such that it does not collide with a CORESET configured for the wireless device and/or with a DMRS of a PDSCH scheduled for the wireless device and/or transmitted SSBs. The UE may measure one or more CSI-RSs configured for the UE and may generate a CSI report based on the CSI-RS measurements and may transmit the CSI report to the base station for scheduling, link adaptation and/or other purposes.

NR supports flexible CSI-RS configurations. A CSI-RS resource may be configured with single or multiple antenna ports and with configurable density. Based on the number of configured antenna ports, a CSI-RS resource may span different number of OFDM symbols (e.g., 1, 2, and 4 symbols). The CSI-RS may be configured for a downlink BWP and may use the numerology of the downlink BWP. The CSI-RS may be configured to cover the full bandwidth of the downlink BWP or a portion of the downlink BWP. In some case, the CSI-RS may be repeated in every resource block of the CSI-RS bandwidth, referred to as CSI-RS with density equal to one. In some cases, the CSI-RS may be configured to be repeated in every other resource block of the CSI-RS bandwidth. CSI-RS may be non-zero power (NZP) CSI-RS or zero-power (ZP) CSI-RS.

The base station may configure a wireless device with one or more sets of NZP CSI-RS resources. The base station may configure the wireless device with a NZP CSI-RS resource set using an RRC information element (IE) NZP-CSI-RS-ResourceSet indicating a NZP CSI-RS resource set identifier (ID) and parameters specific to the NZP CSI-RS resource set. An NZP CSI-RS resource set may comprise one or more CSI-RS resources. An NZP CSI-RS resource set may be configured as part of the CSI measurement configuration.

The CSI-RS may be configured for periodic, semi-persistent or aperiodic transmission. In case of the periodic and semi-persistent CSI-RS configurations, the wireless device may be configured with a CSI resource periodicity and offset parameter that indicate a periodicity and corresponding offset in terms of number of slots. The wireless device may determine the slots that the CSI-RSs are transmitted. For semi-persistent CSI-RS, the CSI-RS resources for CSI-RS transmissions may be activated and deactivated by using a semi-persistent (SP) CSI-CSI Resource Set Activation/Deactivation MAC CE. In response to receiving a MAC CE indicating activation of semi-persistent CSI-RS resources, the wireless device may assume that the CSI-RS transmissions will continue until the CSI-RS resources for CSI-RS transmissions are activated.

As discussed before, CSI-RS may be configured for a wireless device as NZP CSI-RS or ZP CSI-RS. The configuration of the ZP CSI-RS may be similar to the NZP CSI-RS with the difference that the wireless device may not carry out measurements for the ZP CSI-RS. By configuring ZP CSI-RS, the wireless device may assume that a scheduled PDSCH that includes resource elements from the ZP CSI-RS is rate matched around those ZP CSI-RS resources. For example, a ZP CSI-RS resource configured for a wireless device may be an NZP CSI-RS resource for another wireless device. For example, by configuring ZP CSI-RS resources for the wireless device, the base station may indicate to the wireless device that the PDSCH scheduled for the wireless device is rate matched around the ZP CSI-RS resources.

A base station may configure a wireless device with channel state information interference measurement (CSI-IM) resources. Similar to the CSI-RS configuration, configuration of locations and density of CSI-IM resources may be flexible. The CSI-IM resources may be periodic (configured with a periodicity), semi-persistent (configured with a periodicity and activated and deactivated by MAC CE) or aperiodic (triggered by a DCI).

Tracking reference signals (TRSs) may be configured for a wireless device as a set of sparse reference signals to assist the wireless in time and frequency tracking and compensating time and frequency variations in its local oscillator. The wireless device may further use the TRSs for estimating channel characteristics such as delay spread or doppler frequency. The base station may use a CSI-RS configuration for configuring TRS for the wireless device. The TRS may be configured as a resource set comprising multiple periodic NZP CSI-RS resources.

A base station may configure a UE and the UE may transmit sounding reference signals (SRSs) to enable uplink channel sounding/estimation at the base station. The SRS may support up to four antenna ports and may be designed with low cubic metric enabling efficient operation of the wireless device amplifier. The SRS may span one or more (e.g., one, two or four) consecutive OFDM symbols in time domain and may be located within the last n (e.g., six) symbols of a slot. In the frequency domain, the SRS may have a structure that is referred to as a comb structure and may be transmitted on every Nth subcarrier. Different SRS transmissions from different wireless devices may have different comb structures and may be multiplexed in frequency domain.

A base station may configure a wireless device with one or more SRS resource sets and an SRS resource set may comprise one or more SRS resources. The SRS resources in an SRS resources set may be configured for periodic, semi-persistent or aperiodic transmission. The periodic SRS and the semi-persistent SRS resources may be configured with periodicity and offset parameters. The Semi-persistent SRS resources of a configured semi-persistent SRS resource set may be activated or deactivated by a semi-persistent (SP) SRS Activation/Deactivation MAC CE. The set of SRS resources included in an aperiodic SRS resource set may be activated by a DCI. A value of a field (e.g., an SRS request field) in the DCI may indicate activation of resources in an aperiodic SRS resource set from a plurality of SRS resource sets configured for the wireless device.

An antenna port may be associated with one or more reference signals. The receiver may assume that the one or more reference signals, associated with the antenna port, may be used for estimating channel corresponding to the antenna port. The reference signals may be used to derive channel state information related to the antenna port. Two antenna ports may be referred to as quasi co-located if characteristics (e.g., large-scale properties) of the channel over which a symbol is conveyed on one antenna port may be inferred from the channel over which a symbol is conveyed from another antenna port. For example, a UE may assume that radio channels corresponding to two different antenna ports have the same large-scale properties if the antenna ports are specified as quasi co-located. In some cases, the UE may assume that two antenna ports are quasi co-located based on signaling received from the base station. Spatial quasi-colocation (QCL) between two signals may be, for example, due to the two signals being transmitted from the same location and in the same beam. If a receive beam is good for a signal in a group of signals that are spatially quasi co-located, it may be assumed also be good for the other signals in the group of signals.

The CSI-RS in the downlink and the SRS in uplink may serve as quasi-location (QCL) reference for other physical downlink channels and physical uplink channels, respectively. For example, a downlink physical channel (e.g., PDSCH or PDCCH) may be spatially quasi co-located with a downlink reference signal (e.g., CSI-RS or SSB). The wireless device may determine a receive beam based on measurement on the downlink reference signal and may assume that the determined received beam is also good for reception of the physical channels (e.g., PDSCH or PDCCH) that are spatially quasi co-located with the downlink reference signal. Similarly, an uplink physical channel (e.g., PUSCH or PUCCH) may be spatially quasi co-located with an uplink reference signal (e.g., SRS). The base station may determine a receive beam based on measurement on the uplink reference signal and may assume that the determined received beam is also good for reception of the physical channels (e.g., PUSCH or PUCCH) that are spatially quasi co-located with the uplink reference signal.

The Demodulation Reference Signals (DM-RSs) enables channel estimation for coherent demodulation of downlink physical channels (e.g., PDSCH, PDCCH and PBH) and uplink physical channels (e.g., PUSCH and PUCCH). The DM-RS may be located early in the transmission (e.g., front-loaded DM-RS) and may enable the receiver to obtain the channel estimate early and reduce the latency. The time-domain structure of the DM-RS (e.g., symbols wherein the DM-RS are located in a slot) may be based on different mapping types.

The Phase Tracking Reference Signals (PT-RSs) enables tracking and compensation of phase variations across the transmission duration. The phase variations may be, for example, due to oscillator phase noise. The oscillator phase noise may become more sever in higher frequencies (e.g., mmWave frequency bands). The base station may configure the PT-RS for uplink and/or downlink. The PT-RS configuration parameters may indicate frequency and time density of PT-RS, maximum number of ports (e.g., uplink ports), resource element offset, configuration of uplink PT-RS without transform precoder (e.g., CP-OFDM) or with transform precoder (e.g., DFT-s-OFDM), etc. The subcarrier number and/or resource blocks used for PT-RS transmission may be based on the C-RNTI of the wireless device to reduce risk of collisions between PT-RSs of wireless devices scheduled on overlapping frequency domain resources.

Figure 13B:
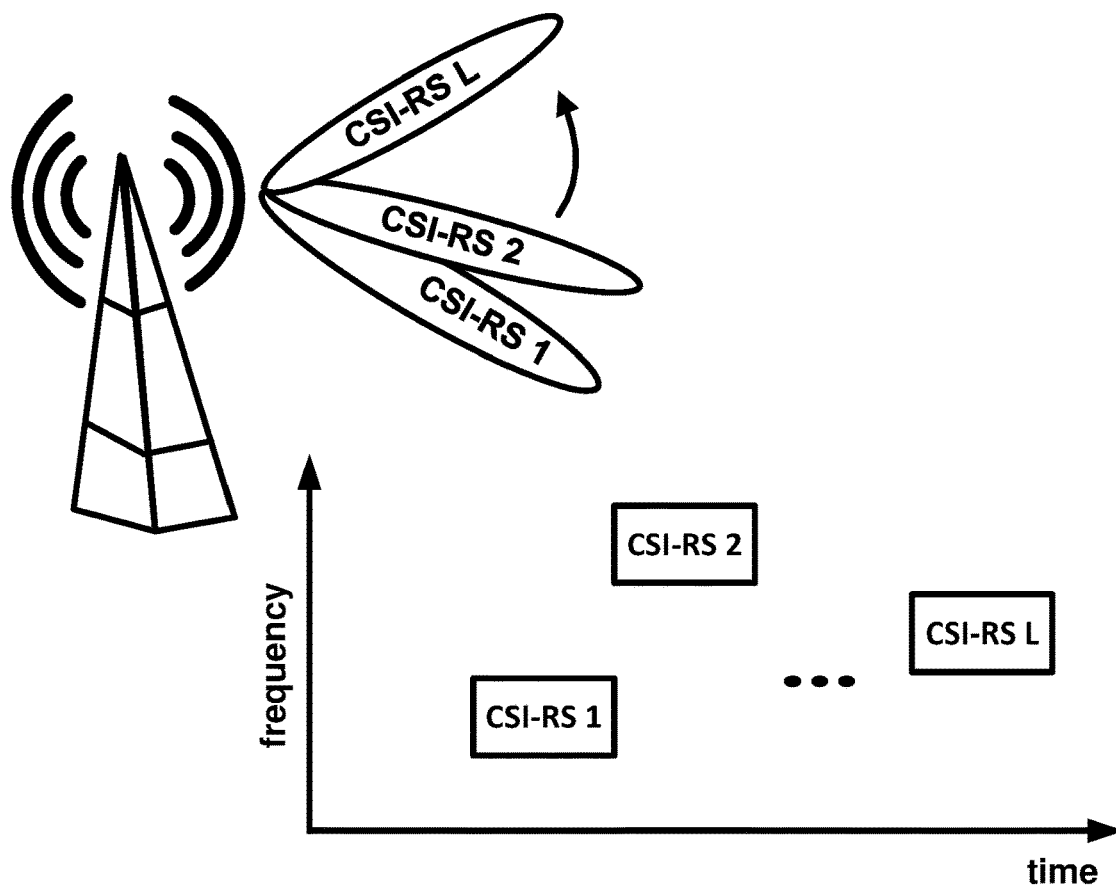
FIG. 13B shows example time and frequency structure of CSI-RSs and their association with beams in accordance with several of various embodiments of the present disclosure.

FIG. 13B shows example time and frequency structure of CSI-RSs and their association with beams in accordance with several of various embodiments of the present disclosure. A beam of the L beams shown in FIG. 13B may be associated with a corresponding CSI-RS resource. The base station may transmit the CSI-RSs using the configured CSI-RS resources and a UE may measure the CSI-RSs (e.g., received signal received power (RSRP) of the CSI-RSs) and report the CSI-RS measurements to the base station based on a reporting configuration. For example, the base station may determine one or more transmission configuration indication (TCI) states and may indicate the one or more TCI states to the UE (e.g., using RRC signaling, a MAC CE and/or a DCI). Based on the one or more TCI states indicated to the UE, the UE may determine a downlink receive beam and receive downlink transmissions using the receive beam. In case of a beam correspondence, the UE may determine a spatial domain filter of a transmit beam based on spatial domain filter of a corresponding receive beam. Otherwise, the UE may perform an uplink beam selection procedure to determine the spatial domain filter of the transmit beam. The UE may transmit one or more SRSs using the SRS resources configured for the UE and the base station may measure the SRSs and determine/select the transmit beam for the UE based the SRS measurements. The base station may indicate the selected beam to the UE. The CSI-RS resources shown in FIG. 13B may be for one UE. The base station may configure different CSI-RS resources associated with a given beam for different UEs by using frequency division multiplexing.

A base station and a wireless device may perform beam management procedures to establish beam pairs (e.g., transmit and receive beams) that jointly provide good connectivity. For example, in the downlink direction, the UE may perform measurements for a beam pair and estimate channel quality for a transmit beam by the base station (or a transmission reception point (TRP) more generally) and the receive beam by the UE. The UE may transmit a report indicating beam pair quality parameters. The report may comprise one or more parameters indicating one or more beams (e.g., a beam index, an identifier of reference signal associated with a beam, etc.), one or more measurement parameters (e.g., RSRP), a precoding matrix indicator (PMI), a channel quality indicator (CQI), and/or a rank indicator (RI).

FIG. 14A, FIG. 14B and FIG. 14C show example beam management processes (referred to as P1, P2 and P3, respectively) in accordance with several of various embodiments of the present disclosure. The P1 process shown in FIG. 14A may enable, based on UE measurements, selection of a base station (or TRP more generally) transmit beam and/or a wireless device receive beam. The TRP may perform a beam sweeping procedure where the TRP may sequentially transmit reference signals (e.g., SSB and/or CSI-RS) on a set of beams and the UE may select a beam from the set of beams and may report the selected beam to the TRP. The P2 procedure as shown in FIG. 14B may be a beam refinement procedure. The selection of the TRP transmit beam and the UE receive beam may be regularly reevaluated due to movements and/or rotations of the UE or movement of other objects. In an example, the base station may perform the beam sweeping procedure over a smaller set of beams and the UE may select the best beam over the smaller set. In an example, the beam shape may be narrower compared to beam selected based on the P1 procedure. Using the P3 procedure as shown in FIG. 14C, the TRP may fix its transmit beam and the UE may refine its receive beam.

A wireless device may receive one or more messages from a base station. The one or more messages may comprise one or more RRC messages. The one or more messages may comprise configuration parameters of a plurality of cells for the wireless device. The plurality of cells may comprise a primary cell and one or more secondary cells. For example, the plurality of cells may be provided by a base station and the wireless device may communicate with the base station using the plurality of cells. For example, the plurality of cells may be provided by multiple base station (e.g., in case of dual and/or multi-connectivity). The wireless device may communicate with a first base station, of the multiple base stations, using one or more first cells of the plurality of cells. The wireless device may communicate with a second base station of the multiple base stations using one or more second cells of the plurality of cells.

The one or more messages may comprise configuration parameters used for processes in physical, MAC, RLC, PCDP, SDAP, and/or RRC layers of the wireless device. For example, the configuration parameters may include values of timers used in physical, MAC, RLC, PCDP, SDAP, and/or RRC layers. For example, the configuration parameters may include parameters for configurating different channels (e.g., physical layer channel, logical channels, RLC channels, etc.) and/or signals (e.g., CSI-RS, SRS, etc.).

Upon starting a timer, the timer may start running until the timer is stopped or until the timer expires. A timer may be restarted if it is running. A timer may be started if it is not running (e.g., after the timer is stopped or after the timer expires). A timer may be configured with or may be associated with a value (e.g., an initial value). The timer may be started or restarted with the value of the timer. The value of the timer may indicate a time duration that the timer may be running upon being started or restarted and until the timer expires. The duration of a timer may not be updated until the timer is stopped or expires (e.g., due to BWP switching). This specification may disclose a process that includes one or more timers. The one or more timers may be implemented in multiple ways. For example, a timer may be used by the wireless device and/or base station to determine a time window [t1, t2], wherein the timer is started at time t1 and expires at time t2 and the wireless device and/or the base station may be interested in and/or monitor the time window [t1, t2], for example to receive a specific signaling. Other examples of implementation of a timer may be provided.

Figure 15:
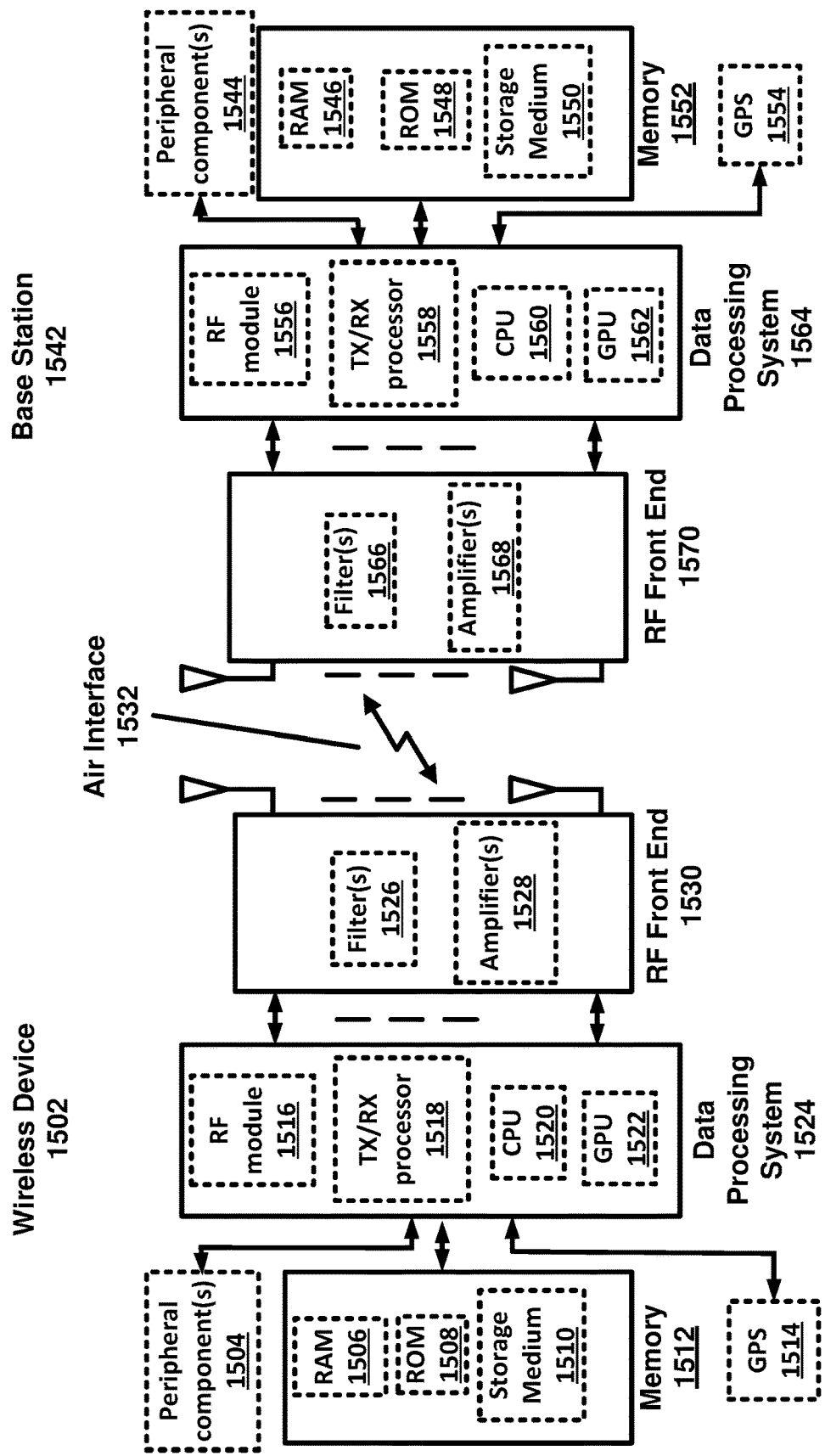
FIG. 15 shows example components of a wireless device and a base station that are in communication via an air interface in accordance with several of various embodiments of the present disclosure.

FIG. 15 shows example components of a wireless device and a base station that are in communication via an air interface in accordance with several of various embodiments of the present disclosure. The wireless device 1502 may communicate with the base station 1542 over the air interface 1532. The wireless device 1502 may include a plurality of antennas. The base station 1542 may include a plurality of antennas. The plurality of antennas at the wireless device 1502 and/or the base station 1542 enables different types of multiple antenna techniques such as beamforming, single-user and/or multi-user MIMO, etc.

The wireless device 1502 and the base station 1542 may have one or more of a plurality of modules/blocks, for example RF front end (e.g., RF front end 1530 at the wireless device 1502 and RF front end 1570 at the base station 1542), Data Processing System (e.g., Data Processing System1524 at the wireless device 1502 and Data Processing System1564 at the base station 1542), Memory (e.g., Memory 1512 at the wireless device 1502 and Memory 1542 at the base station1542). Additionally, the wireless device 1502 and the base station 1542 may have other modules/blocks such as GPS (e.g., GPS 1514 at the wireless device 1502 and GPS 1554 at the base station 1542).

An RF front end module/block may include circuitry between antennas and a Data Processing System for proper conversion of signals between these two modules/blocks. An RF front end may include one or more filters (e.g., Filter(s) 1526 at RF front end 1530 or Filter(s) 1566 at the RF front end 1570), one or more amplifiers (e.g., Amplifier(s) 1528 at the RF front end 1530 and Amplifier(s) 1568 at the RF front end 1570). The Amplifier(s) may comprise power amplifier(s) for transmission and low-noise amplifier(s) (LNA(s)) for reception.

The Data Processing System 1524 and the Data Processing System 1564 may process the data to be transmitted or the received signals by implementing functions at different layers of the protocol stack such as PHY, MAC, RLC, etc. Example PHY layer functions that may be implemented by the Data Processing System1524 and/or 1564 may include forward error correction, interleaving, rate matching, modulation, precoding, resource mapping, MIMO processing, etc. Similarly, one or more functions of the MAC layer, RLC layer and/or other layers may be implemented by the Data Processing System1524 and/or the Data Processing System1564. One or more processes described in the present disclosure may be implemented by the Data Processing System1524 and/or the Data Processing System1564. A Data Processing System may include an RF module (RF module 1516 at the Data Processing System1524 and RF module 1556 at the Data Processing System1564) and/or a TX/RX processor (e.g., TX/RX processor 1518 at the Data Processing System1524 and TX/RX processor 1558 at the Data Processing System1566) and/or a central processing unit (CPU) (e.g., CPU 1520 at the Data Processing System1524 and CPU 1560 at the Data Processing System1564) and/or a graphical processing unit (GPU) (e.g., GPU 1522 at the Data Processing System1524 and GPU 1562 at the Data Processing System1564).

The Memory 1512 may have interfaces with the Data Processing System 1524 and the Memory 1552 may have interfaces with Data Processing System1564, respectively. The Memory 1512 or the Memory 1552 may include non-transitory computer readable mediums (e.g., Storage Medium 1510 at the Memory 1512 and Storage Medium 1550 at the Memory 1552) that may store software code or instructions that may be executed by the Data Processing System1524 and Data Processing System1564, respectively, to implement the processes described in the present disclosure. The Memory 1512 or the Memory 1552 may include random-access memory (RAM) (e.g., RAM 1506 at the Memory 1512 or RAM 1546 at the Memory 1552) or read-only memory (ROM) (e.g., ROM 1508 at the Memory 1512 or ROM 1548 at the Memory 1552) to store data and/or software codes.

The Data Processing System1524 and/or the Data Processing System1564 may be connected to other components such as a GPS module 1514 and a GPS module 1554, respectively, wherein the GPS module 1514 and a GPS module 1554 may enable delivery of location information of the wireless device 1502 to the Data Processing System1524 and location information of the base station 1542 to the Data Processing System1564. One or more other peripheral components (e.g., Peripheral Component(s) 1504 or Peripheral Component(s) 1544) may be configured and connected to the data Processing System1524 and data Processing System1564, respectively.

In example embodiments, a wireless device may be configured with parameters and/or configuration arrangements. For example, the configuration of the wireless device with parameters and/or configuration arrangements may be based on one or more control messages that may be used to configure the wireless device to implement processes and/or actions. The wireless device may be configured with the parameters and/or the configuration arrangements regardless of the wireless device being in operation or not in operation. For example, software, firmware, memory, hardware and/or a combination thereof and/or alike may be configured in a wireless device regardless of the wireless device being in operation or not operation. The configured parameters and/or settings may influence the actions and/or processes performed by the wireless device when in operation.

In example embodiments, a wireless device may receive one or more message comprising configuration parameters. For example, the one or more messages may comprise radio resource control (RRC) messages. A parameter of the configuration parameters may be in at least one of the one or more messages. The one or more messages may comprise information element (IEs). An information element may be a structural element that includes single or multiple fields. The fields in an IE may be individual contents of the IE. The terms configuration parameter, IE and field may be used equally in this disclosure. The IEs may be implemented using a nested structure, wherein an IE may include one or more other IEs and an IE of the one or more other IEs may include one or more additional IEs. With this structure, a parent IE contains all the offspring IEs as well. For example, a first IE containing a second IE, the second IE containing a third IE, and the third IE containing a fourth IE may imply that the first IE contains the third IE and the fourth IE.

The amount of licensed spectrum available for an operator to meet the demands may not be sufficient and obtaining licensed spectrum may be costly. Unlicensed spectrum is freely available subject to a set of rules, for example rules on maximum transmission power. Since the unlicensed spectrum is freely available, the interference situation may be more unpredictable compared to licensed spectrum. Achieving quality-of-service may be more challenging in unlicensed spectrum. WLANs and Bluetooth are examples of communication systems exploiting unlicensed spectrum in the lower-frequency range, e.g., 2.4 GHz or 5 GHz.

Some of the frequency bands used by an NR communications system may be unlicensed (e.g., in lower and/or higher frequency bands). Different deployment scenarios may be used in example embodiments. Example deployment scenarios include: carrier aggregation between licensed band NR (for example for PCell) and unlicensed band NR (NR-U) (for example for SCell), wherein NR-U SCell may have both DL and UL or may be DL-only; dual connectivity between licensed band LTE (e.g., PCell) and NR-U (e.g., PSCell); standalone NR-U, wherein PCell and SCell may be both in unlicensed bands; an NR cell with DL in unlicensed band and UL in licensed band; and dual connectivity between licensed band NR (e.g., PCell) and NR-U (e.g., PSCell).

In an example, the licensed spectrum may be used to provide wide-area coverage and quality-of-service guarantees, with unlicensed spectrum used as a local-area complement to increase user data rates and overall capacity without compromising on overall coverage, availability, and reliability. This may be referred to as License-Assisted Access (LAA).

In an example, to enable fair sharing of unlicensed spectra with other operators and/or systems (e.g., Wi-Fi), several mechanisms may be used in example embodiments. Example mechanisms may include dynamic frequency selection (DFS), where a network node may search and find a part of the unlicensed spectrum with low load. Example embodiments may employ listen-before-talk (LBT) based on example channel access procedures, where the transmitter ensures there are no ongoing transmissions on the carrier frequency prior to transmitting.

In an example, a channel may refer to a carrier or a part of a carrier on which a channel access procedure is performed. A channel access procedure is a procedure based on sensing that evaluates the availability of a channel for performing transmissions on. The basic unit for sensing may be a sensing slot with a duration $T_{sl}=9$ us. The sensing slot duration $T_{sl}$ may be considered to be idle if a base station or a wireless device senses the channel during the sensing slot duration, and determines that the detected power for at least a portion (e.g., 4 us) within the sensing slot duration is less than an energy detection threshold (e.g., $X_{Thresh}$). Otherwise, the sensing slot duration $T_1$ may be considered to be busy.

A Channel Occupancy Time (COT) may refer to the total time for which eNB/gNB/UE and eNB/gNB/UEs sharing the channel occupancy can perform transmission(s) on a channel after an eNB/gNB/UE performs the corresponding channel access procedures. For determining a Channel Occupancy Time, if a transmission gap is less than 25 us, the gap duration may be counted in the channel occupancy time. A channel occupancy time may be shared for transmission between a base station and the corresponding wireless device(s). A DL transmission burst may be defined as a set of transmissions from a base station without gaps greater than 16 us. Transmissions from a base station separated by a gap of more than 16 us may be considered as separate DL transmission bursts. An UL transmission burst may be defined as a set of transmissions from a UE without gaps greater than 16 us. Transmissions from a wireless device separated by a gap of more than 16 us may be considered as separate UL transmission.

In an example, a wireless device may access a channel on which uplink transmission(s) are performed according to an uplink channel access procedure (e.g., one of Type 1 or Type 2 uplink channel access procedures). If an uplink grant scheduling a PUSCH transmission indicates Type 1 channel access procedure, the wireless device may use Type 1 channel access procedure for transmitting transmissions including the PUSCH transmission. A wireless device may use Type 1 channel access procedure for transmitting transmissions including autonomous PUSCH transmission on configured uplink resources. If an uplink grant scheduling a PUSCH transmission indicates Type 2 channel access procedure, the wireless device may use Type 2 channel access procedure for transmitting transmissions including the PUSCH transmission. A wireless device may use Type 1 channel access procedure for transmitting SRS transmissions not including a PUSCH transmission. In an example, uplink channel access priority class p=1, as shown in FIG. 16, may be used for SRS transmissions not including a PUSCH.

In an example, if a wireless device is scheduled by a base station to transmit PUSCH and SRS in contiguous transmissions without gaps in between, and if the wireless device cannot access the channel for PUSCH transmission, the wireless device may attempt to make SRS transmission according to uplink channel access procedures for SRS transmission.

In an example, a wireless device may use Type 1 channel access procedure for PUCCH only transmissions or PUSCH only transmissions without UL-SCH with UL channel access priority class p=1 in FIG. 16.

In an example, a wireless device may use Type 1 channel access procedure for transmissions related to random access procedure with uplink channel access priority class p=1 in FIG. 16.

In an example, the total duration of autonomous uplink transmission(s) obtained by the channel access procedure, including the following DL transmission if the UE sets 'COT sharing indication' in AUL-UCI to '1' in a subframe within the autonomous uplink transmission(s), may not exceed $T_{ulmcot,p}$, where $T_{ulmcot,p}$ is given in FIG. 16.

In an example, a wireless device may detect 'UL duration and offset' field in a DCI. If the UL duration and offset' field indicates an 'UL offset'; and an 'UL duration' d for subframe n, then the scheduled UE may use channel access Type 2 for transmissions in subframes n+l+i where i=0, 1, . . . d−1, irrespective of the channel access Type signalled in the UL grant for those subframes, if the end of wireless device transmission occurs in or before subframe n+l+d−1.

In an example, if the 'UL duration and offset' field indicates an 'UL offset' l and an 'UL duration' d for subframe n and the 'COT sharing indication for AUL' field is set to '1', a UE configured with autonomous UL may use channel access Type 2 for autonomous UL transmissions corresponding to any priority class in subframes n+l+i where i=0, 1, . . . d−1, if the end of wireless device autonomous UL transmission occurs in or before subframe n+l+d−1 and the autonomous UL transmission between n+l and n+l+d−1 may be contiguous.

In an example, if the 'UL duration and offset' field indicates an 'UL offset' l and an 'UL duration' d for subframe n and the 'COT sharing indication for AUL' field is set to '0', then a UE configured with autonomous UL may not transmit autonomous UL in subframes n+l+i where i=0, 1, . . . d−1.

In an example, for contiguous UL transmission(s), if a wireless device is scheduled to transmit a set of w UL transmissions including PUSCH using a PDCCH DCI format, and if the wireless device cannot access the channel for a transmission in the set prior to the last transmission, the wireless device may attempt to transmit the next transmission according to the channel access type indicated in the DCI.

In an example, for contiguous uplink transmission(s), if a wireless device is scheduled to transmit a set of w consecutive uplink transmissions without gaps including PUSCH using one or more PDCCH DCI formats and the wireless device transmits one of the scheduled uplink transmissions in the set after accessing the channel according to one of uplink channel access procedures (e.g., Type 1 or Type 2), the wireless device may continue transmission the remaining uplink transmissions in the set, if any.

In an example, for contiguous UL transmission(s), a wireless device may not be expected to be indicated with different channel access types for any consecutive UL transmissions without gaps in between the transmissions.

In an example, for uplink transmission(s) with multiple starting positions scheduled by a base station, if a wireless device is scheduled by an base station to transmit transmissions including PUSCH Mode 1 using the Type 1 channel access procedure indicated in DCI, and if the wireless device cannot access the channel for a transmission according to the PUSCH starting position indicated in the DCI, the wireless device may attempt to make a transmission at symbol 7 in the same subframe according to Type 1 channel access procedure. In an example, there may be no limit on the number of attempts the UE can make using Type 1 channel access procedure.

In an example, for uplink transmission(s) with multiple starting positions scheduled by a base station, if a wireless device is scheduled by a base station to transmit transmissions including PUSCH Mode 1 using the Type 2 channel access procedure indicated in DCI, and if the wireless device cannot access the channel for a transmission according to the PUSCH starting position indicated in the DCI, the wireless device may attempt to make a transmission at symbol 7 in the same subframe and according to Type 2 channel access procedure. The number of attempts the wireless device may make within the consecutively scheduled subframes including the transmission may be limited to w+1, where w may be the number of consecutively scheduled subframes using Type 2 channel access procedure.

In an example, for contiguous uplink transmissions(s) including a transmission pause, if the wireless is scheduled to transmit a set of w consecutive uplink transmissions without gaps using one or more PDCCH DCI formats, and if the wireless device has stopped transmitting during or before of one of these uplink transmissions in the set and prior to the last uplink transmission in the set, and if the channel is sensed by the wireless device to be continuously idle after the wireless device has stopped transmitting, the wireless device may transmit a later uplink transmission in the set using Type 2 channel access procedure. If the channel sensed by the wireless device is not continuously idle after the wireless device has stopped transmitting, the wireless device may transmit a later uplink transmission in the set using Type 1 channel access procedure with the uplink channel access priority class indicated in the DCI corresponding to the uplink transmission.

In an example, for uplink transmission(s) following configured uplink transmission(s), if the wireless device is scheduled by a base station to transmit on channel $c_i$ by a uplink grant received on channel $c_j$, i≠j, and if the wireless device is transmitting using autonomous uplink on channel $c_i$, the wireless device may terminate the ongoing PUSCH transmissions using the autonomous uplink at least one subframe before the uplink transmission according to the received uplink grant.

In an example, if the wireless device is scheduled by an uplink grant received from a base station on a channel to transmit a PUSCH transmission(s) starting from subframe n on the same channel using Type 1 channel access procedure and if at least for the first scheduled subframe occupies $N_{RB}^{UL}$ resource blocks and the indicated 'PUSCH starting position is OFDM symbol zero, and if the wireless device starts autonomous uplink transmissions before subframe n using Type 1 channel access procedure on the same channel, the wireless device may transmit uplink transmission(s) according to the received uplink grant from subframe n without a gap, if the priority class value of the performed channel access procedure is larger than or equal to priority class value indicated in the uplink grant, and the autonomous uplink transmission in the subframe preceding subframe n may end at the last OFDM symbol of the subframe regardless of the higher layer parameter endingSymbolAUL. The sum of the lengths of the autonomous uplink transmission(s) and the scheduled uplink transmission(s) may not exceed the maximum channel occupancy time corresponding to the priority class value used to perform the autonomous uplink channel access procedure. Otherwise, the wireless device may terminate the ongoing autonomous uplink transmission at least one subframe before the start of the uplink transmission according to the received uplink grant on the same channel.

In an example, if a wireless device receives an uplink grant and a DCI indicating a PUSCH transmission using Type 1 channel access procedure, and if the wireless device has an ongoing Type 1 channel access procedure before the PUSCH transmission starting time, if the uplink channel access priority class value $p_1$ used for the ongoing Type 1 channel access procedure is same or larger than the uplink channel access priority class value $p_2$ indicated in the DCI, the wireless device may transmit the PUSCH transmission in response to the uplink grant by accessing the channel by using the ongoing Type 1 channel access procedure.

In an example, if a wireless device receives an uplink grant and a DCI indicating a PUSCH transmission using Type 1 channel access procedure, and if the wireless device has an ongoing Type 1 channel access procedure before the PUSCH transmission starting time, if the uplink channel access priority class value $p_1$ used for the ongoing Type 1 channel access procedure is smaller than the uplink channel access priority class value $p_2$ indicated in the DCI, the wireless device may terminate the ongoing channel access procedure.

In an example, a base station may indicate Type 2 channel access procedure in the DCI of an uplink grant scheduling transmission(s) including PUSCH on a channel when: the base station has transmitted on the channel according to a channel access procedure; or base station may indicate using the 'UL duration and offset' field that the wireless device may perform a Type 2 channel access procedure for transmissions(s) including PUSCH on a channel in subframe n when the base station has transmitted on the channel according to a channel access procedure described; or a base station may indicate using the 'UL duration and offset' field and 'COT sharing indication for AUL' field that a wireless device configured with autonomous uplink may perform a Type 2 channel access procedure for autonomous uplink transmissions(s) including PUSCH on a channel in subframe n when the base station has transmitted on the channel according to a channel access procedure and acquired the channel using the largest priority class value and the base station transmission includes PDSCH, or a base station may schedule uplink transmissions on a channel, that follows a transmission by the base station on that channel with a duration of $T_{short\_ul}$=25 us, if the uplink transmissions occurs within the time interval starting at $t_0$ and ending at $t_0+T_{CO}$, where $T_{CO}=T_{mcot,p}+T_g$, where $t_0$ is the time instant when the base station has started transmission, $T_{m\_cot,p}$ value is determined by the base station, $T_g$ is the total duration of all gaps of duration greater than 25 us that occur between the DL transmission of the base station and uplink transmissions scheduled by the base station, and between any two uplink transmissions scheduled by the base station starting from $t_0$.

In an example, the base station may schedule uplink transmissions between $t_0$ and $t_0+T_{CO}$ without gaps between consecutive uplink transmissions if they can be scheduled contiguously. For an uplink transmission on a channel that follows a transmission by the base station on that channel within a duration of $T_{short\_ul}$=25 us, the wireless device may use Type 2A channel access procedure for the UL transmission.

In an example, if the base station indicates Type 2 channel access procedure for the wireless device in the DCI, the base station may indicate the channel access priority class used to obtain access to the channel in the DCI.

For indicating a Type 2 channel access procedure, if the gap is at least 25 us, or 16 us, or up to 16 us, the base station may indicate Type 2A, or Type 2B, or Type 2C uplink channel procedures, respectively.

In an example, if a wireless device is scheduled to transmit on a set of channels C, and if Type 1 channel access procedure is indicated by the uplink scheduling grants for the uplink transmissions on the set of channels C, and if the uplink transmissions are scheduled to start transmissions at the same time on all channels in the set of channels C; or if the wireless device intends to perform an autonomous uplink transmission on configured resources on the set of channels C with Type 1 channel access procedure, and if UL transmissions are configured to start transmissions on the same time all channels in the set of channels C; and if the channel frequencies of set of channels C is a subset of one of the sets of channel frequencies, the wireless device may transmit on channel $c_1 \in C$ using Type 2 channel access procedure, if Type 2 channel access procedure is performed on channel $c_1$ immediately before the wireless device transmission on channel $c_i \in C$, i≠j, and if the wireless device has accessed channel $c_i$ using Type 1 channel access procedure, where channel $c_j$ is selected by the wireless device uniformly randomly from the set of channels C before performing Type 1 channel access procedure on any channel in the set of channels C and the wireless device may not transmit on channel $c_i \in C$ within the bandwidth of a carrier, if the wireless device fails to access any of the channels, of the carrier bandwidth, on which the wireless device is scheduled or configured by UL resources.

In an example, a wireless device may transmit the transmission using Type 1 channel access procedure after first sensing the channel to be idle during the slot durations of a defer duration $T_d$; and after the counter N is zero in step 4. The counter N may be adjusted by sensing the channel for additional slot duration(s) according to the actions described below:

1) set N=$N_{init}$, where $N_{init}$ is a random number uniformly distributed between 0 and $CW_p$, and go to action 4;
2) if N>0 and the UE chooses to decrement the counter, set N=N−1;
3) sense the channel for an additional slot duration, and if the additional slot duration is idle, go to action 4; else, go to action 5;
4) if N=0, stop; else, go to action 2.
5) sense the channel until either a busy slot is detected within an additional defer duration $T_d$ or all the slots of the additional defer duration $T_d$ are detected to be idle;
6) if the channel is sensed to be idle during all the slot durations of the additional defer duration $T_d$, go to action 4; else, go to action 5;

In an example, if a wireless device has not transmitted an uplink transmission on a channel on which uplink transmission(s) are performed after action 4 in the process above, the wireless device may transmit a transmission on the channel, if the channel is sensed to be idle at least in a sensing slot duration $T_{sl}$ when the UE is ready to transmit the transmission and if the channel has been sensed to be idle during all the slot durations of a defer duration $T_d$ immediately before the transmission. If the channel has not been sensed to be idle in a sensing slot duration $T_{sl}$ when the wireless device first senses the channel after it is ready to transmit, or if the channel has not been sensed to be idle during any of the sensing slot durations of a defer duration $T_d$ immediately before the intended transmission, the wireless device may proceed to action 1 after sensing the channel to be idle during the slot durations of a defer duration $T_d$.

The defer duration $T_d$ may consist of duration $T_f=16$ us immediately followed by $m_p$ consecutive slot durations where each slot duration is $T_{sl}=9$ us, and $T_f$ includes an idle slot duration $T_{sl}$ at start of $T_f$. $CW_{min,p} \leq CW_p \leq CW_{max,p}$ may be the contention window. $CW_{min,p}$ and $CW_{max,p}$ may be chosen before step 1 of the procedure above. $m_p$, $CW_{min,p}$ and $CW_{max,p}$ may be based on a channel access priority class p as shown in FIG. 16, that is signalled to the wireless device.

In an example, if a wireless device is indicated to perform Type 2A UL channel access procedures, the wireless device may use Type 2A UL channel access procedure for a UL transmission. The UE may transmit the transmission immediately after sensing the channel to be idle for at least a sensing interval $T_{short\_ul}=25$ us. $T_{short\_ul}$ may consist of a duration $T_f=16$ us immediately followed by one slot duration $T_{sl}=9$ us and $T_f$ may include an idle slot duration $T_{sl}$ at start of $T_f$. The channel may be considered to be idle for $T_{short\_ul}$ if it is sensed to be idle during the slot durations of $T_{short\_ul}$.

In an example, if a wireless device is indicated to perform Type 2B UL channel access procedures, the wireless device may use Type 2B UL channel access procedure for a uplink transmission. The wireless device may transmit the transmission immediately after sensing the channel to be idle.

In an example, if a wireless device is indicated to perform Type 2C UL channel access procedures, the wireless device transmits immediately without sensing the channel.

In an example embodiment, a wireless device (e.g., a MAC entity of the wireless device) may employ one or more processes to handle the uplink LBT failures for uplink transmissions, such as uplink transmissions for one or more uplink channels (e.g., PUSCH, PUCCH and/or PRACH) and/or one or more signals (e.g., SRS). In an example, the wireless device may detect/determine consistent uplink LBT failures to detect/determine uplink LBT problems. A MAC entity of the wireless device may receive notifications of uplink LBT failures from the physical layer to detect consistent uplink LBT failures.

In an example, detection/determination of consistent uplink LBT failures may be based on a counter and/or timer. A value of the counter may be incremented based on detecting an uplink LBT failure. In an example, a threshold may be configured and a consistent uplink LBT failure may be determined based on the counter reaching the threshold. A consistent uplink LBT failure event may be triggered based on the uplink LBT failure counter reaching the threshold value. In an example, a timer may be started based on detecting a consistent uplink LBT failure and the value of the counter may be reset (e.g., reset to zero) based on an expiry of the timer. The wireless device may receive configuration parameters indicating the threshold value for the counter (e.g., a Max Count value) and a value of the timer. In an example, the threshold for the counter and/or the timer value may be configured per BWP and/or per cell. In an example, the threshold may be reset (e.g., reset to zero) based on the reconfiguration (e.g., in response to receiving an RRC reconfiguration message) of one or more parameters of the consistent uplink failure detection such as the threshold and/or timer value.

The wireless device may determine consistent LBT failure (e.g., for a cell and/or a BWP of the cell and/or an LBT sub-band of the BWP of the cell). The wireless device may indicate the consistent LBT failure (e.g., for a cell and/or a BWP of the cell and/or an LBT sub-band of the BWP of the cell) to the base station. The cell for which the wireless device may indicate consistent LBT failure may be a secondary cell or a primary cell (e.g., PCell or PSCell). In an example, the wireless device may autonomously take a recovery action. In an example, the wireless device may receive a command from the base station in response to indication of the consistent LBT failure to the base station. The recovery action may include switching the BWP and/or performing a random access process (e.g., in the new BWP after switching). In an example, the wireless device may stop one or more timers (e.g., BWP inactivity timer) based on the detecting/determining the consistent LBT failure.

In an example, the determining/detecting of the consistent uplink LBT failure on a cell/BWP may be based on a plurality of uplink transmissions (e.g., via one or more uplink channels and/or one or more uplink signals) on the cell/BWP. In an example, the determining/detecting of the consistent uplink LBT failure may be independent of uplink transmission type. The LBT failures for different uplink transmissions may be used to determine the consistent uplink LBT failure regardless of the uplink transmission types (e.g., PUSCH, PUCCH, etc.). The consistent uplink LBT failure mechanism may have the same recovery mechanism for all uplink LBT failures regardless of the uplink transmission type.

In an example, based on detecting/determining/declaring consistent uplink LBT failures on PCell or PSCell, the wireless device may switch a current active BWP (of PCell or PSCell) to a second BWP (of PCell or PSCell). The wireless device may initiate a random access process in the second BWP based on the second BWP being configured with random access resources. The wireless device may perform radio link failure (RLF) recovery based on the consistent uplink LBT failure being detected on the PCell and consistent uplink LBT failure being detected on N possible BWPs of the PCell. In an example, based on detecting/determining consistent uplink LBT failures on a PSCell and after detecting a consistent uplink LBT failure on N BWPs of the PSCell, the wireless device may indicate a failure to a master base station via a secondary cell group (SCG) failure information procedure. In an example, N may be the number of configured BWPs with configured random access resources. In an example, after detecting consistent uplink LBT failure on PCell or PSCell, the wireless device may determine which BWP to switch if N is larger than one. The value of N may be configurable (e.g., via RRC) or may be pre-determined/pre-configured.

In an example, based on detecting/determining consistent uplink LBT failures on a cell (e.g., a SCell or PCell), the wireless device may indicate the consistent LBT failure on the cell to the base station based on an LBT failure indication MAC CE. The MAC CE may report consistent uplink LBT failure on one or more Cells. The MAC CE format may support multiple entries to indicate the Cells which have already declared consistent uplink LBT failures. In an example, the LBT failure indication MAC CE may indicate/include cell index(s) where uplink LBT failure occurs. In an example, the format of the LBT failure indication MAC CE may be a bitmap to indicate whether corresponding serving cell has declared consistent uplink LBT failure or not.

The LBT failure indication MAC CE may be transmitted on a different serving cell than a SCell which has consistent UL LBT problem. In an example, the LBT failure indication MAC CE may indicate consistent uplink LBT failures on one or more cells and the wireless device may transmit the LBT failure indication MAC CE based on an uplink grant on a cell other than the one or more cells. The MAC CE for uplink LBT failure indication may have higher priority than data but lower priority than a beam failure recovery (BFR) MAC CE.

The wireless device may trigger scheduling request if there is no available uplink resource for transmitting the MAC CE for a SCell uplink LBT failure indication. The wireless device may receive configuration parameters of a SR configuration associated with uplink LBT failure indication. The configuration parameters may comprise an identifier indicating that the SR is associated with uplink LBT failure indication. In an example, when a SR configuration associated with uplink LBT failure indication is not configured for the wireless device and no resource is available for transmitting the MAC CE for indicating SCell uplink LBT failure, the wireless device may start a random access process.

In an example, when a SR for uplink LBT failure indication is triggered and the wireless device has an overlapping SR PUCCH resource with the SCell LBT failure SR PUCCH resource, the wireless device may select the SCell LBT failure SR PUCCH resource for transmission.

In an example, the wireless device may cancel the consistent LTB failure for a serving cell (or BWP(s)) (e.g., may not consider the cell as having consistent LBT failure) based on the wireless device successfully transmitting an LBT failure MAC CE indicating the serving cell.

In an example, when consistent UL LBT failure is declared on SpCell, the wireless device may trigger MAC CE to indicate where failure happened. The MAC CE may be sent on the BWP that the wireless device switched to during the random access process.

In an example, different LBT failures, irrespective of channel, channel access priority class, and LBT type, may be considered equivalent for the consistent UL LBT failure detection procedure at a MAC entity of a wireless device.

In an example, upon switching to a new BWP after detecting consistent LBT failures on a BWP of the PCell/PSCell, the wireless device may increment a counter (e.g., a BWP switching counter). The BWP switching counter may be used by the wireless device to initiate a radio link failure process based on the BWP switching counter reaching a value (e.g., N). The wireless device may reset the BWP switching counter when the random access process on a BWP of the PCell/PSCell being successfully completed.

In an example, in response to the BWP switching due to consistent uplink LBT failure on PCell/PSCell, the wireless device may indicate the consistent uplink LBT failure via dedicated uplink resource (e.g. PRACH). For example, the PRACH resources used for indication of consistent uplink LBT failure may be dedicated to consistent uplink LBT failure indication In an example, the uplink LBT failure information reported by the UE may include one or more BWP indexes of BWPs with consistent uplink LBT failures, one or more cell indexes of one or more cells with consistent uplink LBT failures and/or one or more measurement results (e.g., RSRP/RSRQ/RSSI/CO) of the serving/neighbor cells In an example, the wireless device may perform an LBT for an uplink transmission comprising the uplink failure indication MAC CE based on a highest priority channel access priority class (e.g., lowest number channel access priority).

In an example, the wireless device may reset the uplink LBT counter for a cell/BWP based on expiry of an uplink LBT timer and/or based on receiving one or more messages indicating reconfiguration of uplink LBT configuration parameters for detecting consistent LBT failures and/or based on transmitting an uplink channel or uplink signal on the cell/BWP in response to successful uplink LBT. In an example, successful uplink LBT for the cell/BWP may indicate that the cell/BWP no longer has consistent LBT failures.

In an example, in response to BWP switching caused by detection of consistent uplink LBT failures on SpCell, a MAC entity may stop an ongoing random access procedure and may initiate a new random access procedure.

In an example, based on switching BWP due to detecting/declaring consistent LBT failure on a BWP of PCell or PSCell, the wireless device may initiate a random access process and may not perform other transmissions (e.g., may not resume suspended configured grants transmissions).

In an example, a wireless device may autonomously deactivate a configured grant for Sell(s) experiencing a consistent UL LBT failure.

In an example, based on detecting/declaring consistent uplink LBT failure for a cell/BWP, ongoing transmissions (e.g., PUSCH transmission, SRS transmission, PUCCH transmission, RACH transmission, etc.) on active BWP of a SCell with consistent uplink LBT failure may be suspended.

In an example, based on detecting/declaring consistent uplink LBT failure for a cell/BWP, type 2 configured grants on the cell/BWP may be cleared. In an example, based on detecting/declaring consistent uplink LBT failure for a cell/BWP, type 1 configured grants on the cell/BWP may be suspended. In an example, based on detecting/declaring consistent uplink LBT failure for a BWP, BWP inactivity for a downlink BWP associated with the BWP may be stopped.

In an example, based on switching BWP due to detecting/declaring consistent LBT failure on a BWP of PCell or PSCell, a counter for detection of consistent uplink LBT failure of the BWP may be reset and/or a timer for consistent uplink LBT failure detection of the BWP may be stopped.

In an example, based on an uplink transmission failure due to LBT, a physical layer of a wireless device may send LBT failure indication to a MAC entity of the wireless device. The MAC entity of the wireless device may, based on receiving an LBT failure indication, start an lbt-FailureDetectionTimer and increment an LBT_COUNTER. Based on the lbt-FailureDetectionTimer expiring, the LBT_COUNTER may be reset. Based on LBT_COUNTER reaching a configured threshold value before the lbt-FailureDetectionTimer expiring, the wireless device may trigger a consistent uplink LBT failure event. In an example, a "failureType" in SCG failure information may indicate consistent uplink LBT failures.

Figure 17:
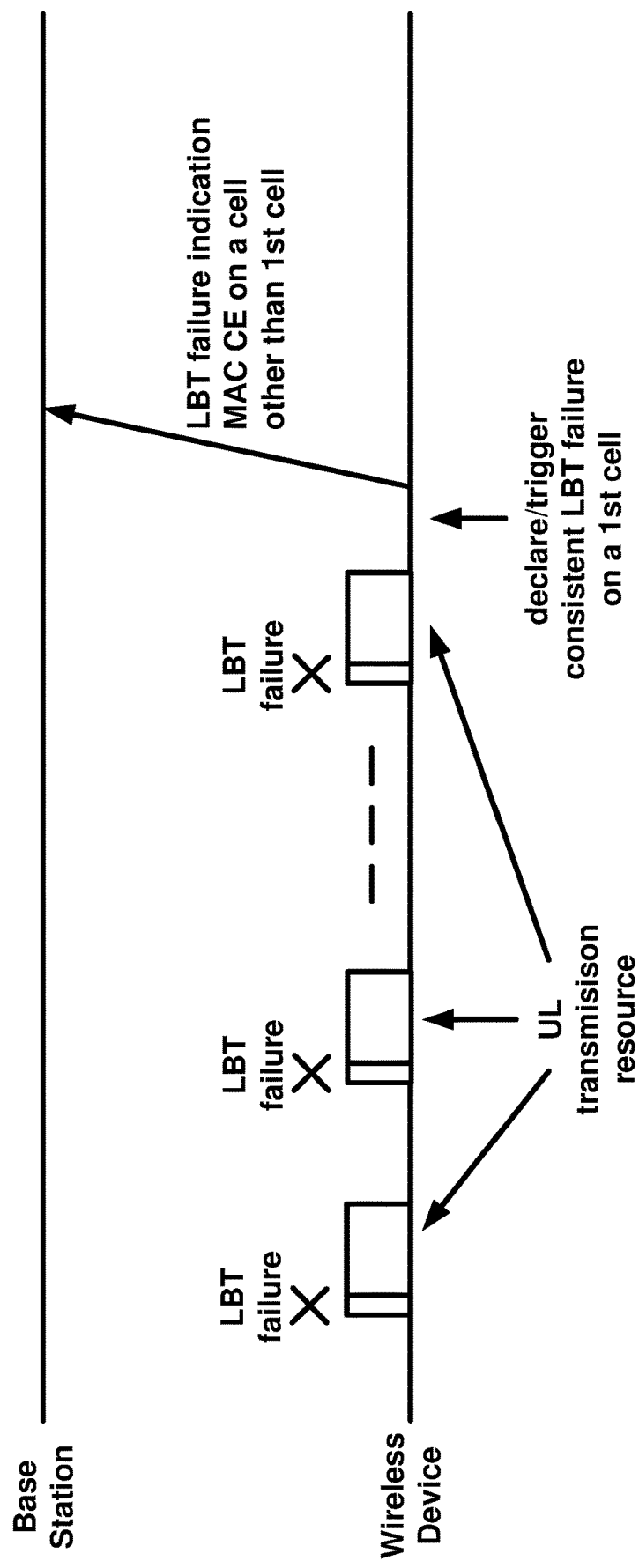
FIG. 17 shows an example LBT failure indication in accordance with several of various embodiments of the present disclosure.

In an example as shown in FIG. 17, a wireless device may determine consistent LBT failures on a cell and/or a BWP of a cell and/or an LBT subband of a BWP of a cell. The determination of consistent LBT failures on the cell/BWP/LBT subband may be based on counting a number of uplink LBT failures for uplink transmissions on the cell/BWP/LBT subband. The uplink transmission may be via an uplink channel (e.g., PUSCH, PUCCH, PRACH) or an uplink signal (e.g., SRS). For example, the wireless device may increment a counter based on determining/detecting an uplink LBT failure for an uplink transmission and may declare/trigger a consistent LBT failure indication based on the counter reaching a first value. The first value for the counter may be configurable (e.g., by RRC). The wireless device may receive configuration parameters comprising a first parameter indicating the first value. For example, a MAC entity of the wireless device may determine an LBT failure based on an indication of the LBT failure for the uplink transmission from the physical layer of the wireless device. The wireless device may start a timer based on receiving an LBT failure indication and may reset the LBT counter (e.g., reset to zero) based on the timer expiring. The wireless device may transmit an LBT failures indication MAC CE based on the triggering/declaring/determining a consistent LBT failure for a first cell/BWP/LBT subband. The LBT failures indication MAC CE may indicate consistent LBT failure on the first cell (and/or first BWP or first LBT subband of the first cell) and one or more other cells/BWPs/LB subbands that have consistent LBT failures.

Figure 18:
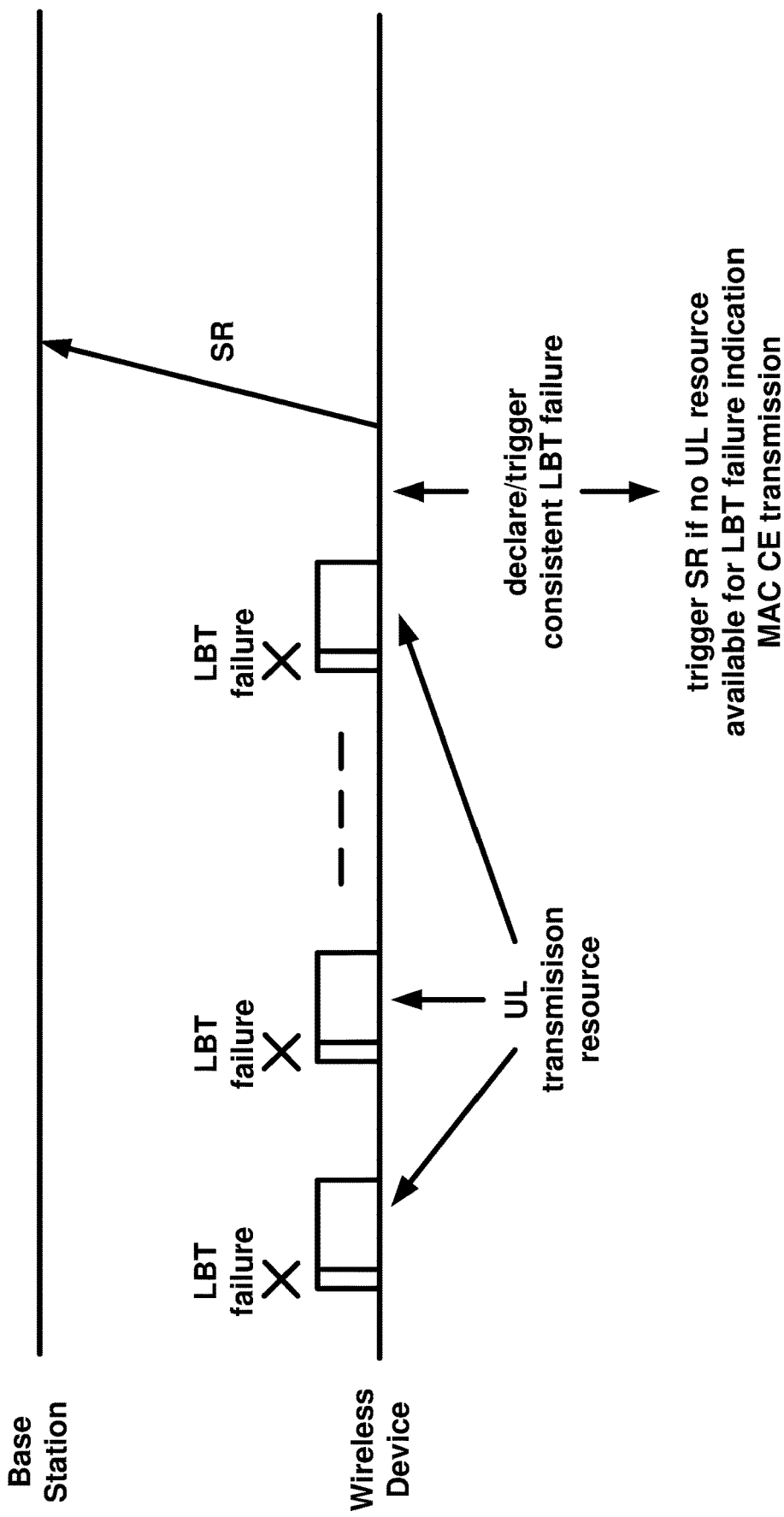
FIG. 18 shows scheduling request transmission for consistent LBT failures recovery in accordance with several of various embodiments of the present disclosure.

In an example as shown in FIG. 18, the wireless device may declare/trigger consistent LBT failures on a cell/BWP/LBT subband based on a consistent LBT failure determination described earlier. The wireless device may determine that no uplink resource is available for transmission of an LBT failure indication MAC CE. Based on no uplink resource being available for transmission of the LBT failure indication MAC CE, the wireless device may trigger a scheduling request. The wireless device may transmit a scheduling request signal based on a scheduling request configuration. The scheduling request configuration may be for transmission of scheduling request signals related to uplink LBT failure recovery.

In an example, the configuration parameters of the scheduling request configuration (e.g., a scheduling request identifier and/or other parameters) may indicate that the scheduling request configuration is for consistent LBT failure recovery. The scheduling request configuration may indicate resources comprising a first resource for transmission of the scheduling request signal.

In an example, a MAC entity of a wireless device may be configured by RRC with a beam failure recovery (BFR) procedure and with parameters for a beam failure recovery procedure. The beam failure recovery procedure may be used for indicating to a serving base station of a new SSB or CSI-RS based on beam failure being detected on the serving SSB(s)/CSI-RS(s). Beam failure may be detected by counting beam failure instance indications from the lower layers to the MAC entity.

In an example, if IE beamFailureRecoveryConfig is reconfigured by upper layers during an ongoing Random Access procedure for beam failure recovery, the MAC entity may stop the ongoing Random Access procedure and may initiate a Random Access procedure using the new configuration.

In an example, the following RRC configuration parameters may be received in one or more IEs such as BeamFailureRecoveryConfig and the RadioLinkMonitoringConfig for the Beam Failure Detection and Recovery procedure: beamFailureInstanceMaxCount for the beam failure detection; beamFailureDetectionTimer for the beam failure detection; beamFailureRecoveryTimer for the beam failure recovery procedure; rsrp-ThresholdSSB: an RSRP threshold for the beam failure recovery; powerRampingStep: powerRampingStep for the beam failure recovery; powerRampingStepHighPriority: powerRampingStepHighPriority for the beam failure recovery; preambleReceivedTargetPower: preambleReceivedTargetPower for the beam failure recovery; preambleTransMax: preambleTransMax for the beam failure recovery; scalingFactorBI: scalingFactorBI for the beam failure recovery; ssb-perRACH-Occasion: ssb-per-RACH-Occasion for the beam failure recovery; ra-ResponseWindow: the time window to monitor response(s) for the beam failure recovery using contention-free Random Access Preamble; prach-ConfigurationIndex: prach-Configuration-Index for the beam failure recovery; ra-ssb-OccasionMaskIndex: ra-ssb-OccasionMaskIndex for the beam failure recovery; ra-OccasionList: ra-OccasionList for the beam failure recovery. In an example, the UE variable BFI_COUNTER may indicate a counter for beam failure instance indication which may be initially set to 0.

In an example, beam failure instance indication may be received from lower layers. The MAC entity may start or restart the beamFailureDetectionTimer based on the receiving the beam failure instance indication. The MAC entity may increment BFI_COUNTER by 1 based on the receiving the beam failure instance indication. The MAC entity may initiate a Random Access procedure on the SpCell if BFI_COUNTER>=beamFailureInstanceMaxCount.

In an example, if the beamFailureDetectionTimer expires, the MAC entity may set BFI_COUNTER to 0. In an example, if beamFailureDetectionTimer, beamFailureInstanceMaxCount, or the reference signals used for beam failure detection is reconfigured by upper layers, the MAC entity may set BFI_COUNTER to 0.

In an example, if the Random Access procedure for beam failure recovery is successfully completed: the MAC entity may set BFI_COUNTER to 0; the MAC entity may stop the beamFailureRecoveryTimer, if configured; and the MAC entity may consider the Beam Failure Recovery procedure successfully completed.

In an example, an IE BeamFailureRecoveryConfig may be used to configure a wireless device with RACH resources and candidate beams for beam failure recovery in case of beam failure detection. In an example, a beamFailureRecoveryTimer parameter may indicate a timer for beam failure recovery timer. In an example, upon expiration of the timer the wireless may not use CFRA for BFR. The value of beamFailureRecoveryTimer may be in ms. For example, value ms10 may correspond to 10 ms, value ms20 may correspond to 20 ms, and so on. In an example, candidateBeamRSList may indicate a list of reference signals (e.g., CSI-RS and/or SSB) identifying the candidate beams for recovery and the associated RA parameters. In an example, the network may configure these reference signals to be within the linked DL BWP (e.g., within the DL BWP with the same bwp-Id) of the UL BWP in which the BeamFailureRecoveryConfig may be provided. In an example, a msg1-SubcarrierSpacing parameter may indicate subcarrier spacing for contention free beam failure recovery. Example values may include 15 kHz or 30 kHz (e.g., FR1), and 60 kHz or 120 kHz (e.g., FR2).

In an example, a rsrp-ThresholdSSB parameter may indicate L1-RSRP threshold used for determining whether a candidate beam may be used by the wireless device to attempt contention free random access to recover from beam failure. In an example, ra-prioritization may indicate parameters which may apply for prioritized random access procedure for BFR. In an example, a ra-ssb-OccasionMaskIndex parameter may indicate explicitly signalled PRACH Mask Index for RA Resource selection. The mask may be valid for SSB resources. In an example, a rach-ConfigBFR parameter may indicate configuration of contention free random access occasions for BFR. In an example, a recoverySearchSpaceId parameter may indicate search space to use for BFR RAR. The network may configure this search space to be within the linked DL BWP (e.g., within the DL BWP with the same bwp-Id) of the UL BWP in which the BeamFailureRecoveryConfig is provided. In an example, the CORESET associated with the recovery search space may not be associated with another search space. Network may configure the wireless device with a value for this field when contention free random access resources for BFR are configured.

In an example, the IE RadioLinkMonitoringConfig may be used to configure radio link monitoring for detection of beam- and/or cell radio link failure. In an example, a beamFailureDetectionTimer parameter may indicate a timer for beam failure detection. The value of timer may be in number of "$Q_{out,LR}$ reporting periods of Beam Failure Detection" Reference Signal. Value pbfd1 may correspond to 1 $Q_{out,LR}$ reporting period of Beam Failure Detection Reference Signal, value pbfd2 may correspond to 2 $Q_{out,LR}$ reporting periods of Beam Failure Detection Reference Signal and so on. In an example, a beamFailureInstanceMaxCount parameter may determine after how many beam failure events the wireless device may trigger beam failure recovery. Value n1 may correspond to 1 beam failure instance, value n2 may correspond to 2 beam failure instances and so on. In an example, a failureDetectionResourcesToAddModList parameter may indicate a list of reference signals for detecting beam failure and/or cell level radio link failure (RLF). In an example, the network may configure at most two detectionResources per BWP for the purpose beamFailure or both. If no RSs are provided for the purpose of beam failure detection, the wireless device may perform beam monitoring based on the activated TCI-State for PDCCH. If no RSs are provided in this list for the purpose of RLF detection, the wireless device may perform Cell-RLM based on the activated TCI-State of PDCCH. The network may ensure that the wireless device has a suitable set of reference signals for performing cell-RLM.

In an example, SCell beam failure detection may be per cell. In an example, DL BWPs of a SCell may be configured with independent SCell BFR configurations. In an example, a SR ID may be configured for BFR within a same cell group (e.g., a PUCCH group). In an example, a SCell BFRQ MAC CE may trigger a SCell BFRQ SR if there is no valid uplink grant which can accommodate the SCell BFRQ MAC CE. In an example, the transmission of the SCell BFRQ MAC CE may cancel a pending BFRQ SR of the failed SCell(s). In an example, when based on the number of the BFRQ SR transmission reaching the sr-TransMax, the wireless device may trigger a RACH procedure.

In an example, beamFailureDetectionTimer and beamFailureInstanceMaxCount may be configured cell specifically per DL BWP configured. In an example, based on reconfiguration of beamFailureDetectionTimer, beamFailureInstanceMaxCount, or any of the reference signals used for beam failure detection by upper layers, BFI_COUNTER my be set to 0 for the given Serving Cell. In an example, when SCell BFR SR resource is not configured and SCell BFR MAC CE transmission triggers SCell BFR SR, Random Access procedure on SpCell may be triggered to request UL resources to transmit the SCell BFR MAC CE.

In an example, when SCell BFR SR is triggered and the wireless device has an overlapping SR PUCCH resource with the SCell BFR SR PUCCH resource, the wireless device may all select the SCell BFR SR PUCCH resource for transmission. In an example, a pending SR for SCell beam failure recovery triggered prior to the MAC PDU assembly may be cancelled when the MAC PDU is transmitted and this PDU includes a SCell BFR MAC CE. In an example, SCell BFR MAC CE may carry information of multiple failed SCells, e.g., a multiple entry format for SCell BFR MAC CE may be used.

In an example, for a SCell, the SCell BFR MAC CE may indicate the following information: information about the failed SCell index, indication if new candidate beam RS is detected or not, and new candidate beam RS index (if available). In an example, SCell BFR MAC CE may have higher priority than data from logical channels except UL-CCCH and/or LBT failure indication MAC CE.

In an example, a serving Cell may be configured with one or multiple BWPs. The BWP switching for a Serving Cell may be used to activate an inactive BWP and deactivate an active BWP at a time. The BWP switching may be controlled by the PDCCH indicating a downlink assignment or an uplink grant, by the bwp-InactivityTimer, by RRC signaling, or by the MAC entity itself upon initiation of Random Access procedure.

In an example, upon RRC (re-)configuration of firstActiveDownlinkBWP-Id and/or firstActiveUplinkBWP-Id for SpCell or activation of an SCell, the DL BWP and/or UL BWP indicated by firstActiveDownlinkBWP-Id and/or firstActiveUplinkBWP-Id respectively may be active without receiving PDCCH indicating a downlink assignment or an uplink grant. The active BWP for a Serving Cell may be indicated by RRC or PDCCH. For unpaired spectrum, a DL BWP may be paired with a UL BWP, and BWP switching may be common for both UL and DL.

In an example, for an activated Serving Cell configured with a BWP, if a BWP is activated, the MAC entity may transmit on UL-SCH on the BWP; transmit on RACH on the BWP, if PRACH occasions are configured; monitor the PDCCH on the BWP; transmit PUCCH on the BWP, if configured; report CSI for the BWP; transmit SRS on the BWP, if configured; receive DL-SCH on the BWP; (re-)initialize suspended configured uplink grants of configured grant Type 1 on the active BWP according to the stored configuration, if any, and to start in a symbol.

In an example, for an activated Serving Cell configured with a BWP, if a BWP is deactivated, the MAC entity may not transmit on UL-SCH on the BWP; the MAC entity may not monitor the PDCCH on the BWP; the MAC entity may not transmit PUCCH on the BWP; the MAC entity may not report CSI for the BWP; the MAC entity may not transmit SRS on the BWP; the MAC entity may not receive DL-SCH on the BWP; the MAC entity may clear configured downlink assignment and configured uplink grant of configured grant Type 2 on the BWP; the MAC entity may suspend configured uplink grant of configured grant Type 1 on the inactive BWP.

In an example, upon initiation of the Random Access procedure on a Serving Cell, the wireless device may select a carrier for performing Random Access procedure. The PRACH occasions may not be configured for the active UL BWP. The MAC entity may, for the selected carrier of this Serving Cell, switch the active UL BWP to BWP indicated by initialUplinkBWP. If the Serving Cell is an SpCell, the MAC entity may, for the selected carrier of this Serving Cell, switch the active DL BWP to BWP indicated by initialDownlinkBWP.

In an example, upon initiation of the Random Access procedure on a Serving Cell, the wireless device may select a carrier for performing Random Access procedure. The PRACH occasions may be configured for the active UL BWP. If the Serving Cell is an SpCell, if the active DL BWP does not have the same bwp-Id as the active UL BWP, the MAC entity may, for the selected carrier of this Serving Cell, switch the active DL BWP to the DL BWP with the same bwp-Id as the active UL BWP.

In an example, upon initiation of the Random Access procedure on a Serving Cell, the wireless device may select a carrier for performing Random Access procedure. The MAC entity may for the selected carrier of this Serving Cell, stop the bwp-InactivityTimer associated with the active DL BWP of this Serving Cell, if running. If the Serving Cell is SCell, the MAC entity may, for the selected carrier of this Serving Cell, stop the bwp-InactivityTimer associated with the active DL BWP of SpCell, if running. The MAC entity may, for the selected carrier of this Serving Cell, perform the Random Access procedure on the active DL BWP of SpCell and active UL BWP of this Serving Cell.

In an example, if the MAC entity receives a PDCCH for BWP switching of a Serving Cell, if there is no ongoing Random Access procedure associated with this Serving Cell; or if the ongoing Random Access procedure associated with this Serving Cell is successfully completed upon reception of this PDCCH addressed to C-RNTI, the MAC entity may perform BWP switching to a BWP indicated by the PDCCH.

In an example, if the MAC entity receives a PDCCH for BWP switching for a Serving Cell while a Random Access procedure associated with that Serving Cell is ongoing in the MAC entity, it may be up to wireless device implementation whether to switch BWP or ignore the PDCCH for BWP switching, except for the PDCCH reception for BWP switching addressed to the C-RNTI for successful Random Access procedure completion in which case the wireless device may perform BWP switching to a BWP indicated by the PDCCH. Upon reception of the PDCCH for BWP switching other than successful contention resolution, if the MAC entity decides to perform BWP switching, the MAC entity may stop the ongoing Random Access procedure and initiate a Random Access procedure after performing the BWP switching; if the MAC decides to ignore the PDCCH for BWP switching, the MAC entity may continue with the ongoing Random Access procedure on the Serving Cell.

In an example, upon reception of RRC (re-)configuration for BWP switching for a Serving Cell while a Random Access procedure associated with that Serving Cell is ongoing in the MAC entity, the MAC entity may stop the ongoing Random Access procedure and initiate a Random Access procedure after performing the BWP switching.

In an example, the defaultDownlinkBWP-Id may be configured, and the active DL BWP may not be the BWP indicated by the defaultDownlinkBWP-Id. In an example the defaultDownlinkBWP-Id may not configured, and the active DL BWP may not be the initialDownlinkBWP. A PDCCH addressed to C-RNTI or CS-RNTI indicating downlink assignment or uplink grant may be received on the active BWP; or a PDCCH addressed to C-RNTI or CS-RNTI indicating downlink assignment or uplink grant may be received for the active BWP; or a MAC PDU may be transmitted in a configured uplink grant or received in a configured downlink assignment. If there is no ongoing Random Access procedure associated with this Serving Cell; or if the ongoing Random Access procedure associated with this Serving Cell is successfully completed upon reception of this PDCCH addressed to C-RNTI: the MAC entity may start or restart the bwp-InactivityTimer associated with the active DL BWP.

In an example, the defaultDownlinkBWP-Id may be configured, and the active DL BWP may not be the BWP indicated by the defaultDownlinkBWP-Id. In an example the defaultDownlinkBWP-Id may not configured, and the active DL BWP may not be the initialDownlinkBWP. The bwp-InactivityTimer associated with the active DL BWP may expire. If the defaultDownlinkBWP-Id is configured, the MAC entity may perform BWP switching to a BWP indicated by the defaultDownlinkBWP-Id. Otherwise, the MAC entity may perform BWP switching to the initialDownlinkBWP.

In an example, if a Random Access procedure is initiated on an SCell, both this SCell and the SpCell may be associated with this Random Access procedure.

In an example, a PDCCH for BWP switching may be received, and the MAC entity may switch the active DL BWP. If the defaultDownlinkBWP-Id is configured, and the MAC entity switches to the DL BWP which is not indicated by the defaultDownlinkBWP-Id; or if the defaultDownlinkBWP-Id is not configured, and the MAC entity switches to the DL BWP which is not the initialDownlinkBWP, the MAC entity may start or restart the bwp-InactivityTimer associated with the active DL BWP.

In an example, a wireless device may receive configuration parameters comprising an IE LogicalChannelConfig that may be used to configure the logical channel parameters. The IE LogicalChannelConfig may indicate a plurality of parameters. For example, a parameter allowedSCS-List, if present, may indicate UL MAC SDUs from a logical channel may only be mapped to the indicated numerology. Otherwise, UL MAC SDUs from the logical channel can be mapped to any configured numerology. For example, a parameter allowedServingCells, if present, may indicate UL MAC SDUs from a logical channel may only be mapped to the serving cells indicated in this list. Otherwise, UL MAC SDUs from the logical channel may be mapped to any configured serving cell of this cell group. In an example, a parameter bitRateQueryProhibitTimer may indicate a timer that is used for bit rate recommendation query in, in seconds. Value s0 may indicate 0 s, s0dot4 may indicate 0.4 s and so on. In an example, a parameter bucketSizeDuration may be used in one or more processes comprising a logical channel prioritization process. The value may be in ms. For example, value ms5 may correspond to 5 ms, value ms10 may correspond to 10 ms, and so on. In an example, a parameter configuredGrantType1Allowed, if present, may indicate that UL MAC SDUs from a logical channel may be transmitted on a configured grant type 1. In an example, a parameter logicalChannelGroup, may indicate ID of a logical channel group, which the logical channel belongs to. In an example, a parameter logicalChannelSR-Mask, may controls SR triggering when a configured uplink grant of type1 or type2 is configured. A value true may indicate that SR masking is configured for the logical channel. In an example, a parameter logicalChannelSR-DelayTimerApplied may indicate whether to apply the delay timer for SR transmission for this logical channel. In an example, a parameter maxPUSCH-Duration, if present, may indicate UL MAC SDUs from a logical channel may only be transmitted using uplink grants that result in a PUSCH duration shorter than or equal to the duration indicated by this field.

Otherwise, UL MAC SDUs from the logical channel may be transmitted using an uplink grant resulting in any PUSCH duration. In an example, a parameter priority may indicate a logical channel priority. In an example, a parameter prioritisedBitRate may be used in one or more processes comprising a logical channel prioritization procedure and may have a value in Kilobytes/sec. In an example, a parameter schedulingRequestId may indicate a scheduling request configuration applicable for a logical channel.

In an example, an IE LogicalChannelIdentity may be used to identify a logical channel (LogicalChannelConfig) and a corresponding RLC bearer (RLC-BearerConfig).

In an example, a Logical Channel Prioritization (LCP) procedure may be applied based on performing a new transmission. RRC may control the scheduling of uplink data by signaling, for each logical channel per MAC entity: priority where an increasing priority value indicates a lower priority level; prioritisedBitRate which sets a Prioritized Bit Rate (PBR); bucketSizeDuration which sets a Bucket Size Duration (BSD).

In an example, RRC may additionally control the LCP procedure by configuring mapping restrictions for each logical channel: allowedSCS-List which may set the allowed Subcarrier Spacing(s) for transmission; maxPUSCH-Duration which may set the maximum PUSCH duration allowed for transmission; configuredGrantType1Allowed which may set whether a configured grant Type 1 may be used for transmission; allowedServingCells which may set the allowed cell(s) for transmission. A UE variable Bj, which may be maintained for each logical channel may be used for the Logical channel prioritization procedure: the MAC entity may initialize Bj of the logical channel to zero when the logical channel is established.

In an example, for a logical channel j, the MAC entity may: increment Bj by the product PBR×T before an instance of the LCP procedure, where T may be the time elapsed since Bj was last incremented; if the value of Bj is greater than the bucket size (i.e. PBR×BSD): the MAC entity may set Bj to the bucket size.

In an example, the MAC entity may, when a new transmission is performed, select the logical channels for an UL grant that satisfy the following conditions: the set of allowed Subcarrier Spacing index values in allowedSCS-List, if configured, includes the Subcarrier Spacing index associated to the UL grant; and maxPUSCH-Duration, if configured, is larger than or equal to the PUSCH transmission duration associated to the UL grant; and configuredGrantType1Allowed, if configured, is set to true in case the UL grant is a Configured Grant Type 1; and allowedServingCells, if configured, includes the Cell information associated to the UL grant. The Subcarrier Spacing index, PUSCH transmission duration and Cell information may be included in Uplink transmission information received from lower layers for the corresponding scheduled uplink transmission.

In an example, a MAC entity may, when a new transmission is performed, allocate resources to the logical channels as follows: logical channels selected for the UL grant with Bj>0 are allocated resources in a decreasing priority order. If the PBR of a logical channel is set to infinity, the MAC entity may allocate resources for all the data that is available for transmission on the logical channel before meeting the PBR of the lower priority logical channel(s). The MAC entity may decrement Bj by the total size of MAC SDUs served to logical channel j. If any resources remain, the logical channels selected are served in a strict decreasing priority order (regardless of the value of Bj) until either the data for that logical channel or the UL grant is exhausted, whichever comes first. Logical channels configured with equal priority may be served equally. In an example, the value of Bj may be negative.

In an example, if a MAC entity is requested to simultaneously transmit multiple MAC PDUs, or if the MAC entity receives the multiple UL grants within one or more coinciding PDCCH occasions (e.g., on different Serving Cells), it may be up to UE implementation in which order the grants are processed.

In an example, a MAC entity may not generate a MAC PDU for the HARQ entity if the following conditions are satisfied: the MAC entity may be configured with skipUplinkTxDynamic with value true and the grant indicated to the HARQ entity may be addressed to a C-RNTI, or the grant indicated to the HARQ entity may be a configured uplink grant; and there may be no aperiodic CSI requested for this PUSCH transmission; and the MAC PDU may include zero MAC SDUs; and the MAC PDU includes only the periodic BSR and there may be no data available for any LCG, or the MAC PDU may include only the padding BSR.

In an example, logical channels may be prioritized in accordance with an order. An example order may be as follows (highest priority listed first):
C-RNTI MAC CE or data from UL-CCCH;
Configured Grant Confirmation MAC CE;
MAC CE for BSR, with exception of BSR included for padding;
Single Entry PHR MAC CE or Multiple Entry PHR MAC CE;
data from any Logical Channel, except data from UL-CCCH;
MAC CE for Recommended bit rate query;
MAC CE for BSR included for padding.

In an example, one or more radio bearers may be configured with PDCP duplication. In an example, if one or more DRBs are configured with PDCP duplication, the network may activate and deactivate the PDCP duplication for the configured DRB(s).

In an example, the PDCP duplication for the configured DRB(s) may be activated and deactivated by receiving the Duplication Activation/Deactivation MAC CE; or by indication by RRC.

In an example, if a Duplication Activation/Deactivation is received activating the PDCP duplication of a DRB configured with PDCP duplication, the MAC entity may indicate the activation of PDCP duplication of the DRB to upper layers. In an example, if a Duplication Activation/Deactivation MAC CE is received deactivating the PDCP duplication of a DRB configured with PDCP duplication, the MAC entity may indicate the deactivation of PDCP duplication of the DRB to upper layers.

In an example, a Power Headroom reporting procedure may be used to provide a serving gNB with the following information: Type 1 power headroom: the difference between the nominal UE maximum transmit power and the estimated power for UL-SCH transmission per activated Serving Cell; Type 2 power headroom: the difference between the nominal UE maximum transmit power and the estimated power for UL-SCH and PUCCH transmission on SpCell of the other MAC entity (e.g., E-UTRA MAC entity in EN-DC, NE-DC, and NGEN-DC cases); Type 3 power headroom: the difference between the nominal UE maximum transmit power and the estimated power for SRS transmission per activated Serving Cell. The RRC may control Power Headroom reporting by configuring the following parameters: phr-PeriodicTimer; phr-ProhibitTimer; phr-Tx-PowerFactorChange; phr-Type2OtherCell; phr-ModeOtherCG; multiplePHR.

In an example, a Power Headroom Report (PHR) may be triggered if any of the following events occur: phr-ProhibitTimer expires or has expired and the path loss has changed more than phr-Tx-PowerFactorChange dB for at least one activated Serving Cell of any MAC entity which is used as a pathloss reference since the last transmission of a PHR in this MAC entity when the MAC entity has UL resources for new transmission; phr-PeriodicTimer expires; upon configuration or reconfiguration of the power headroom reporting functionality by upper layers, which may not be used to disable the function; activation of an SCell of any MAC entity with configured uplink; addition of the PSCell (e.g., PSCell being newly added or changed); phr-ProhibitTimer expires or has expired, when the MAC entity has UL resources for new transmission, and the following is true for any of the activated Serving Cells of any MAC entity with configured uplink: there are UL resources allocated for transmission or there is a PUCCH transmission on this cell, and the required power backoff due to power management (as allowed by P-MPRc) for this cell has changed more than phr-Tx-PowerFactorChange dB since the last transmission of a PHR when the MAC entity had UL resources allocated for transmission or PUCCH transmission on this cell.

In an example, a wireless device may multiplex UCI in a PUCCH transmission that overlaps with a PUSCH transmission. In an example, the wireless device may multiplex only HARQ-ACK information, if any, from the UCI in the PUSCH transmission and may not transmit the PUCCH if the UE multiplexes aperiodic or semi-persistent CSI reports in the PUSCH. In an example, the wireless device may multiplex only HARQ-ACK information and CSI reports, if any, from the UCI in the PUSCH transmission and may not transmit the PUCCH if the UE does not multiplex aperiodic or semi-persistent CSI reports in the PUSCH.

In an example, a wireless device may transmit multiple PUSCHs in a slot on respective serving cells that include first PUSCHs that are scheduled by DCI format(s) 0_0 or DCI format(s) 0_1 and second PUSCHs configured by respective ConfiguredGrantConfig or semiPersistentOn-PUSCH. The wireless device may multiplex UCI in one of the multiple PUSCHs. The wireless device may multiplex the UCI in a PUSCH from the first PUSCHs.

In an example, a wireless device may transmit multiple PUSCHs in a slot on respective serving cells. The wireless device may multiplex UCI in one of the multiple PUSCHs. In an example, the wireless device may not multiplex aperiodic CSI in any of the multiple PUSCHs. In an example, the wireless device may multiplex the UCI in a PUSCH of the serving cell with the smallest ServCellIndex. If the wireless device transmits more than one PUSCHs in the slot on the serving cell with the smallest ServCellIndex, the wireless device may multiplex the UCI in the earliest PUSCH that the UE transmits in the slot.

In an example, RRC may configure a timeAlignmentTimer (per TAG) which controls how long the MAC entity may consider the Serving Cells belonging to the associated TAG to be uplink time aligned.

In an example, when a Timing Advance Command MAC CE is received, and if an NTA has been maintained with the indicated TAG: the MAC entity may apply the Timing Advance Command for the indicated TAG and may start or restart the timeAlignmentTimer associated with the indicated TAG.

In an example, when a Timing Advance Command is received in a Random Access Response message for a Serving Cell belonging to a TAG: if the Random Access Preamble was not selected by the MAC entity among the contention-based Random Access Preamble: the MAC entity may apply the Timing Advance Command for this TAG and may start or restart the timeAlignmentTimer associated with this TAG.

In an example, when a Timing Advance Command is received in a Random Access Response message for a Serving Cell belonging to a TAG: if the timeAlignmentTimer associated with this TAG is not running: the MAC entity may apply the Timing Advance Command for this TAG; may start the timeAlignmentTimer associated with this TAG; and when the Contention Resolution is considered not successful; or when the Contention Resolution is considered successful for SI request, after transmitting HARQ feedback for MAC PDU including UE Contention Resolution Identity MAC CE: the MAC entity may stop timeAlignmentTimer associated with this TAG.

In an example, when a a timeAlignmentTimer expires: if the timeAlignmentTimer is associated with the PTAG: the MAC entity may flush all HARQ buffers for all Serving Cells; may notify RRC to release PUCCH for all Serving Cells, if configured; may notify RRC to release SRS for all Serving Cells, if configured; may clear any configured downlink assignments and configured uplink grants; may clear any PUSCH resource for semi-persistent CSI reporting; may consider all running timeAlignmentTimers as expired; and may maintain NTA of all TAGs.

In an example, when a a timeAlignmentTimer expires: if the timeAlignmentTimer is associated with a STAG, the MAC entity may, for all Serving Cells belonging to this TAG: flush all HARQ buffers; notify RRC to release PUCCH, if configured; notify RRC to release SRS, if configured; clear any configured downlink assignments and configured uplink grants; clear any PUSCH resource for semi-persistent CSI reporting; maintain NTA of this TAG.

In an example, when a MAC entity stops uplink transmissions for an SCell due to the fact that the maximum uplink transmission timing difference between TAGs of the MAC entity or the maximum uplink transmission timing difference between TAGs of any MAC entity of the UE is exceeded, the MAC entity may consider the timeAlignmentTimer associated with the SCell as expired.

In an example, the MAC entity may not perform any uplink transmission on a Serving Cell except the Random Access Preamble transmission when the timeAlignmentTimer associated with the TAG to which this Serving Cell belongs is not running. Furthermore, when the timeAlignmentTimer associated with the PTAG is not running, the MAC entity may not perform any uplink transmission on any Serving Cell except the Random Access Preamble transmission on the SpCell.

A wireless device may perform a process based on configuration parameters (e.g., RRC configuration parameters received via one or more RRC messages) for the wireless device. The wireless device may perform the process based on dynamic activation/deactivation of the process and/or based on dynamic indication of one or more parameters for the process. In an example, the process may be released by removing/releasing the configuration parameters (e.g., the RRC configuration parameters). In an example, the deactivation of the process may be based on a physical layer command while the wireless device may keep/maintain the configuration parameters (e.g., the RRC configuration parameters) related to the process. For example, a semi-persistent process may be dynamically activated or deactivated while the configuration parameters may be kept/maintained for the wireless device. The releasing of the semi-persistent process may be based on releasing the RRC configuration parameters. The process may not be activated for the wireless device when the configuration parameters for the process are released. The wireless device may receive a reconfiguration message (e.g., RRC reconfiguration message) indicating reconfiguration of the process by indicating new configuration parameters for the wireless device.

In an example, a MAC entity may be configured with one or more SCells. The base station may activate and/or deactivate the configured SCells. Upon configuration of an SCell, the SCell may be deactivated.

In an example, the configured SCell(s) may be activated and deactivated by receiving an SCell Activation/Deactivation MAC CE.

In an example, the SCell(s) configured for a wireless device may be activated and deactivated by configuring sCellDeactivationTimer timer for a configured SCell. In an example, a sCellDeactivationTimer timer may not be configured for a SCell configured with PUCCH. In an example, an SCell associated with a sCellDeactivationTimer timer may be deactivated upon the expiry of the sCellDeactivationTimer timer.

In an example, a wireless device may receive an SCell Activation/Deactivation MAC CE indicating activation of the SCell. The wireless device may activate the SCell according to a timing. The activation of the SCell may comprise applying normal SCell operation including: SRS transmissions on the SCell; CSI reporting for the SCell; PDCCH monitoring on the SCell; and PUCCH transmissions on the SCell, if configured.

In an example, a wireless device may receive an SCell Activation/Deactivation MAC CE indicating activation of the SCell. If the SCell was deactivated prior to receiving this SCell Activation/Deactivation MAC CE, the wireless device may activate the DL BWP and UL BWP indicated by firstActiveDownlinkBWP-Id and firstActiveUplinkBWP-Id respectively.

In an example, a wireless device may receive an SCell Activation/Deactivation MAC CE indicating activation of the SCell. The wireless device may start or restart the sCellDeactivationTimer associated with the SCell according to a timing based on the receiving the SCell Activation/Deactivation MAC CE.

In an example, a wireless device may receive an SCell Activation/Deactivation MAC CE indicating activation of the SCell. The wireless device may (re-)initialize suspended configured uplink grants of configured grant Type 1 associated with this SCell according to the stored configuration, if any, and may start in the symbol according to rules based on the receiving the SCell Activation/Deactivation MAC CE.

In an example, a wireless device may receive an SCell Activation/Deactivation MAC CE indicating activation of the SCell. The wireless device may trigger a PHR based on the receiving the SCell Activation/Deactivation MAC CE.

In an example, an SCell Activation/Deactivation MAC CE may be received indicating deactivation of the SCell or the sCellDeactivationTimer associated with the activated SCell may expire. Based on the SCell Activation/Deactivation MAC CE indicating deactivation of the SCell or based on the sCellDeactivationTimer associated with the activated SCell expiring, the wireless device may: deactivate the SCell according to a timing; stop the sCellDeactivationTimer associated with the SCell; stop the bwp-InactivityTimer associated with the SCell; deactivate active BWP associated with the SCell; clear configured downlink assignment and configured uplink grant Type 2 associated with the SCell respectively; clear PUSCH resource for semi-persistent CSI reporting associated with the SCell; suspend configured uplink grant Type 1 associated with the SCell; and flush HARQ buffers associated with the SCell.

In an example, if PDCCH on the activated SCell indicates an uplink grant or downlink assignment; or if PDCCH on the Serving Cell scheduling the activated SCell indicates an uplink grant or a downlink assignment for the activated SCell; or if a MAC PDU is transmitted in a configured uplink grant or received in a configured downlink assignment: the wireless device may restart the sCellDeactivationTimer associated with the SCell.

In an example, if the SCell is deactivated, the wireless device may: not transmit SRS on the SCell; not report CSI for the SCell; not transmit on UL-SCH on the SCell; not transmit on RACH on the SCell; not monitor the PDCCH on the SCell; not monitor the PDCCH for the SCell; not transmit PUCCH on the SCell.

In an example, HARQ feedback for the MAC PDU containing SCell Activation/Deactivation MAC CE may not be impacted by PCell, PSCell and PUCCH SCell interruptions due to SCell activation/deactivation.

In an example, when a SCell is deactivated, the ongoing Random Access procedure on the SCell, if any, may be aborted.

Existing processes when one or more cells configured for a wireless device have consistent LBT failures may result in degraded wireless device and network performance. There is a need to enhance the existing processes. Example embodiments enhance the existing processes when one or more cells configure for the wireless device have consistent LBT failures.

In an example, a wireless device may receive one or more messages comprising configuration parameters. The one or more messages may comprise one or more RRC messages. The one or more messages may comprise configuration parameters of a plurality of cells. The plurality of cells may comprise a primary cell and one or more secondary cells. The plurality of cells may comprise one or more unlicensed cells. In an example, a primary cell may be an unlicensed cell. In an example, the primary cell may be a licensed cell and one or more secondary cells may be unlicensed cells. In an example, the primary cell and one or more secondary cells may be unlicensed. The plurality of cells may be provided to the wireless device by one or more base stations. In an example, the plurality of cells may be provided by a master base station and one or more secondary base station. One or more first cells of the plurality of cells may be provided by a master base station and one or more second cells of the plurality of cells may be provided by a secondary base station. The one or more first cells may form a first cell group (e.g., a master cell group (MCG)) and the one or more second cells may form a second cell group (e.g., a secondary cell group (SCG)).

The one or more messages may comprise configuration parameters for consistent uplink LBT failure detection on an unlicensed cell. The wireless device may determine the consistent uplink failures on a cell based on a consistent uplink LBT failures detection process. The consistent uplink failures detection process may be based on one or more counters (e.g., an LBT failure counter) and one or more timers (e.g., an LBT failure detection timer). For example, the wireless may determine the consistent uplink LBT failures on the cell based on the LBT failure counter reaching a first value. In an example, the one or more messages may indicate the first value. The wireless device may increment the LBT failure counter based on receiving a notification of LBT failure from physical layer. The notification of LBT failure may be based on a failed LBT for an uplink transmission on the cell. The uplink transmission may be for an uplink channel (e.g., PUSCH, PUCCH, PRACH, etc.) or an uplink signal (e.g., SRS). The wireless device may start an uplink LBT failure detection timer based on receiving a notification of uplink LBT failure from the wireless device. The wireless device may start the uplink LBT failure detection timer with a first value. The configuration parameters for consistent uplink LBT failures may comprise a parameter indicating the first value. The wireless device may reset (e.g., reset to zero) the uplink detection counter based on the uplink LBT failure detection counter expiring.

Based on determining/detecting a consistent LBT failure on a cell, the wireless device may trigger uplink LBT failure indication. The wireless device may transmit an LBT failure indication MAC control element (MAC CE) based on the trigger. The LBT failure indication MAC CE may indicate the consistent LBT failure on one or more cells comprising the cell. The LBT failure indication MAC CE may comprise one or more fields indicating the consistent uplink LBT failures on the one or more cells. In an example, if the wireless device detects/determines consistent uplink LBT failures on a primary cell, the wireless device may switch from a first BWP of the primary cell to a second BWP of the primary cell and may start a random access process on the second BWP. The wireless device may transmit the LBT failure indication MAC CE based on an uplink grant received during the random access process (e.g., via a random access response).

The one or more messages may comprise configuration parameters of a plurality of logical channels. The configuration parameters of a logical channel may comprise a parameter indicating a priority and/or traffic/service type associated with the logical channel. For example, the parameter may indicate that the logical channel has a high priority. For example, the parameter may indicate that the logical channel is associated with an ultra-reliable low-latency communications (URLLC) traffic type. For example, the parameter may indicate that the logical channel is associated with an enhanced mobile broadband (eMBB) traffic/service type. In an example, the parameter indicating the priority and/or the traffic/service type may indicate whether the logical channel is mapped to (e.g., allowed to be transmitted via resources of) an unlicensed cell. In an example, the parameter indicating the priority and/or the traffic/service type may indicate whether the logical channel is mapped to (e.g., allowed to be transmitted via resources of) an unlicensed cell with consistent uplink LBT failures. In an example, the configuration parameters may comprise a second parameter indicating whether the logical channel is mapped to (e.g., is allowed to be transmitted via resources of) an unlicensed cell. In an example, the configuration parameters may comprise a second parameter indicating whether the logical channel mapped to (e.g., is allowed to be transmitted via resources of) an unlicensed cell with consistent LBT failure.

Figure 19:
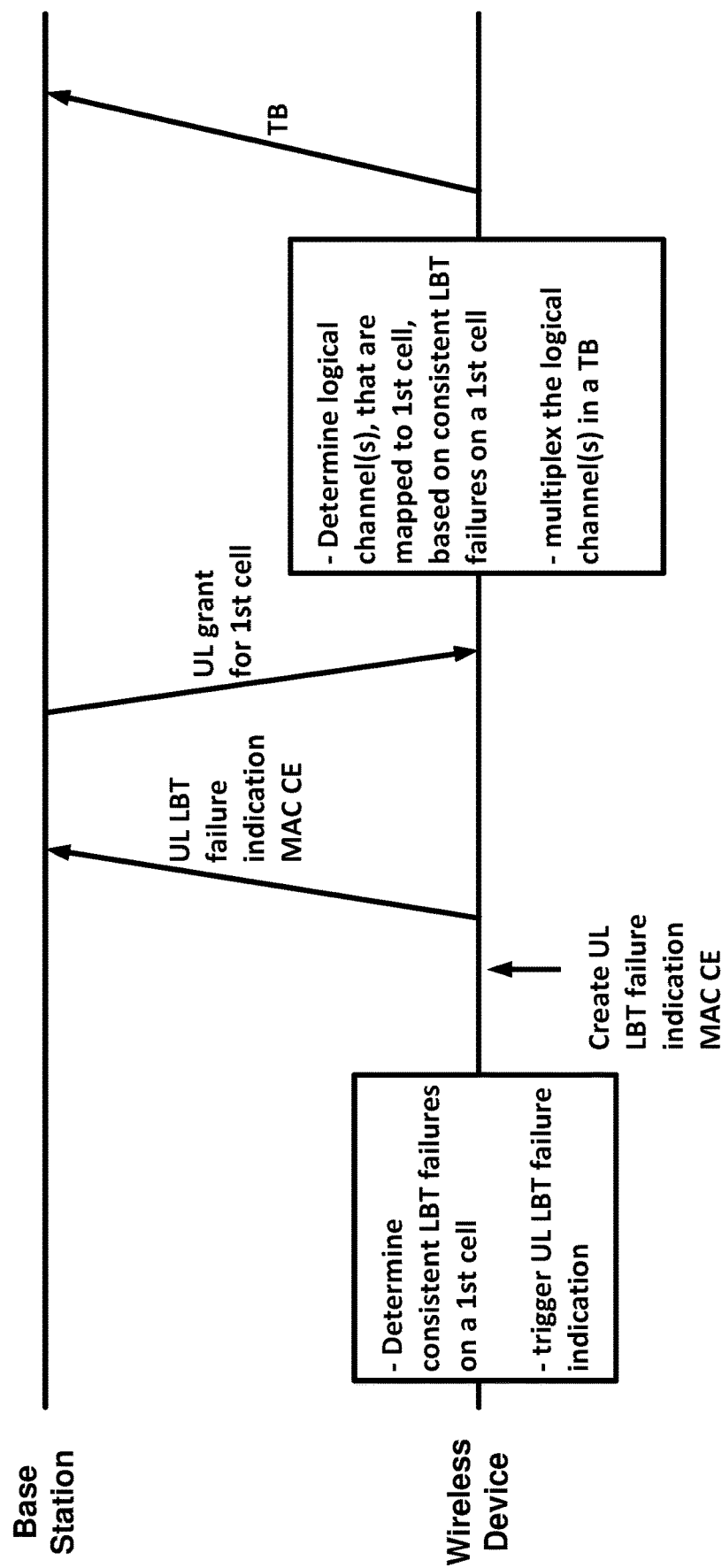
FIG. 19 shows an example process in accordance with several of various embodiments of the present disclosure.

In an example embodiment as shown in FIG. 19, a wireless device may determine consistent uplink LBT failures on a first cell. The wireless device may determine the consistent uplink LBT failures on the first cell based on a consistent uplink LBT failure detection process described earlier. The wireless device may determine the consistent uplink LBT failures on a first BWP (e.g., an active BWP) of the first cell based on LBT failures for uplink transmissions on the first BWP of the first cell. The wireless device may trigger an LBT failure indication based on the determining the consistent uplink failure on the first cell. The wireless device may create an LBT failure indication MAC CE based on the determining the consistent uplink failure on the first cell. The LBT failure indication MAC CE may comprise a field, the value of the field indicating the consistent uplink LBT failures on the first cell. The wireless device may transmit the uplink LBT failure indication MAC CE based on the determining the consistent uplink LBT failures. The wireless device may transmit the uplink LBT failure indication MAC CE using uplink resources indicated by a dynamic or a configured uplink grant. In an example, the first cell may be a secondary cell. Based on the first cell being a secondary cell, the wireless device may transmit the uplink failure indication MAC CE using uplink resources in a cell other than the first cell.

The wireless device may receive an uplink grant indicating uplink resource for transmission of a transport block on the first cell (the cell with consistent LBT failure). The uplink grant may indicate one or more transmission parameters of the transport block (e.g., MCS, frequency domain and time domain resource allocation parameters, one or more power control parameter, one or more HARQ parameters, etc.).

The wireless device may multiplex data (e.g., data of logical channel(s)) and control information (e.g., one or more MAC CEs) in the transport block using a multiplexing process. The multiplexing process may be based on a logical channel prioritization procedure wherein the logical channels and/or MAC CEs are multiplexed in the transport block based on the MAC CE and/or logical channel priorities and the uplink resources indicated by the uplink grant.

The wireless device may determine one or more logical channels, of a plurality of logical channels configured for the wireless device, and/or MAC CEs that are mapped to (e.g., are allowed to be transmitted on) the first cell based on the determining the consistent uplink LBT failures on the first cell. The wireless device may determine one or more logical channels, of a plurality of logical channels configured for the wireless device, and/or MAC CEs that are mapped to (e.g., are allowed to be transmitted on) the first cell based on the triggering the consistent uplink LBT failures on the first cell. The wireless device may determine one or more logical channels, of a plurality of logical channels configured for the wireless device, and/or MAC CEs that are mapped to (e.g., are allowed to be transmitted on) the first cell based on the transmitting the uplink failure indication MAC CE. In an example, the configuration parameters of the one or more logical channels may indicate that the one or more logical channels are mapped to (e.g., allowed to be transmitted on) a cell with consistent uplink LBT failures. In an example, the configuration parameters of the one or more logical channels may indicate that the one or more logical channels are mapped to (e.g., allowed to be transmitted on) an unlicensed cell but are not mapped to an unlicensed cell with consistent uplink LBT failures. For example, the configuration parameters of the one or more logical channels may indicate that the one or more logical channels are associated with one or more traffic/service types. For example, the one or more service/traffic types may exclude a first traffic/service type. For example, the first traffic/service type may be a URLLC traffic/service type. The one or more traffic/service types may include eMBB traffic/service type.

In an example, the configuration parameters of the plurality of logical channels configured for the wireless may indicate that one or more first logical channels, of the plurality of logical channels, are not mapped to (e.g., are not allowed to be transmitted on) a cell with consistent LBT failures (e.g., the first cell). The one or more logical channels, determined by the wireless device for multiplexing in the transport block, may not include the one or more first logical channels. In an example, the configuration parameters of the plurality of logical channels may indicate that the one or more first logical channels are mapped to (e.g., allowed to be transmitted on) the first cell. The one or more first logical channels may not be mapped to (e.g., may not be allowed to be transmitted on) the first cell based on the determining the consistent uplink LBT failures on the first cell. The one or more first logical channels may not be mapped (e.g., may not be allowed to be transmitted on) the first cell based on the triggering the uplink failure indication.

The one or more first logical channels may not be mapped to (e.g., may not be allowed to be transmitted on) the first cell based on the transmitting the uplink LBT failure indication MAC CE.

The wireless device may multiplex the one or more logical channels and/or MAC CEs that are mapped to (e.g., are allowed to be transmitted on) the first cell in the transport block. The wireless device may multiplex the one or more logical channels and/or MAC CEs using a logical channel prioritization procedure. The wireless device may map the transport block to the uplink resources indicated by the uplink grant. The wireless device may transmit the transport block via the uplink resources indicated by the uplink grant and based on the transmission parameters indicated by the uplink grant.

In an example, the wireless device may receive a command for recovery from consistent uplink LBT failures on the first cell. The wireless device may recover from the consistent uplink LBT failures based on the receiving the command and based on performing the action indicated by the command. The one or more first logical channel may be mapped to (e.g., allowed to be transmitted on) the first cell based on the receiving the command and/or based on recovery from the consistent uplink LBT failures. In an example, the command may indicate switching from a first BWP of the first cell to a second BWP of the first cell. The command may be received via a downlink control channel (e.g., PDCCH) and may be transmitted using a downlink control information.

Figure 20:
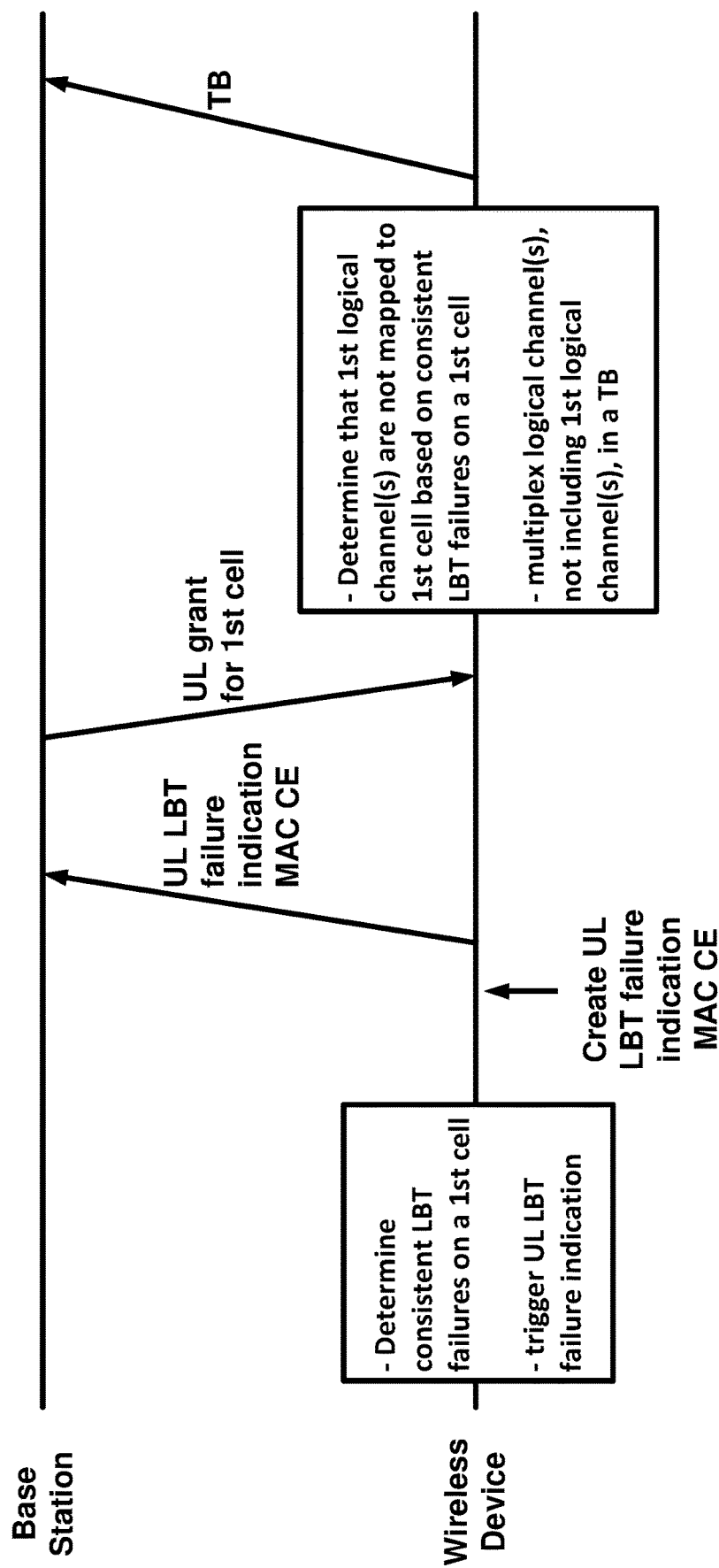
FIG. 20 shows an example process in accordance with several of various embodiments of the present disclosure.

In an example embodiment as shown in FIG. 20, the wireless device may determine that one or more first logical channels, of a plurality of logical channels configured for the wireless device, and/or MAC CEs are not mapped to (e.g., are not allowed to be transmitted on) the first cell based on the determining the consistent uplink LBT failures on the first cell. The wireless device may determine that one or more first logical channels, of a plurality of logical channels configured for the wireless device, and/or MAC CEs are not mapped to (e.g., are not allowed to be transmitted on) the first cell based on the triggering the consistent uplink LBT failures on the first cell. The wireless device may determine that one or more first logical channels, of a plurality of logical channels configured for the wireless device, and/or MAC CEs are not mapped to (e.g., are not allowed to be transmitted on) the first cell based on the transmitting the uplink failure indication MAC CE. In an example, the configuration parameters of the one or more first logical channels may indicate that the one or more first logical channels are not mapped to (e.g., are not allowed to be transmitted on) a cell with consistent uplink LBT failures. For example, the configuration parameters of the one or more first logical channels may indicate that the one or more first logical channels are associated with one or more traffic/service types. For example, the one or more service/traffic types may include a URLLC traffic/service type. The one or more traffic/service types may include eMBB traffic/service type.

Figure 21:
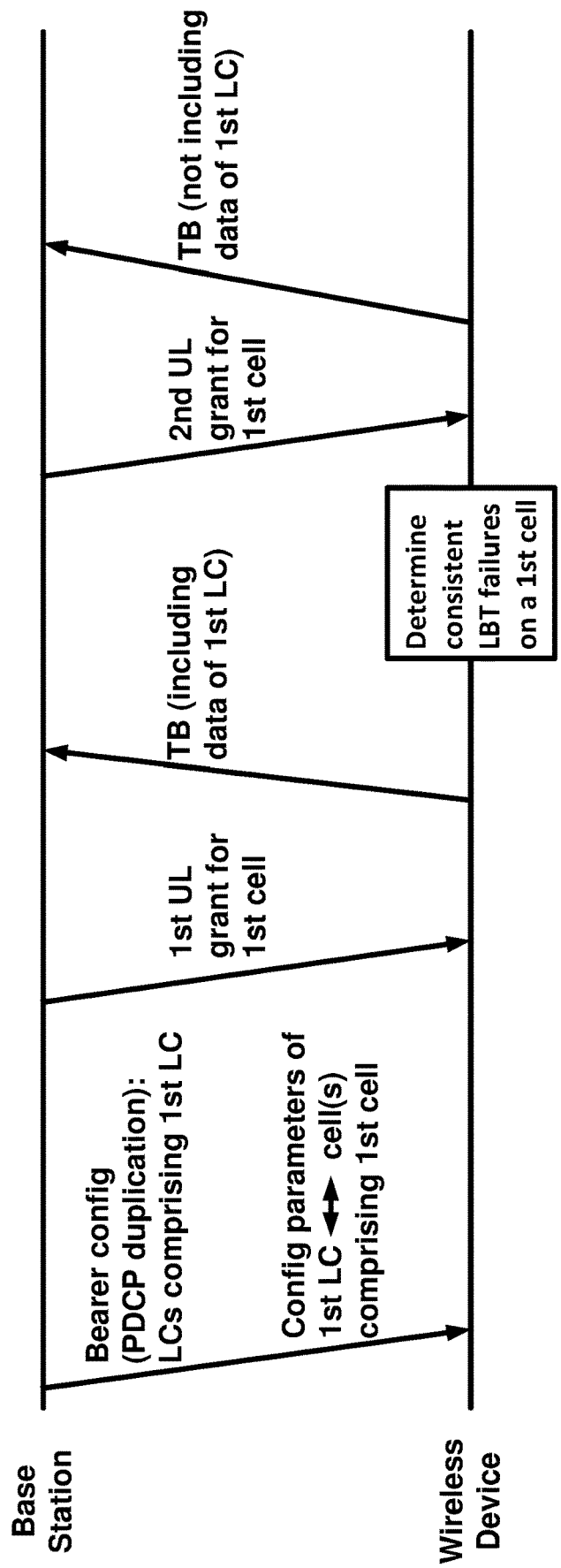
FIG. 21 shows an example process in accordance with several of various embodiments of the present disclosure.

In an example embodiment, as shown in FIG. 21, a wireless device may receive configuration parameters of one or more bearers. The one or more bearers may comprise one or more data radio bearers (DRBs) and one or more signaling radio bearers (SRBs). The wireless device may receive first configuration parameters indicating that a bearer is configured with packet data convergence protocol (PDCP) duplication. The bearer may be activated with PDCP duplication. For example, the wireless device may receive a command (e.g., a MAC CE) indicating activation of the bearer. In an example, the bearer may be a DRB. In an example, the bearer may be a SRB. The bearer may be associated with a plurality of logical channels.

In an example, a bearer configured with and/or activated for PDCP packet duplication may be associated with a plurality of logical channels. In an example, a bearer configured with and/or activated with PDCP duplication may be associated with a plurality of RLC entities and an RLC entity, in the plurality of RLC entities, may correspond to a logical channel. Data of the bearer, which is configured with and activated for PDCP duplication, may be duplicated in the plurality of RLC entities. A first logical channel, in the plurality of logical channels, may be mapped to one or more first cells and a second logical channel, in the plurality of logical channels, may be mapped to one or more second cells. Data of the first logical channel may be transmitted based on a first grant received for the one or more first cells and data of the second logical channel may be transmitted based on a second grant for the one or more second cells.

The wireless device may receive second configuration parameters indicating that a first logical channel, of a plurality of logical channels, is mapped to one or more cells comprising a first cell. For example, the second configuration parameters may comprise a first parameter indicating one or more allowed serving cells for the first logical channel. The one or more allowed serving cells may comprise the first cell. The second configuration parameters may further indicate that the first logical channel is not mapped to a cell with consistent LBT failures. For example, the second configuration parameters may comprise a parameter indicating a priority, wherein the priority may indicate that the first logical channel is not mapped to a cell with consistent LBT failures. In an example, the second configuration parameters may comprise a parameter indicating a traffic/service type associated with the first logical channel. The parameter indicating the traffic/service type may indicate that the first logical channel may not be mapped to a cell with consistent LBT failures. In an example the traffic/service type may be a URLLC traffic/service type.

The wireless device may receive a first uplink grant for transmission of a first transport block on the first cell. The first uplink grant may comprise transmission parameters for transmission of the first transport block. The transmission parameters may comprise uplink resources for transmission of the first transport block, HARQ parameters (e.g., HARQ process number, NDI, RV, etc.), power control parameters, etc. The wireless device may multiplex first data of the first logical channel in the first transport block and may transmit the first transport block based on the transmission parameters indicated by the first uplink grant.

The wireless device may determine consistent uplink LBT failures on the first cell. The wireless device may determine the consistent uplink LBT failures on the first cell based on a consistent LBT failure detection process described earlier. The wireless device may receive a second uplink grant for transmission of a second transport block on the first cell. The wireless device may receive the second uplink grant after the determining the consistent uplink LBT failures on the first cell. Based on the determining the consistent uplink LBT failures on the first cell, the wireless device may not transmit second data of the first logical channel in the second transport block. A multiplexing process (e.g., using a logical channel prioritization procedure) may select one or more logical channels for multiplexing in the second transport block, wherein the one or more logical channels may exclude the first logical channel based on the determining the consistent uplink failures on the first cell.

In an example, the wireless device may receive a command for recovery from the consistent uplink LBT failures on the first cell. The command may indicate switching from a first BWP of the first cell to a second BWP of the first cell. The command may be received via a downlink control channel. In an example, the command may be received in a downlink control information. The wireless device may receive a third uplink grant for transmission of a third transport block on the first cell. Based on the receiving the command, the wireless device may transmit third data of the first logical channel in the third transport block. Based on the recovery from consistent uplink LBT failures on the first cell, the wireless device may transmit third data of the first logical channel in the third transport block on the first cell, wherein the transport block is transmitted after the recovery form consistent uplink LBT on the first cell.

Figure 22:
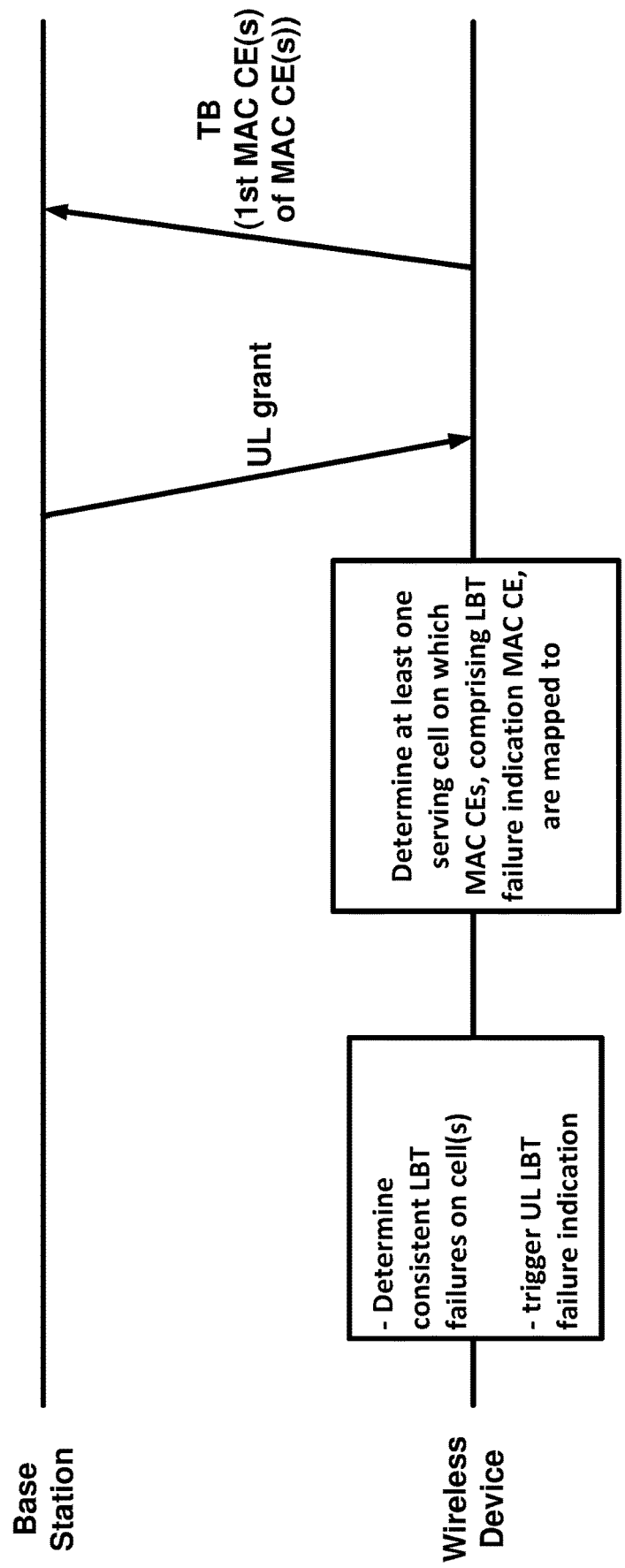
FIG. 22 shows an example process in accordance with several of various embodiments of the present disclosure.

In an example embodiment as shown in FIG. 22, a wireless device may determine consistent uplink LBT failures on one or more cells. The wireless device may determine the consistent uplink LBT failures using a consistent uplink LBT failures detection process described earlier. The wireless device may trigger an uplink LBT failure indication MAC CE based on the determining the consistent uplink LBT failures on the one or more cells. The wireless device may create an uplink LBT failure indication MAC CE based on the determining the consistent uplink LBT failures on the one or more cells. The uplink LBT failure indication MAC CE may comprise one or more fields indicating the consistent uplink LBT failures on the one or more cells.

The wireless device may trigger a plurality of MAC CEs comprising the LBT failure indication MAC CE. The plurality of MAC CEs may further comprise a BFR MAC CE. For example, the BFR MAC CE may be for beam failure recovery on a secondary cell. The wireless device may determine at least one serving cell that the plurality of MAC CEs comprising the uplink LBT failure indication MAC CE are mapped to (e.g., are allowed to be transmitted on). The wireless device may determine the at least one serving cell based on the determining the consistent uplink LBT failures and the one or more cells with consistent uplink LBT failures. In an example, the wireless device may determine the at least one serving cell based on the triggering the uplink LBT failure indication and the one or more cells with consistent uplink LBT failures. In an example, the wireless device may determine the at least one serving cell based on the crating the uplink LBT failure indication MAC CE and the one or more cells with consistent uplink LBT failures.

The wireless device may receive an uplink grant for transmission of a transport block. The wireless device may receive the uplink grant for transmission of the transport block on a first cell of the at least one serving cell. The uplink grant may comprise transmission parameters (e.g., uplink resource, time and frequency domain resource allocations, power control parameters, HARQ related parameters (e.g., HARQ process number, NDI, RV, etc.), etc.). The wireless device may determine that the uplink grant is for a first cell of the at least one serving cell. The wireless device may determine that one or more of the plurality of MAC CEs may be transmitted via the uplink grant based on the first cell being one of the at least one serving cell. The wireless device may multiplex one or more of the plurality of MAC CEs in the transport block using a multiplexing process and using a logical channel prioritization procedure. The wireless device may transmit the transport block based on the transmission parameters indicated by the uplink grant.

In an example, the one or more cells, on which the wireless device determines the consistent uplink LBT failures, may comprise a SPCell (e.g., a PCell or a PSCell). The wireless device may determine the at least one serving cell to be the SPCell based on the one or more cells comprising the SPCell. The consistent uplink LBT failures may be for a first BWP of the SPCell. The wireless device may switch from the first BWP of the SPCell to a second BWP of the SPCell and may start a random access process in the second BWP of the SPCell. The uplink grant for transmission of the transport block may be for the second BWP of the SPCell. In an example, the uplink grant may be received in a random access response during the random access process.

The wireless device may receive configuration parameters of a plurality of cells. In an example, the at least one serving cell may be the plurality of cells with the one or more cells, with consistent uplink LBT failures, excluded. The plurality of MAC CEs comprising the LBT failure indication MAC CE may be mapped to (e.g., allowed to be transmitted on) the at least one serving cell. In an example, the plurality of serving cells comprising the LBT failure indication MAC CE and the BFR MAC CE may be mapped to (e.g., allowed to be transmitted on) the at least one serving cell.

Figure 23:
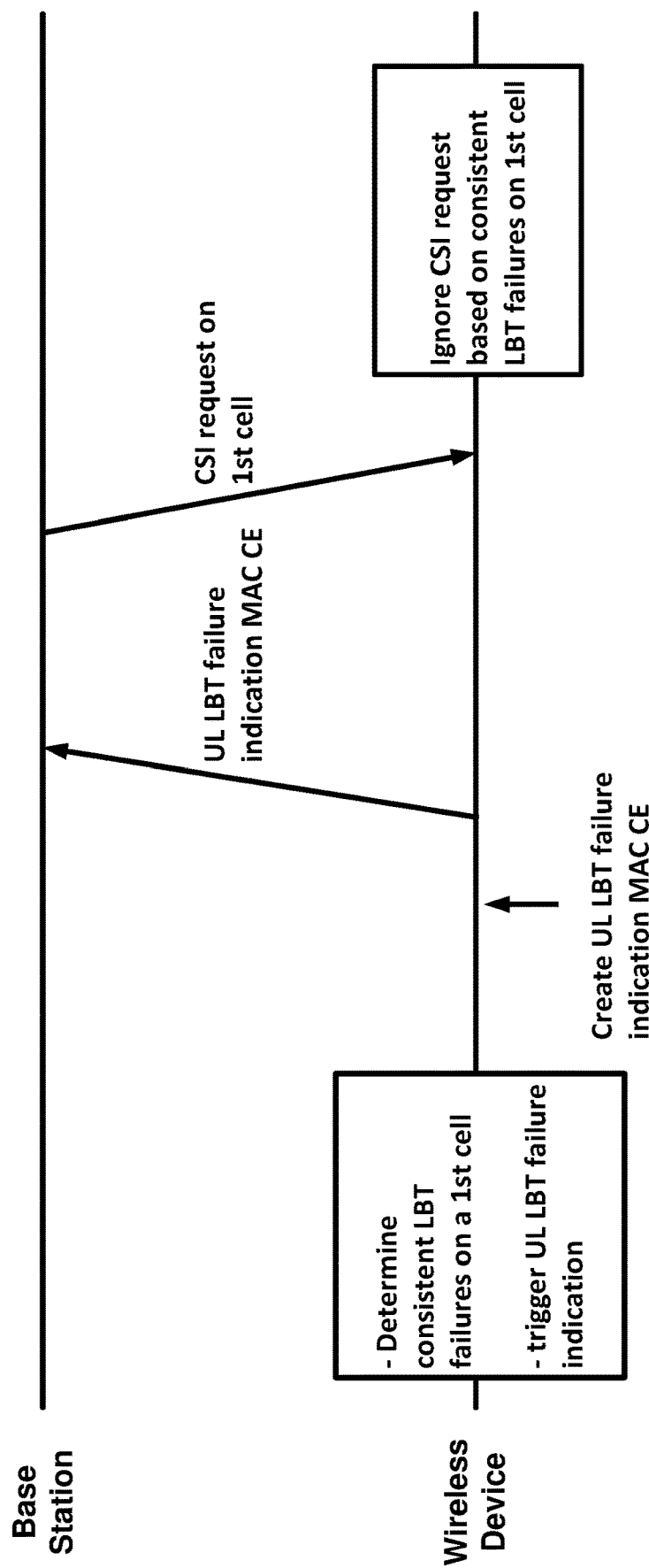
FIG. 23 shows an example process in accordance with several of various embodiments of the present disclosure.

In an example embodiment as shown in FIG. 23, a wireless device may determine consistent uplink LBT failures on a first cell. The wireless device may determine the consistent uplink LBT failures using a consistent uplink LBT failures detection process described earlier. The wireless device may trigger an uplink LBT failure indication MAC CE based on the determining the consistent uplink LBT failures on the first cell. The wireless device may create an uplink LBT failure indication MAC CE based on the determining the consistent uplink LBT failures on the one or more cells. The uplink LBT failure indication MAC CE may comprise one or more fields indicating the consistent uplink LBT failures on the first cell. In an example, the wireless device may transmit the uplink LBT failure indication MAC CE based on the determining the consistent uplink LBT failures on the first cell.

The wireless device may receive a request for transmission of a CSI report on a first cell of the one or more cells (the one or more cells on which the consistent uplink LBT failure is determined). In an example, the wireless device may receive the request based on a downlink control information received via a downlink control channel. For example, the downlink control information may comprise a field indicating the request for transmission of the CSI report. The request may be for an aperiodic CSI report. The request may be for transmission of the CSI report via an uplink shared channel. In an example, the request may be for transmission of the CSI report by multiplexing a CSI report in a transport block and transmitting the transport block via PUSCH. In an example, the request may be for transmission of the CSI report with data (e.g., with UL-SCH). In an example, the request may be for transmission of the CSI report without data (e.g., without UL-SCH). In an example, a DCI indicating the CSI request may indicate whether the request is for transmission of the CSI report with or without UL-SCH. In an example, the DCI may indicate activation of resources for transmission of semi-persistent CSI reports (including the CSI report). The DCI may indicate activation of resources for transmission of the CSI reports via uplink shared/data channel. In an example, the DCI may indicate the request for transmission of an aperiodic CSI report on an uplink control channel. In an example, the request may be received via a MAC CE. For example, the MAC CE may indicate activation of resources for transmission of semi-persistent CSI reports. For example, the MAC CE may indicate activation of resources for transmission of semi-persistent CSI reports via an uplink control channel.

The wireless device may ignore the request for transmission of the CSI report (e.g., drop the CSI report) based on the determining the consistent uplink LBT failures on the first cell. In an example, the wireless device may ignore the request for transmission of the CSI report (e.g., drop the CSI report) based on the triggering the consistent uplink LBT failures on the first cell. In an example, the wireless device may ignore the request for transmission of the CSI report (e.g., drop the CSI report) based on the transmitting the uplink LBT failure indication MAC CE.

In an example, the wireless device may transmit the CSI report via a second request. The second request may indicate a second cell for transmission of the CSI report. The second cell may not have consistent uplink LBT failures. In an example, the second request may be for transmission of the CSI report via the first cell after the first cell is recovered from the consistent uplink LBT failures. For example, the wireless device may receive a command for recovery from consistent uplink LBT failures on the first cell. The command may indicate switching from a first BWP of the first cell to a second BWP of the first cell. In an example, the command may indicate switching from the first BWP of the first cell to the second BWP of the first cell and may comprise a request for transmission of the CSI report.

In an example, based on the ignoring the request for transmission of the CSI report, the wireless device may multiplex the CSI report in a transport block based on a second DCI. The wireless device may multiplex the CSI report in the transport block using a multiplexing mechanism. The multiplexing mechanism may be one of a rate matching mechanism and a puncturing mechanism.

In an example, based on the ignoring the request for transmission of the CSI report, the wireless device may transmit the CSI report using an uplink control channel. In an example, the transmitting the CSI report using the uplink control channel may be based on a size of the CSI report. For example, the wireless device may transmit the CSI report using the uplink control channel based on the size of the CSI report being smaller than a threshold. In an example, the threshold may be predetermined or indicated using an RRC parameter.

Figure 24:
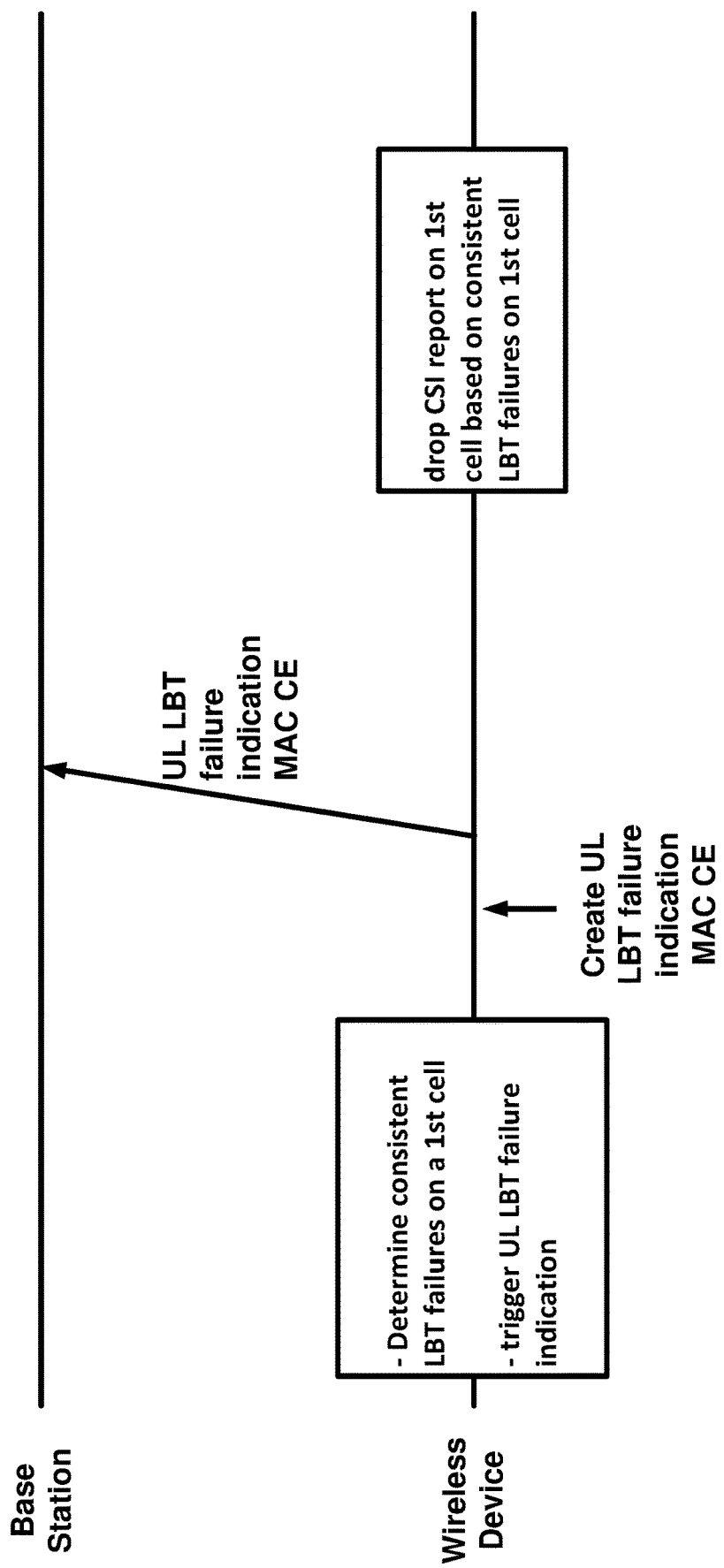
FIG. 24 shows an example process in accordance with several of various embodiments of the present disclosure.

In an example embodiment as shown in FIG. 24, the wireless device may drop CSI report on the first cell (e.g., an aperiodic CSI report, a periodic CSI report or a semi-persistent CSI report) based on determining consistent uplink LBT failures on a first cell. In an example, the wireless device may drop the CSI report on the first cell based on triggering an uplink failure indication in response to the determining the consistent uplink failure on the first cell. In an example, the wireless device may drop the CSI report on the first cell based on transmitting an uplink failure indication MAC CE in response to the transmitting the LBT failure indication MAC CE.

Figure 25:
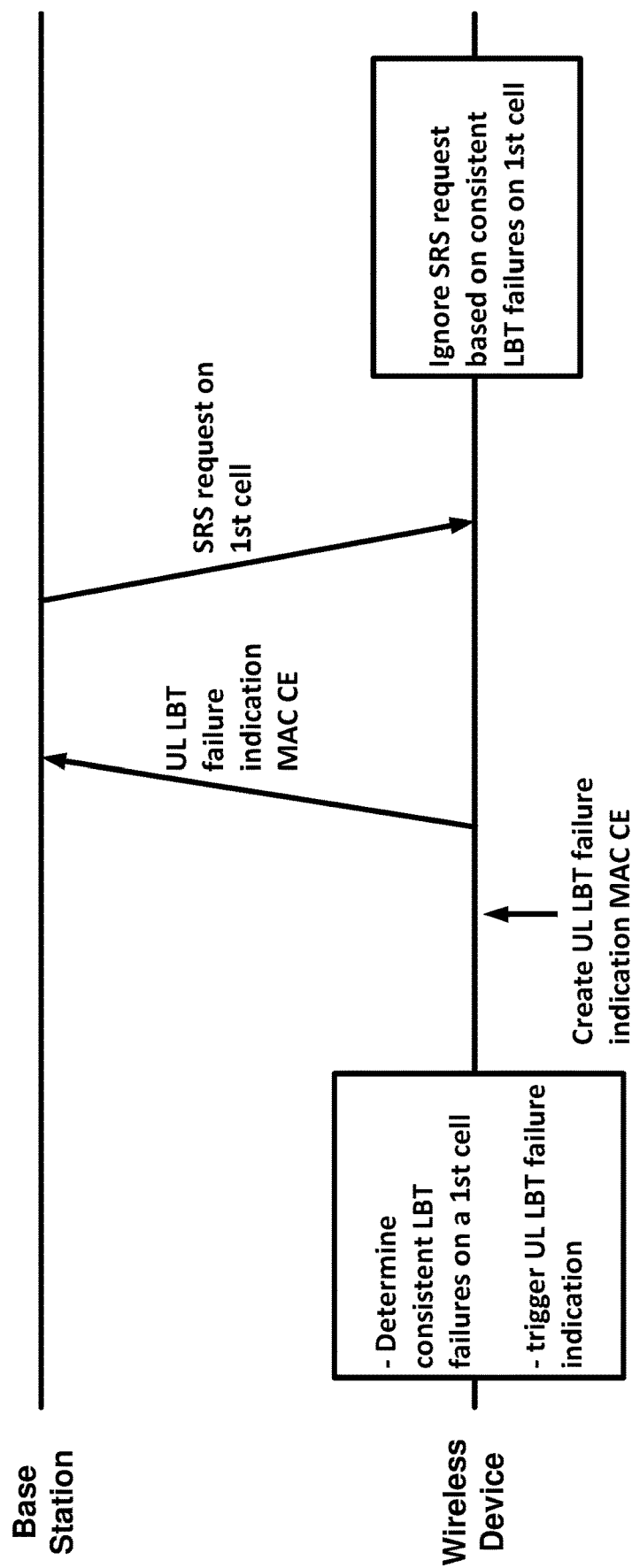
FIG. 25 shows an example process in accordance with several of various embodiments of the present disclosure.

In an example embodiment as shown in FIG. 25, a wireless device may determine consistent uplink LBT failures on a first cell. The wireless device may determine the consistent uplink LBT failures using a consistent uplink LBT failures detection process described earlier. The wireless device may trigger an uplink LBT failure indication MAC CE based on the determining the consistent uplink LBT failures on the first cell. The wireless device may create an uplink LBT failure indication MAC CE based on the determining the consistent uplink LBT failures on the first cell. The uplink LBT failure indication MAC CE may comprise one or more fields indicating the consistent uplink LBT failures on the first cell. In an example, the wireless device may transmit the uplink LBT failure indication MAC CE based on the determining the consistent uplink LBT failures on the first cell.

The wireless device may receive a request for transmission of sounding reference signal (SRS) via a first cell of the one or more cells. In an example, the request may be received via a downlink control channel. In an example, the request may be received in a downlink control information received via a downlink control channel. The downlink control information may comprise a field indicating the request for the SRS. In an example, the request may be received via a MAC CE. The MAC CE may indicate activation of SRS transmissions. In an example, the MAC CE may indicate activation of semi-persistent SRS.

In an example the SRS may be transmitted periodically. The wireless device may drop transmission of a periodic SRS on the first cell based on the determining the consistent uplink LBT failures on the first cell. In an example, the wireless device may drop transmission of a periodic SRS on the first cell based on the triggering the LBT failure indication. In an example, the wireless device may drop transmission of a periodic SRS on the first cell based on the transmission of the LBT failure indication MAC CE.

Figure 26:
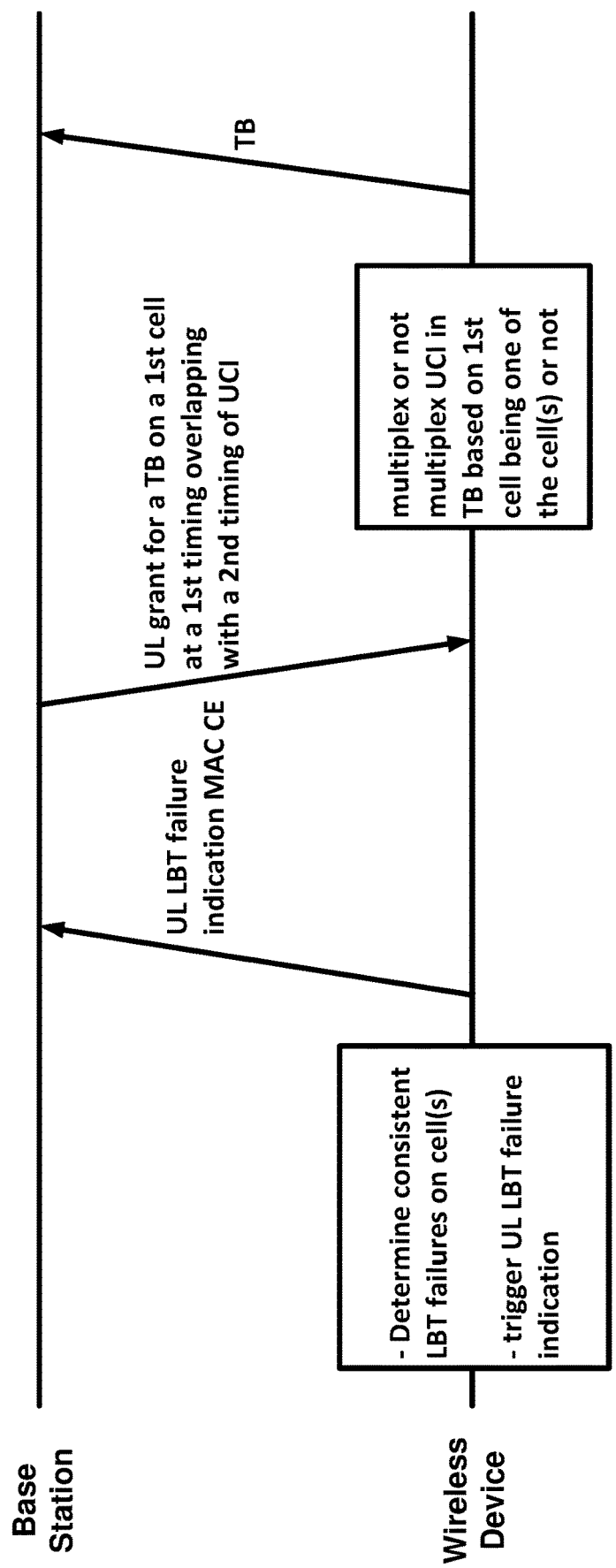
FIG. 26 shows an example process in accordance with several of various embodiments of the present disclosure.

In an example embodiment as shown in FIG. 26, a wireless device may determine consistent uplink LBT failures on one or more cells. The wireless device may determine the consistent uplink LBT failures using a consistent uplink LBT failures detection process described earlier. The wireless device may trigger an uplink LBT failure indication MAC CE based on the determining the consistent uplink LBT failures on the one or more cells. The wireless device may create an uplink LBT failure indication MAC CE based on the determining the consistent uplink LBT failures on the one or more cells. The uplink LBT failure indication MAC CE may comprise one or more fields indicating the consistent uplink LBT failures on the one or more cells. In an example, the wireless device may transmit the uplink LBT failure indication MAC CE based on the determining the consistent uplink LBT failures on the one or more cells.

The wireless device may receive an uplink grant indicating uplink resources for transmission of a transport block on a first cell at a first timing. The first timing may overlap with a second timing of scheduled transmission of uplink control information (UCI). The uplink control information may be scheduled to be transmitted on a second cell different from the first cell. In an example, the first timing and the second timing may overlap in one or more symbols. In an example, the first timing and the second timing may be in the same slot. In an example, the first timing and the second timing may be in the same subframe. In an example, the UCI may comprise a channel state information (CSI) report. The wireless device may receive CSI configuration parameters indicating the second timing. In an example, the CSI report may be a periodic CSI report and the CSI configuration parameters may comprise a periodicity and/or offset parameter indicating the second timing of the CSI report. In an example, the CSI report may be a semi-persistent CSI report. The second timing may be based on the CSI configuration parameters and one or more parameters in an activation command (e.g., a MAC CE). The wireless device may receive a MAC CE indicating activation of a plurality of resources (e.g., uplink control channel resources) for transmission of semi-persistent CSI reports, the plurality of resources including a resource for transmission of the CSI report at the second timing. In an example, the CSI report may be an aperiodic CSI report (e.g., aperiodic CSI report on PUCCH).

In an example, the UCI may comprise one or more of CSI report, HARQ feedback, scheduling request, etc. The wireless device may determine to multiplex or not multiplex the UCI in the transport block based on the first cell being one of the one or more cells, on which consistent LBT failures are determined, or not. The UCI may be scheduled to be transmitted at the second timing via an uplink control channel.

In an example embodiment, the second timing for transmission of UCI (for example using an uplink control channel) may overlap with and/or coincide with one or more first timings of transmissions of one or more transport blocks on one or more cells. The wireless device may determine a first transport block in the one or more transport blocks for multiplexing the UCI in the first transport block and transmitting the first transport block. The wireless device may determine the first transport block based on a first cell on which the first transport block is scheduled to be transmitted. For example, the wireless device may determine the transport block based on a cell index of the first cell. For example, the wireless device may determine the transport block based on whether the first cell has consistent uplink LBT failures or not. In an example, the wireless device may determine the first transport block/first cell based on the first cell having smallest cell index and not having consistent uplink LBT failures. For example, the wireless device may determine the first transport block/first cell based on the first cell having smallest cell index among the cells (of the one or more transport blocks) that do not have consistent uplink LBT failures.

The multiplexing the UCI in a transport block may be based on a multiplexing mechanism. The multiplexing mechanism may be one of a plurality of multiplexing mechanisms comprising a rate matching process and a puncturing mechanism.

In an example, the UCI may be scheduled to be transmitted at the second timing using an uplink shared/data channel. The wireless device may determine to multiplex the uplink control information in a transport block based on one or more conditions, for example a priority of UCI and/or the data in the transport block. In an example the UCI is scheduled to be transmitted in an uplink control channel and the wireless device may not be configured with simultaneous PUSCH and PUCCH transmission.

Figure 27:
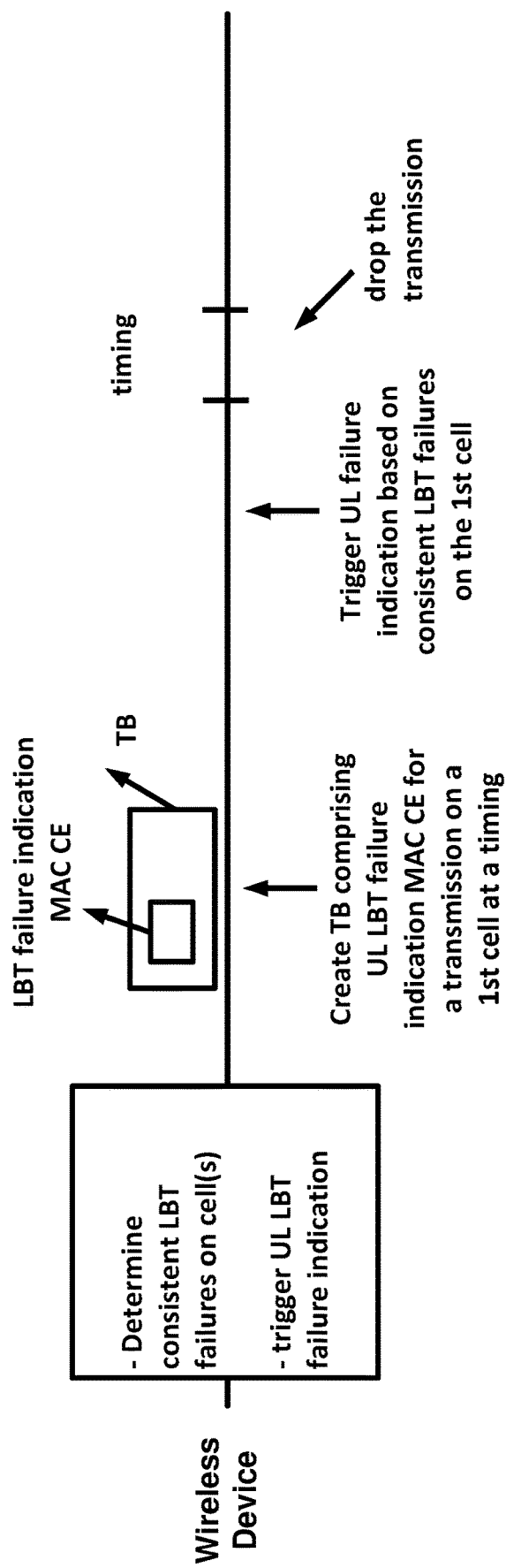
FIG. 27 shows an example process in accordance with several of various embodiments of the present disclosure.

In an example embodiment as shown in FIG. 27, a wireless device may determine consistent uplink LBT failures on one or more cells. The wireless device may determine the consistent uplink LBT failures using a consistent uplink LBT failures detection process described earlier. The wireless device may trigger an uplink LBT failure indication based on the determining the consistent uplink LBT failures on the one or more cells. The wireless device may create an uplink LBT failure indication MAC CE based on the determining the consistent uplink LBT failures on the one or more cells. The uplink LBT failure indication MAC CE may comprise one or more fields indicating the consistent uplink LBT failures on the one or more cells. The wireless device may create a transport block comprising the uplink failure indication MAC CE. The transport block may be scheduled to be transmitted on a first cell at a timing. In an example, the timing for transmission of the transport block may be one or more symbols in a slot. In an example, the timing for transmission of the transport block may be a first slot.

The wireless device may determine consistent uplink LBT failures for the first cell and/or may trigger/declare LBT failure indication for the first cell (e.g., the cell on which the transport block comprising the LBT failure indication MAC CE is scheduled to be transmitted) after the creating the LBT failure indication MAC CE and before the timing of the transmission of the transport block. The wireless device may drop the transport block and/or ignore the transmission based on the determining the consistent uplink LBT failures on the first cell. In an example, the wireless device may drop the transport block and/or ignore the transmission based on the triggering/declaring the uplink LBT failure indication in response to the consistent uplink LBT failure on the first cell.

In an example, the transport may comprise one or more logical channels. The dropping the transport block may further be based on the one or more logical channels. For example, the dropping the transport block may be further based on one or more service/traffic types of the one or more logical channel having one or more first service/traffic types. The one or more traffic/service types may comprise URLLC traffic/service type. In an example, the wireless device may receive configuration parameters of the one or more logical channels. The configuration parameters of the one or more logical channels may indicate that the one or more logical channels having the one or more first traffic/service type.

Figure 28:
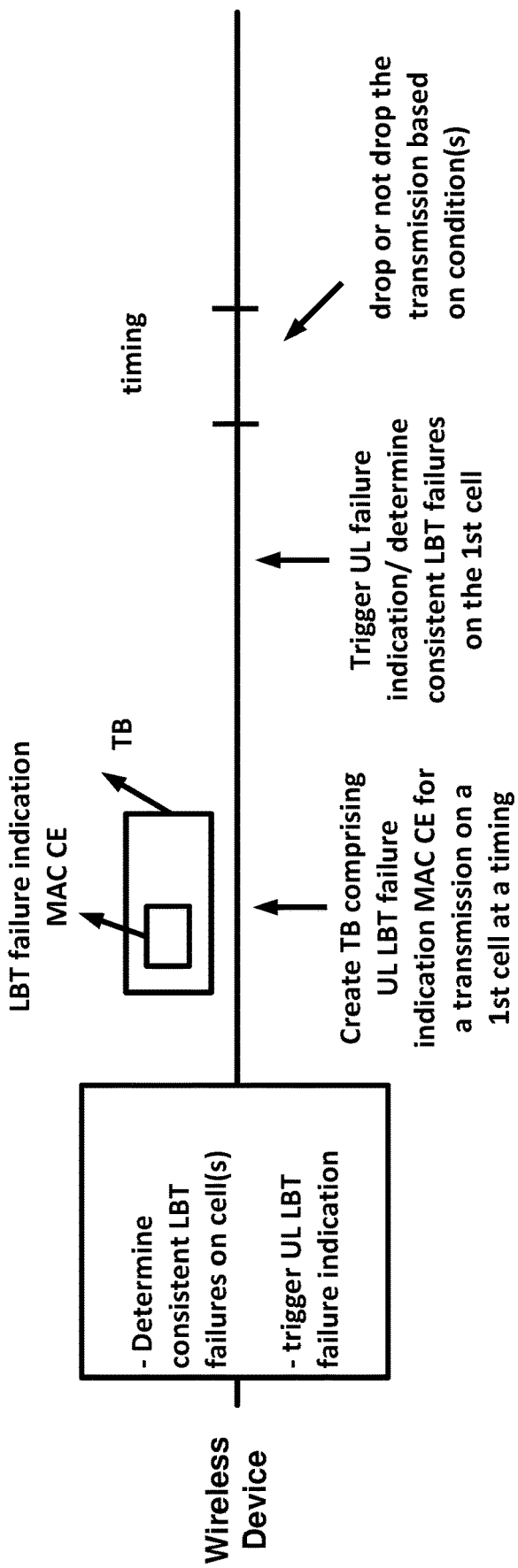
FIG. 28 shows an example process in accordance with several of various embodiments of the present disclosure.

In an example embodiment as shown in FIG. 28, the wireless device may drop the transport block and/or ignore the transmission or not drop the transport block and/or not ignore the transmission based on one or more conditions.

In an example, the transport block may comprise one or more logical channels. The wireless device may receive configuration parameters of the one or more logical channels. The one or more conditions may comprise one or more configuration parameters of the one or more logical channels. The one or more logical channels may correspond to one or more first traffic/service types. In an example, the configuration parameters of the one or more logical channels may indicate the one or more first traffic/service types. In an example the one or more traffic/service types may comprise URLLC and eMBB.

In an example, the triggering the consistent uplink failure indication or determining the consistent uplink LBT failures for the first cell may be on a first timing. The one or more conditions for dropping or not dropping the transport block (e.g., ignoring or not ignoring the transmission) may be based on a duration between the first timing of triggering the uplink failure indication and/or determining the consistent uplink LBT failures on the first cell and the timing for scheduled transmission of the transport block. For example, the wireless device may drop the transport block (e.g., ignore the transmission) based on the duration being smaller than a first duration. For example, the wireless device may drop the transport block (e.g., ignore the transmission) based on the duration being larger than a second duration.

Figure 29:
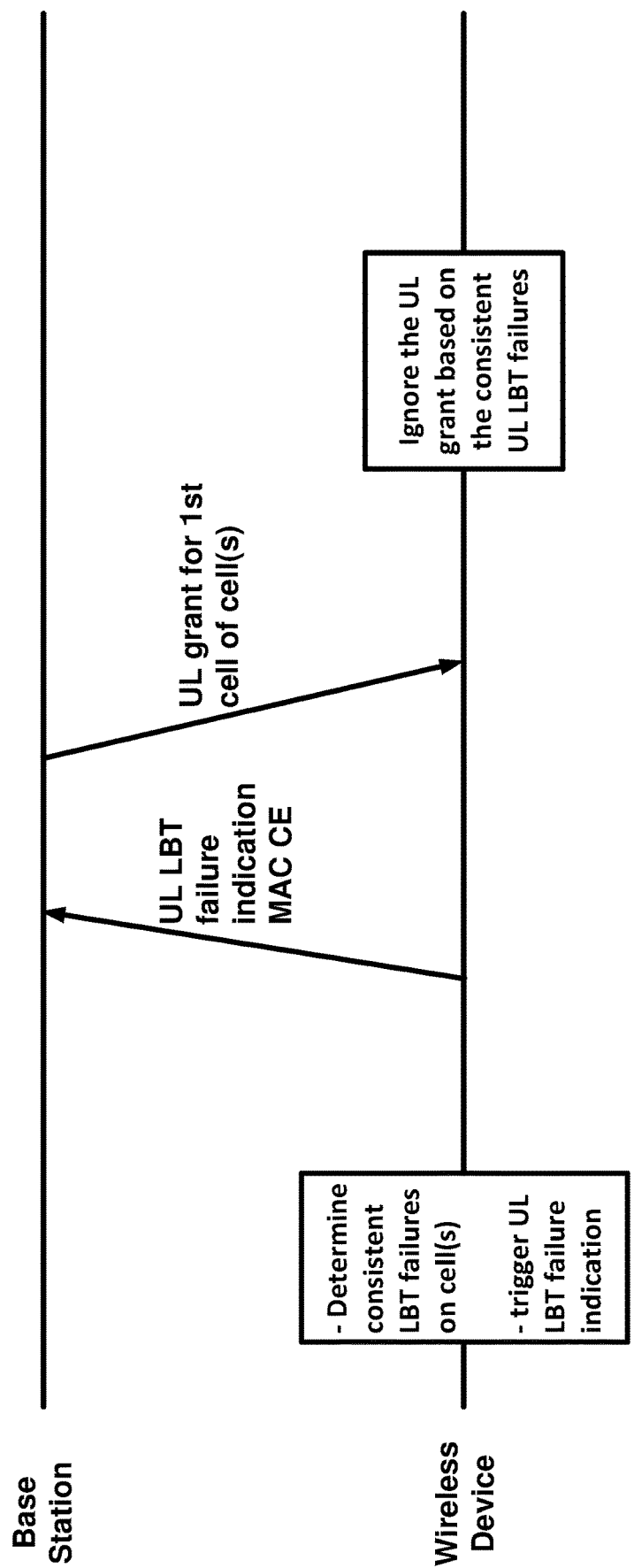
FIG. 29 shows an example process in accordance with several of various embodiments of the present disclosure.

In an example embodiment as shown in FIG. 29, a wireless device may determine consistent uplink LBT failures on one or more cells. The wireless device may determine the consistent uplink LBT failures using a consistent uplink LBT failures detection process described earlier. The wireless device may trigger an uplink LBT failure indication based on the determining the consistent uplink LBT failures on the one or more cells. The wireless device may create an uplink LBT failure indication MAC CE based on the determining the consistent uplink LBT failures on the one or more cells. The uplink LBT failure indication MAC CE may comprise one or more fields indicating the consistent uplink LBT failures on the one or more cells. The wireless device may transmit the uplink LBT failure indication based on the determining the consistent uplink LBT failures on the one or more cells.

The wireless device may receive an uplink grant for a first cell of the one or, on which the wireless determines the consistent uplink LB T failures. The wireless device may receive a downlink control information comprising the uplink grant. The wireless device may ignore the uplink grant based on the determining the consistent uplink LBT failures on the first cell. In an example, the wireless device may ignore the uplink grant based on the triggering the uplink LBT failure indication. In an example, the wireless device may ignore the uplink grant based on the transmitting the uplink LBT failure indication MAC CE.

In an example, the wireless device may receive the uplink grant for a first BWP of the first cell. The wireless device may ignore the uplink grant based on the first BWP being a current BWP on which consistent uplink LBT failure is determined. The wireless device may ignore the uplink grant based on the uplink grant not indicating a BWP switching, for example a BWP identifier of the uplink indicating a current BWP of the first cell and not indicating a new BWP different from the current BWP.

Figure 30:
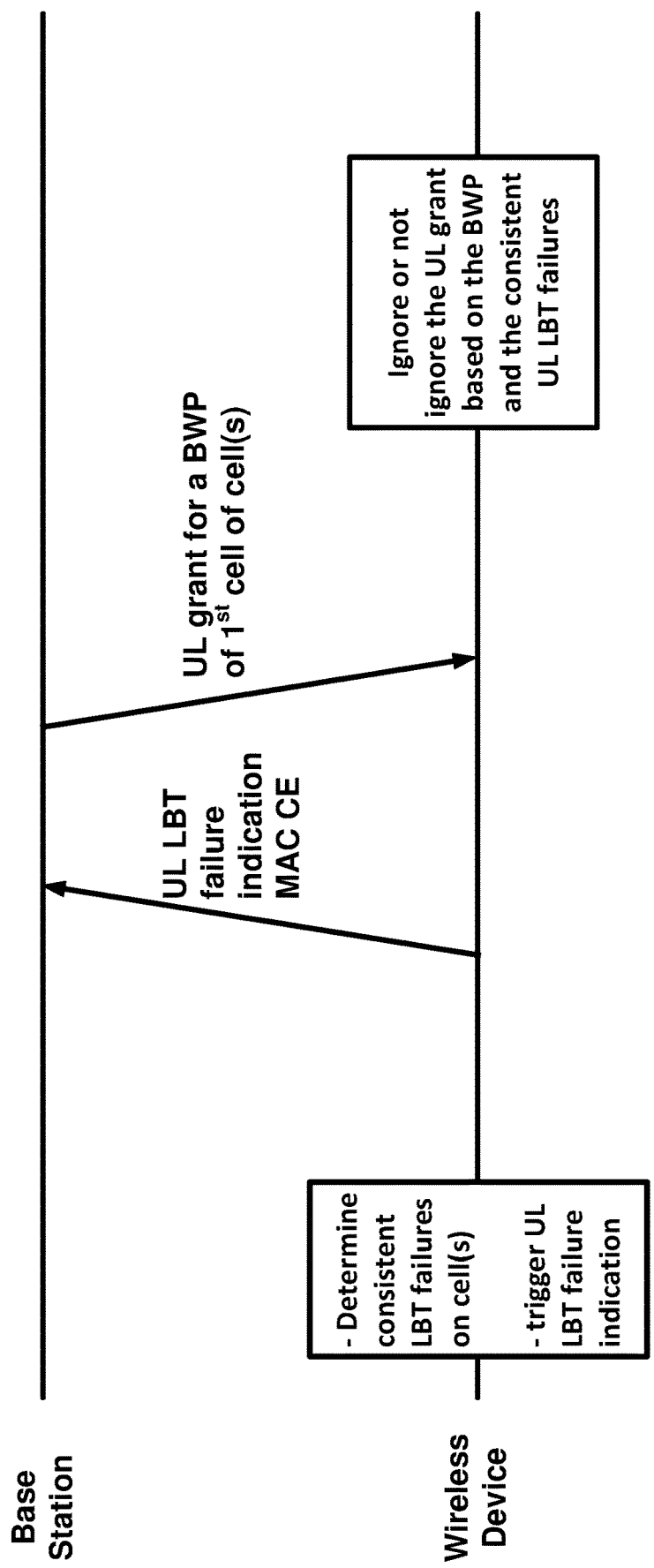
FIG. 30 shows an example process in accordance with several of various embodiments of the present disclosure.

In an example embodiment as shown in FIG. 30, a wireless device may determine to ignore or not ignore the uplink grant based on the uplink grant indicating BWP switching or not. For example, the wireless device may determine to ignore or not ignore the uplink grant based on the uplink grant indicating switching from a current active BWP of the first cell, for which consistent uplink LBT failures is determined or not. The wireless device may ignore or not ignore the uplink grant based on the determining.

In an example, the ignoring the uplink grant comprises skipping the transmission indicated by the uplink grant. The ignoring the uplink grant may comprise not generating and/or not transmitting a transport block based on the transmission parameters indicated by the uplink grant.

Figure 31:
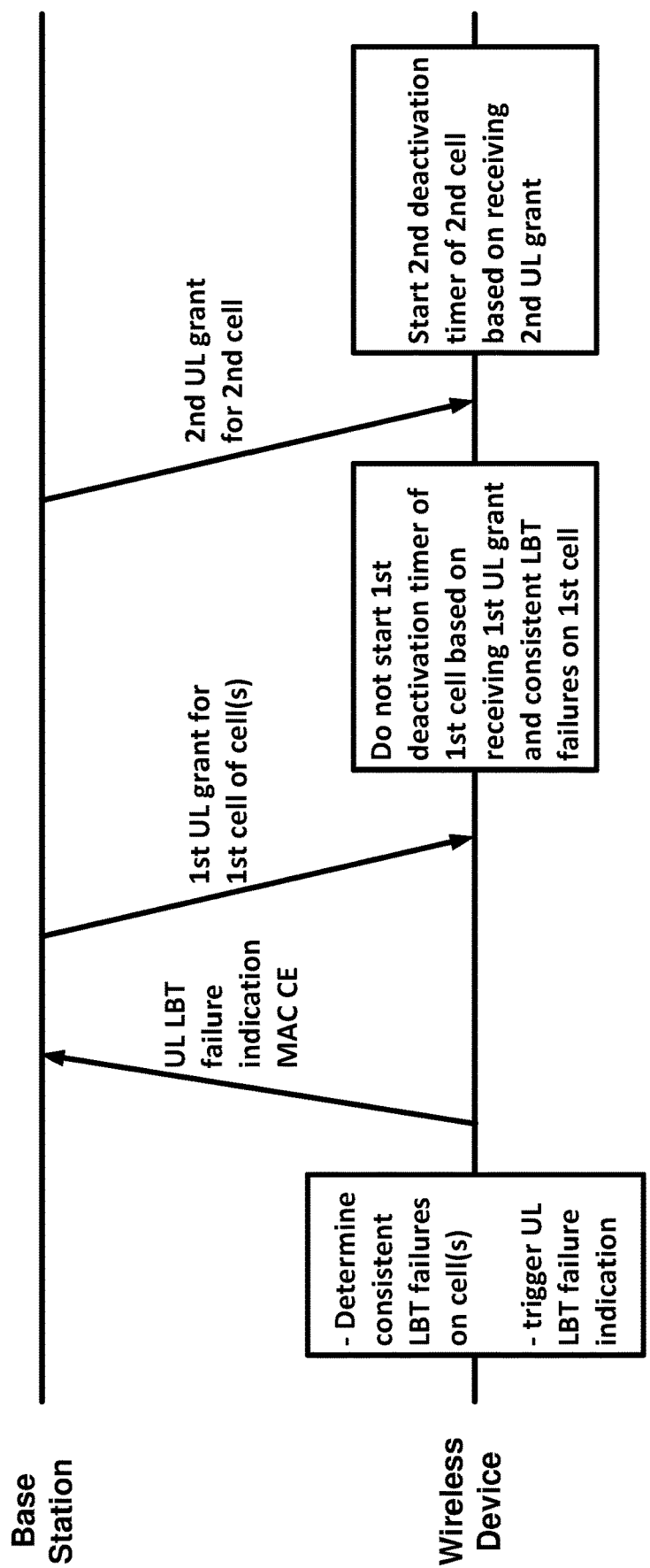
FIG. 31 shows an example process in accordance with several of various embodiments of the present disclosure.

In an example embodiment as shown in FIG. 31, a wireless device may determine consistent uplink LBT failures on one or more cells. The wireless device may determine the consistent uplink LBT failures using a consistent uplink LBT failures detection process described earlier. The wireless device may trigger an uplink LBT failure indication MAC CE based on the determining the consistent uplink LBT failures on the one or more cells. The wireless device may create an uplink LBT failure indication MAC CE based on the determining the consistent uplink LBT failures on the one or more cells. The uplink LBT failure indication MAC CE may comprise one or more fields indicating the consistent uplink LBT failures on the one or more cells. In an example, the wireless device may transmit the uplink LBT failure indication MAC CE based on the determining the consistent uplink LBT failures on the one or more cells.

The wireless device may receive a first uplink grant for a first cell of the one or more cells (on which the wireless determines the consistent uplink LBT failures). The first uplink grant may be for an uplink transmission on the first cell. For example, the uplink transmission may be a PUSCH transmission. Based on the receiving the uplink grant for the first cell and determining the consistent uplink failure on the first cell, the wireless device may not start a first deactivation timer of the first cell. In an example, based on the receiving the uplink grant for the first cell and triggering the uplink LBT failure indication, the wireless device may not start a first deactivation timer of the first cell. In an example, based on the receiving the uplink grant for the first cell and the transmitting the uplink LBT failure indication MAC CE, the wireless device may not start a first deactivation timer of the first cell.

The wireless device may receive a second uplink grant for a second cell, wherein the second cell may not be among the one or more cells with consistent uplink LBT failures. The second uplink grant may be for an uplink transmission on the second cell. For example, the uplink transmission may be a PUSCH transmission. Based on the receiving the second uplink grant, the wireless device may start a second deactivation timer of the second cell.

In an example, the wireless device may receive configuration parameters for a first deactivation timer of the first cell and a second deactivation timer of the second cell. The configuration parameters may comprise a first timer value for the first deactivation timer and a second timer value for the second deactivation timer. The wireless device may start the second deactivation timer with the second timer value. The wireless device may deactivate the first cell based the first deactivation timer expiring. The wireless device may deactivate the second cell based on the deactivation timer of the second cell expiring.

Figure 32:
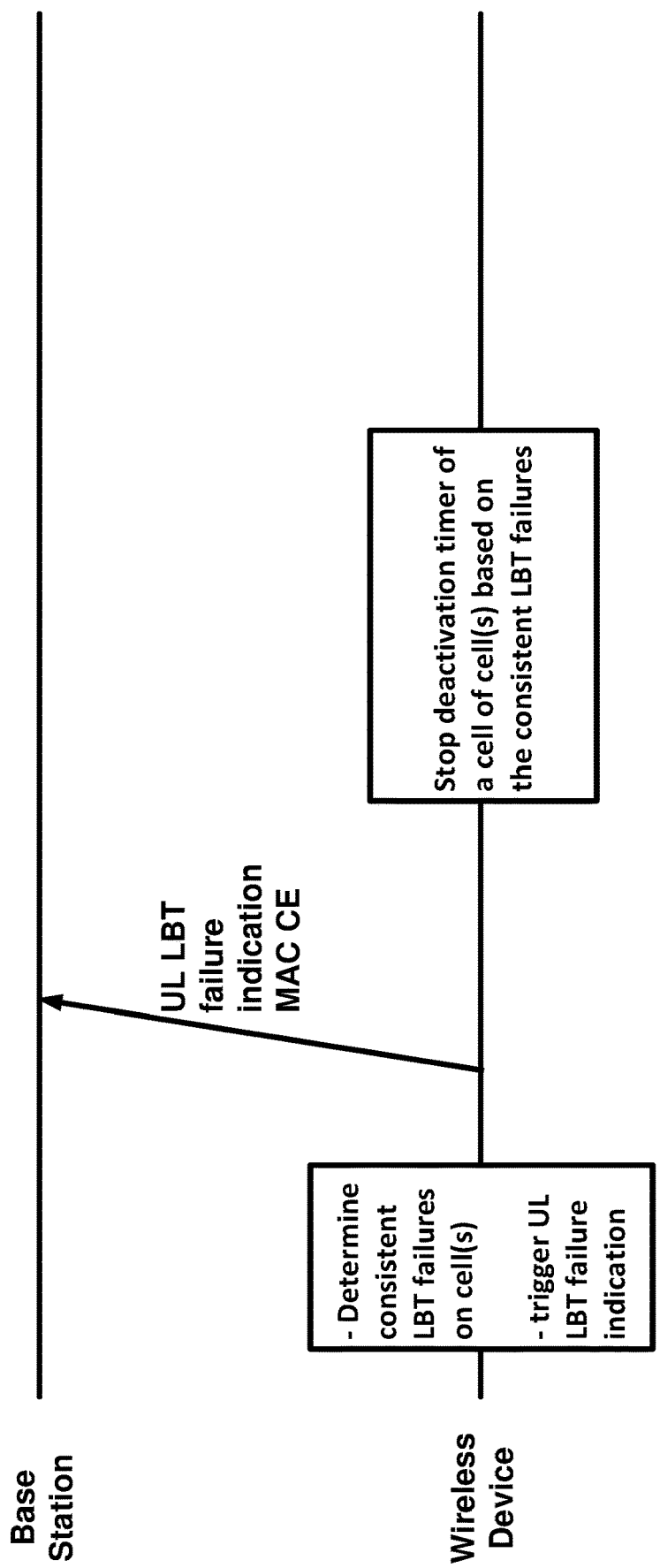
FIG. 32 shows an example process in accordance with several of various embodiments of the present disclosure.

In an example embodiment as shown in FIG. 32, a wireless device may determine consistent uplink LBT failures on one or more cells. The wireless device may determine the consistent uplink LBT failures using a consistent uplink LBT failures detection process described earlier. The wireless device may trigger an uplink LBT failure indication MAC CE based on the determining the consistent uplink LBT failures on the one or more cells. The wireless device may create an uplink LBT failure indication MAC CE based on the determining the consistent uplink LBT failures on the one or more cells. The uplink LBT failure indication MAC CE may comprise one or more fields indicating the consistent uplink LBT failures on the one or more cells. In an example, the wireless device may transmit the uplink LBT failure indication MAC CE based on the determining the consistent uplink LBT failures on the one or more cells.

The wireless device may stop a deactivation timer of a cell of the one or more cells based on the determining the consistent uplink LBT failures on the cell. In an example, the wireless device may stop a deactivation timer of a cell of the one or more cells based on the triggering the uplink LBT failure indication. In an example, the wireless device may stop a deactivation timer of a cell of the one or more cells based on the transmitting the uplink LBT failure indication MAC CE.

In an example, the one or more cells may comprise one or more secondary cells. The cell of the one or more cells for which the wireless device stops the deactivation timer may be a secondary cell.

In an example, the wireless device may receive a command for recovery from consistent uplink LBT failures on the cell. The command may, for example, indicate switching from a first BWP of the cell to a second BWP of the cell. The wireless device may start the deactivation timer of the cell based on the receiving the command. The wireless device may start the deactivation timer of the cell based performing the action indicated by the command. For example, the wireless device may start the deactivation timer of the cell based on the switching the BWP of the cell form a current active BWP to a second BWP.

In an example, a wireless device may receive configuration parameters of a configured grant configuration. The configured grant configuration may be a Type 1 configured grant configuration or a Type 2 configured grant configuration. The configured grant configuration parameters may comprise parameters to determine resources associated with the configure grant configuration. The parameters may comprise a periodicity and/or offset parameter, one or more parameters for determining transmission power, etc.

Figure 33:
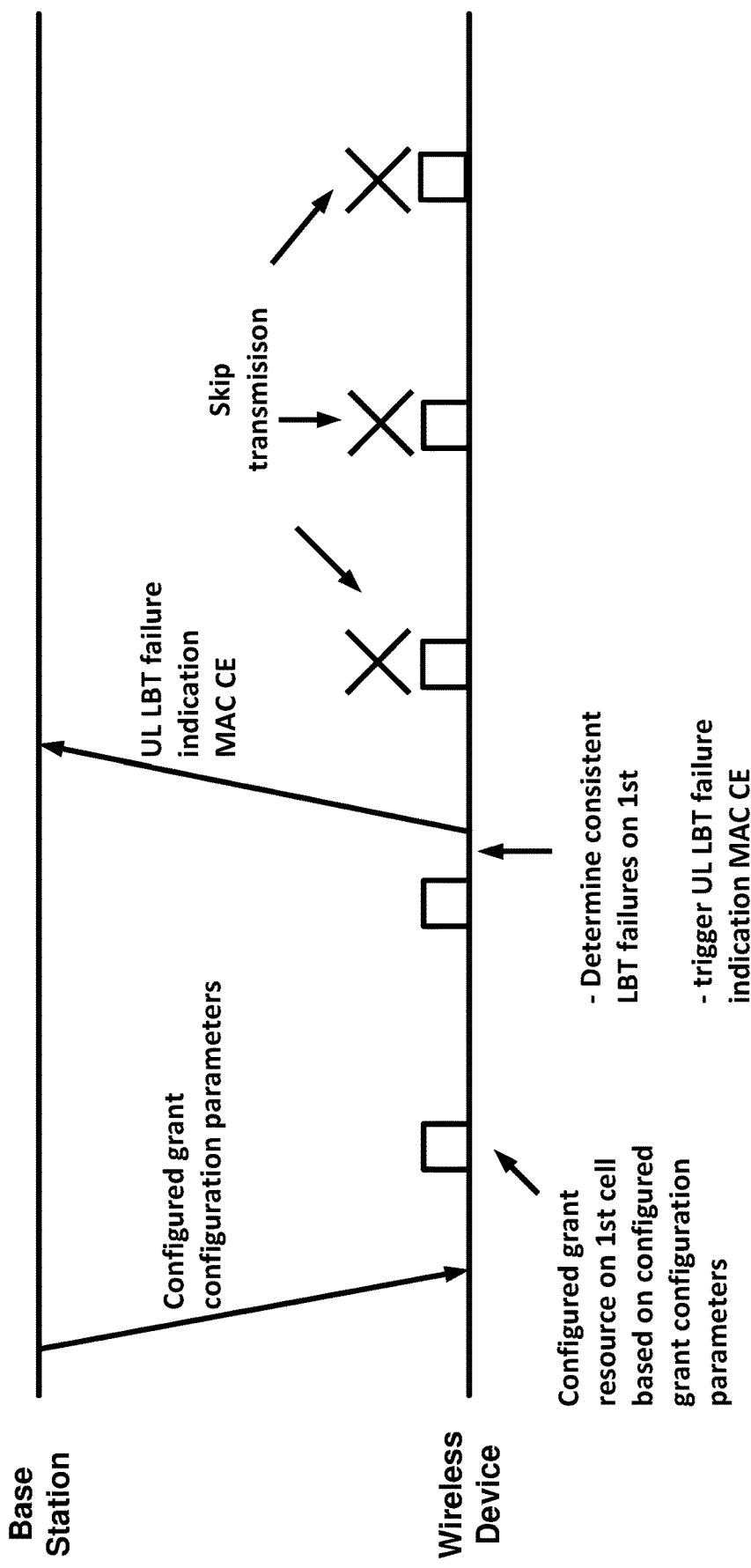
FIG. 33 shows an example process in accordance with several of various embodiments of the present disclosure.

In an example embodiment as shown in FIG. 33, a wireless device may determine a plurality of configured grant resources on a first cell based on the configured grant configuration. In an example, the configured grant configuration may be a Type 1 configured grant configuration and the wireless device may determine the plurality of configured grant resources based on the receiving the configured grant configuration. In an example, the configured grant configuration may be a Type 2 configured grant configuration and the wireless device may determine the plurality of configured grant resources based on the receiving the configured grant configuration and based on receiving a command (e.g., an activation DCI) indicating activation of the configured grant configuration. The wireless device may determine consistent uplink LBT failures on the first cell. The wireless device may determine the consistent uplink LBT failures on the first cell based on a consistent uplink LBT failure detection process described earlier. In an example, the wireless device may trigger an uplink LBT failure indication MAC CE based on the determining the consistent uplink LB failures on the first cell. In an example, the wireless device may transmit the uplink LBT failure indication MAC CE based on the determining the consistent uplink LBT failures on the first cell.

The wireless device may skip uplink transmissions via first plurality of resources of the plurality of configured grant resources that are configured and/or occur after the determining the consistent uplink LBT failures on the first cell. In an example, the wireless device may skip uplink transmissions via first plurality of resources of the plurality of configured grant resources that are configured and/or occur after the triggering the uplink failure indication. In an example, the wireless device may skip uplink transmissions via first plurality of resources of the plurality of configured grant resources that are configured and/or occur after the transmitting the uplink failure indication MAC CE. The wireless device may not generate transport blocks for transmission via the first plurality of resources of the plurality of configured grant resources based on the skipping the uplink transmissions via first plurality of resource. In an example, the wireless device may suspend uplink transmissions based on the configured grant resources on the first cell based on the determining the consistent uplink LBT failures on the first cell. In an example, the wireless device may suspend uplink transmissions based on the configured grant resources on the first cell based on the triggering the uplink LBT failure indication. In an example, the wireless device may suspend uplink transmissions based on the configured grant resources on the first cell based on the transmitting the LBT failure indication MAC CE.

In an example embodiment, a wireless device may determine consistent uplink LBT failures on one or more cells. The wireless device may determine the consistent uplink LBT failures on the one or more cells based on a consistent uplink LBT failure detection process. The wireless device may trigger an LBT failure indication MAC CE based on the determining the consistent uplink LBT failures on the one or more cells. The wireless device may receive a DCI indicating an uplink grant. The wireless device may transmit a transport block comprising an LBT failure indication MAC CE indicating the consistent uplink LBT failures on the one or more cells. For example, the LBT failure indication MAC CE may comprise one or more fields indicating the consistent uplink LBT failures on the one or more cells. In an example, the transport block may include no data from logical channels (e.g., no MAC SDU). The transport block may include one or more MAC CEs comprising the LBT failure indication MAC CE.

In an example, a wireless device may create a first uplink LBT failure indication MAC CE. The first uplink LBT failure indication MAC CE may indicate consistent uplink LBT failure on one or more first cells. The wireless device may create the first uplink LBT failure indication MAC CE for a transmission at a first timing. The wireless device may create a transport block comprising the first LBT failure indication MAC CE for transmission at the first timing. The transport block comprising the first uplink LBT failure indication MAC CE may be scheduled for transmission on an unlicensed cell. The wireless device may perform an LBT process before attempting to transmit the transport block.

In an example embodiment, the wireless device may create a second uplink LBT failure indication MAC CE before the first timing of the scheduled transmission of the first MAC CE. The second uplink failure indication MAC CE may indicate consistent uplink LBT failures on one or more first cells and on one or more second cells. The wireless device may create the second uplink LBT failure indication MAC CE for transmission at a second timing, wherein the second timing may be after the first timing. In an example, the first timing may be one or more first symbols of a first slot. In an example, the second timing may be one or more second symbols of a second slot. The second slot may be after the first slot. The wireless device may create the second uplink LBT failure indication MAC CE based on assuming that a first LBT for the first transmission of the first MAC CE (e.g., transmission of the first transport block) fails (e.g., indicate busy channel). The wireless device may create a second transport block comprising the second uplink LBT failure indication MAC CE. The wireless device may transmit the second transport block.

In an example embodiment, the wireless device may create a second uplink LBT failure indication MAC CE before the first timing of the scheduled transmission of the first MAC CE. The second uplink failure indication MAC CE may indicate consistent uplink LBT failures on one or more second cells. The wireless device may create the second uplink LBT failure indication MAC CE for transmission at a second timing, wherein the second timing may be after the first timing. In an example, the first timing may be one or more first symbols of a first slot. In an example, the second timing may be one or more second symbols of a second slot. The second slot may be after the first slot. The wireless device may create the second uplink LBT failure indication MAC CE based on assuming that a first LBT for the first transmission of the first MAC CE (e.g., transmission of the first transport block) is successful (e.g., indicate busy channel) and the wireless device transmits the first MAC CE. The wireless device may create a second transport block comprising the second uplink LBT failure indication MAC CE. The wireless device may transmit the second transport block.

Figure 34:
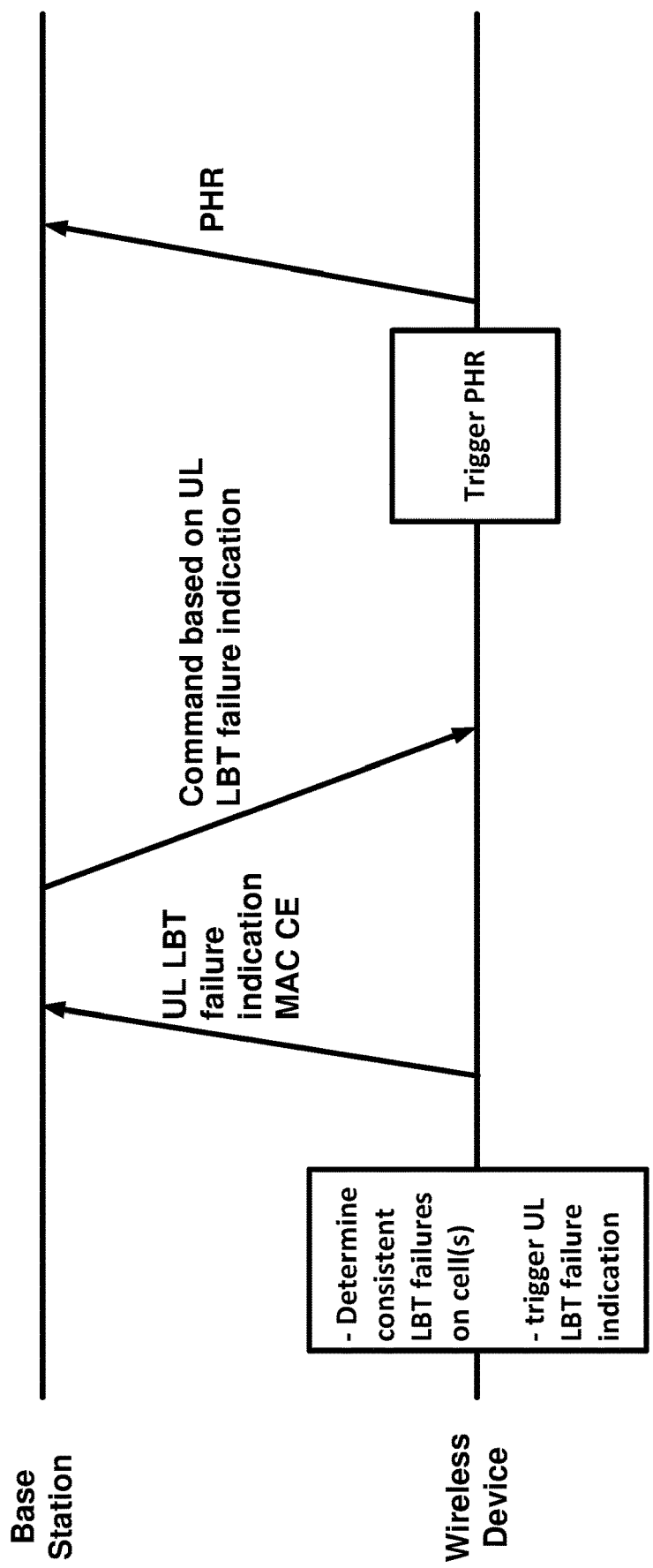
FIG. 34 shows an example process in accordance with several of various embodiments of the present disclosure.

In an example embodiment as shown in FIG. 34, a wireless device may determine consistent uplink LBT failures on one or more cells. The wireless device may determine the consistent uplink LBT failures using a consistent uplink LBT failures detection process described earlier. The wireless device may trigger an uplink LBT failure indication MAC CE based on the determining the consistent uplink LBT failures on the one or more cells. The wireless device may create an uplink LBT failure indication MAC CE based on the determining the consistent uplink LBT failures on the one or more cells. The uplink LBT failure indication MAC CE may comprise one or more fields indicating the consistent uplink LBT failures on the one or more cells. In an example, the wireless device may transmit the uplink LBT failure indication MAC CE based on the determining the consistent uplink LBT failures on the one or more cells.

The wireless device may receive a command based on the transmitting uplink failure indication MAC CE. For example, the command may be received via a downlink control channel. The command may be for recovery from consistent uplink LBT failures on one or more first cells of the one or more cells on which the wireless device determines the consistent uplink LBT failures. In an example, the command may indicate a BWP switching from a first BWP of the first cell to a second BWP of the first cell of the one or more first cells. The wireless device may trigger a power headroom based on the receiving the command. In an example, the wireless device may perform one or more processes (e.g., switching BWP, etc.) based on the receiving the command. The wireless device may trigger a power headroom based on the performing the one or more processes. In an example, the command may be for recovery form consistent uplink LBT failures on one or more first cells. The wireless device may trigger a power headroom report comprising power headroom values for the one or more first cells. The wireless device may transmit the power headroom report. The wireless device may create a PHR MAC CE and may transmit the PHR MAC CE using uplink resources indicated by an uplink grant. The PHR MAC CE may comprise one or more PHR values associated with PUSCH transmission.

Figure 35:
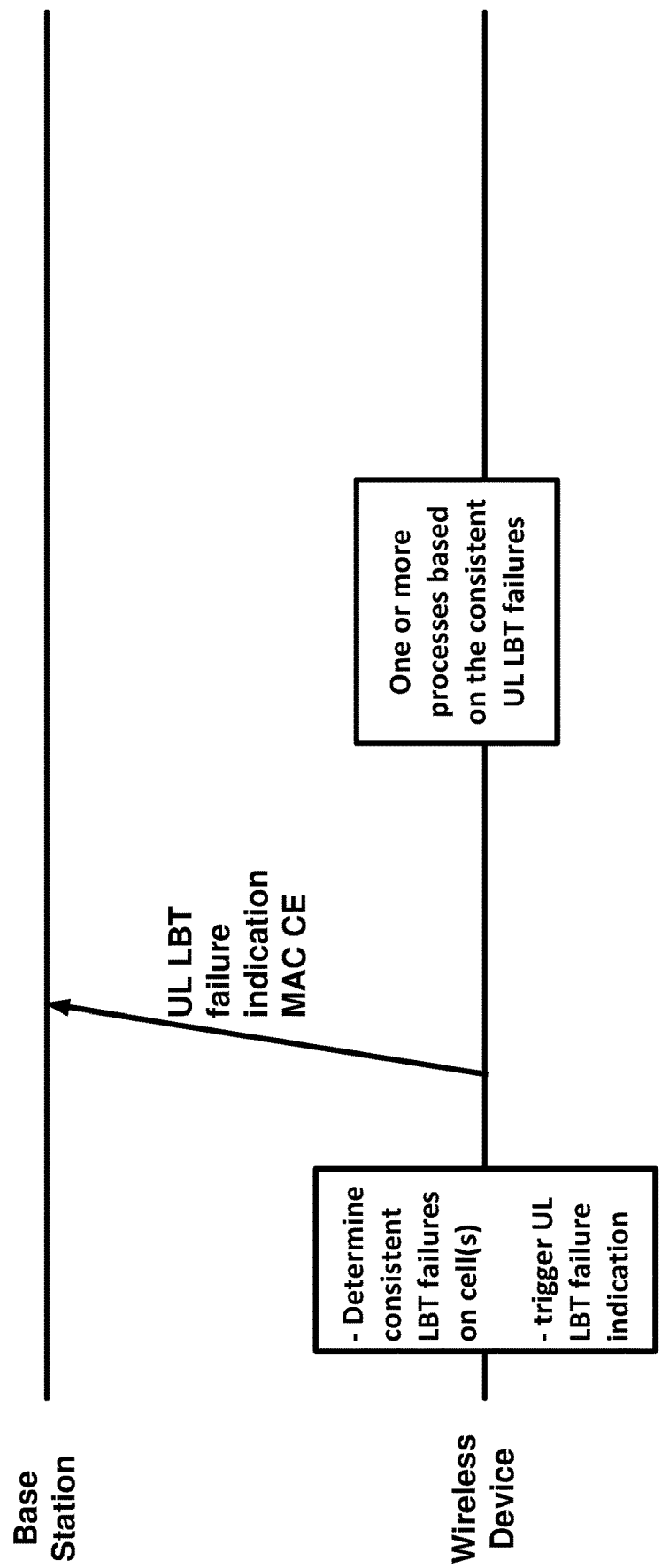
FIG. 35 shows an example process in accordance with several of various embodiments of the present disclosure.

In an example embodiment as shown in FIG. 35, wireless device may determine consistent uplink LBT failures on one or more cells. The wireless device may determine the consistent uplink LBT failures using a consistent uplink LBT failures detection process described earlier. The wireless device may trigger an uplink LBT failure indication MAC CE based on the determining the consistent uplink LBT failures on the one or more cells. The wireless device may create an uplink LBT failure indication MAC CE based on the determining the consistent uplink LBT failures on the one or more cells. The uplink LBT failure indication MAC CE may comprise one or more fields indicating the consistent uplink LBT failures on the one or more cells. In an example, the wireless device may transmit the uplink LBT failure indication MAC CE based on the determining the consistent uplink LBT failures on the one or more cells. The wireless device may perform one or more processes for a cell of the one or more cells based on the determining the consistent uplink LBT failures on the one or more cells.

In an example, the one or more processes may comprise flushing HARQ buffers for the cell. Flushing the HARQ buffers for the cell may comprise removing different redundancy versions of transport blocks stored in the HARQ buffers of the cell.

In an example, the one or more processes may comprise releasing a physical uplink control channel (PUCCH) for the cell. The releasing the PUCCH for the cell may comprise releasing the RRC configuration parameters of the PUCCH for the cell. Based on the releasing the PUCCH for the cell, the wireless device may release PUCCH resources configured for the cell and the PUCCH resources for the cell may not be available for the wireless device.

In an example, the one or more processes may comprise releasing SRS for the for the cell. The releasing the SRS for the cell may comprise releasing the SRS configuration parameters of the SRS for the cell. Based on the releasing the SRS for the cell, the wireless device may release SRS resources configured for the cell and the SRS resources for the cell may not be available for the wireless device.

In an example, the one or more processes may comprise clearing configured downlink assignments and/or uplink configured grants for the cell. The clearing the configured downlink assignments and/or uplink configured grants for the cell may comprise deactivating the configured downlink assignment resources and/or clearing the uplink configured grant resources for the cell. The wireless device may keep/maintain the RRC configuration parameters of the uplink configured grants and/or the configured downlink assignments which may be activated by new activation DCIs/commands by the base station. For example, the wireless device may receive a new activation DCI/command to activate the uplink configured grants or configured downlink assignments for the cell, for example based on the recovery from consistent uplink LBT failures.

In an example, the one or more processes may comprise clearing PUSCH resource for semi-persistent CSI reporting on the cell. The clearing the PUSCH resource for semi-persistent CSI reporting on the cell may comprise deactivating the configured PUSCH resources for semi-persistent CSI reporting on the cell. The wireless device may keep/maintain the RRC configuration parameters of the semi-persistent CSI reporting which may be activated by new activation DCIs/commands by the base station. For example, the wireless device may receive a new activation DCI/command to activate the PUSCH resources for semi-persistent CSI reporting on the cell, for example based on the recovery from consistent uplink LBT failures.

In an example, the one or more processes may comprise maintaining $N_{TA}$ for the TAG comprising the cell. The value of $N_{TA}$ may be used to determine timing advance for a TAG. For example, the $N_{TA}$ may be multiplied by a first value to determine a timing advance. The first value may be based on a numerology (e.g., subcarrier spacing) for the cell.

In an example, the one or more processes may comprise considering the time alignment timer for the cell as expired. The wireless device may receive a command (e.g., a timing advance command MAC CE) and the wireless device may restart the time alignment timer for the TAG comprising the cell. The timing advance MAC CE may comprise a timing advance value for the TAG comprising the cell.

In an example embodiment, a wireless device may determine consistent uplink LBT failures on a first cell that is a timing reference for one or more cells in a timing advance group. The wireless device may determine the consistent uplink LBT failures using a consistent uplink LBT failures detection process described earlier. The wireless device may trigger an uplink LBT failure indication MAC CE based on the determining the consistent uplink LBT failures on the cell. The wireless device may create an uplink LBT failure indication MAC CE based on the determining the consistent uplink LBT failures on the cell. The uplink LBT failure indication MAC CE may comprise a field indicating the consistent uplink LBT failures on the cell. In an example, the wireless device may transmit the uplink LBT failure indication MAC CE based on the determining the consistent uplink LBT failures on the cell. The wireless device may perform one or more processes for the one or more cells in the timing advance group based on the determining the consistent uplink LBT failures on the cell.

In an example, the one or more processes may comprise flushing HARQ buffers for the one or more cells. Flushing the HARQ buffers for the one or more cells may comprise removing different redundancy versions of transport blocks stored in the HARQ buffers of the one or more cells.

In an example, the one or more processes may comprise releasing one or more physical uplink control channels (PUCCHs) for the one or more cells. The releasing the PUCCHs for the one or more cells may comprise releasing the RRC configuration parameters of the PUCCHs for the one or more cells. Based on the releasing the PUCCHs for the one or more cells, the wireless device may release PUCCH resources configured for the one or more cells and the PUCCH resources for the one or more cells may not be available for the wireless device.

In an example, the one or more processes may comprise releasing one or more SRSs for the for the one or more cells. The releasing the SRSs for the one or more cells may comprise releasing the SRS configuration parameters of the SRSs for the one or more cells. Based on the releasing the SRSs for the one or more cells, the wireless device may release SRS resources configured for the one or more cells and the SRS resources for the one or more cells may not be available for the wireless device.

In an example, the one or more processes may comprise clearing configured downlink assignments and/or uplink configured grants for the one or more cells. The clearing the configured downlink assignments and/or uplink configured grants for the one or more cells may comprise deactivating the configured downlink assignment resources and/or clearing the uplink configured grant resources for the one or more cells. The wireless device may keep/maintain the RRC configuration parameters of the uplink configured grants and/or the configured downlink assignments which may be activated by new activation DCIs/commands by the base station. For example, the wireless device may receive one or more new activation DCIs/commands to activate the uplink configured grants or configured downlink assignments for the one or more cell, for example based on the recovery from consistent uplink LBT failures.

In an example, the one or more processes may comprise clearing PUSCH resource for semi-persistent CSI reporting on the one or more cells. The clearing the PUSCH resource for semi-persistent CSI reporting on the one or more cells may comprise deactivating the configured PUSCH resources for semi-persistent CSI reporting on the one or more cells. The wireless device may keep/maintain the RRC configuration parameters of the semi-persistent CSI reporting which may be activated by new activation DCIs/commands by the base station. For example, the wireless device may receive a new activation DCI/command to activate the PUSCH resources for semi-persistent CSI reporting on the one or more cells, for example based on the recovery from consistent uplink LBT failures.

In an example, the one or more processes may comprise maintaining $N_{TA}$ for the TAG for which the cell is a timing reference. The value of $N_{TA}$ may be used to determine timing advance for a TAG. For example, the $N_{TA}$ may be multiplied by a first value to determine a timing advance. The first value may be based on a numerology (e.g., subcarrier spacing) of the cell.

In an example, the one or more processes may comprise considering the time alignment timer for TAG for which the cell is a timing reference as expired. The wireless device may receive a command (e.g., a timing advance command MAC CE) and the wireless device may restart the time alignment timer for the TAG. The timing advance MAC CE may comprise a timing advance value for the TAG.

In an example embodiment, a wireless device may determine consistent uplink LBT failures on a primary cell. The wireless device may determine the consistent uplink LBT failures using a consistent uplink LBT failures detection process described earlier. The wireless device may switch from a first BWP of the primary cell to a new BWP and may start a random access process on the new BWP. The wireless device may trigger an uplink LBT failure indication MAC CE based on the determining the consistent uplink LBT failures. The wireless device may create an uplink LBT failure indication MAC CE based on the determining the consistent uplink LBT failures. The uplink LBT failure indication MAC CE may comprise a field indicating the consistent uplink LBT failures on the primary cell. In an example, the wireless device may transmit the uplink LBT failure indication MAC CE based on the determining the consistent uplink LBT failures on the primary cell. The wireless device may perform one or more processes for the one or more cells in based on the determining the consistent uplink LBT failures on the cell.

In an example, the one or more processes may comprise flushing HARQ buffers for one or more cells. Flushing the HARQ buffers for the one or more cell may comprise removing different redundancy versions of transport blocks stored in the HARQ buffers of the one or more cells.

In an example, the one or more processes may comprise releasing one or more physical uplink control channels (PUCCHs) for one or more cells. The releasing the PUCCHs for the one or more cells may comprise releasing the RRC configuration parameters of the PUCCHs for the one or more cells. Based on the releasing the PUCCHs for the one or more cells, the wireless device may release PUCCH resources configured for the one or more cells and the PUCCH resources for the one or more cells may not be available for the wireless device for transmission of uplink control information.

In an example, the one or more processes may comprise releasing one or more SRSs for one or more cells. The releasing the SRSs for the one or more cells may comprise releasing the SRS configuration parameters of the SRSs for the one or more cells. Based on the releasing the SRSs for the one or more cells, the wireless device may release SRS resources configured for the one or more cells and the SRS resources for the one or more cells may not be available for the wireless device.

In an example, the one or more processes may comprise clearing configured downlink assignments and/or uplink configured grants for one or more cells. The clearing the configured downlink assignments and/or uplink configured grants for the one or more cells may comprise deactivating the configured downlink assignment resources and/or clearing the uplink configured grant resources for the one or more cells. The wireless device may keep/maintain the RRC configuration parameters of the uplink configured grants and/or the configured downlink assignments which may be activated by new activation DCIs/commands by the base station. For example, the wireless device may receive one or more new activation DCIs/commands to activate the uplink configured grants or configured downlink assignments for the one or more cell, for example based on the recovery from consistent uplink LBT failures.

In an example, the one or more processes may comprise clearing PUSCH resource for semi-persistent CSI reporting on one or more cells. The clearing the PUSCH resource for semi-persistent CSI reporting on the one or more cells may comprise deactivating the configured PUSCH resources for semi-persistent CSI reporting on the one or more cells. The wireless device may keep/maintain the RRC configuration parameters of the semi-persistent CSI reporting which may be activated by new activation DCIs/commands by the base station. For example, the wireless device may receive a new activation DCI/command to activate the PUSCH resources for semi-persistent CSI reporting on the one or more cells, for example based on the recovery from consistent uplink LBT failures.

In an example, the one or more processes may comprise considering the time alignment timer for one or more TAGs as expired. The wireless device may receive a command (e.g., a timing advance command MAC CE) and the wireless device may restart the time alignment timer for the one or more TAGs. The timing advance MAC CE may comprise one or more timing advance values for the one or more TAGs.

In an example embodiment, a wireless device may determine consistent uplink LBT failures on a first cell. The wireless device may trigger an uplink failure indication based on the determining the consistent uplink LBT failures. In an example, the wireless device may create an uplink failure indication MAC CE based on the determining the consistent uplink LBT failures. In an example, the wireless device may transmit an uplink LBT failure indication MAC CE based on the determining the consistent uplink LBT failures. The wireless device may receive an uplink grant indicating resources for transmission of a transport block on the first cell. The wireless device may determine one or more logical channels, of a plurality of logical channels, that are allowed to be transmitted on (e.g., are mapped to) the first cell based on the determining the consistent uplink LBT failures. In an example, the wireless device may determine the one or more logical channels, of the plurality of logical channels, that are allowed to be transmitted on (e.g., are mapped to) the first cell based on the creating the uplink failure indication MAC CE. In an example, the wireless device may determine the one or more logical channels, of the plurality of logical channels, that are allowed to be transmitted on (e.g., are mapped to) the first cell based on the transmitting the uplink failure indication MAC CE. The wireless device may multiplex the one or more logical channels in the transport block based on a multiplexing process (e.g., using a logical channel prioritization procedure).

In an example, the determining the one or more logical channels may be based on one or more service/traffic types associated with the one or more logical channels.

In an example, the one or more service/traffic types may not include ultra-reliable low-latency communications (URLLC) traffic/service type.

In an example, the one or more service/traffic types may include enhanced mobile broadband (eMBB) traffic/service type.

In an example, the wireless device may receive configuration parameters of the plurality of logical channel; and the configuration parameters may indicate that the one or more logical channels are allowed to be transmitted on (e.g., are mapped to) a cell with consistent uplink LBT failures.

In an example, the wireless device may receive configuration parameters of the plurality of logical channel. The configuration parameters may indicate that one or more first logical channels, of the plurality of logical channels, are not allowed to be transmitted on (e.g., are not mapped to) a cell with consistent uplink LBT failures. The one or more logical channels may not include the one or more first logical channels.

In an example, the wireless device may receive configuration parameters of the plurality of logical channel. The configuration parameters may indicate that one or more first logical channels, of the plurality of logical channels, are allowed to be transmitted on (e.g., are mapped to) the first cell. The one or more first logical channels may not be allowed to be transmitted on (e.g., may not be mapped to) the first cell based on the determining the consistent uplink LBT failures. In an example, the one or more first logical channels may not be allowed to be transmitted on (e.g., may not be mapped to) the first cell based on the triggering the uplink failure indication. In an example, the one or more first logical channels may not be allowed to be transmitted on (e.g., may not be mapped to) the first cell based on the creating the uplink failure indication MAC CE. In an example, the one or more first logical channels may not be allowed to be transmitted on (e.g., may not be mapped to) the first cell based on the transmitting the uplink failure indication MAC CE.

In an example, the wireless device may receive a command for recovery from consistent uplink LBT failures on the first cell; and the one or more first logical channels may be allowed to be transmitted on (e.g., mapped to) the first cell based on receiving the command. In an example, the command may indicate switching from a first BWP of the first cell to a second BWP of the first cell as an active BWP. In an example, the command may be received via a downlink control channel indicating a downlink control information.

In an example, the determining the consistent uplink LBT failures on the first cell may comprise incrementing an LBT failure counter based on receiving a notification of LBT failure, for an uplink transmission, from physical layer. In an example, the determining the consistent uplink LBT failures on the first cell may be based on the LBT counter reaching a first value.

In an example, the determining the consistent uplink LBT failures on the first cell may comprise starting an LBT failure detection timer based on receiving a notification of LBT failure, for an uplink transmission, from physical layer.

In an example, the wireless device may transmit the transport block based on the multiplexing. The wireless device may transmit the transport block after multiplexing the one or more logical channels.

In an example, the uplink failure indication MAC CE may indicate that the first cell has consistent uplink LBT failures.

In an example, the transmitting the uplink failure indication MAC CE may be via a second cell different from the first cell.

In an example, the determining the consistent LBT failures is for a BWP of the first cell.

In an example, the first cell may be a secondary cell.

In an example embodiment, a wireless device may determine consistent uplink LBT failures on a first cell. The wireless device may trigger an uplink failure indication based on the determining the consistent uplink LBT failures. In an example, the wireless device may create an uplink failure indication MAC CE based on the determining the consistent uplink LBT failures. In an example, the wireless device may transmit an uplink LBT failure indication MAC CE based on the determining the consistent uplink LBT failures. The wireless device may receive an uplink grant indicating resources for transmission of a transport block on the first cell. The wireless device may determine that one or more first logical channels, of a plurality of logical channels, are not allowed to be transmitted on (e.g., are not mapped to) the first cell based on the determining the consistent uplink LBT failures on the first cell. In an example, the wireless device may determine that one or more first logical channels, of a plurality of logical channels, are not allowed to be transmitted on (e.g., are not mapped to) the first cell based on the triggering the uplink failure indication. In an example, the wireless device may determine that one or more first logical channels, of a plurality of logical channels, are not allowed to be transmitted on (e.g., are not mapped to) the first cell based on the transmitting the uplink failure indication MAC CE. The wireless device may multiplex one or more logical channels, not including the one or more first logical channels, in the transport block based on a multiplexing process (e.g., using a logical channel prioritization procedure).

In an example embodiment, a wireless device may receive: first configuration parameters indicating that a bearer is configured with and/or activated for packet duplication, wherein the bearer is associated with a plurality of logical channels; and second configuration parameters indicating that a first logical channel, of the plurality of logical channels, is allowed to be transmitted (e.g., mapped to) one or more cells comprising a first cell. The wireless device may receive a first uplink grant for transmission of a first transport block on the first cell. The wireless device may transmit first data of the first logical channel in the first transport block based on the first uplink grant. The wireless device may determine consistent uplink LBT failures on the first cell. The wireless device may receive a second uplink grant for transmission of a second transport block on the first cell. Based on the determining, the wireless device may not transmit second data of the first logical channel in the second transport block.

In an example, the packet duplication may be packet data convergence protocol (PDCP) packet duplication.

In an example, the bearer may be a data radio bearer (DRB).

In an example, the bearer may be a signaling radio bearer (SRB).

In an example, the wireless device may receive a command for recovery from the consistent uplink LBT failures on the first cell. The wireless device may receive a third uplink grant for transmission of a third transport block. Based on the receiving the command, the wireless device may transmit the third data of the first logical channel in the third transport block. In an example, the command may indicate switching from a first BWP of the first cell to a second BWP of the first cell as an active BWP. In an example, the command may be received via a downlink control channel indicating a downlink control information.

In an example embodiment, a wireless device may determine consistent uplink LBT failures on one or more cells. The wireless device may trigger an uplink LBT failure indication MAC CE based on the determining. In an example, the wireless device may create an uplink LBT failure indication MAC CE based on the determining. Based on the determining the consistent uplink LBT failures and the one or more cells, the wireless device may determine at least one serving cell, wherein a plurality of medium access control (MAC) control element (MAC CEs), comprising the LBT failure indication MAC CE, are allowed to be transmitted on (e.g., are mapped to). In an example, based on the triggering the uplink failure indication and the one or more cells, the wireless device may determine at least one serving cell, wherein a plurality of medium access control (MAC) control element (MAC CEs), comprising the LBT failure indication MAC CE, are allowed to be transmitted on (e.g., are mapped to). In an example, based on the creating the uplink LBT failure indication MAC CE and the one or more cells, the wireless device may determine at least one serving cell, wherein a plurality of medium access control (MAC) control element (MAC CEs), comprising the LBT failure indication MAC CE, are allowed to be transmitted on (e.g., are mapped to). The wireless device may receive an uplink grant indicating resources for transmission of a transport block on a first cell of the at least one serving cell. The wireless device may multiplex, in the transport block, one or more MAC CEs of the plurality of MAC CEs.

In an example, the plurality of MAC CEs may comprise a beam failure recovery (BFR) MAC CE. In an example, the BFR MAC CE may be for beam failure recovery on a secondary cell. In an example, the plurality of MAC CEs may comprise the LBT failure indication MAC CE and the BFR MAC CE.

In an example, the one or more first cells may comprise a SPCell (e.g., a PCell or a PSCell). The at least one serving cell may be the SPCell based on the one or more first cells comprising the SPCell. Consistent LBT failure for the SPCell may be for a first BWP of the SPCell. The uplink grant may be for a second BWP of the SPCell. In an example, the wireless device may switch from the first BWP of the SPCell to the second BWP of the SPCell; and the wireless device may perform a random access procedure on the second BWP. In an example, the uplink grant may be received via a random access response during the random access procedure.

In an example, the wireless device may receive configuration parameters of a plurality of cells. The at least one cell may comprise the plurality of cells with the one or more first cells, with consistent uplink LBT failures, excluded.

In an example, the wireless device may transmit the transport block based on the multiplexing. The wireless device may transmit the transport block after multiplexing the one or more MAC CEs.

In an example embodiment, a wireless device may determine consistent uplink LBT failures on one or more cells. The wireless device may trigger an uplink LBT failure indication based on the determining. In an example, the wireless device may create an uplink LBT failure indication MAC CE based on the determining. In an example, the wireless device may transmit an uplink LBT failure indication MAC CE based on the determining. The wireless device may receive a request for transmission of a channel state information (CSI) report via a first cell of the one or more cells. The wireless device may ignore the request based on the determining the consistent uplink LBT failures. In an example, the wireless device may ignore the request based on the triggering the uplink LBT failure indication. In an example, the wireless device may ignore the request based on the creating the uplink LBT failure indication MAC CE. In an example, the wireless device may ignore the request based on transmitting the uplink LBT failure indication MAC CE.

In an example, the request may be transmitted via a MAC CE.

In an example, the request may be transmitted via a downlink control information (DCI). In an example, the DCI may indicate the request for transmission of the CSI report without uplink data (e.g., without UL-SCH).

In an example, the CSI report may be an aperiodic CSI report.

In an example, the CSI report may be a semi-persistent CSI report.

In an example, the request for transmission of the CSI report may be for transmission via an uplink shared/data channel.

In an example, the request for transmission of the CSI report may be for transmission via an uplink control channel.

In an example, based on ignoring the request for transmission of the CSI report, the wireless device may transmit the CSI report based on a second request.

In an example, the wireless device may transmit/multiplex the CSI report in a transport block based on a second DCI.

In an example, the wireless device may transmit the CSI report based on an uplink control channel. In an example, the transmitting the CSI report based on the uplink control channel may be based on a size of the CSI report. In an example, the transmitting the CSI report based on the uplink control channel is based on the size of the CSI report being smaller than a threshold.

In an example embodiment, a wireless device may determine consistent uplink LBT failures on one or more cells. The wireless device may trigger an uplink LBT failure indication based on the determining. In an example, the wireless device may create an uplink LBT failure indication MAC CE based on the determining. In an example, the wireless device may transmit an uplink LBT failure indication MAC CE based on the determining. The wireless device may receive a request for transmission of a sounding reference signal (SRS) via a first cell of the one or more cells. The wireless device may ignore the request based on the determining the consistent uplink LBT failures. In an example, the wireless device may ignore the request based on the triggering the uplink LBT failure indication. In an example, the wireless device may ignore the request based on the creating the uplink LBT failure indication MAC CE. In an example, the wireless device may ignore the request based on transmitting the uplink LBT failure indication MAC CE.

In an example, the request for transmission of the SRS may be transmitted via a MAC CE.

In an example, the request for transmission of the SRS may be transmitted via a DCI.

In an example, the SRS may be semi-persistent SRS.

In an example embodiment, a wireless device may determine consistent LBT failures on one or more cells. The wireless device may receive an uplink grant indicating uplink resources for transmission of a transport block on a first cell at a first timing wherein the first timing overlaps with a second timing of scheduled transmission of uplink control information. The wireless device may multiplex or not multiplex the uplink control information in the transport block based on the first cell being one of the one or more cells or not. In an example, the wireless device may transmit or not transmit the uplink control information via the uplink resources based on the first cell being one of the one or more cells or not. In an example, the wireless device may piggyback or not piggyback the uplink control information in the transport block based on the first cell being one of the one or more cells or not.

In an example, the wireless device may receive configuration parameters of a plurality of cells comprising the one or more cells.

In an example, the wireless device may trigger an LBT failure indication based on the determining. In an example, the wireless device may transmit an LBT failure indication MAC CE based on the determining, wherein the LBT failure indication MAC CE may indicate the consistent LBT failures on the one or more cells.

In an example, the uplink control information may comprise CSI report.

In an example, the CSI report may be a periodic CSI report. In an example, the wireless device may receive CSI configuration parameters indicating the second timing of scheduled transmission of the uplink control information.

In an example, the CSI report may be semi-persistent CSI report. The wireless device may receive CSI configuration parameters. The wireless device may receive a MAC CE indicating activation of a plurality of resources comprising a resource for the semi-persistent CSI report.

In an example, the CSI report may be an aperiodic CSI report.

In an example, the multiplexing the uplink control information in the transport block is based on a multiplexing process. In an example, the multiplexing process may be based on rate matching.

In an example, the uplink control information is scheduled to be transmitted at the second timing via an uplink shared/data channel.

In an example, the uplink control information is scheduled to be transmitted at the second timing via an uplink control channel.

In an example, the uplink control information is scheduled to be transmitted on a second cell at the second timing. In an example, the second cell may be different from the first cell.

In an example, the first timing and the second timing overlap in one or more symbols.

In example, the first timing and the second timing overlap based on the first timing and the second timing being in the same slot.

In an example embodiment, a wireless device, may create a transport block comprising an uplink failure indication MAC CE indicating consistent uplink LBT failures for one or more cells, wherein the transport block is scheduled for a transmission on a first cell at a timing. The wireless device may declare/trigger consistent uplink LBT failure for the first cell after the creating the MAC CE and before the timing. The wireless device may drop the transmission based on the declaring/triggering the consistent uplink LBT failure for the first cell.

In an example, the dropping the transmission may be based on a time duration between a first timing of the triggering the consistent uplink LBT failures for the first cell and the timing of the transmission of the transport block.

In an example, the transport block may comprise one or more logical channels. The dropping the transmission may be based on the one or more logical channels.

In an example, the timing for transmission of the transport block is one or more symbols in a first slot.

In an example, the timing for transmission of the transport block is a first slot.

In an example embodiment, a wireless device may create a transport block comprising an uplink failure indication MAC CE indicating consistent uplink LBT failures for one or more cells, wherein the transport block is scheduled for a transmission on a first cell at a timing. The wireless device may declare/trigger consistent uplink LBT failure for the first cell after the creating the MAC CE and before the timing. The wireless device may drop or not drop the transmission based on the declaring/triggering consistent uplink LBT failure for the first cell and one or more conditions.

In an example, the transport block comprises one or more logical channel; and the one or more conditions for dropping or not dropping the transport block may comprise one or more configuration parameters of the one or more logical channels. In an example, the one or more configuration parameters may indicate one or more service/traffic types associated with the one or more logical channels. In an example, the one or more service/traffic types comprise an ultra-reliable low-latency communications (URLLC) service type. In an example, the one or more service/traffic types comprise an enhanced mobile broadband (eMBB) service type.

In an example, the triggering the consistent uplink LBT failure for the first cell is on a first timing; and the one or more conditions for dropping or not dropping the transport block are based on and/or comprise a duration between the first timing and the timing. In an example, the wireless device drops the transport block based on the duration being smaller than a first duration. In an example, the wireless device drops the transport block based on the duration being larger than a second duration.

In an example embodiment, a wireless device may determine consistent uplink LBT failures on one or more cells. The wireless device may trigger an uplink LBT failure indication based on the determining. The wireless device may transmit an uplink LBT failure indication MAC CE based on the determining. The wireless device may receive an uplink grant for a first cell of the one or more cells. The wireless device may ignore the uplink grant based on the determining the consistent uplink LBT failures on one or more cells. In an example, the wireless device may ignore the uplink grant based on the triggering the uplink LBT failure indication. In an example, the wireless device may ignore the uplink grant based on the transmitting the uplink failure indication MAC CE.

In an example, the uplink grant may be for a first BWP of the first cell. The ignoring the uplink grant may be based on the first BWP being the current active BWP for which a consistent LBT failures is determined.

In an example, the ignoring the uplink grant may be based on the uplink grant not indicating a BWP switching.

In an example embodiment, a wireless device may determine consistent uplink LBT failures on one or more cells. The wireless device may trigger an uplink LBT failure indication based on the determining. In an example, the wireless device may transmit an uplink LBT failure indication MAC CE based on the determining. The wireless device may receive an uplink grant for a first cell of the one or more cells. The wireless may ignore or not ignore the uplink grant based on the uplink grant indicating BWP switching or not. In an example, the wireless device may ignore or not ignore the uplink grant based on the uplink grant indicating switching from a current active BWP of the first cell, for which consistent uplink failure is determined, or not.

In an example, the ignoring the uplink grant may comprise not transmitting/skipping a transmission via uplink resources indicated by the uplink grant.

In an example embodiment, a wireless device may determine consistent uplink LBT failures on one or more cells. The wireless device may trigger an uplink LBT failure indication based on the determining. In an example, the wireless device may transmit an uplink LBT failure indication MAC CE based on the determining. The wireless device may receive a first uplink grant for a first cell of the one or more cells. Based on the receiving the first uplink grant and the determining the consistent uplink LBT failures on the one or more cells, the wireless device may not start a first deactivation timer of the first cell. In an example, based on the receiving the first uplink grant and the triggering the uplink LBT failure indication, the wireless device may not start a first deactivation timer of the first cell. In an example, based on the receiving the first uplink grant and the transmitting the uplink LBT failure indication MAC CE, the wireless device may not start a first deactivation timer of the first cell. The wireless device may receive a second uplink grant for a second cell, wherein the second cell is not one of the one or more cells (e.g., does not have consistent uplink LBT failures). Based on the receiving the second uplink grant, the wireless device may start a second deactivation timer of the second cell.

In an example, the wireless device may deactivate the first cell based on the first deactivation timer of the first cell expiring.

In an example, the wireless device may deactivate the second cell based on the second deactivation timer of the second cell expiring.

In an example, the first uplink grant is for a first uplink transmission on the first cell (e.g., via an uplink component carrier of the first cell).

In an example, the wireless device may receive a first downlink assignment for the first cell, the downlink assignment indicating a downlink transmission on the first cell (e.g., via a downlink component carrier of the first cell). The wireless device may start the first deactivation timer of the first cell based on the receiving the first downlink assignment.

In an example embodiment, a wireless device may determine consistent uplink LBT failures on one or more cells. The wireless device may trigger an uplink LBT failure indication based on the determining. The wireless device may transmit an uplink LBT failure indication MAC CE based on the determining. The wireless device may stop a deactivation timer of a cell of the one or more cells based on the determining the consistent uplink LBT failures. In an example, the wireless device may stop the deactivation timer of the cell of the one or more cells based on the triggering the uplink LBT failure indication. In an example, the wireless device may stop the deactivation timer of the cell of the one or more cells based on transmitting the uplink failure indication MAC CE.

In an example, the one or more cells for which consistent LBT failures is determined may comprise one or more secondary cells. The cell may be a first secondary cell in the one or more secondary cells.

In an example, the wireless device may receive a command for recovery from consistent LBT failures on the cell. The wireless device may start the deactivation timer of the cell based on the receiving the command.

In an example embodiment, a wireless device may determine a plurality of configured grant resources on a first cell based on a configured grant configuration. The wireless device may determine consistent uplink LBT failures on the first cell. In an example, the wireless device may trigger an uplink LBT failure indication based on the determining. In an example, the wireless device may transmit an LBT failure indication MAC CE based on the determining. The wireless device may skip uplink transmissions via first plurality of resource of the plurality of configured grant resources that are/occur after the determining the consistent uplink LBT failures. In an example, the wireless device may skip uplink transmissions via first plurality of resource of the plurality of configured grant resources that are/occur after the triggering the uplink failure indication. In an example, the wireless device may skip uplink transmissions via first plurality of resource of the plurality of configured grant resources that are/occur after the transmitting the uplink failure indication MAC CE. In an example, the wireless device may suspend transmissions via the configured grant resources based on the determining the consistent uplink LBT failures. In an example, the wireless device may suspend transmissions via the configured grant resources based on the triggering the uplink LBT failure indication. In an example, the wireless device may suspend transmissions via the configured grant resources based on the transmitting the uplink LBT failure indication MAC CE.

In an example embodiment, a wireless device may determine consistent uplink LBT failures on one or more cells. The wireless device may receive a downlink control information indicating an uplink grant. The wireless device may transmit, based on the uplink grant, a transport block comprising an LBT failure indication MAC CE indicating the consistent uplink LBT failures on the one or more cells, wherein the transport blocks includes no data (e.g., no MAC SDU and/or no data from logical channels).

In an example embodiment, a wireless device may determine consistent uplink LBT failures on one or more cells. The wireless device may trigger an uplink LBT failure indication based on the determining. In an example, the wireless device may create an uplink LBT failure indication MAC CE based on the determining. In an example, the wireless device may transmit an uplink LBT failure indication MAC CE based on the determining. The wireless device may receive an uplink grant for a first cell of the one or more cells. The wireless device may not generate and/or ignore/skip transmission of a transport based on the uplink grant in response to the determining the consistent uplink LBT failures on the first cell. In an example, the wireless device may not generate and/or ignore/skip transmission of a transport based on the uplink grant in response to the triggering the uplink LBT failure indication. In an example, the wireless device may not generate and/or ignore/skip transmission of a transport based on the uplink grant in response to the transmission of the LBT failure indication MAC CE.

In an example embodiment, a wireless device may create a first MAC CE, indicating consistent uplink LBT failures on one or more first cells, for a transmission at a first timing. The wireless device may create, before the first timing, a second MAC CE, indicating consistent LBT failures on the one or more first cells and one or more second cells, for transmission at a second timing, later than the first timing, wherein the creating the second MAC CE is based on assuming that a first LBT for the first transmission fails.

In an example embodiment, a wireless device may create a first MAC CE, indicating consistent uplink LBT failures on one or more first cells, for a transmission at a first timing. The wireless device may create, before the first timing, a second MAC CE, indicating consistent LBT failures on one or more second cells, for transmission at a second timing, later than the first timing, wherein the creating the second MAC CE is based on assuming that a first LBT for the first transmission is successful.

In an example, the second MAC CE indicates consistent uplink LBT failures on the one or more second cells; and does not indicate the consistent uplink LBT failures on the one or more first cells.

In an example embodiment, a wireless device may determine consistent uplink LBT failures one or more cells. The wireless device may transmit, to a base station, an LBT failure indication MAC CE indicating the consistent uplink LBT failures on the one or more cells. The wireless device may receive a command, from the base station, based on the transmitting the LBT failure indication MAC CE. The wireless device may trigger a power headroom report (PHR) based on the receiving the command. The wireless device may transmit the PHR.

In an example, the command may indicate a switch from a first bandwidth part of a first cell to a second bandwidth part of the first cell, wherein the first cell may be one of the one or more cells with consistent LBT failures. In an example, the PHR may comprise a first power headroom associated with the first cell. In an example, the first power headroom may be associated with an uplink shared/data channel transmission.

In an example, the command may be received via a downlink control information. In an example, the downlink control information may be received via a downlink control channel.

In an example embodiment, a wireless device may determine consistent LBT failures on one or more cells. The wireless device may trigger an uplink LBT failure indication based on the determining. In an example, the wireless device may transmit an uplink LBT failure indication MAC CE based on the determining. The wireless device may perform one or more processes based on the determining the consistent uplink LBT failures. In an example, the wireless device may perform one or more processes based on the triggering the uplink failure indication. In an example, the wireless device may perform one or more processes based on the transmitting the uplink LBT failure indication MAC CE. The one or more processes may comprise at least one of: flushing HARQ buffers for the cell; releasing an uplink control channel (e.g., PUCCH) for the cell; releasing SRS for the cell; clearing configured uplink grants or downlink assignments for the cell; clearing PUSCH resources for semi-persistent CSI reporting; maintaining $N_{TA}$ for a time alignment group comprising the cell; considering a time alignment timer for the time alignment group comprising the cell as expired.

In an example embodiment, a wireless device may determine consistent uplink LBT failures on a first cell that is a timing reference for one or more cells in a time alignment group. The wireless device may trigger an uplink LBT failure indication based on the determining. In an example, the wireless device may transmit an uplink LBT failure indication MAC CE based on the determining. The wireless device may perform one or more processes based on the determining the consistent uplink LBT failures. In an example, the wireless device may perform one or more processes based on the triggering the uplink failure indication. In an example, the wireless device may perform one or more processes based on the transmitting the uplink LBT failure indication MAC CE. The one or more processes may comprise at least one of: flushing HARQ buffers for the one or more cells; releasing uplink control channel (e.g., PUCCH) for the one or more cells; releasing SRS for the one or more cells; clearing configured uplink grants or downlink assignments for the one or more cells; clearing PUSCH resources for semi-persistent CSI reporting on the one or more cells; maintaining $N_{TA}$ for the time alignment group; considering a time alignment timer for the time alignment group as expired.

In an example embodiment, may determine consistent uplink LBT failures on a primary cell. The wireless device may trigger an uplink LBT failure indication based on the determining. The wireless device may transmit an uplink LBT failure indication MAC CE based on the determining. The wireless device may perform one or more processes based on the determining the consistent uplink LBT failures on the primary cell. In an example, the wireless device may perform one or more processes based on the triggering the uplink failure indication due the determining the consistent LBT failures on the primary cell. In an example, the wireless device may perform one or more processes based on the transmitting the uplink LBT failure indication MAC CE indicating consistent uplink LBT failures on the primary cell. The one or more processes may comprise flushing HARQ buffers for one or more cells; releasing uplink control channel (e.g., PUCCH) for one or more cells; releasing SRS for one or more cells; clearing configured uplink grants or downlink assignments for one or more cells; clearing PUSCH resources for semi-persistent CSI reporting on one or more cells; considering a time alignment timer for the time alignment group as expired.

In an example, the one or more cells may be one or more cells configured for the wireless device.

Figure 36:
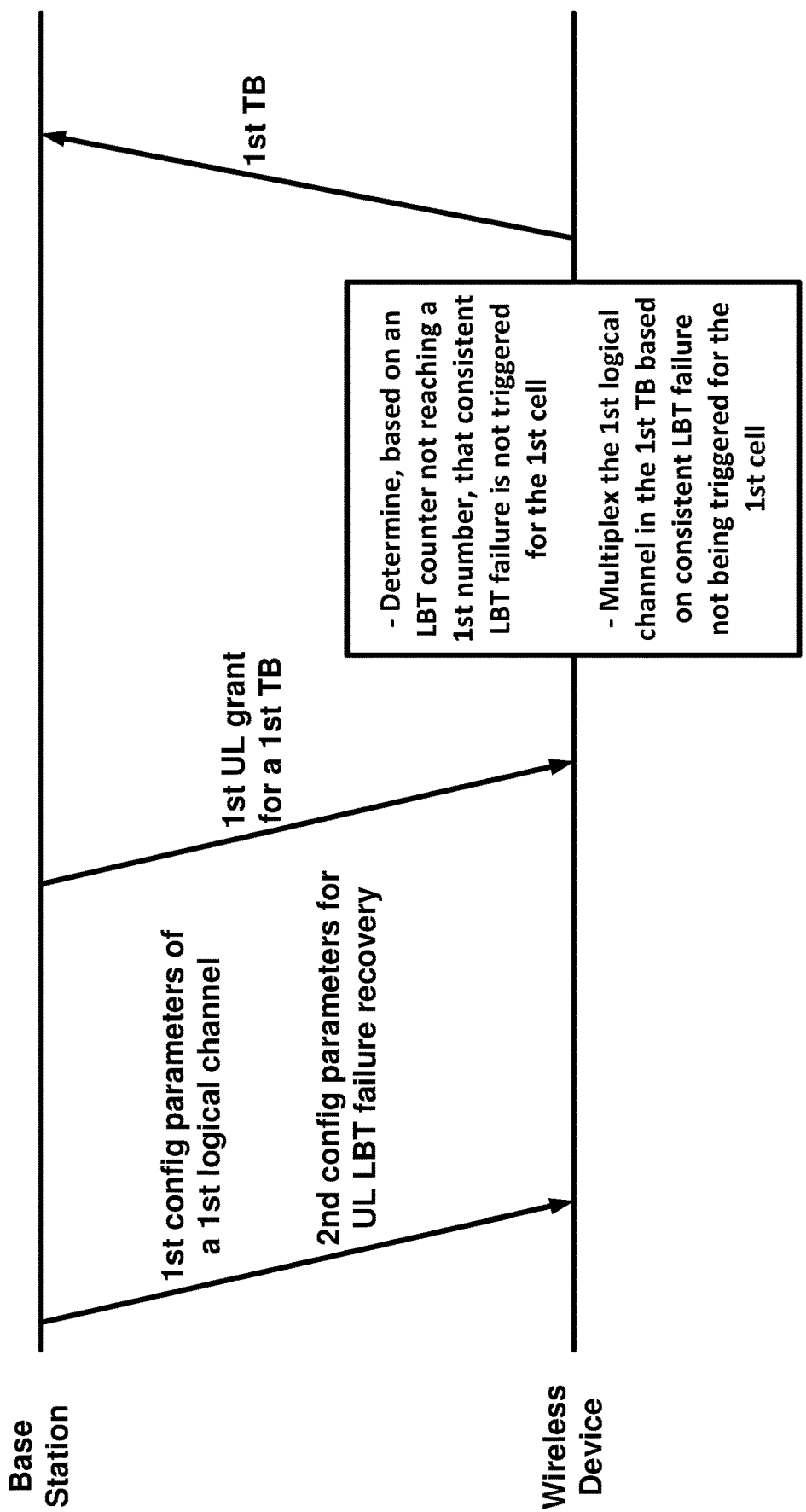
FIG. 36 shows an example multiplexing process in accordance with several of various embodiments of the present disclosure.

In an example embodiment as shown in FIG. 36, a wireless device may receive one or more messages (e.g., one or more RRC messages) comprising configuration parameters. The one or more messages may comprise configuration parameters of one or more cells. The one or more cells may comprise a primary cell. In an example, the one or more cells may comprise a primary cell and one or more secondary cells. A cell in the one or more cells may be an unlicensed cell (e.g., may operate in an unlicensed or shared spectrum). The one or more cells may comprise a first cell. The first cell may be an unlicensed cell or a cell for operation in unlicensed/shared spectrum. The one or more messages may comprise first configuration parameters of a first logical channel. The first configuration parameters may comprise parameters used in a logical channel prioritization procedure (e.g., a priority, a prioritized bit rate, a bucket size duration, allowed serving cells, allowed subcarrier spacing, a maximum PUSCH duration), a logical channel group identifier, a scheduling request identifier, channel access priority, etc. The one or more messages may further comprise second configuration parameters for uplink LBT failure recovery. The second configuration parameters may comprise a first parameter used for determining after how many consistent uplink LBT failure events the UE triggers uplink LBT failure recovery. The second configuration parameters may further comprise a timer value for an LBT failure detection timer used for consistent LBT failure detection.

The wireless device may receive a first uplink grant for transmission of a first TB via the first cell. The wireless device may receive a DCI comprising the uplink grant. The first uplink grant may indicate transmission parameters for transmission of the first TB. The transmission parameters may comprise radio resources (e.g., time and/or frequency domain resource allocation parameters) for transmission of the first TB, HARQ related parameters (HARQ process ID, RV, NDI, etc.), power control related parameters, etc. The wireless device may create the first TB by multiplexing one or more logical channels and/or one or more MAC CEs in the first TB. The wireless device may multiplex the one or more logical channels and/or the one or more MAC CEs in the first TB based on a logical channel prioritization (LCP) procedure. The LCP procedure may comprise selecting one or more logical channels and/or one or more MAC CEs. The selecting of the one or more logical channels and/or the one or more MAC CEs for a TB scheduled by an uplink grant may be based on whether consistent LBT failures is triggered for a cell for which the uplink grant is received. The wireless device may determine to multiplex the first logical channel in the first TB based on consistent LBT failures not being triggered for the first cell. The determination to multiplex the first logical channel in the first TB may be based on the first configuration parameters of the first logical channel. For example, the first configuration parameters may comprise a first parameter indicating that the first logical channel is mapped to (e.g., is allowed to be transmitted via) a cell for which consistent LBT failures is not triggered. For example, the first configuration parameters may comprise a first parameter indicating that the first logical channel is not mapped to (e.g., is not allowed to be transmitted via) a cell for which consistent LBT failures is triggered. For example, the first configuration parameters may comprise a first parameter indicating that the first logical channel is mapped to (e.g., is allowed to be transmitted via resources of) an unlicensed cell but is not mapped to (e.g., is not allowed to be transmitted via) a cell for which consistent LBT failures is triggered. For example, the first configuration parameters of the first logical channel may comprise a parameter indicating that the first logical channel is associated with a service type (e.g., URLLC) indicating that the first logical channel may not be mapped to (e.g., transmitted via resources of) a cell for which consistent LBT failures is triggered. The wireless device may determine that consistent LBT failures is not triggered for the first cell based on the second configuration parameters for the uplink LBT failure recovery. The wireless device may determine that an LBT counter has not reached a first number (e.g., indicated by the first parameter in the second configuration parameters for the uplink LBT recovery configuration). The wireless device may create the first TB using the LCP procedure. The wireless device may transmit the first TB based on the uplink grant, e.g., using the transmission parameters indicated by the uplink grant and via the radio resources indicated by the uplink grant.

In an example, the wireless device may receive a second uplink grant for transmission of a second TB via the first cell. The second uplink grant may comprise transmission parameters for transmission of the second TB (e.g., radio resources (e.g., via time/frequency domain resource allocation parameters). HARQ related parameters, power control related parameters, etc.). The wireless device may use the logical channel prioritization procedure and may multiplex one or more second logical channels in the second TB. The wireless device may not multiplex the first logical channel in the second TB based on consistent LBT failures being triggered for the first cell. For example, the first configuration parameters of the first cell may comprise a first parameter indicating that the first logical channel is not mapped (e.g., is not allowed to be transmitted via) a cell for which consistent LBT failures is triggered. The wireless device may exclude the first logical channel for multiplexing in the second TB based on the first parameter of the first configuration parameters.

In an example, the one or more messages, received by the wireless device, may further comprise third configuration parameters of a radio bearer. The radio bearer may correspond to a plurality of RLC entities including a first RLC entity and a second RLC entity. The first RLC entity may be associated with the first logical channel and the second RLC entity may be associated with a second logical channel. In an example, the radio bearer may be configured/activated with PDCP packet duplication. The first logical channel may be mapped to the first cell (for example, the allowed serving cells parameter, in the first configuration parameters of the first logical channel, may indicate a list of serving cells comprising the first cell). The second logical channel may be mapped to a second cell. In an example, the wireless device may transmit data of the first logical channel via the first cell. In an example, the wireless device may transmit data of the first logical channel via the first cell except while the first cell is triggered for consistent LBT failures.

In an example, the consistent LBT failures may be triggered for a first BWP of the first cell, e.g., based on failed LBT procedures for uplink transmissions on the first BWP of the first cell and while the first BWP is an active BWP of the first cell. In an example, the wireless device may switch from the first BWP of the first cell to a second BWP of the first cell as the active BWP of the first cell. In response to switching the BWP, the wireless device may multiplex the first logical in a third TB scheduled for transmission via the first cell (e.g., via the second BWP of the first cell) after switching from the first BWP to the second BWP.

In an example, the wireless device may further multiplex a first control element (e.g., a first MAC CE) in the first TB based on the first cell not being triggered for consistent LBT failures. The first MAC CE may be mapped to (e.g., allowed to be transmitted via resources of) a cell for which consistent LBT failures is not triggered. The first MAC CE may not be mapped to (e.g., may not be allowed to be transmitted via resources of) a cell for which consistent LBT failures is triggered. In an example, the first MAC CE may be an LBT failure MAC CE. In an example, the first MAC CE may be a beam failure recovery (BFR) MAC CE. In an example, a second MAC CE, different from the first MAC CE, may be mapped to (e.g., may be allowed to be transmitted via resources of) for which consistent LBT failures is triggered. For example, the configuration parameters of the second logical channel may indicate that the second logical channel is mapped to (e.g., allowed to be transmitted via resources of) a cell for which consistent LBT failures is triggered. In an example, the wireless device may receive a second uplink grant for transmission of a second TB via the first cell. The wireless device may not multiplex the first MAC CE in the second TB. The wireless device may multiplex the second MAC CE in the second TB.

In accordance with various exemplary embodiments in the present disclosure, a device (e.g., a wireless device, a base station and/or alike) may include one or more processors and may include memory that may store instructions. The instructions, when executed by the one or more processors, cause the device to perform actions as illustrated in the accompanying drawings and described in the specification. The order of events or actions, as shown in a flow chart of this disclosure, may occur and/or may be performed in any logically coherent order. In some examples, at least two of the events or actions shown may occur or may be performed at least in part simultaneously and/or in parallel. In some examples, one or more additional events or actions may occur or may be performed prior to, after, or in between the events or actions shown in the flow charts of the present disclosure.

Figure 37:
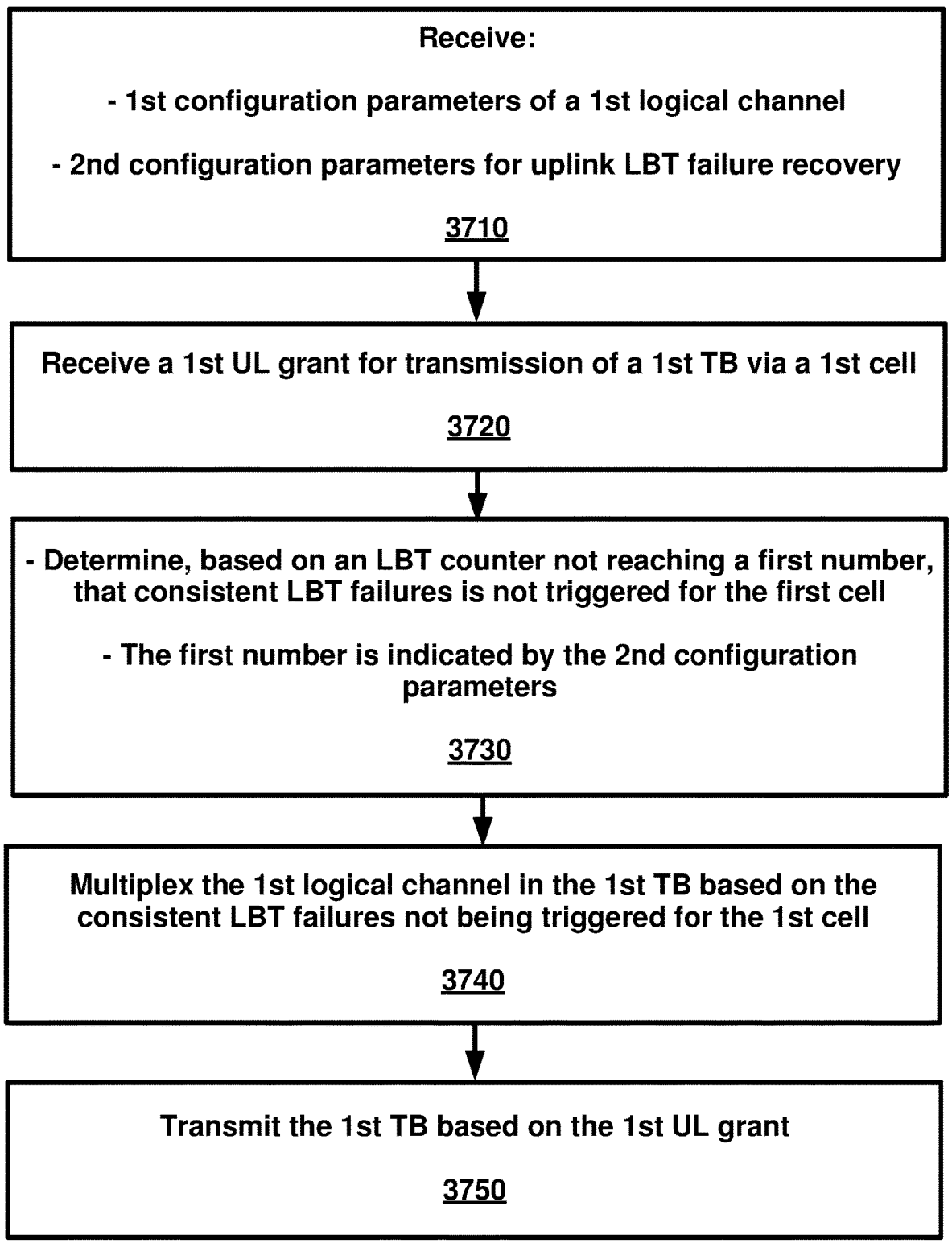
FIG. 37 shows an example flow diagram in accordance with several of various embodiments of the present disclosure.

FIG. 37 shows an example flow diagram in accordance with several of various embodiments of the present disclosure. At 3710, a wireless device may receive: first configuration parameters of a first logical channel; and second configuration parameters for uplink listen-before-talk (LBT) failure recovery. At 3720, the wireless device may receive a first uplink grant for transmission of a first transport block (TB) via a first cell. At 3730, the wireless device may determine, based on an LBT counter not reaching a first number, that consistent LBT failures is not triggered for the first cell, wherein the first number may be indicated by the second configuration parameters. At 3740, the wireless device may multiplex the first logical channel in the first TB based on the consistent LBT failures not being triggered for the first cell. At 3750, the wireless device may transmit the first TB based on the first uplink grant.

In an example embodiment, the first configuration parameters, received at 3710, may comprise a first parameter indicating that the first logical channel is mapped to a cell for which the consistent LBT failures is not triggered.

In an example embodiment, the first configuration parameters, received at 3710, may comprise a first parameter indicating that the first logical channel is not mapped to a cell for which the consistent LBT failures is triggered.

In an example embodiment, the wireless device may receive a second uplink grant for transmission of a second TB via the first cell. The wireless device may multiplex one or more second logical channels in the second TB. The one or more second logical channels may not comprise the first logical channel based on the consistent LBT failures being triggered for the first cell. In an example embodiment, the wireless device may receive third configuration parameters of a radio bearer corresponding to a plurality of radio link control (RLC) entities comprising a first RLC entity and a second RLC entity. The first RLC entity may be associated with the first logical channel that is mapped to the first cell. The second RLC entity may be associated with a second logical channel that is mapped to a second cell. In an example embodiment, the first configuration parameters, received at 3710, may comprise a first parameter indicating that the first logical channel is mapped to the first cell. In an example embodiment, the third configuration parameters may comprise a first parameter indicating that packet duplication is configured for the radio bearer. In an example embodiment, the wireless device may switch from a first bandwidth part of the first cell to a second bandwidth part of the first cell based on the consistent LBT failures being triggered for the first cell. The wireless device may multiplex the first logical channel in a third TB scheduled for transmission via the first cell after the switching.

In an example embodiment, the wireless device may multiplex a first control element in the first TB based on the consistent LBT failures not being triggered for the first cell. In an example embodiment, the wireless device may receive a second uplink grant for transmission of a second TB via the first cell. The first control element may not be multiplexed in the second TB based on the consistent LBT failures being triggered for the first cell. In an example embodiment, the first control element may be a beam failure recovery medium access control (MAC) control element. In an example embodiment, the first control element may be an LBT failure medium access control (MAC) control element.

In an example embodiment, the first logical channel, for which the configuration parameters are received at 3710, may be associated with a first service type.

In an example embodiment, the second configuration parameters, received at 3710, may comprise a parameter indicating the first number. In an example embodiment, the first number may be for determining after how many consistent uplink LBT failure events the wireless device may trigger uplink LBT failure recovery.

In an example embodiment, the multiplexing the first logical channel in the first TB, at 3740, may be based on a logical channel prioritization procedure. The logical channel prioritization procedure may comprise selecting one or more logical channels and one or more control elements for an uplink grant of a cell. The selecting may be based on whether consistent LBT failures is triggered for the cell.

In an example embodiment, the first configuration parameters, received at 3710, may indicate that: the first logical channel is allowed to be transmitted via an unlicensed cell; and the first logical channel is not allowed to be transmitted via an unlicensed cell for which consistent LBT failures is triggered.

Figure 38:
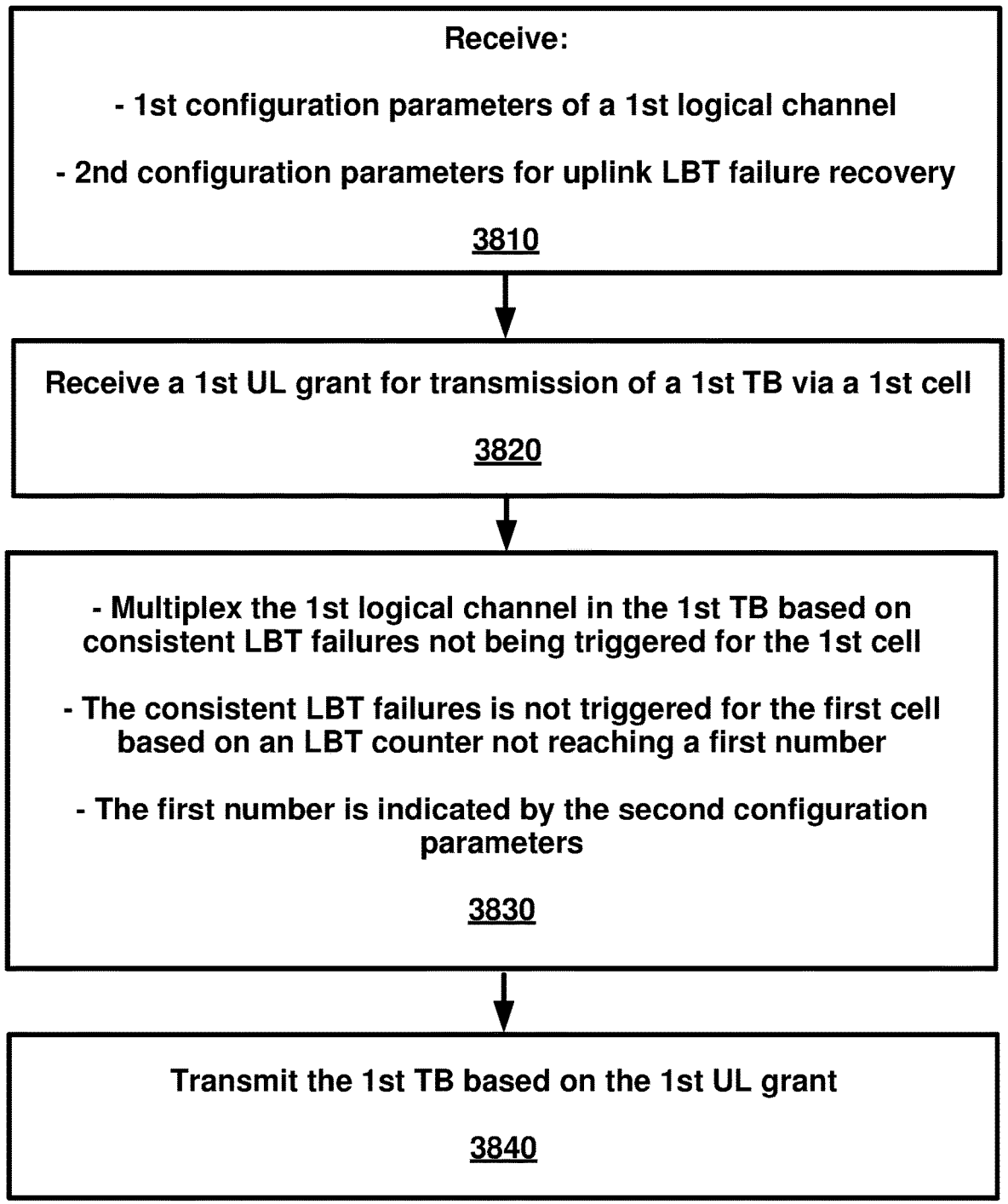
FIG. 38 shows an example flow diagram in accordance with several of various embodiments of the present disclosure.

FIG. 38 shows an example flow diagram in accordance with several of various embodiments of the present disclosure. At 3810, a wireless device may receive: first configuration parameters of a first logical channel; and second configuration parameters for uplink listen-before-talk (LBT)

failure recovery. At 3820, the wireless device may receive a first uplink grant for transmission of a first transport block (TB) via a first cell. At 3830, the wireless device may multiplex the first logical channel in the first TB based on consistent LBT failures not being triggered for the first cell, wherein: the consistent LBT failures may not be triggered for the first cell based on an LBT counter not reaching a first number; and the first number may be indicated by the second configuration parameters. At 3840, the wireless device may transmit the first TB based on the first uplink grant.

Figure 39:
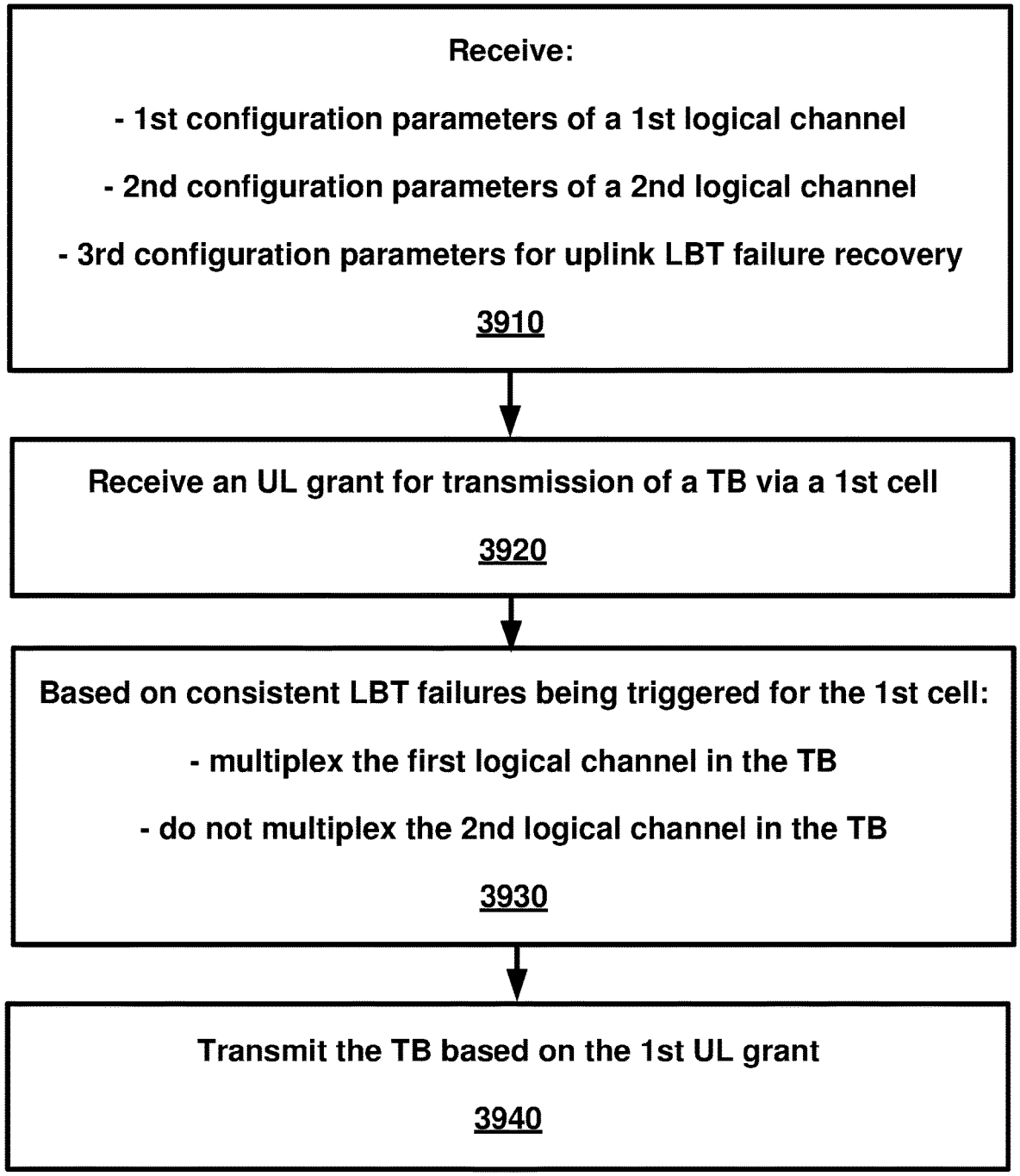
FIG. 39 shows an example flow diagram in accordance with several of various embodiments of the present disclosure.

FIG. 39 shows an example flow diagram in accordance with several of various embodiments of the present disclosure. At 3910, a wireless device may receive: first configuration parameters of a first logical channel; second configuration parameters of a second logical channel; and third configuration parameters for uplink listen-before-talk (LBT) failure recovery. At 3920, the wireless device may receive an uplink grant for transmission of a transport block (TB) via a first cell. At 3930, based on consistent LBT failures being triggered for the first cell: the wireless device may multiplex the first logical channel in the TB; and may not multiplex the second logical channel in the TB. At 3940, the wireless device may transmit the TB based on the uplink grant.

In an example embodiment, the first configuration parameters, received at 3910, may indicate that the first logical channel is mapped to a cell with consistent LBT failures. The second configuration parameters, received at 3910, may indicate that the second logical channel is not mapped to a cell with consistent LBT failures.

Figure 40:
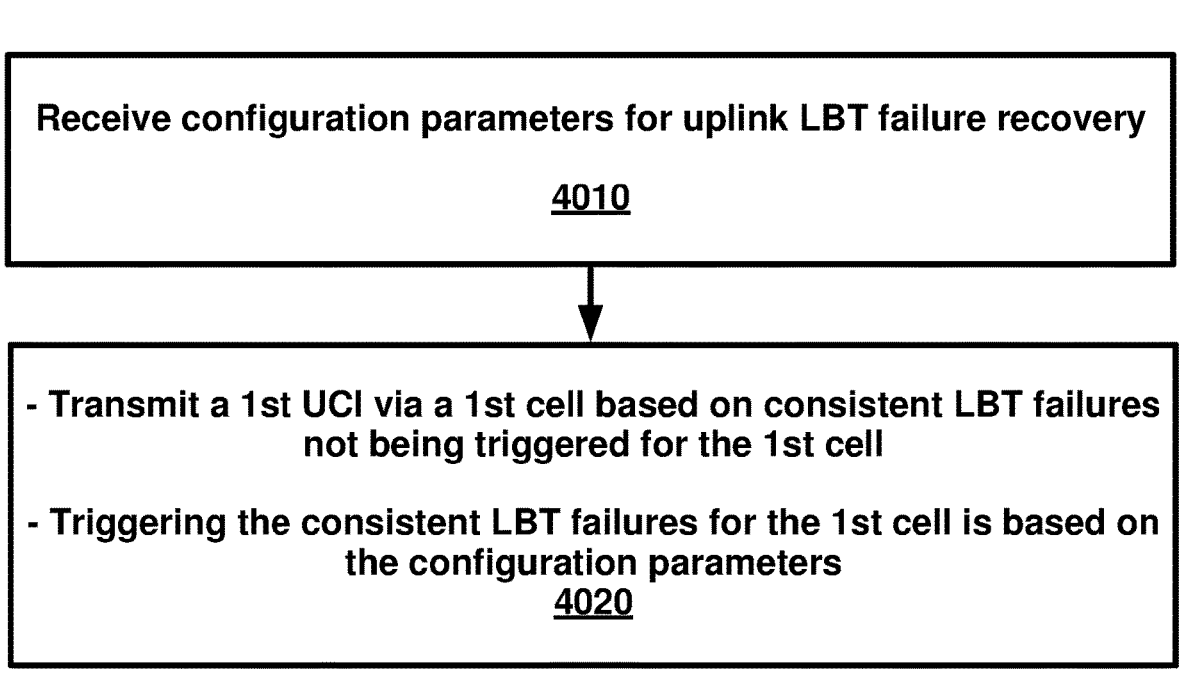
FIG. 40 shows an example flow diagram in accordance with several of various embodiments of the present disclosure.

FIG. 40 shows an example flow diagram in accordance with several of various embodiments of the present disclosure. At 4010, a wireless device may receive configuration parameters for uplink listen-before-talk (LBT) failure recovery. At 4020, the wireless device may transmit a first uplink control information via a first cell based on consistent LBT failures not being triggered for the first cell, wherein a triggering of the consistent LBT failures for the first cell may be based on the configuration parameters.

In an example embodiment, the wireless device may drop a second uplink control information scheduled for transmission via the first cell based on consistent LBT failures being triggered for the first cell.

In an example, the first uplink control information, transmitted at 4020, may comprise a channel state information report. In an example embodiment, the wireless device may receive a channel state information report request for the first cell. In an example embodiment, the receiving the channel state information report request may be based on receiving a downlink control information. A value of a field of the downlink control may indicate the request for the channel state information report for the first cell. In an example embodiment, the receiving the channel state information report request may be based on a medium access control (MAC) control element (CE). In an example embodiment, the channel state information report may be a semi-persistent channel state information report. In an example embodiment, the wireless device may receive an activation command indicating activation of semi-persistent channel state information reporting. In an example embodiment, the activation command may be based on one of a downlink control information and a MAC CE. In an example embodiment, the channel state information report may be a periodic channel state information report.

In an example embodiment, the transmitting the first uplink control information, at 4020, may be via one of an uplink data channel or an uplink control channel.

Figure 41:
FIG. 41 shows an example flow diagram in accordance with several of various embodiments of the present disclosure.

FIG. 41 shows an example flow diagram in accordance with several of various embodiments of the present disclosure. At 4110, a wireless device may receive configuration parameters for uplink listen-before-talk (LBT) failure recovery. At 4120, the wireless device may transmit a first sounding reference signal via a first cell based on consistent LBT failures not being triggered for the first cell, wherein a triggering of the consistent LBT failures for the first cell may be based on the configuration parameters.

In an example embodiment, the wireless device may drop a second sounding reference signal scheduled for transmission via the first cell based on consistent LBT failures being triggered for the first cell.

In an example embodiment, the wireless device may receive a sounding reference signal request for the first cell. In an example embodiment, the receiving the sounding reference signal request may be based on receiving a downlink control information. A value of a field of the downlink control may indicate the request for the sounding reference signal for the first cell. In an example embodiment, the receiving the sounding reference signal request may be based on a medium access control (MAC) control element (CE).

In an example embodiment, the first sounding reference signal, transmitted at 4120, may be a semi-persistent sounding reference signal. In an example embodiment, the wireless device may receive an activation command indicating activation of semi-persistent sounding reference signal. In an example embodiment, the activation command may be based on one of a downlink control information and a MAC CE.

In an example embodiment, the first sounding reference signal, transmitted at 4120, may be a periodic sounding reference signal.

In an example embodiment, the transmitting the first sounding reference signal, at 4120, may be via one of an uplink data channel or an uplink control channel.

Figure 42:
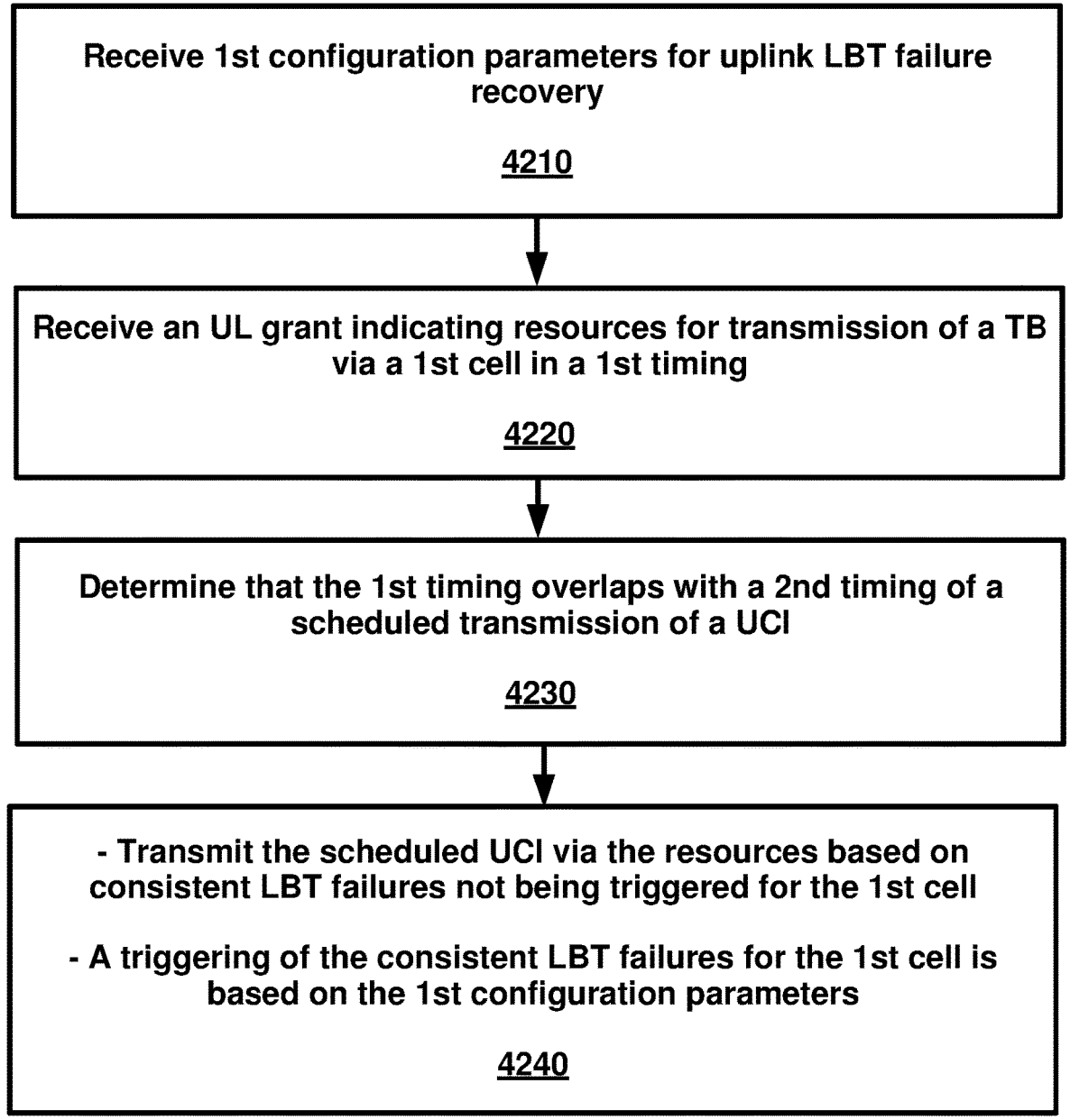
FIG. 42 shows an example flow diagram in accordance with several of various embodiments of the present disclosure.

FIG. 42 shows an example flow diagram in accordance with several of various embodiments of the present disclosure. At 4210, a wireless device may receive first configuration parameters for uplink listen-before-talk (LBT) failure recovery. At 4220, the wireless device may receive an uplink grant indicating resources for transmission of a transport block via a first cell in a first timing. At 4230, the wireless device may determine that the first timing overlaps with a second timing of a scheduled transmission of an uplink control information (UCI). At 4240, the wireless device may transmit the scheduled UCI via the resources based on consistent LBT failures not being triggered for the first cell, wherein a triggering of the consistent LBT failures for the first cell may be based on the first configuration parameters.

In an example embodiment, the wireless device may further receive, at 4210, second configuration parameters indicating the second timing.

In an example embodiment, the transmitting the scheduled UCI via the resources, at 4240, may be based on a multiplexing process.

In an example embodiment, the UCI may be scheduled for transmission via an uplink control channel.

In an example embodiment, the first timing, at 4230, may overlap with the second timing in one or more symbols.

In an example embodiment, the uplink control information, transmitted at 4240, may comprise a channel state information report.

Figure 43:
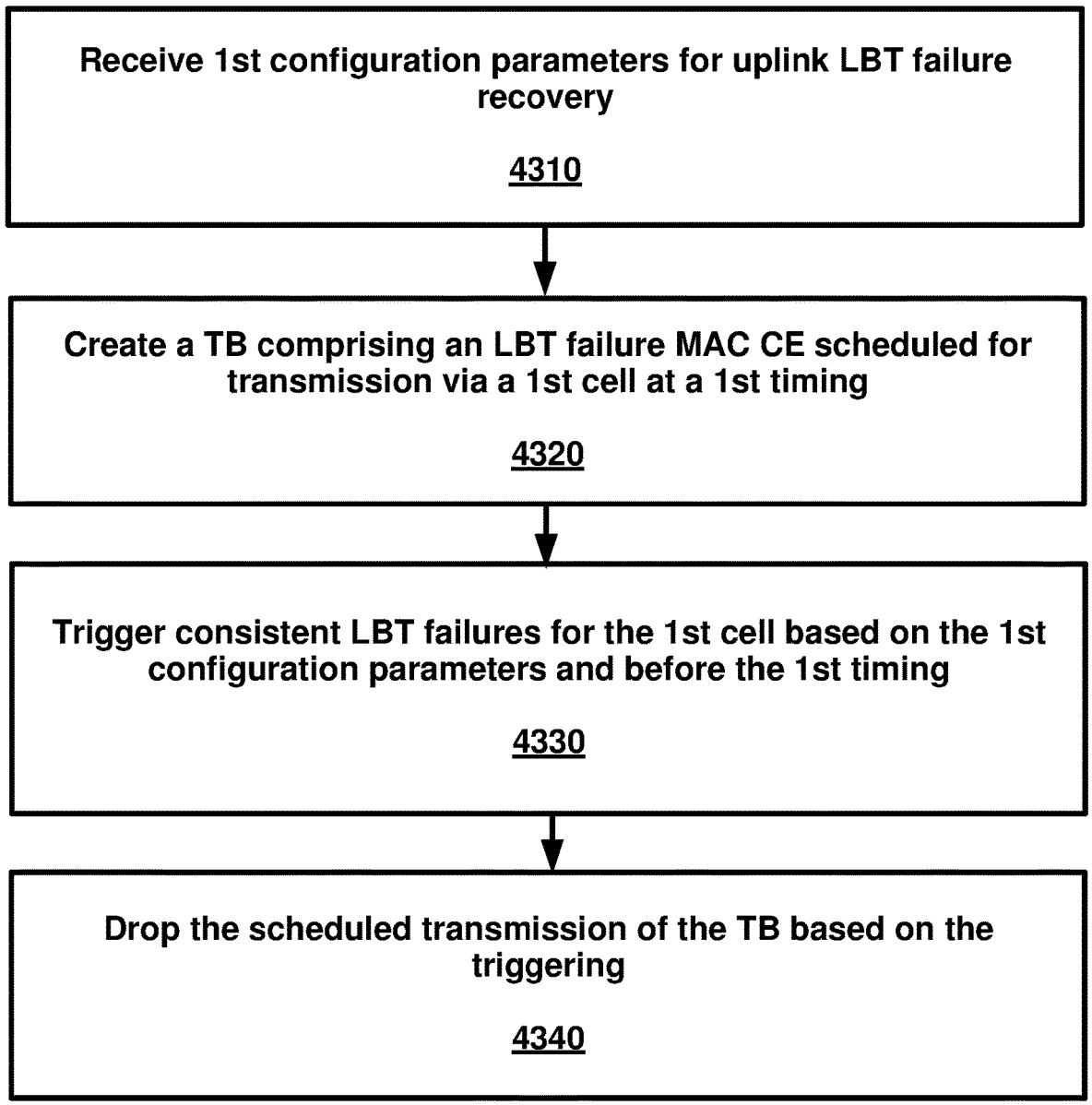
FIG. 43 shows an example flow diagram in accordance with several of various embodiments of the present disclosure.

FIG. 43 shows an example flow diagram in accordance with several of various embodiments of the present disclosure. At 4310, a wireless device may receive first configuration parameters for uplink listen-before-talk (LBT) failure recovery. At 4320, the wireless device may create a transport block comprising an LBT failure medium access control (MAC) control element (CE) scheduled for transmission via a first cell at a first timing. At 4330, the wireless device may trigger consistent LBT failures for the first cell based on the first configuration parameters and before the first timing. At 4340, the wireless device may drop the scheduled transmission of the transport block based on the triggering.

In an example embodiment, the dropping, at 4340, may further be based on a second timing of the triggering the consistent LBT failures for the first cell. In an example embodiment, the dropping, at 4340, may be based on a time duration between the second timing and the first timing.

In an example embodiment, the transport block may comprise one or more logical channels. The dropping, at 4340, may be based on the one or more logical channels.

Figure 44:
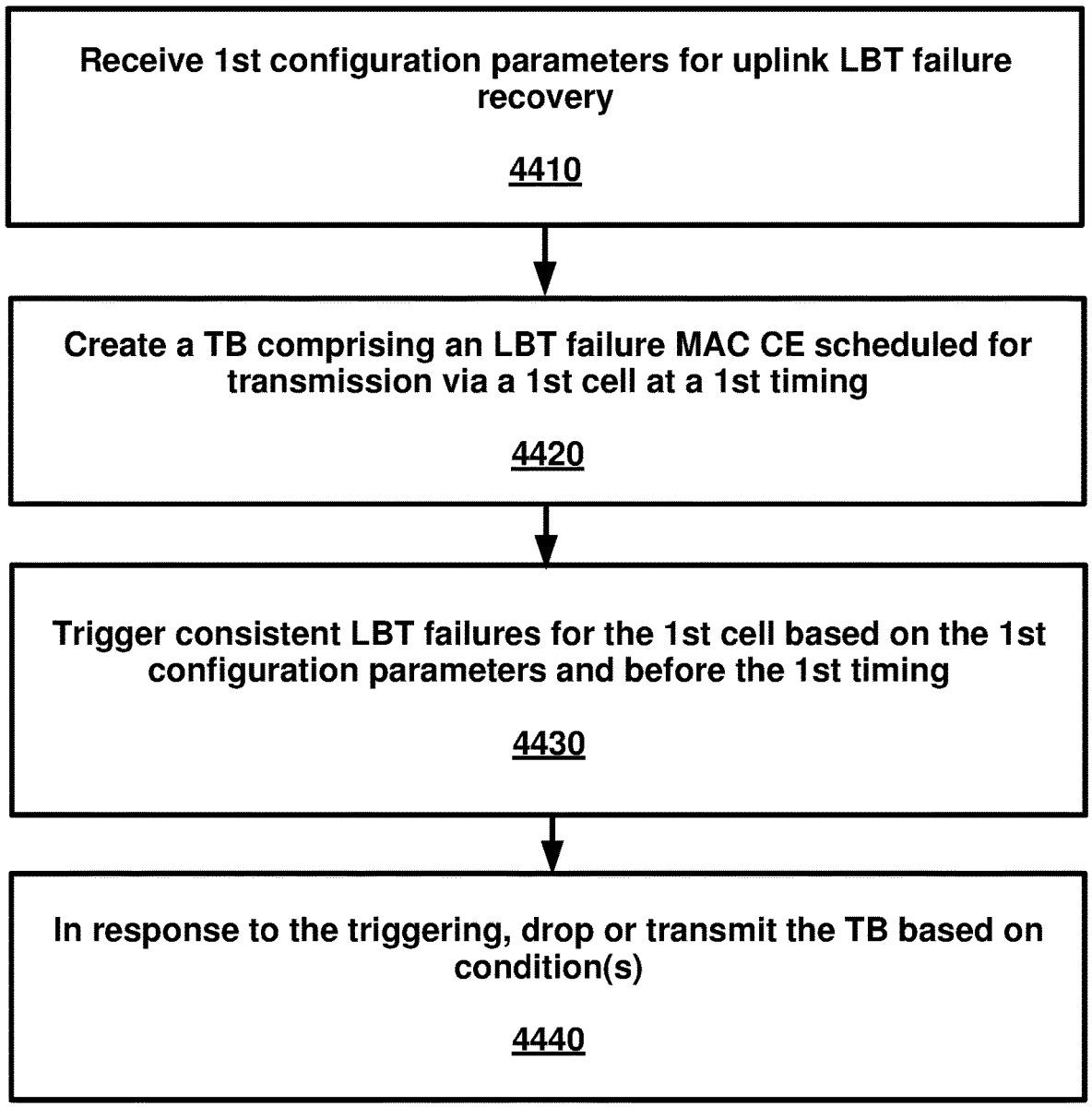
FIG. 44 shows an example flow diagram in accordance with several of various embodiments of the present disclosure.

FIG. 44 shows an example flow diagram in accordance with several of various embodiments of the present disclosure. At 4410, a wireless device may receive first configuration parameters for uplink listen-before-talk (LBT) failure recovery. At 4420, the wireless device may create a transport block comprising an LBT failure medium access control (MAC) control element (CE) scheduled for transmission via a first cell at a first timing. At 4430, the wireless device may trigger consistent LBT failures for the first cell based on the first configuration parameters and before the first timing. At 4440, in response to the triggering, the wireless device may drop or may transmit the transport block based on one or more conditions.

In an example embodiment, the transport block, created at 4420, may comprise one or more logical channels. The one or more conditions, at 4440, may be based on one or more configuration parameters of the one or more logical channels.

In an example embodiment, the triggering the consistent LBT failures, at 4430, may be at a second timing. The one or more conditions, at 4440, may be based on a duration between the second timing and the first timing.

Figure 45:
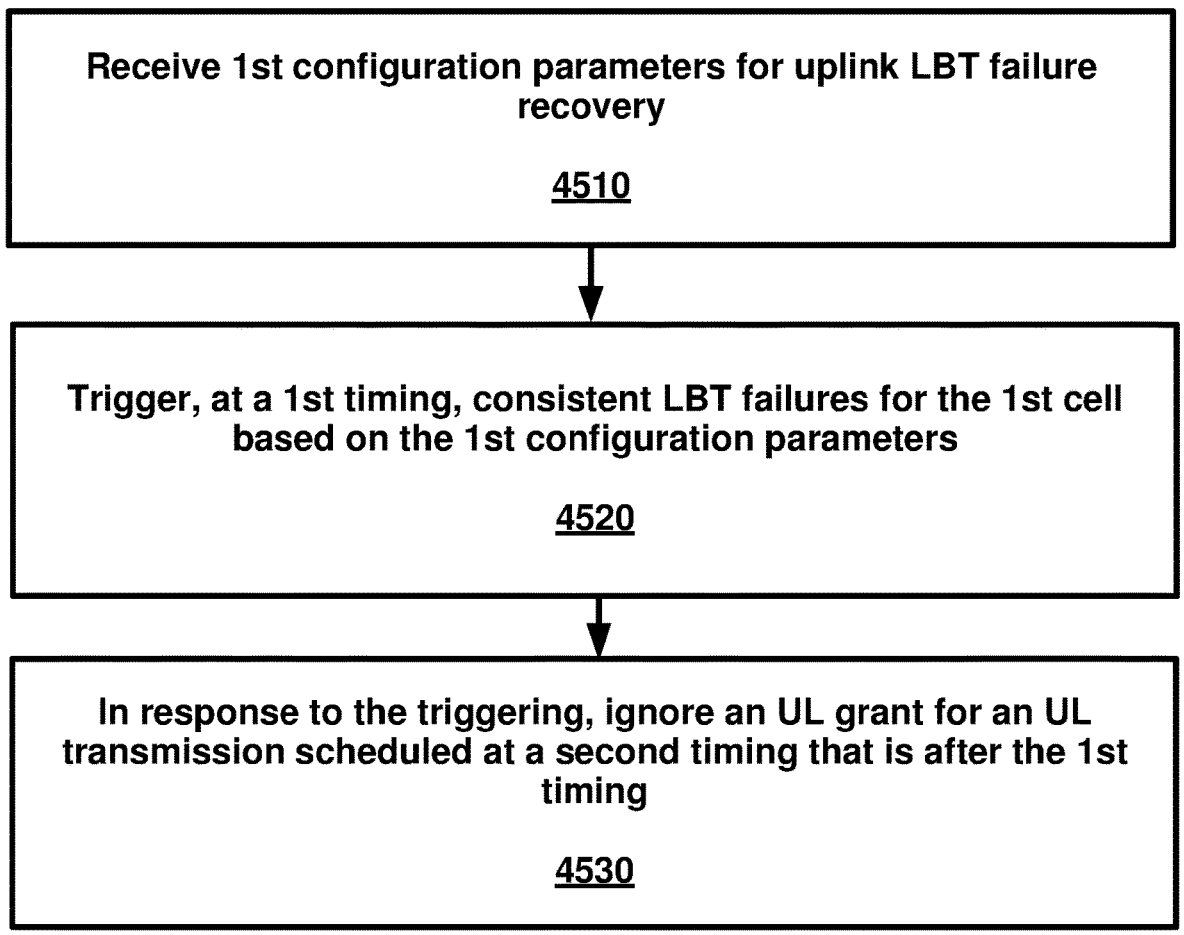
FIG. 45 shows an example flow diagram in accordance with several of various embodiments of the present disclosure.

FIG. 45 shows an example flow diagram in accordance with several of various embodiments of the present disclosure. At 4510, a wireless device may receive first configuration parameters for uplink listen-before-talk (LBT) failure recovery. At 4520, the wireless device may trigger, at a first timing, consistent LBT failures for a first cell based on the first configuration parameters. At 4530, in response to the triggering, the wireless device may ignore an uplink grant for an uplink transmission scheduled at a second timing that is after the first timing.

In an example embodiment, the ignoring the uplink grant, at 4530, may be based on the uplink grant being for a current active bandwidth part of the first cell and not indicating a bandwidth part switching.

Figure 46:
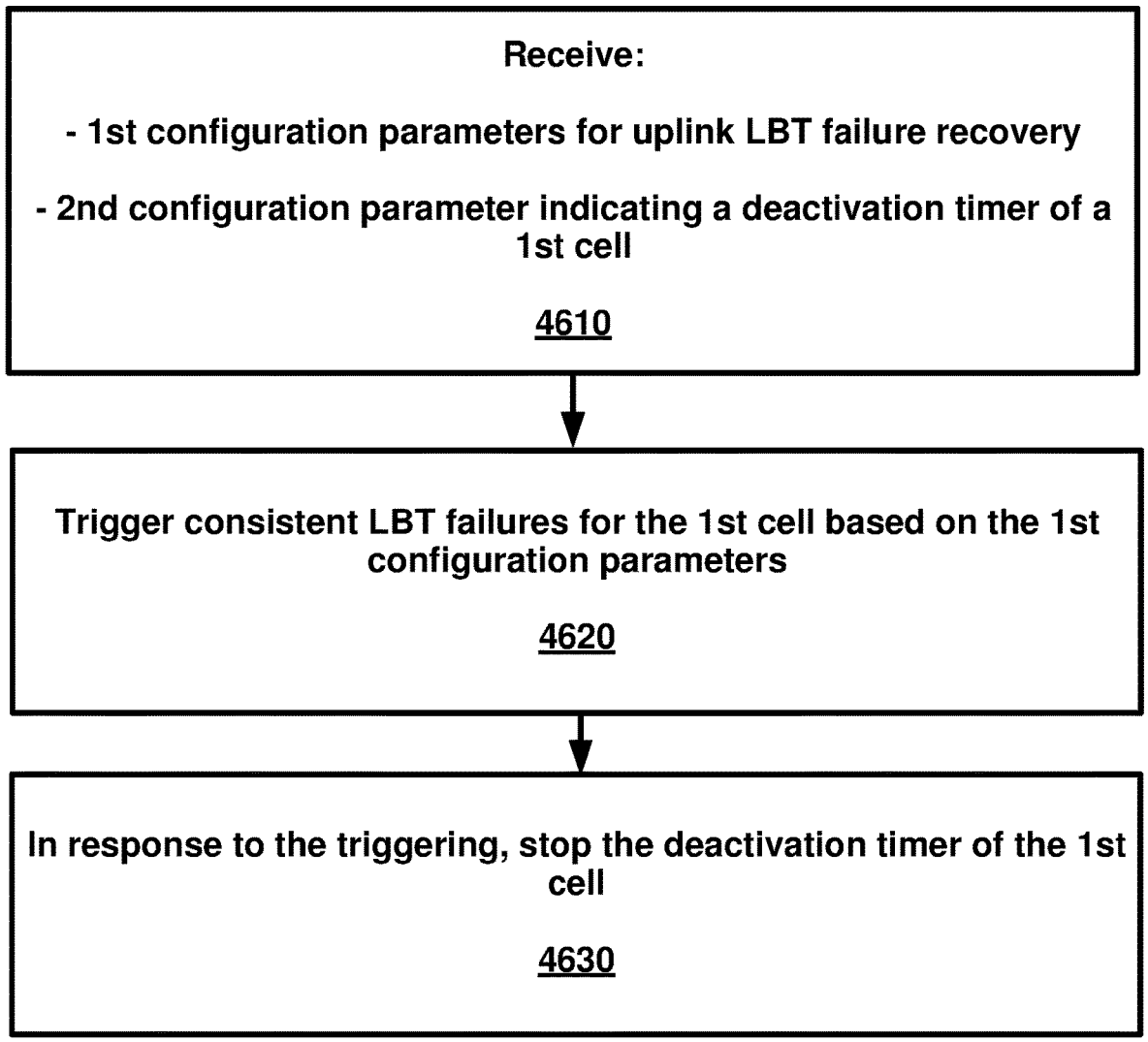
FIG. 46 shows an example flow diagram in accordance with several of various embodiments of the present disclosure.

FIG. 46 shows an example flow diagram in accordance with several of various embodiments of the present disclosure. At 4610, a wireless device may receive: first configuration parameters for uplink listen-before-talk (LBT) failure recovery; and a second configuration parameter indicating a deactivation timer of a first cell. At 4620, the wireless device may trigger consistent LBT failures for the first cell based on the first configuration parameters. At 4630, in response to the triggering, the wireless device may stop the deactivation timer of the first cell.

In an example embodiment, the wireless device may receive a command for LBT failure recovery. In an example embodiment, the wireless device may start, with a first value, the deactivation timer of the first cell in response to receiving the command, wherein the second configuration parameter, received at 4610, indicates the first value. In an example embodiment, the wireless device may deactivate the first cell based on the deactivation timer of the first cell expiring.

Figure 47:
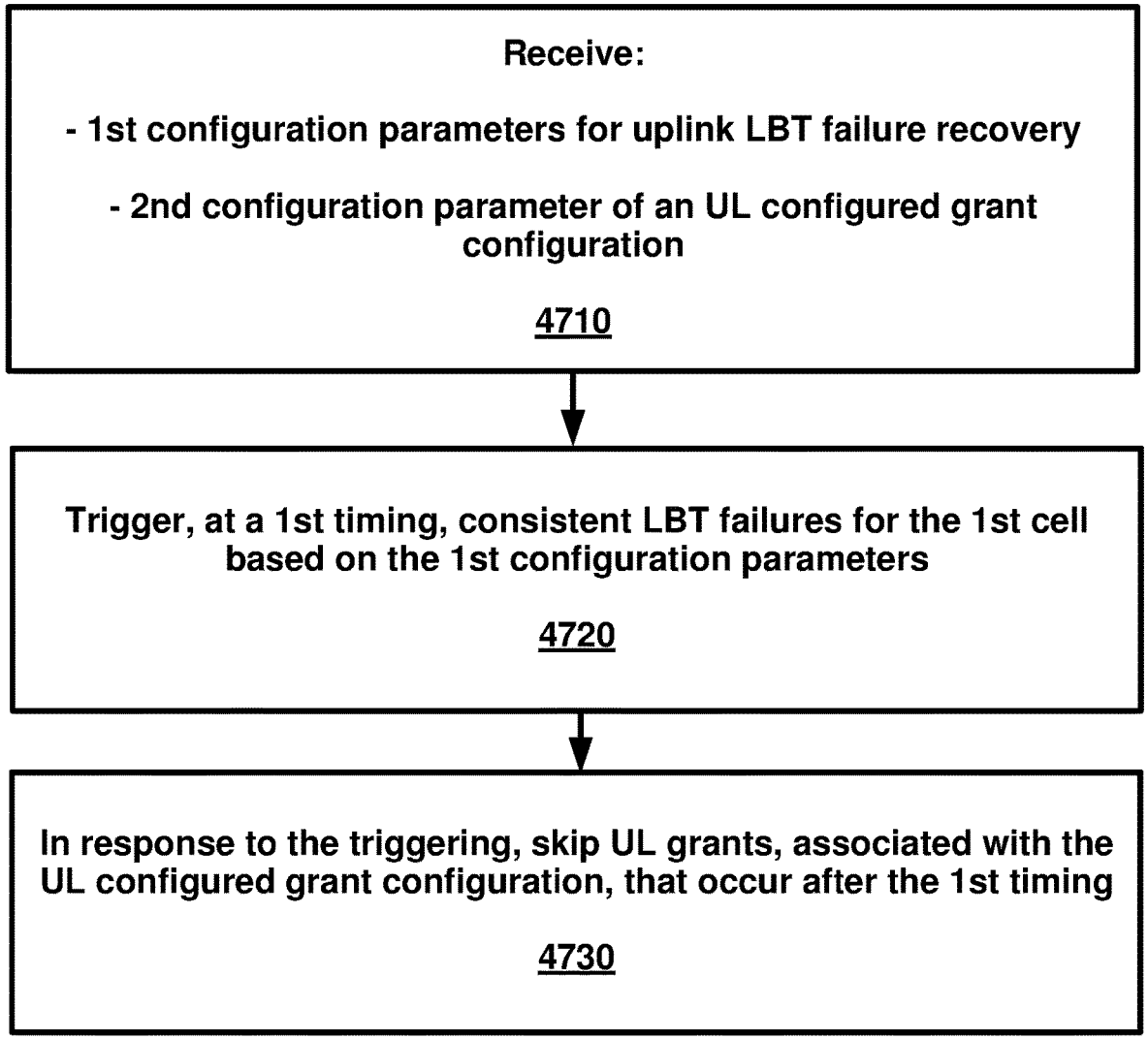
FIG. 47 shows an example flow diagram in accordance with several of various embodiments of the present disclosure.

FIG. 47 shows an example flow diagram in accordance with several of various embodiments of the present disclosure. At 4710, a wireless device may receive: first configuration parameters for uplink listen-before-talk (LBT) failure recovery; and second configuration parameters of an uplink configured grant configuration. At 4720, the wireless device may trigger, at a first timing, consistent LBT failures for the first cell based on the first configuration parameters. At 4730, in response to the triggering, the wireless device may skip a plurality of uplink grants, associated with the uplink configured grant configuration, that occur after the first timing.

Figure 48:
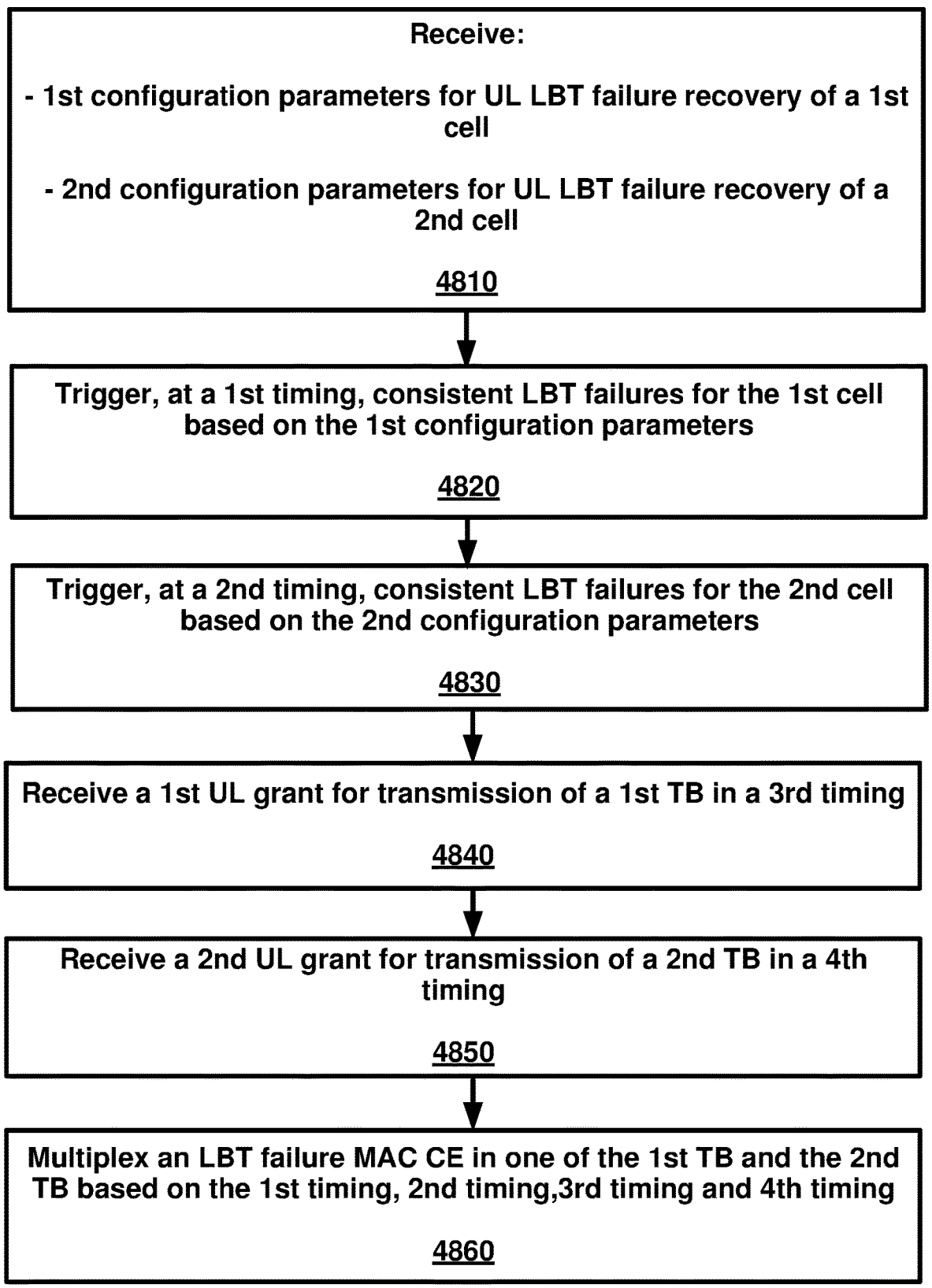
FIG. 48 shows an example flow diagram in accordance with several of various embodiments of the present disclosure.

FIG. 48 shows an example flow diagram in accordance with several of various embodiments of the present disclosure. At 4810, a wireless device may receive: first configuration parameters for uplink listen-before-talk (LBT) failure recovery of a first cell; and second configuration parameters for uplink listen-before-talk (LBT) failure recovery of a second cell. At 4820, the wireless device may trigger, at a first timing, consistent LBT failures for the first cell based on the first configuration parameters. At 4830, the wireless device may trigger, at a second timing after the first timing, consistent LBT failures for the second cell based on the second configuration parameters. At 4840, the wireless device my receive a first uplink grant for transmission of a first transport block (TB) in a third timing. At 4850, the wireless device may receive a second uplink grant for transmission of a second TB in a fourth timing. At 4860, the wireless device may multiplex an LBT failure medium access control (MAC) control element (CE) in one of the first TB and the second TB based on the first timing, the second timing, the third timing and the fourth timing.

Various exemplary embodiments of the disclosed technology are presented as example implementations and/or practices of the disclosed technology. The exemplary embodiments disclosed herein are not intended to limit the scope. Persons of ordinary skill in the art will appreciate that various changes can be made to the disclosed embodiments without departure from the scope. After studying the exemplary embodiments of the disclosed technology, alternative aspects, features and/or embodiments will become apparent to one of ordinary skill in the art. Without departing from the scope, various elements or features from the exemplary embodiments may be combined to create additional embodiments. The exemplary embodiments are described with reference to the drawings. The figures and the flowcharts that demonstrate the benefits and/or functions of various aspects of the disclosed technology are presented for illustration purposes only. The disclosed technology can be flexibly configured and/or reconfigured such that one or more elements of the disclosed embodiments may be employed in alternative ways. For example, an element may be optionally used in some embodiments or the order of actions listed in a flowchart may be changed without departure from the scope.

An example embodiment of the disclosed technology may be configured to be performed when deemed necessary, for example, based on one or more conditions in a wireless device, a base station, a radio and/or core network configuration, a combination thereof and/or alike. For example, an example embodiment may be performed when the one or more conditions are met. Example one or more conditions may be one or more configurations of the wireless device and/or base station, traffic load and/or type, service type, battery power, a combination of thereof and/or alike. In some scenarios and based on the one or more conditions, one or more features of an example embodiment may be implemented selectively.

In this disclosure, the articles "a" and "an" used before a group of one or more words are to be understood as "at least one" or "one or more" of what the group of the one or more words indicate. The use of the term "may" before a phrase is to be understood as indicating that the phrase is an example of one of a plurality of useful alternatives that may be employed in an embodiment in this disclosure.

In this disclosure, an element may be described using the terms "comprises", "includes" or "consists of" in combination with a list of one or more components. Using the terms "comprises" or "includes" indicates that the one or more components are not an exhaustive list for the description of the element and do not exclude components other than the one or more components. Using the term "consists of" indicates that the one or more components is a complete list for description of the element. In this disclosure, the term "based on" is intended to mean "based at least in part on". The term "based on" is not intended to mean "based only on". In this disclosure, the term "and/or" used in a list of elements indicates any possible combination of the listed elements. For example, "X, Y, and/or Z" indicates X; Y; Z; X and Y; X and Z; Y and Z; or X, Y, and Z.

Some elements in this disclosure may be described by using the term "may" in combination with a plurality of features. For brevity and ease of description, this disclosure may not include all possible permutations of the plurality of features. By using the term "may" in combination with the plurality of features, it is to be understood that all permutations of the plurality of features are being disclosed. For example, by using the term "may" for description of an element with four possible features, the element is being described for all fifteen permutations of the four possible features. The fifteen permutations include one permutation with all four possible features, four permutations with any three features of the four possible features, six permutations with any two features of the four possible features and four permutations with any one feature of the four possible features.

Although mathematically a set may be an empty set, the term set used in this disclosure is a nonempty set. Set B is a subset of set A if every element of set B is in set A. Although mathematically a set has an empty subset, a subset of a set is to be interpreted as a non-empty subset in this disclosure. For example, for set A={subcarrier1, subcarrier2}, the subsets are {subcarrier1}, {subcarrier2} and {subcarrier1, subcarrier2}.

In this disclosure, the phrase "based on" may be used equally with "based at least on" and what follows "based on" or "based at least on" indicates an example of one of plurality of useful alternatives that may be used in an embodiment in this disclosure. The phrase "in response to" may be used equally with "in response at least to" and what follows "in response to" or "in response at least to" indicates an example of one of plurality of useful alternatives that may be used in an embodiment in this disclosure. The phrase "depending on" may be used equally with "depending at least on" and what follows "depending on" or "depending at least on" indicates an example of one of plurality of useful alternatives that may be used in an embodiment in this disclosure. The phrases "employing" and "using" and "employing at least" and "using at least" may be used equally in this in this disclosure and what follows "employing" or "using" or "employing at least" or "using at least" indicates an example of one of plurality of useful alternatives that may be used in an embodiment in this disclosure.

The example embodiments disclosed in this disclosure may be implemented using a modular architecture comprising a plurality of modules. A module may be defined in terms of one or more functions and may be connected to one or more other elements and/or modules. A module may be implemented in hardware, software, firmware, one or more biological elements (e.g., an organic computing device and/or a neurocomputer) and/or a combination thereof and/or alike. Example implementations of a module may be as software code configured to be executed by hardware and/or a modeling and simulation program that may be coupled with hardware. In an example, a module may be implemented using general-purpose or special-purpose processors, digital signal processors (DSPs), microprocessors, microcontrollers, application-specific integrated circuits (ASICs), programmable logic devices (PLDs) and/or alike. The hardware may be programmed using machine language, assembly language, high-level language (e.g., Python, FORTRAN, C, C++ or the like) and/or alike. In an example, the function of a module may be achieved by using a combination of the mentioned implementation methods.

What is claimed is:

1. A method comprising:
   receiving, by a wireless device:
      a first parameter indicating a first number of listen-before-talk (LBT) failure instances; and
      a second parameter indicating a first value of an LBT failure detection timer;
   creating a transport block, comprising an LBT failure medium access control (MAC) control element (CE), scheduled for transmission via a first cell in a first timing;
   triggering consistent LBT failure for the first cell based on the first parameter and the second parameter and before the first timing; and
   in response to the triggering, dropping or transmitting the transport block based on one or more conditions.

2. The method of claim 1, wherein:
   the transport block comprises data of one or more logical channels; and
   the one or more conditions are based on one or more configuration parameters of the one or more logical channels.

3. The method of claim 2, further comprising receiving the one or more configuration parameters of the one or more logical channels.

4. The method of claim 1, wherein:
   the transport block comprises data of one or more logical channels; and
   the one or more conditions are based on one or more service types associated with the one or more logical channels.

5. The method of claim 1, wherein:
   the triggering the consistent LBT failure is in a second timing; and
   the one or more conditions are based on a duration between the second timing and the first timing.

6. The method of claim 5, wherein the one or more conditions are based on comparing the duration with a first duration.

7. The method of claim 5, wherein the second timing is after creating the transport block.

8. The method of claim 1, further comprising:
incrementing an LBT counter by one based on an LBT failure of an LBT procedure for an uplink transmission; and
starting the LBT failure detection timer, with the first value, based on the LBT failure.

9. The method of claim 8, wherein the triggering the consistent LBT failure for the first cell is based on the LBT counter reaching the first number.

10. A wireless device comprising:
one or more processors; and
memory storing instructions that, when executed by the one or more processors, cause the wireless device to:
receive:
a first parameter indicating a first number of listen-before-talk (LBT) failure instances; and
a second parameter indicating a first value of an LBT failure detection timer;
create a transport block, comprising an LBT failure medium access control (MAC) control element (CE), scheduled for transmission via a first cell in a first timing;
trigger consistent LBT failure for the first cell based on the first parameter and the second parameter and before the first timing; and
in response to the triggering, drop or transmit the transport block based on one or more conditions.

11. The wireless device of claim 10, wherein:
the transport block comprises data of one or more logical channels; and
the one or more conditions are based on one or more configuration parameters of the one or more logical channels.

12. The wireless device of claim 10, wherein:
the transport block comprises data of one or more logical channels; and
the one or more conditions are based on one or more service types associated with the one or more logical channels.

13. The wireless device of claim 10, wherein:
the triggering the consistent LBT failure is in a second timing; and
the one or more conditions are based on a duration between the second timing and the first timing.

14. The wireless device of claim 13, wherein the one or more conditions are based on comparing the duration with a first duration.

15. The wireless device of claim 13, wherein the second timing is after creating the transport block.

16. The wireless device of claim 10, wherein the instructions, when executed by the one or more processors, further cause the wireless device to:
increment an LBT counter by one based on an LBT failure of an LBT procedure for an uplink transmission; and
start the LBT failure detection timer, with the first value, based on the LBT failure.

17. The wireless device of claim 16, wherein the triggering the consistent LBT failure for the first cell is based on the LBT counter reaching the first number.

18. A system comprising:
a base station; and
a wireless device comprising: one or more processors; and memory storing instructions that, when executed by the one or more processors, cause the wireless device to: receive a first parameter indicating a first number of listen-before-talk (LBT) failure instances and a second parameter indicating a first value of an LBT failure detection timer; create a transport block, comprising an LBT failure medium access control (MAC) control element (CE), scheduled for transmission via a first cell in a first timing; trigger consistent LBT failure for the first cell based on the first parameter and the second parameter and before the first timing; and in response to the triggering, drop or transmit the transport block based on one or more conditions.

* * * * *